United States Patent

Moteki et al.

[11] Patent Number: 5,960,005
[45] Date of Patent: *Sep. 28, 1999

[54] METHOD AND DEVICE FOR TWO-WAY COMMUNICATION NETWORK

[75] Inventors: Umihiko Moteki; Masaharu Matsumoto, both of Tachikawa; Yutaka Suzuki, Kawasaki; Atsuo Serikawa, Kawasaki; Yuji Maeda, Kawasaki; Yoshihide Morimoto; Takeshi Uehara, both of Tachikawa, all of Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/683,361

[22] Filed: Jul. 18, 1996

[30] Foreign Application Priority Data

Dec. 25, 1995 [JP] Japan ................................... 7-336573
Dec. 28, 1995 [JP] Japan ................................... 7-343933
May 10, 1996 [JP] Japan ................................... 8-116595

[51] Int. Cl.$^6$ ............................................. H04B 17/00
[52] U.S. Cl. .................................................. 370/496
[58] Field of Search .................................. 370/437, 445, 370/446, 449, 457, 465, 468, 473, 480, 481, 482, 485, 491, 496, 252; 455/4.1, 5.1, 17–20, 509, 522, 59, 62, 63, 67.1, 67.4, 69, 70, 71, 115, 116, 192.1, 192.2; 340/825.06

[56] References Cited

U.S. PATENT DOCUMENTS

| | | | |
|---|---|---|---|
| 4,512,033 | 4/1985 | Schrock | 455/2 |
| 4,816,825 | 3/1989 | Chan et al. | 340/825.5 |
| 5,056,109 | 10/1991 | Gilhousen et al. | 370/342 |
| 5,216,692 | 6/1993 | Ling | 370/200 |
| 5,257,415 | 10/1993 | Kumagai et al. | 455/126 |
| 5,361,394 | 11/1994 | Shigihara | 455/5.1 |
| 5,521,906 | 5/1996 | Grube et al. | 370/352 |
| 5,526,529 | 6/1996 | Tamano | 455/103 |

FOREIGN PATENT DOCUMENTS

| | | |
|---|---|---|
| 63-42534 | 2/1988 | Japan . |
| 63-119330 | 5/1988 | Japan . |
| 64-80188 | 3/1989 | Japan . |
| 2-192231 | 7/1990 | Japan . |
| 4-2129 | 1/1992 | Japan . |
| 4-51725 | 2/1992 | Japan . |
| 4-151918 | 5/1992 | Japan . |
| 5-130102 | 5/1993 | Japan . |
| 6-90195 | 3/1994 | Japan . |
| 7-23368 | 1/1995 | Japan . |

Primary Examiner—Chi H. Pham
Assistant Examiner—Kwang B. Yao
Attorney, Agent, or Firm—Helfgott & Karas, P C.

[57] ABSTRACT

A method of an automatic adjustment of a carrier level is used for a system having a center device, a communication line extending from the center device, and at least one communication-terminal device connected to the communication line. The system conducts two-way communication of data signals on the communication line based on a predetermined multiplexing scheme. The method includes the steps of periodically transmitting a carrier-level-measurement message from the center device to the communication line for each high-frequency channel used for the two-way communication, the carrier-level-measurement message being sent via a first channel different from channels used for communication and control, transmitting a reply message in response to the carrier-level-measurement message from a communication-terminal device to the center device via a second channel different from the channels used for communication and control, transmitting a carrier-level-adjustment message from the center device to the communication line via the first channel, the carrier-level-adjustment message containing level-adjustment information based on a carrier level of the reply message received by the center device, and adjusting a carrier level of the communication-terminal device based on the level-adjustment information of the carrier-level-adjustment message received by the communication-terminal device.

20 Claims, 88 Drawing Sheets

FIG. 4

| TRANSMISSION METHOD | TRANSMISSION MEDIA | COAX CABLE (HFC) | | |
|---|---|---|---|---|
| | TRANSMISSION RATE | 8.192 Mbps | | |
| | TRANSMISSION RF CHANNEL | UP | 10MHz ~ 50MHz, 1 OF 5 CHANNELS | |
| | | DOWN | 222MHz ~ 550MHz, 1 OF 54 CHANNELS | |
| | ACCESSING METHOD | UP | TDMA (MULTI-ACCESS COMMUNICATION BASED ON SLOTTED ALOHA) | |
| | | DOWN | TDM | |
| CONVERSION METHOD | | QPSK (4.096 Mbaud) | | |
| FRAME FORMAT | FRAME STRUCTURE | UP | 4096 bytes / 4 ms | |
| | | DOWN | (128 bytes / 125 s) x 32, MULTI-FRAME FORMAT | |
| | CHANNEL STRUCTURE | UP | B CHANNEL x 95 | (VOICE/DATA : 64Kbps) |
| | | | C CHANNEL x 1 | (INTERACTIVE / CONTROL : 128Kbps) |
| | | | D CHANNEL x 1 | (CALL CONTROL : 64Kbps) |
| | | | M CHANNEL x 1 | (MAINTENANCE/DISTANCE MEASUREMENT : 16kbps) |
| | | | ACK-C CHANNEL x 1 | (C-CHANNEL-DATA-FRAME RESPONSE : 10Kbps) |
| | | | ACK-D CHANNEL x 1 | (D-CHANNEL-DATA-FRAME RESPONSE : 10Kbps) |
| | | DOWN | B CHANNEL x 95 | (VOICE/DATA : 64Kbps) |
| | | | C CHANNEL x 1 | (INTERACTIVE/CONTROL : 240Kbps) |
| | | | D CHANNEL x 1 | (CALL CONTROL : 120Kbps) |
| | | | M CHANNEL x 1 | (MAINTENANCE/DISTANCE MEASUREMENT : 16Kbps) |

FIG. 13

| TSTB NUMBER | AREA FOR DIFFERENCE CL | | | | | AREA FOR AVERAGE |
|---|---|---|---|---|---|---|
| | $D_1$ | $D_2$ | $D_3$ | ... | $D_{N-1}$ | $D_N$ | $(D_1 + \cdots + D_N)/N$ or $(N'+1)$ |
| #1 | 0 | 1 | 0 | ... | 0 | | 0 |
| #2 | 0 | 0 | 0 | ... | 0 | | 0 |
| ... | | | | | | | |
| #i | | 0 | 1 | ... | 0 | 0 | 0 |
| #(i+1) | | | | ... | 1 | 1 | 1 |

$D_0 \sim D_N$ : DIFFERENCE CL IN CHRONOLOGICAL ORDER WITH $D_N$ BEING NEWEST

FIG. 22A
| TSTB NUMBER | AREA FOR DIFFERENCE CL | | | | | | AREA FOR AVERAGE |
|---|---|---|---|---|---|---|---|
| | $D_1$ | $D_2$ | $D_3$ | -- | $D_{N-1}$ | $D_N$ | $(D_1 + \cdots + D_N)/N$ |
| #i | 1 | 0 | 1 | -- | 0 | 0 | 0 |
OLDER ←→ NEWER
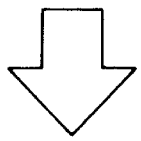
FIG. 22B
| TSTB NUMBER | AREA FOR DIFFERENCE CL | | | | | | AREA FOR AVERAGE |
|---|---|---|---|---|---|---|---|
| | $D_1$ | $D_2$ | $D_3$ | -- | $D_{N-1}$ | $D_N$ | $(D_1 + \cdots + D_N)/N \text{ or } (N'+1)$ |
| #i | | 0 | 1 | -- | 0 | 0 | 0 |
↑ ELIMINATE THE OLDEST
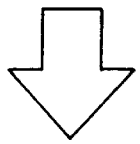
FIG. 22C
| TSTB NUMBER | AREA FOR DIFFERENCE CL | | | | | | AREA FOR AVERAGE |
|---|---|---|---|---|---|---|---|
| | $D_1$ | $D_2$ | $D_3$ | -- | $D_{N-1}$ | $D_N$ | $(D_1 + \cdots + D_N)/N \text{ or } (N'+1)$ |
| #i | 0 | 1 | 0 | -- | 0 | | 0 |
← SHIFT TO THE LEFT

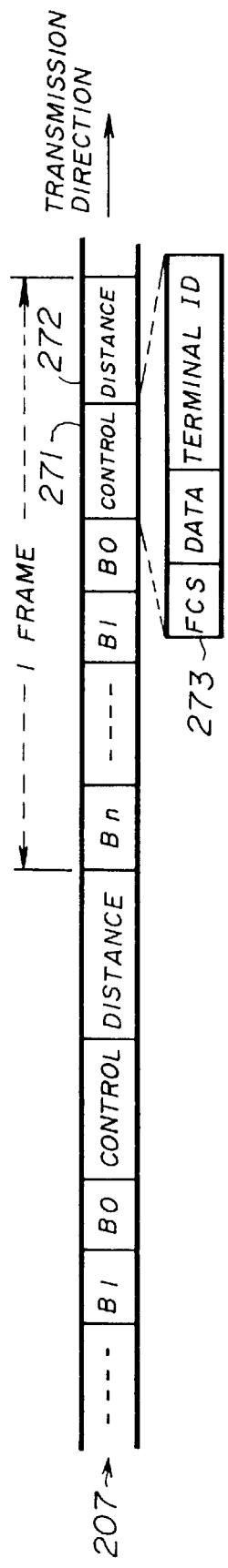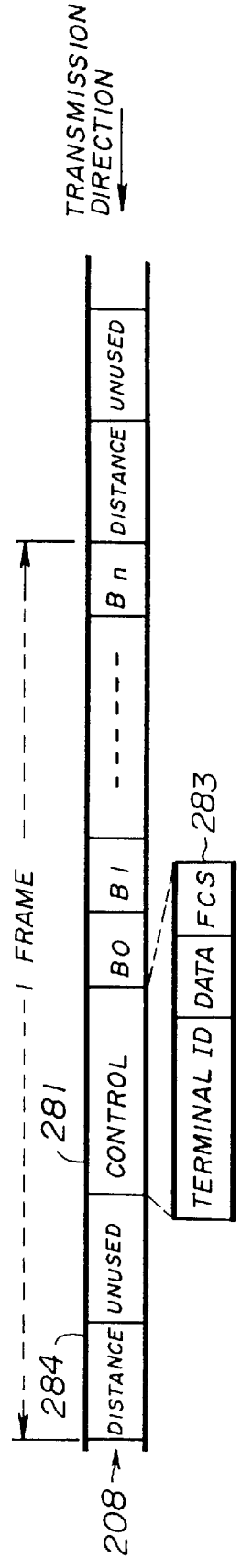

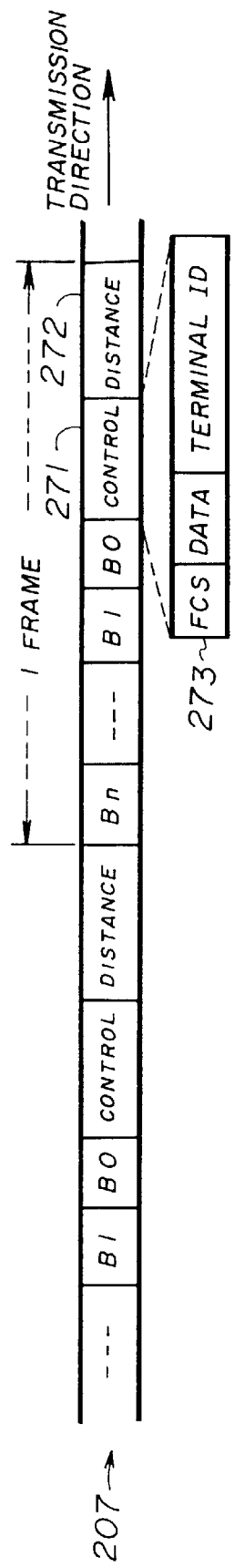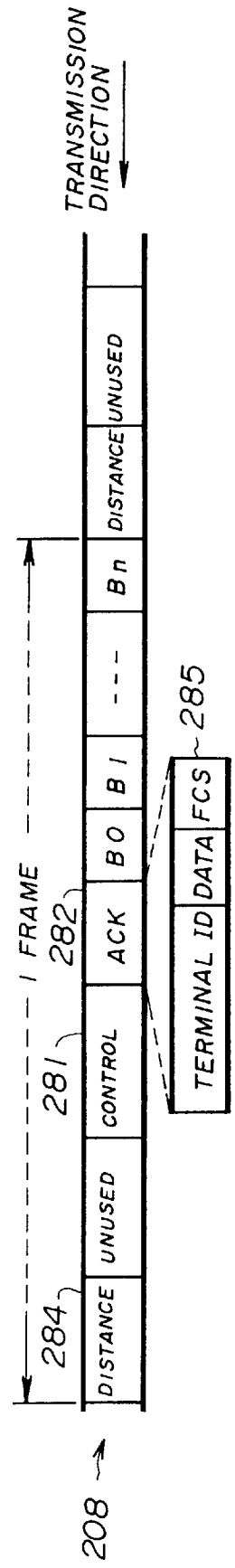

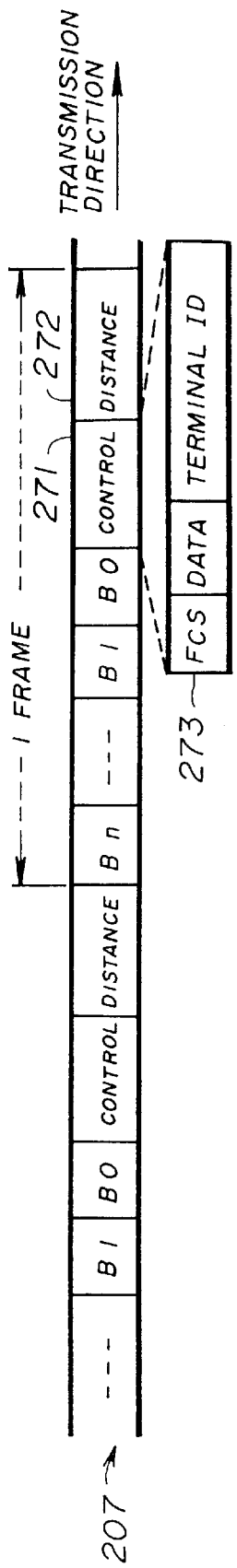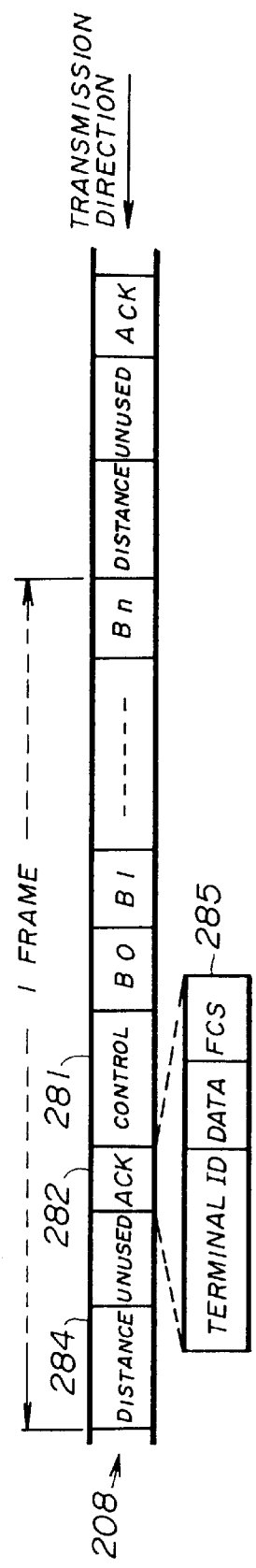
FIG. 52A
FIG. 52B

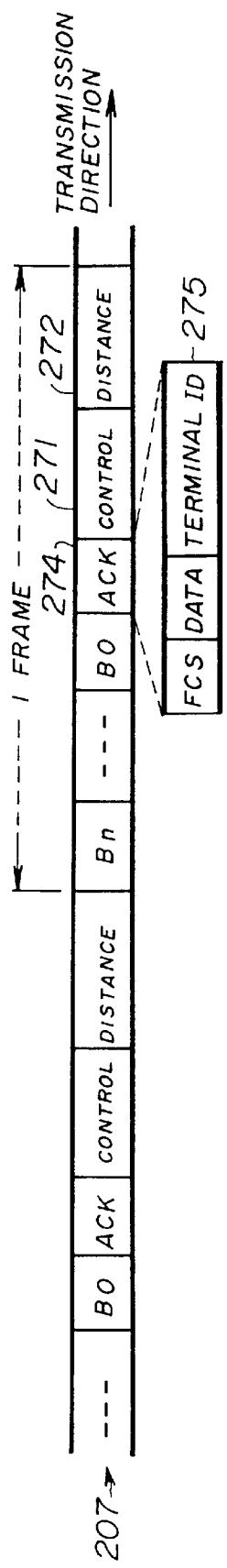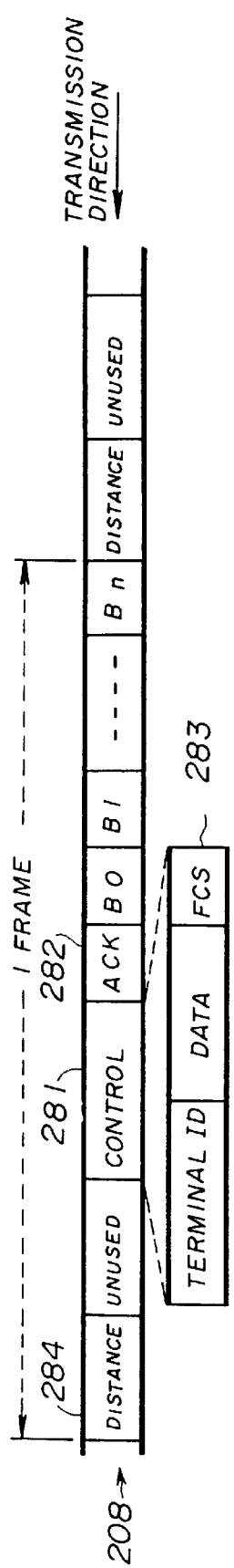

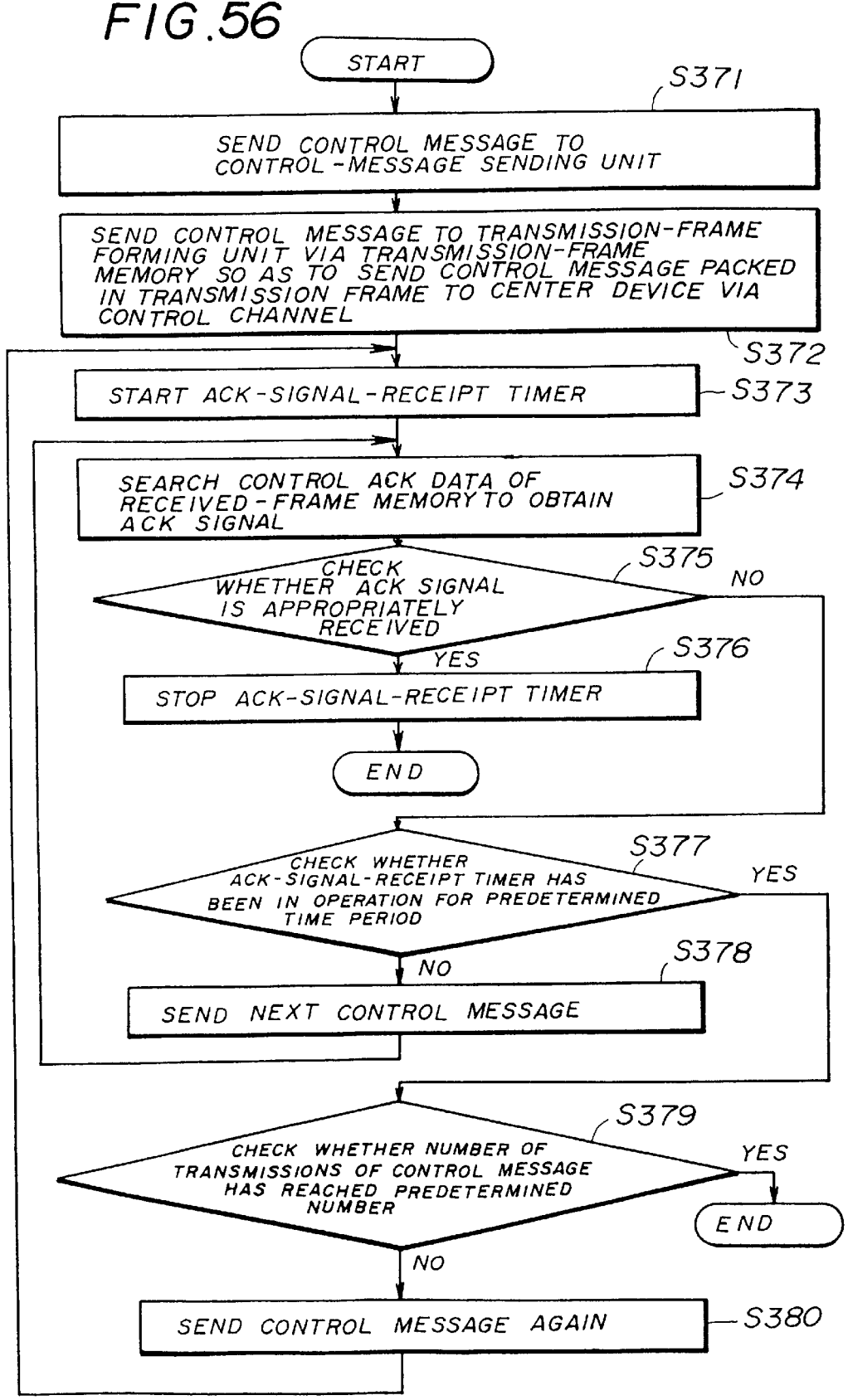

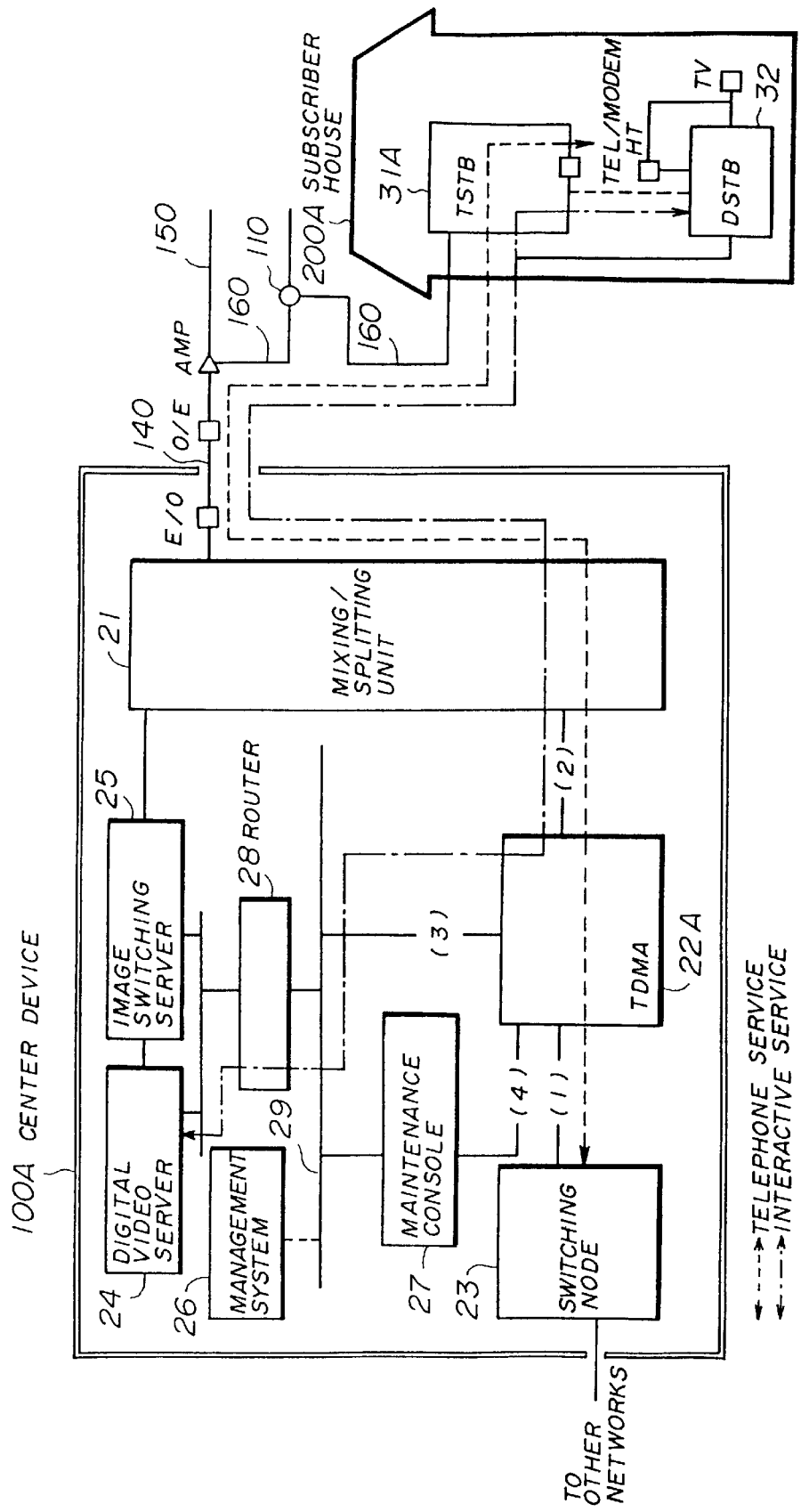

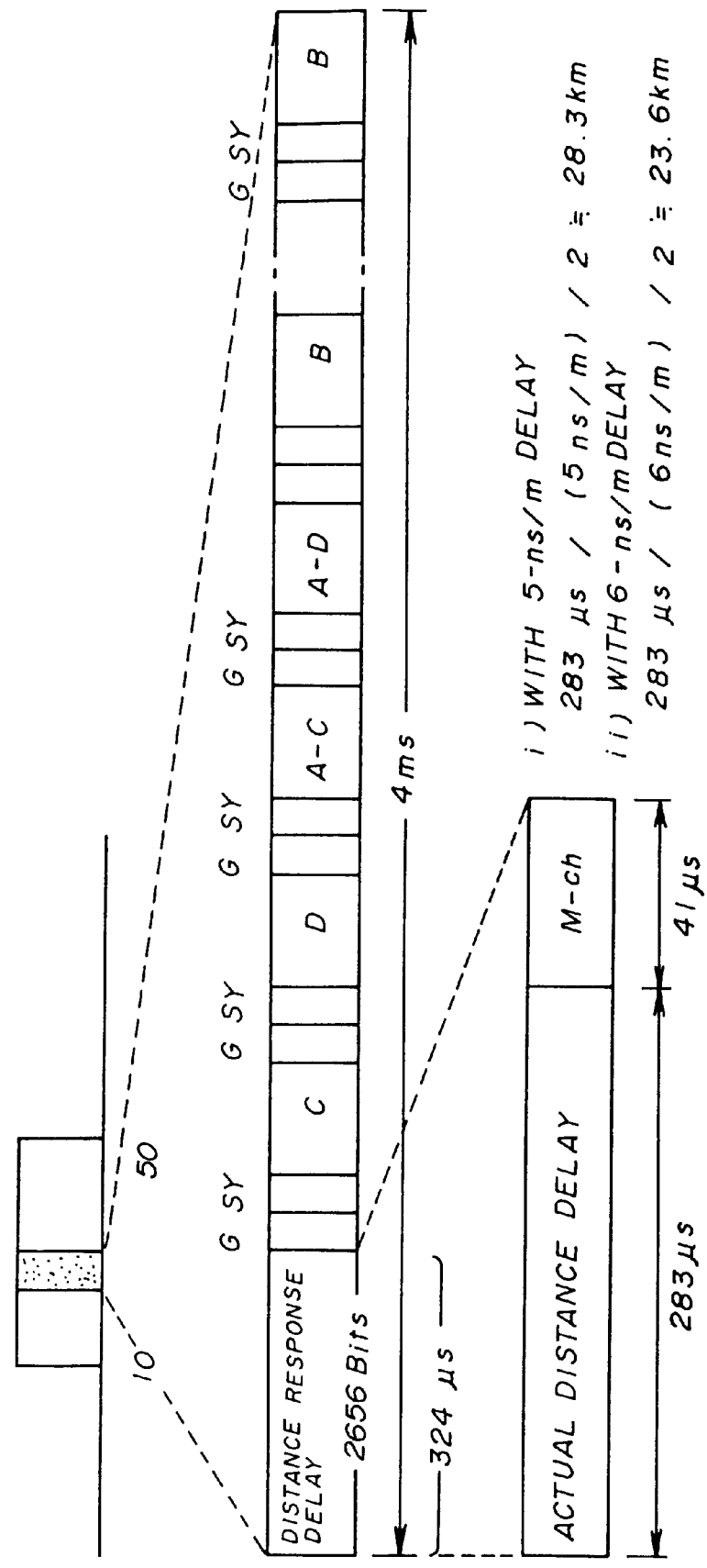

FIG. 60A M CHANNEL (ID ALLOCATION, DISTANT MEASUREMENT) [336 BITS / 41 μs]

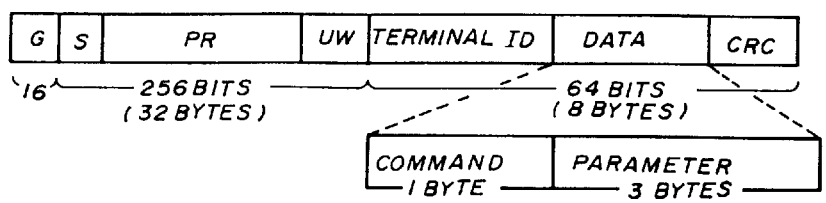

FIG. 60B C CHANNEL (INTERACTIVE CONTROL) [656 BITS / 80 μs]

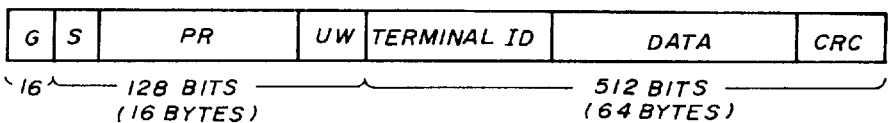

FIG. 60C D CHANNEL (CALL CONTROL) [400 BITS / 49 μs]

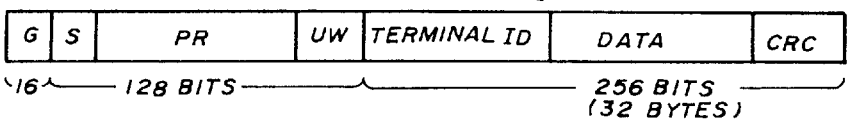

FIG. 60D B CHANNEL (VOICE / DATA) [304 BITS / 37 μs]

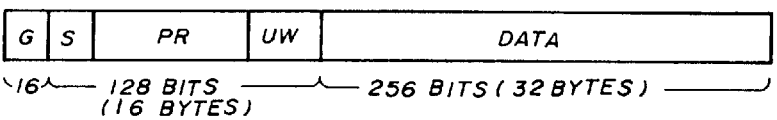

FIG. 60E ACK-C CHANNEL (C-CHANNEL-DEDICATED ACK) [88 BITS / 11 μs]

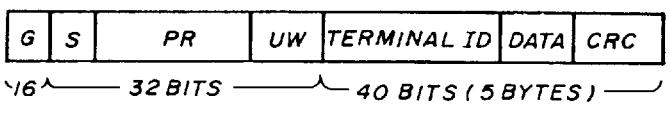

FIG. 60F ACK-D CHANNEL (D-CHANNEL-DEDICATED ACK) [88 BITS / 11 μs]

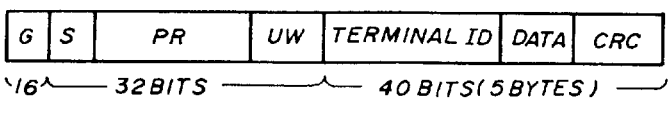

G : GUARD TIMING
S : START BIT
PR: SYNCHRONIZATION BIT (PRE-AMBLE)
UW: UNIQUE WORD (11100011)
SY : SYNCHRONIZATION SIGNAL (PR + UW)

FIG. 63A

MF CONFIGURATION

| F | MF | M-ch/C-ch/D-ch | B0 | B1 | B2 | B3 | ~ | B91 | B92 | B93 | B94 | NL |

|←——————————— 1 FRAME (125 μs) ———————————→|

FIG. 63B

| TS NO / FRAME | F/MF | | M-ch/C-ch/D-ch | | | | B-ch | | | | | | | | NL |
|---|---|---|---|---|---|---|---|---|---|---|---|---|---|---|---|
| | 00 | 01 | 02 | 09 | 17 | 31 | 32 | 33 | 35 | 36 | ~ | 123 | 124 | 125 | 126 | 127 |
| 00 | MF | | M ch | | NULL | | B0 | B1 | B2 | B3 | ~ | B91 | B92 | B93 | B94 | NL |
| 01 | F | | | | C0-ch | | B0 | B1 | B2 | B3 | ~ | B91 | B92 | B93 | B94 | NL |
| 02 | F | | | | C1-ch | | B0 | B1 | B2 | B3 | ~ | B91 | B92 | B93 | B94 | NL |
| 03 | F | | | | C2-ch | | B0 | B1 | B2 | B3 | ~ | B91 | B92 | B93 | B94 | NL |
| 04 | F | | | | C3-ch | | B0 | B1 | B2 | B3 | ~ | B91 | B92 | B93 | B94 | NL |
| 05 | F | | | | D0-ch | | B0 | B1 | B2 | B3 | ~ | B91 | B92 | B93 | B94 | NL |
| 06 | F | | | | D1-ch | | B0 | B1 | B2 | B3 | ~ | B91 | B92 | B93 | B94 | NL |
| 07 | F | | | | NULL | | B0 | B1 | B2 | B3 | ~ | B91 | B92 | B93 | B94 | NL |
| ≀ | ≀ | | | | ≀ | | | | | | ≀ | | | | | NL |
| 14 | F | | | | NULL | | B0 | B1 | B2 | B3 | ~ | B91 | B92 | B93 | B94 | NL |
| 15 | F | | | | NULL | | B0 | B1 | B2 | B3 | ~ | B91 | B92 | B93 | B94 | NL |
| 16 | F | | | | NULL | | B0 | B1 | B2 | B3 | ~ | B91 | B92 | B93 | B94 | NL |
| 17 | F | | | | NULL | | B0 | B1 | B2 | B3 | ~ | B91 | B92 | B93 | B94 | NL |
| ≀ | ≀ | | | | ≀ | | | | | | ≀ | | | | | NL |
| 28 | F | | | | NULL | | B0 | B1 | B2 | B3 | ~ | B91 | B92 | B93 | B94 | NL |
| 29 | F | | | | NULL | | B0 | B1 | B2 | B3 | ~ | B91 | B92 | B93 | B94 | NL |
| 30 | F | | | | NULL | | B0 | B1 | B2 | B3 | ~ | B91 | B92 | B93 | B94 | NL |
| 31 | F | | | | NULL | | B0 | B1 | B2 | B3 | ~ | B91 | B92 | B93 | B94 | NL |

1 MULTI-FRAME = 32 FRAMES (125 μs × 32 = 4ms)

FIG. 72

| TSTB NUMBER | AREA FOR DIFFERENCE DT | | | | | | AREA FOR AVERAGE |
|---|---|---|---|---|---|---|---|
| | $D_1$ | $D_2$ | $D_3$ | ... | $D_{N-1}$ | $D_N$ | $(D_1 + \cdots + D_N)/N$ or $(N'+1)$ |
| #1 | 0 | 1 | 0 | | 0 | | 0 |
| #2 | 0 | 0 | 0 | | 0 | | 0 |
| #i | | 0 | 1 | | 0 | 0 | 0 |
| #(i+1) | | | | | 1 | 1 | 1 |

$D_0 \sim D_N$ : DIFFERENCE DT IN CHRONOLOGICAL ORDER WITH $D_N$ BEING NEWEST

FIG. 81A
| TSTB NUMBER | AREA FOR DIFFERENCE DT | | | | | | AREA FOR AVERAGE |
|---|---|---|---|---|---|---|---|
| | $D_1$ | $D_2$ | $D_3$ | | $D_{N-1}$ | $D_N$ | $(D_1 + \cdots + D_N)/N$ |
| #1 | 1 | 0 | 1 | | 0 | 0 | 0 |
OLDER ←—→ NEWER
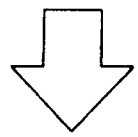
FIG. 81B
| TSTB NUMBER | AREA FOR DIFFERENCE DT | | | | | | AREA FOR AVERAGE |
|---|---|---|---|---|---|---|---|
| | $D_1$ | $D_2$ | $D_3$ | | $D_{N-1}$ | $D_N$ | $(D_1 + \cdots + D_N)/Nor(N'+1)$ |
| #i | | 0 | 1 | | 0 | 0 | 0 |
↑
ELIMINATE THE OLDEST
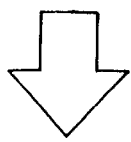
FIG. 81C
| TSTB NUMBER | AREA FOR DIFFERENCE DT | | | | | | AREA FOR AVERAGE |
|---|---|---|---|---|---|---|---|
| | $D_1$ | $D_2$ | $D_3$ | | $D_{N-1}$ | $D_N$ | $(D_1 + \cdots + D_N)/Nor(N'+1)$ |
| #i | 0 | 1 | 0 | | 0 | | 0 |
←——— SHIFT TO THE LEFT

METHOD AND DEVICE FOR TWO-WAY COMMUNICATION NETWORK

BACKGROUND OF THE INVENTION

1. Field of the Invention

The present invention generally relates to digital communication networks for two-way communication of data signals of different media such as voice signals, data signals, image signals, etc., based on a multiplexing method such as frequency-division multiplexing, where a single communication line extending from a center device is connected to one or more communication terminal devices.

The present invention particularly relates to an automatic adjustment of carrier levels, transmission of acknowledge signals, and an automatic adjustment of signal-transmission timings between the center device and the communication terminal devices connected with each other via the communication line on the digital communication network.

In the field of communication technology, an intensive research effort has been directed to two-way communication of data of various types on a network system which connects a center device and a plurality of communication terminal devices via a shared communication line. An example of such a network includes a CATV transmission system which has been used in the field. In the network, levels of carriers which the center device or each of the communication terminal devices transmits to the communication line should be set to a predetermined level by taking into consideration the signal loss along the communication line. The present invention relates to an automatic adjustment of the carrier level of each communication terminal device.

2. Description of the Prior Art

Typically, a carrier level of each communication terminal device is fixedly set to a predetermined carrier level which can compensate for the loss along the communication line. The determination of the carrier level is made after an examination of various aspects including the distance between the communication terminal device and the center device (i.e., after laying out a loss plan). It is generally preferable that a level difference between signals received at the center device is within a range of 6 dB. As for transmission from the center device, the carrier level is fixedly set to a predetermined level on the basis of the distance between the center device and the farthest communication terminal device.

In contrast to the fixed carrier level, an automatic adjustment of a carrier level for the communication terminal devices has been proposed. For example, the Japanese Patent Laid-open Application No. 63-119330 discloses a level adjustment which is carried out only at the time of receiving a packet sent from a communication terminal device (i.e., only at the time of data transmission). This level adjustment has been proposed to counter a problem in CSMA/CD (carrier sense multiple access with collision detection) used in the broadband LAN, where an existence of a communication terminal device having an inappropriate carrier level makes it impossible to detect a packet collision so as to incapacitate communication with other communication terminal devices. In this level adjustment, a communication terminal device needing the level adjustment contacts the center device, and, then, the center device sends back a level detected at the center device. Based on this received level, the communication terminal device adjusts the transmission level.

Depending on conditions of an environment of the communication terminal devices and the communication line, however, the loss of the carrier level may deviate from the predetermined loss plan, or may vary over a passage of time in a short run as well as in a long run. Also, it is possible that the carrier level itself changes. In these cases, the center device may detect these deviation and variations as an error, or may even be unable to detect the carrier.

The level adjustment method disclosed in the above reference, however, measures a level of the received signal only after a communication terminal device requests the level adjustment, and, then, sends the detected level back to the communication terminal device. Thus, factors varying over a passage of time cannot be tracked to carry out an appropriate level adjustment.

Also, since the communication for the level adjustment is conducted via an ordinary communication channel, it may affect communications of other communication terminal devices.

Furthermore, when a frequency band is divided into a plurality of high-frequency (RF) channels having equal bandwidth so as to carry signals such as voice, data, images via each channel, a determined carrier level of some channel may have an adverse effect on other channels, depending on which channel is used.

The level adjustment method disclosed in the above reference does not take into account these problems.

Accordingly, there is a need for a method and a device for an automatic carrier-level adjustment which can adjust the carrier level for each channel by following actual level fluctuation without affecting ordinary communication.

SUMMARY OF THE INVENTION

Accordingly, it is a general object of the present invention to provide a method and a device for an automatic carrier-level adjustment which can satisfy the need described above.

It is another and more specific object of the present invention to provide a method and a device for an automatic carrier-level adjustment which can adjust the carrier level for each channel by following actual level fluctuation without affecting ordinary communication.

In order to achieve the above objects according to the present invention, a method of an automatic adjustment of a carrier level is used for a system having a center device, a communication line extending from the center device, and at least one communication-terminal device connected to the communication line. The system conducts two-way communication of data signals on the communication line based on a predetermined multiplexing scheme. The method includes the steps of periodically transmitting a carrier-level-measurement message from the center device to the communication line for each high-frequency channel used for the two-way communication, the carrier-level-measurement message being sent via a first channel different from channels used for communication and control, transmitting a reply message in response to the carrier-level-measurement message from a communication-terminal device to the center device via a second channel different from the channels used for communication and control, transmitting a carrier-level-adjustment message from the center device to the communication line via the first channel, the carrier-level-adjustment message containing level-adjustment information based on a carrier level of the reply message received by the center device, and adjusting a carrier level of the communication-terminal device based on the level-adjustment information of the carrier-level-adjustment message received by the communication-terminal device.

The same objects are achieved by a center device used in a system for a two-way communication of data signals based on a predetermined multiplexing scheme, the center device connected to a communication line, the communication line connected to at least one communication terminal device. The center device includes a first unit for periodically transmitting carrier-level-measurement message to the communication line for each high-frequency channel used for the two-way communication, the carrier-level-measurement message being sent via a first channel different from channels used for communication and control, and a second unit for transmitting a carrier-level-adjustment message to the communication line via the first channel, the carrier-level-adjustment message containing level-adjustment information based on a received-carrier level of a reply message sent from a communication-terminal device responding to the carrier-level-measurement message, the reply message being sent via a second channel different from the channels used for communication and control.

With this center device, a communication-terminal device is used in the system for the two-way communication of data signals based on the predetermined multiplexing scheme. The communication-terminal device includes a first unit for periodically receiving a carrier-level-measurement message for each high-frequency channel used for the two-way communication as the carrier-level-measurement message is sent from the center device via a first channel different from channels used for communication and control, so as to transmit a reply message to the center device in response to the carrier-level-measurement message via a second channel different from the channels used for communication and control, and a second unit for adjusting a carrier level for transmission based on level-adjustment information after receiving a carrier-level-adjustment message from the center device via the first channel, the carrier-level-adjustment message containing the level-adjustment information based on a carrier level of the reply message received by the center device.

In the method described above or in the center device and the communication-terminal device described above, the automatic carrier-level adjustment of the communication-terminal device is periodically carried out via a channel which is different from those used for ordinary communications and the control thereof. Therefore, the automatic adjustment of the carrier level of each channel reflecting an actual level fluctuation is achieved without disturbing the ordinary communications.

Other objects and further features of the present invention will be apparent from the following detailed description when read in conjunction with the accompanying drawings.

BRIEF DESCRIPTION OF THE DRAWINGS

FIG. 4 is a table chart showing an interface structure of a coaxial cable of FIG. 3;

FIG. 13 is a table chart showing a carrier-level-data table TBL;

FIGS. 22A through 22C are table charts showing a process of a step S157;

FIGS. 42A and 42B are illustrative drawings showing formats of frames used for a downward transmission and an upward transmission, respectively, between the center device and the terminal device;

FIGS. 45A and 45B are illustrative drawings showing frame formats used for transmission between the center device and the terminal devices according to a first embodiment of a second principle of the present invention;

FIGS. 52A and 52B are illustrative drawings showing frame formats used for transmission between the center device and the terminal devices according to the second embodiment of the second principle;

FIGS. 55A and 55B are illustrative drawings showing frame formats used for transmission between the center device and the terminal devices according to the third embodiment of the second principle;

FIG. 56 is a flowchart of an operation of the terminal device according to the third embodiment of the second principle;

FIG. 58 is a block diagram of a configuration of a CATV system according to an embodiment of a third principle of the present invention;

FIG. 59 is an illustrative drawing showing a frame structure of an upward-direction frame based on the interface structure of FIG. 4;

FIGS. 60A through 60F are illustrative drawings showing channel structures of the upward-direction frame;

FIG. 63A and 63B are illustrative drawings showing details of a multi-frame structure;

FIG. 72 is a table chart showing a transmission-delay-time-data table;

FIGS. 81A through 81C are table charts showing a process of a step S1157;

FIG. 95 is a sequence diagram of an operation sequence when the TDMA unit cannot receive a response transmitted from the newly installed communication-terminal unit responding to a global message because of a transmission error or the like.

DESCRIPTION OF THE PREFERRED EMBODIMENTS

In the following, principles and embodiments of the present invention will be described with reference to the accompanying drawings.

Figure 1:
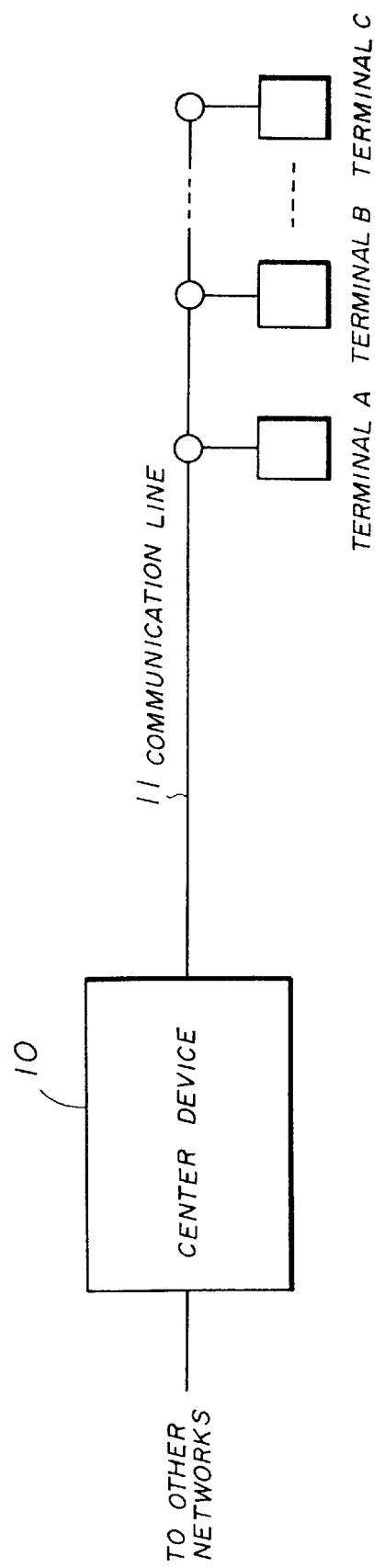
FIG. 1 is a block diagram of an example of a system configuration of a digital communication network.

FIG. 1 is a block diagram of an example of a system configuration of a digital communication network. In FIG. 1, a plurality of terminals A, B, and C are connected to a single communication line 11 extending from a center device 10. The center device 10 and each terminal can conduct a two-way communication of data signals for different media such as voice signals, data signals, image signals, etc., based on a multiplexing method such as a frequency-division multiplexing. Here, the center device 10 may be connected to other communication networks. The terminals A, B, and C include telephones and television sets, for example.

Figure 2:
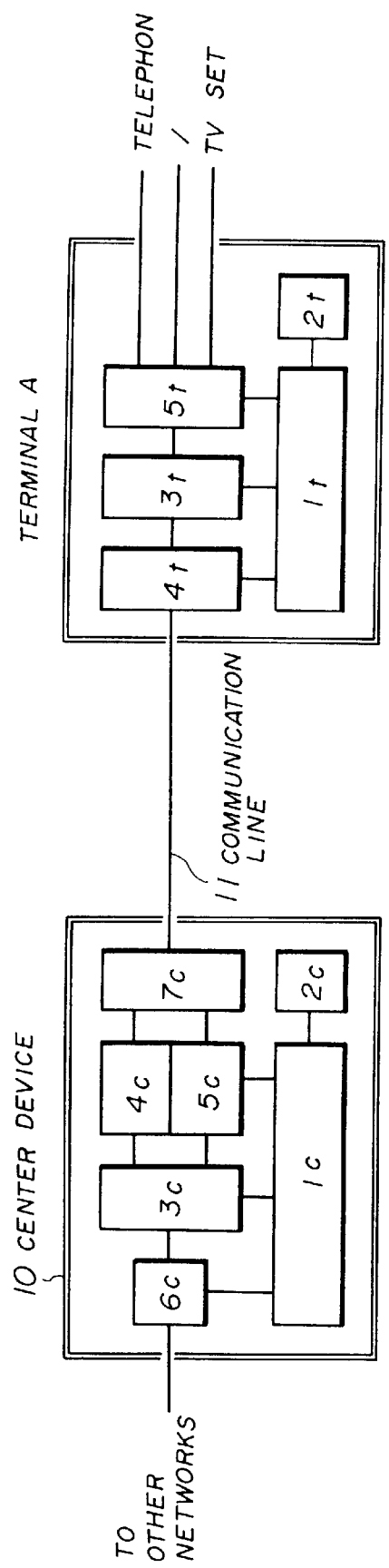
FIG. 2 is a block diagram of a detailed configuration of a center device and a terminal of FIG. 1.

FIG. 2 is a block diagram of a detailed configuration of the center device 10 and the terminal A of FIG. 1. The center device 10 includes a central-control unit 1c, a memory unit 2c, a switching-control unit 3c, a downward-communication-line interface 4c, an upward-communication-line interface 5c, a voice/data/image-signal-interface unit 6c, and a mixing/splitting unit 7c.

The central-control unit 1c is responsible for the entire control of the center device 10. The memory unit 2c stores operation data and system programs describing the control of the center device 10. The switching-control unit 3c carries out a switching process of voice signals, data signals, image signals, etc. The downward-communication-line interface 4c modulates a high-frequency signal (carrier) by a digital signal received from the switching-control unit 3c, and supplies the modulated signal to the mixing/splitting unit 7c for each high-frequency channel. The frequency band of the communication line 11 is divided into a plurality of frequency bands to create each channel.

The upward-communication-line interface 5c demodulates a high-frequency signal received from the mixing/splitting unit 7c to output a digital signal, and supplies the digital signal to the switching-control unit 3c. The voice/data/image-signal-interface unit 6c controls an interface for sending and receiving the voice signals, data signals, image signals, etc. The mixing/splitting unit 7c mixes the high-frequency signal of each high-frequency channel received from the downward-communication-line interface 4c into an interface frequency band used for communication with the terminal, and transmits it to the terminal. Also, the mixing/splitting unit 7c receives a signal within the interface frequency band from the terminal, and separates it into each high-frequency channel. Then, the mixing/splitting unit 7c sends the signal of each high-frequency channel to the upward-communication-line interface 5c.

The terminal A includes a central-control unit 1t, a memory unit 2t, a communication-control unit 3t, a high-frequency-modem unit 4t, and a peripheral-interface unit 5t.

The central-control unit 1t is responsible for the entire control of the terminal A. The memory unit 2t stores operation data and system programs describing the control of the terminal A. The communication-control unit 3t controls exchanges of data signals and control signals between the high-frequency-modem unit 4t and the peripheral-interface unit 5t.

The high-frequency-modem unit 4t demodulates the high-frequency signal received from the center device 10 to create digital data, and supplies the digital data to the communication-control unit 3t. Also, the high-frequency-modem unit 4t modulates a high-frequency signal (carrier) by a digital signal received from the communication-control unit 3t, and supplies the modulated signal to the center device 10. The peripheral-interface unit 5t conveys signals received from external devices such as telephone machines and television sets to the communication-control unit 3t. Also, the peripheral-interface unit 5t conveys the signals received from the communication-control unit 3t to the external devices.

In the above configuration, according to a first embodiment of the present invention, the center device 10 and the terminals A, B, and C conduct a periodic communication at regular intervals to monitor a carrier level of each terminal and to adjust the carrier level if necessary. This periodic communication for the level adjustment is carried out by using a channel which is specific for the level adjustment and different from data-communication channels or control channels.

In detail, the mixing/splitting unit 7c of the center device 10 receives a high-frequency signal from a terminal A, for example, and supplies the high-frequency signal for each high-frequency channel to the upward-communication-line interface 5c. For each high-frequency channel, the upward-communication-line interface 5c measures a carrier level of the high-frequency signal, and informs the central-control unit 1c of a difference between the detected carrier level and an optimal carrier level.

Based on the difference, the central-control unit 1c determines a carrier-level-adjustment amount which the terminal A should use for the adjustment of the carrier level, and, then, sends the carrier-level-adjustment amount for each high-frequency channel to the downward-communication-line interface 4c. The downward-communication-line interface 4c places the carrier-level-adjustment amount for each high-frequency channel on a transmission signal for the terminal A, and sends the transmission signal to the terminal A through the mixing/splitting unit 7c. For the transmission of the transmission signal, it is preferable to use a level-adjustment-specific channel different from data channels and control channels.

In the terminal A, the high-frequency-modem unit 4t demodulates the high-frequency signal received from the center device 10 via the communication line 11 to create a digital signal, and divides it for each high-frequency channel before handing it to the communication-control unit 3t. The communication-control unit 3t extracts the carrier-level-adjustment amount for each high-frequency channel from the received digital signal, and provides the carrier-level-adjustment amount to the central-control unit 1t. The central-control unit it controls the high-frequency-modem unit 4t according to the carrier-level-adjustment amount for each high-frequency channel, so that the carrier level is modified for next and following transmissions to the center device 10.

As described above, the level adjustment for each terminal is based on periodic level detections, and, preferably, the carrier-level-adjustment amount is transmitted to each terminal via a specific channel. Thus, an automatic carrier-level adjustment is appropriately carried out for each channel by following an actual level fluctuation without affecting other communications.

In the following, an embodiment of a first principle of the present invention will be described with reference to the accompanying drawings.

Figure 3:
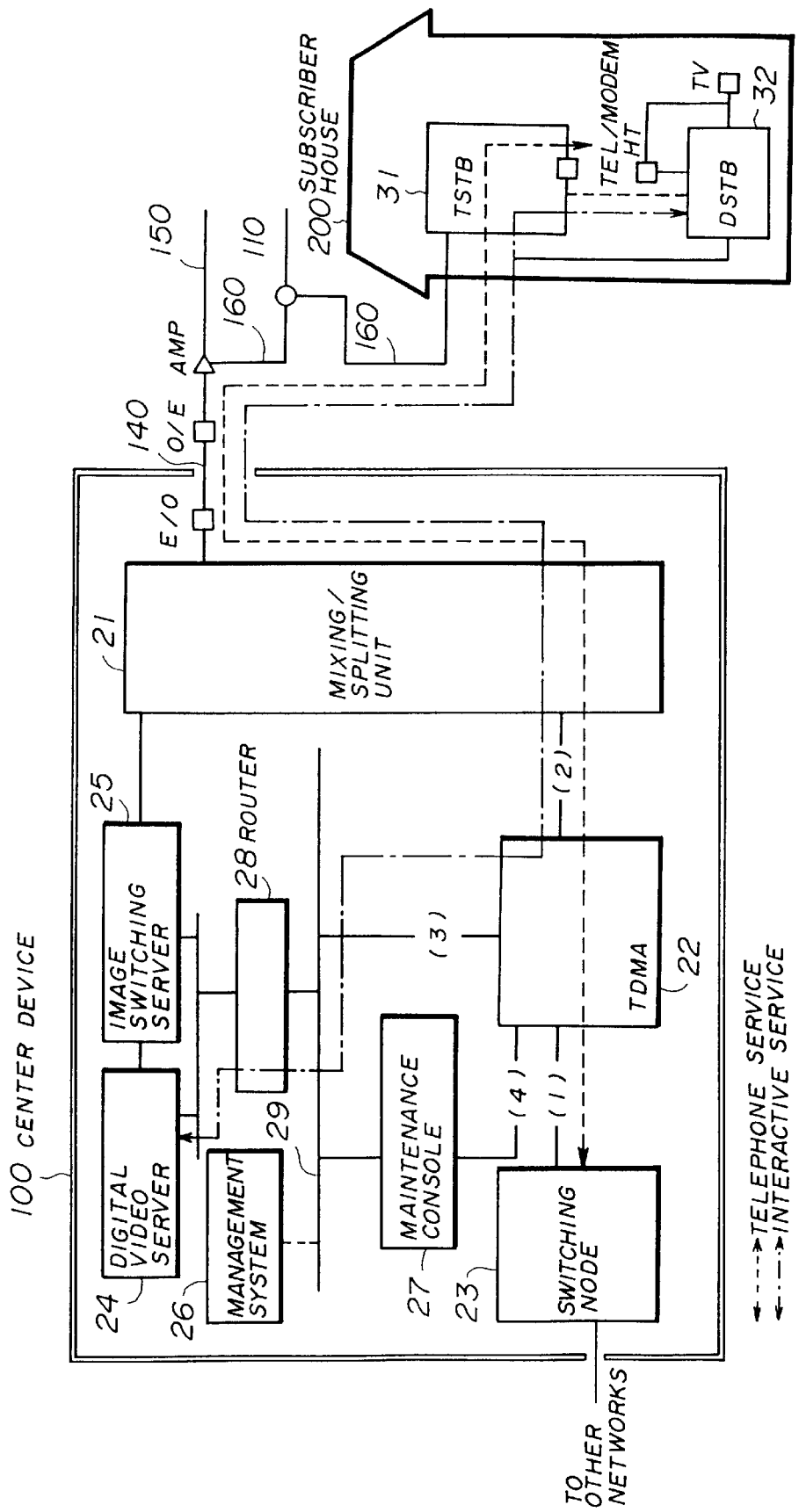
FIG. 3 is a block diagram of a configuration of a CATV system according to an embodiment of a first principle of the present invention.

FIG. 3 is a block diagram of a configuration of a CATV system according to the embodiment of the first principle of the present invention. The CATV system of FIG. 3 includes a center device 100, a subscriber house 200, an optical-fiber cable 140, and a coaxial cable 150. One end of the optical-fiber cable 140 is connected to the center device 100, and the other end is connected to an optical-to-electrical conversion unit O/E. The coaxial cable 150 extending from the electrical-to-optical conversion unit O/E is provided with an amplifier Amp. From the amplifier Amp, a coaxial cable 160 is branched and extends to the subscriber house 200. The coaxial cable 160 enters the subscriber house 200 via the splitter 110. Other subscriber houses (not shown) are connected to the coaxial cable 150. A plurality of amplifiers AMP are connected to the coaxial cable 150, so that a plurality of coaxial cables 160 can be branched from the amplifiers AMP.

The center device 100 includes a mixing/splitting unit 21, a TDMA (time division multiple access) unit 22, a switching node 23, a digital video server 24, an image switching server 25, a management system 26, a maintenance console 27, a router 28, a bus 29, and an optical-to-electrical conversion unit E/O. The mixing/splitting unit 21 mixes signals from the image switching server 25 and the TDMA unit 22, and outputs a resulting signal to the optical-to-electrical conversion unit E/O. Also, the mixing/splitting unit 21 splits a signal from the optical-to-electrical conversion unit E/O, and provides resulting signals to the image switching server 25 and the TDMA unit 22.

The TDMA unit 22 is responsible for the entire control of the center device 100, and a description thereof will be provided later in detail. The switching node 23 controls the communication between the center device 100 and another communication network. The digital video server 24 provides subscribers with images for interactive services such as VOD (video on demand). The image switching server 25 applies predetermined image processing on the image signals provided from the digital video server 24 for the purpose of transmission of the images, and supplies an output to the mixing/splitting unit 21 after an application of digital modulation. The management system 26 conducts maintenance management of the center device 100. Service personnel for the maintenance enters or obtains necessary information via the maintenance console 27. The TDMA unit 22, the digital video server 24, and the image switching server 25 exchange signals with each other via the bus 29 and the router 28.

Interfaces between the TDMA unit 22 and units connected thereto are as follows. The switching-node interface between the TDMA unit 22 and the switching node 23 is an ISDN primary set for interface (ISDN PRI) which has electrical and physical conditions complying to ITU-I.430 and has a frame structure complying to ITU-G.704, for example. The interface between the TDMA unit 22 and the mixing/splitting unit 21 uses a coaxial cable on which a plurality of high-frequency channels are formed. The bus 29 connected to the TDMA unit 22 is an ethernet LAN, for example. The interface between the TDMA unit 22 and the maintenance console 27 is a serial interface such as RS-232C, for example.

The subscriber house 200 includes a first communication-terminal unit (TSTB: telephone set top box) 31 and a second communication-terminal unit (DSTB: digital set top box) 32. The first communication-terminal unit 31 is connected to an interface unit TEL/MODEM for connecting a telephone and a modem. The second communication-terminal unit 32 is connected to an interface unit HT for connecting a home terminal used for an interactive service, and is connected to an interface unit TV for connecting a television set. In FIG. 3, a dotted arrow indicates a signal flow for a telephone service, and a dotted-and-dashed arrow indicates a signal flow for an interactive service.

Relations between the configuration of FIG. 3 and the configuration of FIG. 2 are as follows. The TDMA unit 22 of FIG. 3 corresponds to the elements 1c through 6c of FIG. 2, and the mixing/splitting unit 21 of FIG. 3 corresponds to the element 7c of FIG. 2. The first communication-terminal unit 31 and the second communication-terminal unit 32 of FIG. 3 correspond to the elements 1t through 5t of FIG. 2, where control functions of the elements 1t through 5t are divided into that for the telephone service and that for the interactive service.

Main elements used for the carrier-level adjustment of the first principle of the present invention are the TDMA unit 22 and the first communication-terminal unit 31 of FIG. 3, and a description thereof will be provided in detail. First, an interface structure of the coaxial cable 150 will be described for the sake of explanation.

FIG. 4 is a table chart showing the interface structure of the coaxial cable 150.

The coaxial cable 150 is frequency-divided, where five high-frequency (RF) channels between 10 MHz and 50 MHz are assigned for a communication in an upward direction, and fifty-four high-frequency channels between 222 MHz and 550 MHz are assigned to a communication in a downward direction. For each of the high-frequency channels, a frame structure is shown in FIG. 4, and a channel structure is such that the communication in the upward direction is provided with B, C, D, M, ACK-C, and ACK-D channels and the communication in the downward direction is provided with B, C, D, and M channels. These channels other than the M channel are set forth in the ITU recommendation. The M channel is provided for the maintenance and distance-measurement purposes, and is used for the carrier-level adjustment of the first principle of the present invention.

In this manner, the carrier-level adjustment is performed by using a channel (M channel) other than the B, C, and D channels so as not to affect an ordinary communication and the control thereof.

Figure 5:
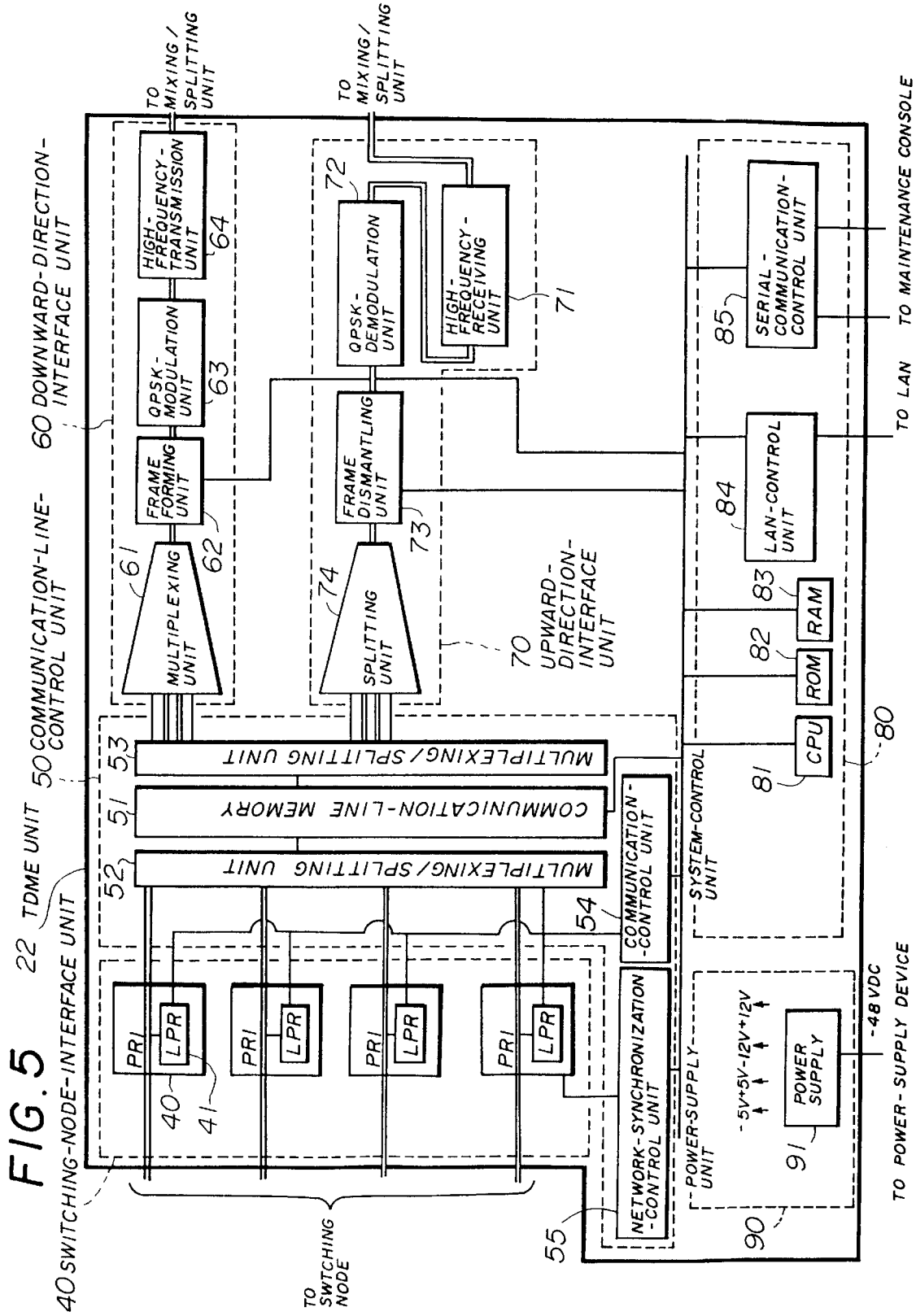
FIG. 5 is a block diagram showing a detailed configuration of a TDMA unit of FIG. 3.

FIG. 5 is a block diagram showing a detailed configuration of the TDMA unit 22.

The TDMA unit 22 includes a switching-node-interface unit 40, a communication-line-control unit 50, a downward-direction-interface unit 60, an upward-direction-interface unit 70, a system-control unit 80, and a power-supply unit 90. The system-control unit 80 includes a CPU 81, a ROM 82, a RAM 83, a LAN-control unit 84, and a serial-communication-control unit 85, and is responsible for the entire control of the TDMA unit 22 including the interface control thereof. The communication-line-control unit 50 includes a communication-line memory 51, a multiplexing/splitting unit 52, a multiplexing/splitting unit 53, a communication-control unit 54, and a network-synchronization-control unit 55, and carries out the multiplexing and splitting of the 2-Mbps highway for the communication with the switching-node-interface unit 40.

Also, the communication-line-control unit 50 carries out communication control between a line processor LPR and the CPU 81, network-synchronization-and-distribution control, and control of the communication-line memory 51. The switching-node-interface unit 40 has four lines of the ISDN primary set for interface of 1.5 Mbps. Each line is provided with a PRI trunk, and each trunk is provided with the line processor LPR. The downward-direction-interface unit 60 includes a multiplexing unit 61, a frame forming unit 62, a QPSK-modulation unit 63, and a high-frequency-transmission unit 64, and forms a digital frame (8 Mbps) transmitted in the downward direction via the optical-fiber cable 140.

Also, the downward-direction-interface unit 60 carries out QPSK modulation and high-frequency-transmission control, and performs selection of high-frequency-transmission channels and the setting of a transmission-carrier level. The upward-direction-interface unit 70 includes a high-frequency-receiving unit 71, a QPSK-demodulation unit 72, a frame dismantling unit 73, and a splitting unit 74, and controls the receiving of high-frequency signals via the optical-fiber cable 140. Also, the upward-direction-interface unit 70 carries out QPSK demodulation and the dismantling of the digital frame. The power-supply unit 90 supplies power for internal circuit by using an externally provided power.

Figure 6:
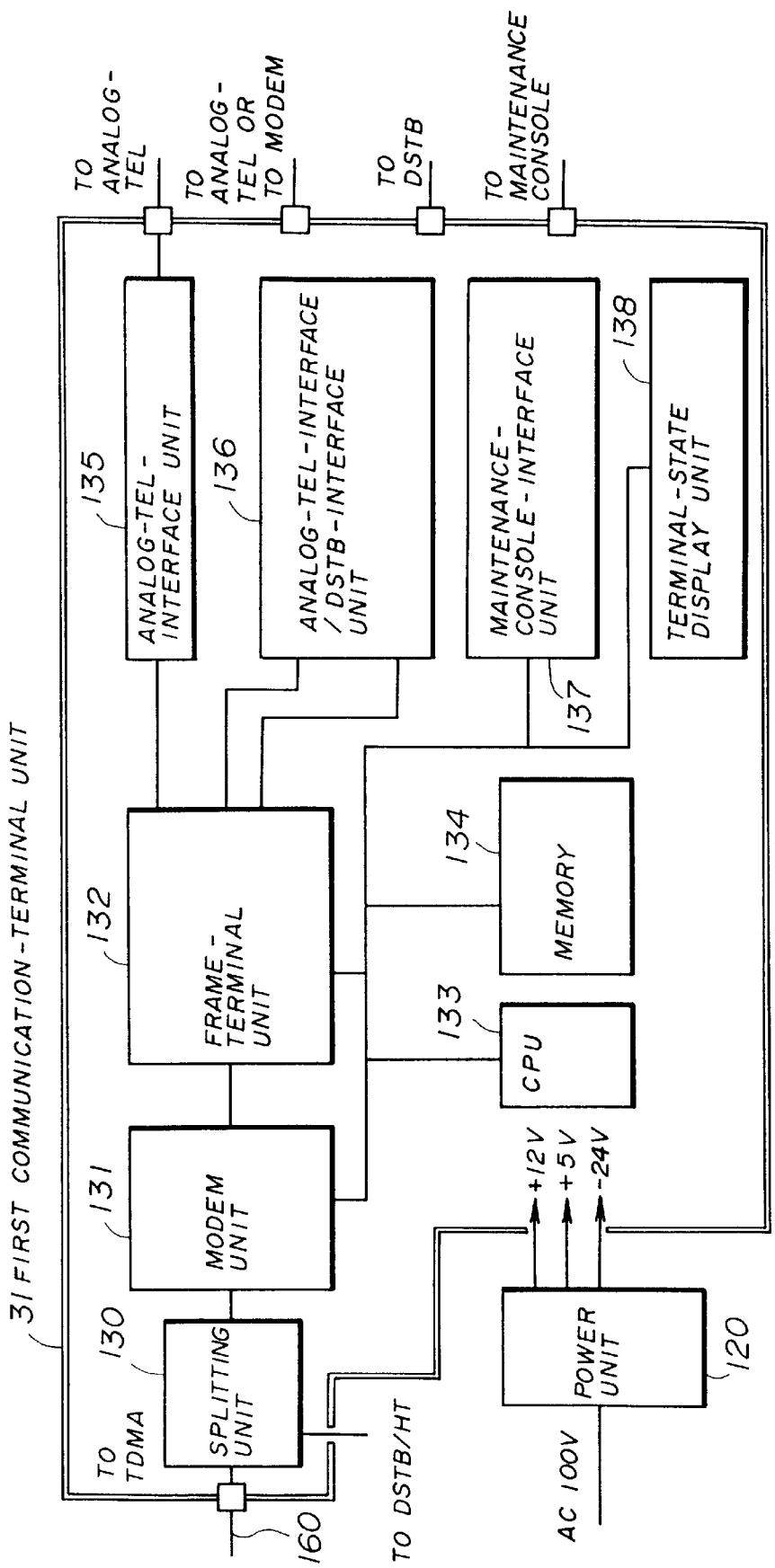
FIG. 6 is a block diagram showing a detailed configuration of a first communication-terminal unit of FIG. 3.

FIG. 6 is a block diagram showing a detailed configuration of the first communication-terminal unit 31.

The first communication-terminal unit 31 includes a splitting unit 130, a modem unit 131, a frame-terminal unit 132, a CPU 133, a memory 134, an analog-TEL-interface unit 135, an analog-TEL-interface/DSTB-interface unit 136, a maintenance-console-interface unit 137, and a terminal-state-display unit 138.

The modem unit 131 carries out a conversion between an 8-Mbps digital signal and the QPSK signal transmitted and received via the coaxial cable 160, the selection of the transmission high-frequency channels, and the setting of the transmission-carrier level. The frame-terminal unit 132 forms and splits the B, C, D, and M channels for signals to and from the modem unit 131. The frame-terminal unit 132 carries out terminal control (including delay control) of the D and M channels. The analog-TEL-interface unit 135 provides an analog-standard-telephone/modem interface. The analog-TEL-interface/DSTB-interface unit 136 carries out a signal exchange with the second communication-terminal unit 32 for the C channel serving as the control-signal channel for an interactive service such as VOD.

Also, the analog-TEL-interface/DSTB-interface unit 136 provides a LAN interface of IEEE 802.3. The maintenance-console-interface unit 137 provides an interface with a maintenance console used for maintenance of the subscriber-house terminal. The terminal-state-display unit 138 displays status information which should be checked on the terminal side, such as a power status, a status indicating either the distance-setting completion or the distance-setting in progress, etc. The splitting unit 130 splits the coaxial cable 160 into two paths, one for the modem unit 131 and the other for the second communication-terminal unit 32, etc. A power unit 120 is provided outside the first communication-terminal unit 31 to supply electric power to the first communication-terminal unit 31. The power unit 120 is also used as a power supply for the second communication-terminal unit 32.

In the following, operations of the embodiment of the first principle will be described.

The TDMA unit 22 periodically transmits a global message prompting a reply from the first communication-terminal unit 31 by using the M channel on the interface between the TDMA unit 22 and the first communication-terminal unit 31, in order to check whether the first communication-terminal unit 31 is operating properly. The process of transmitting this global message is as follows.

In FIG. 5, the system-control unit 80 of the TDMA unit 22 sends a global message to the frame forming unit 62 of the downward-direction-interface unit 60. The frame forming unit 62 inserts the received global message into a multi-frame on the downward interface between the TDMA unit 22 and the first communication-terminal unit 31, and sends it to the QPSK-modulation unit 63. The QPSK-modulation unit 63 modulates a digital signal of the 8-Mbps multi-frame received from the frame forming unit 62 to generate a high-frequency signal, and supplies the high-frequency signal to the high-frequency-transmission unit 64. The high-frequency-transmission unit 64 transmits a signal at a speed of 4 Mbaud through a 6-MHz high-frequency channel to the mixing/splitting unit 21 of the center device 100 shown in FIG. 3. The mixing/splitting unit 21 receives a plurality of high-frequency channels distanced by a 6-MHz interval from each other from the TDMA unit 22 and the image switching server 25, and mixes them into the frequency band of the optical-fiber cable 140. In this manner, the mixing/splitting unit 21 transmits a signal to the first communication-terminal unit 31.

When the first communication-terminal unit 31 is a newly installed one, the first communication-terminal unit 31 receives the high-frequency signal from the TDMA unit 22 by using the modem unit 131. Then, the first communication-terminal unit 31 extracts high-frequency channels to be processed, and applies the QPSK demodulation to the high-frequency signals of the extracted high-frequency channels to generate digital signals. Further, the first communication-terminal unit 31 supplies the digital signals as 8-Mbps multi-frames to the frame-terminal unit 132. The frame-terminal unit 132 breaks down the multi-frames into the B, C, D, M, C-ACK, and D-ACK channels, and sends these channels other than the B channel to the memory 134 under the control of the CPU 133.

The CPU 133 checks the M channel, and forms a reply message to send it to the frame-terminal unit 132 if the M channel contains the global message for the confirmation of the newly installed one of the first communication-terminal unit 31. The frame-terminal unit 132 inserts the reply message into the M channel of the frame directed upward to the TDMA unit 22, and sends the frame to the modem unit 131. The modem unit 131 applies the QPSK modulation to the frame to generate a high-frequency signal, and sends the high-frequency signal to the TDMA unit 22 via the 64-MHz high-frequency channel.

The TDMA unit 22 measures the high-frequency-carrier level of the reply message received by the high-frequency-receiving unit 71, and compares the measured level with an optimal received-carrier level stored in a memory (e.g., ROM 82 or RAM 83) of the TDMA unit 22. Then, the TDMA unit 22 notifies the CPU 81 of the system-control unit 80 of a difference between these two carrier levels. The CPU 81 generates a code indicating a carrier-level adjustment amount as an M-channel message by using the notified difference. Here, the carrier-level adjustment amount is an adjustment amount which should be used by the first communication-terminal unit 31 the next time it sends an upwardly directed high-frequency signal.

The CPU 81 sends the code to the frame forming unit 62 of the downward-direction-interface unit 60. The frame forming unit 62 inserts the code into an 8-MHz multi-frame in the same manner as when sending the global message, and sends the code to the first communication-terminal unit 31 via the QPSK-modulation unit 63, the high-frequency-transmission unit 64, and the mixing/splitting unit 21.

Upon receiving the M channel message containing the adjustment amount described above, the first communication-terminal unit 31 makes the CPU 133 give the modem unit 131 an instruction that carrier levels for high-frequency signals transmitted from now on be set in accordance with the adjustment amount received from the TDMA unit 22. An actual adjustment of the carrier levels is conducted through conventional means such as a bias adjustment of an internal transmission unit, an adjustment of an attenuator, etc.

As in the operations described above, the carrier levels of upwardly directed signals from the first communication-terminal unit 31 to the TDMA unit 22 are set by an automatic and periodic adjustment.

In the above-described operations, it is conceivable that the first communication-terminal unit 31 sends a reply message in response to a global message transmitted from the TDMA unit 22, but the TDMA unit 22 does not register the receiving of the reply message because of an improper initial setting of the carrier level. In this case, the first communication-terminal unit 31 will not receive the following message (e.g., periodic message) from the TDMA unit 22. When this happens, the first communication-terminal unit 31 makes the CPU 133 give an instruction to the modem unit 131 to change the current carrier-level setting by a predetermined amount stored in the memory 134. Then, the modem unit 131 sends a reply message using the changed level when a next global message is received.

In this operation, the first communication-terminal unit 31 uses the modem unit 131 to measure the high-frequency carrier level of the global message received from the TDMA unit 22, and the CPU 133 is notified of the measured level. The CPU 133 estimates a proper initial carrier level for transmission based on the measured level, and notifies the modem unit 131 of the proper initial carrier level. The modem unit 131 sets a transmission carrier level based on the notified initial carrier level to send a reply message responding to a global message from the TDMA unit 22.

In this operation, the TDMA unit 22 periodically sends an M-channel message (health-check message) to each first communication-terminal unit 31, requesting a reply. The M-channel message transmitted from the TDMA unit 22 may include a high-frequency carrier-level adjustment amount which should be used by the first communication-terminal unit 31 for sending a high-frequency signal the next time. Message exchanges between the TDMA unit 22 and the first communication-terminal unit 31 are the same as the message exchanges previously described. In this operation, however, the TDMA unit 22 applies an averaging process, as will be described below, to a difference between the carrier level of the high-frequency signal from the first communication-terminal unit 31 and the optimal carrier level stored in the memory of the TDMA unit 22.

First, a reference number N indicating a number of differences used for the averaging calculation, a threshold value P for the difference between the received carrier level and the optimal carrier level stored in the memory, and a threshold number Np indicating how many notifications of the difference exceeding the threshold value P should be tolerated are stored in the memory (e.g., RAM 83) of the TDMA unit 22. These settings may be entered through the management system 26 or the maintenance console 27 of the center device 100 shown in FIG. 3, or may be stored in the memory (e.g., ROM 82) as fixed settings.

The downward-direction-interface unit 60 of the TDMA unit 22 receives a reply message from the first communication-terminal unit 31 responding to the periodic message transmitted from the TDMA unit 22. Then, the TDMA unit 22 measures the carrier level of the received reply message, and notifies the CPU 81 of the system-control unit 80 of a difference between the measured carrier level and the optimal carrier level stored in the memory of the TDMA unit 22. The CPU 81 compares the difference with the threshold value P stored in the memory (e.g., ROM 82), and stores the difference in the memory (e.g., RAM 83) if the difference is smaller than or equal to the threshold value P.

Also, the CPU 81 obtains a sum of the difference notified this time and the differences notified at the last N−1 occasions, and calculates an average of these differences by using the reference number N. The average thus obtained is then sent by a next periodic message from the TDMA unit 22 to the first communication-terminal unit 31 as the carrier-level adjustment amounts for high-frequency signals which will be transmitted the next time from the first communication-terminal unit 31.

If the difference notified this time is larger than the threshold value P, a count is read from a counter (which will be described below) to be compared with the threshold number Np stored in the memory. This counter increments the count by 1 when the notified difference is larger than the threshold value P. If the count is smaller than the threshold number Np, the count is updated with an increment by 1, and the notified difference is discarded. Then, an average obtained at an immediately previous occasion is sent by the next periodic message to the first communication-terminal unit 31 as the carrier-level adjustment amount. If the count is larger than the threshold number Np, the differences stored in the memory are disposed of, and a carrier-level adjustment process for the first communication-terminal unit 31 is carried out again. This is not carried out by the next periodic message, but a message is immediately sent to the first communication-terminal unit 31.

Figure 7:
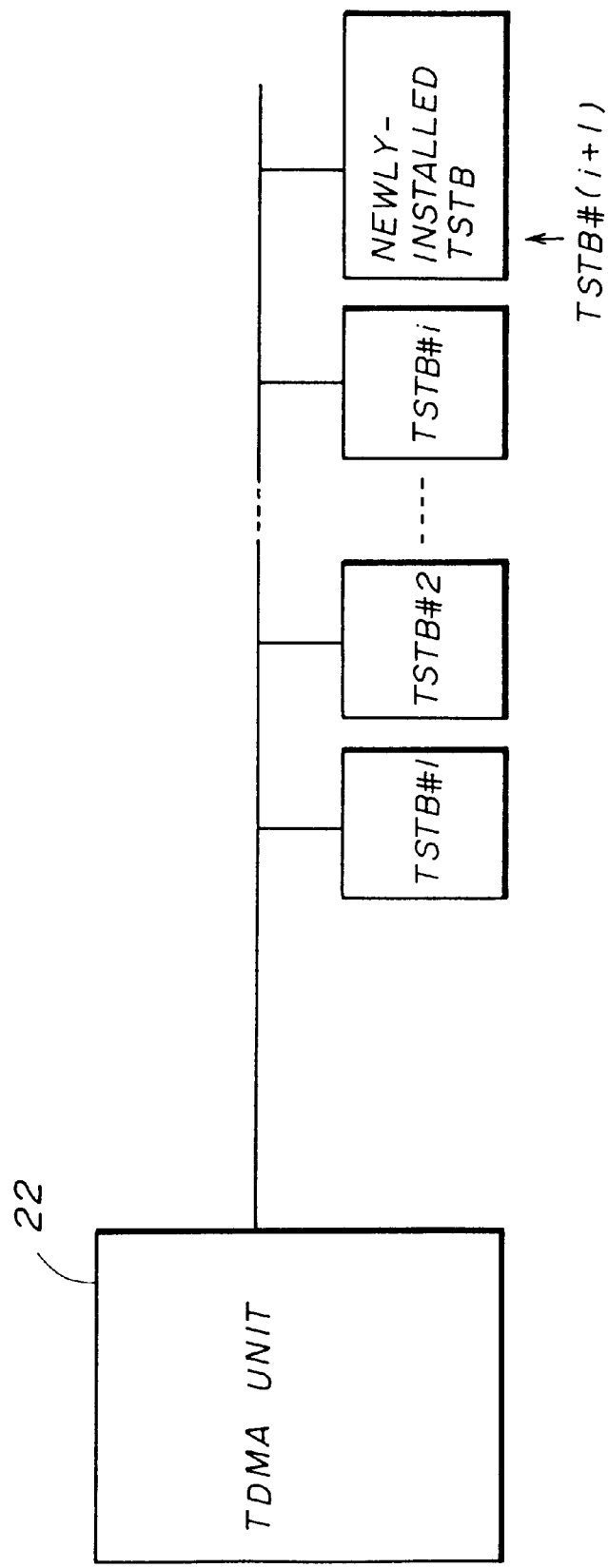
FIG. 7 is an illustrative drawing showing assignments of identification numbers to communication-terminal units TSTB of FIG. 3.

In the following, the operations of the embodiment of the first principle will be described in detail with reference to the accompanying flowcharts. In the description provided below, each of the first communication-terminal units 31 is provided with an identification number to distinguish one from the others, and the first communication-terminal unit 31 is called a communication-terminal unit TSTB. FIG. 7 is an illustrative drawing showing assignments of the identification numbers to the communication-terminal units TSTB.

Figure 8B:
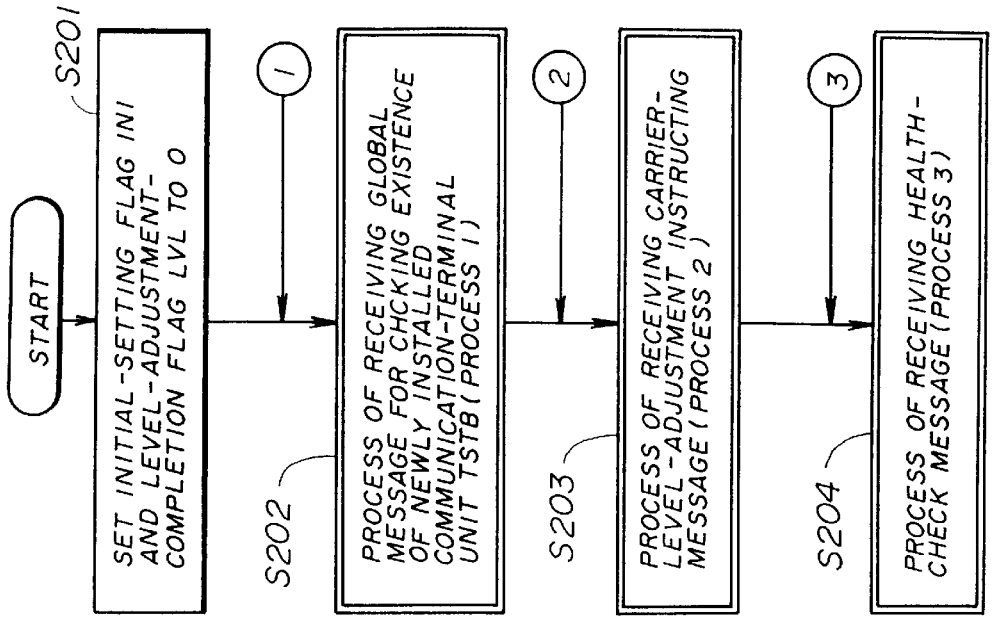
FIG. 8B is a flowchart of a control process carried out by a CPU of the communication-terminal unit TSTB.
Figure 8A:
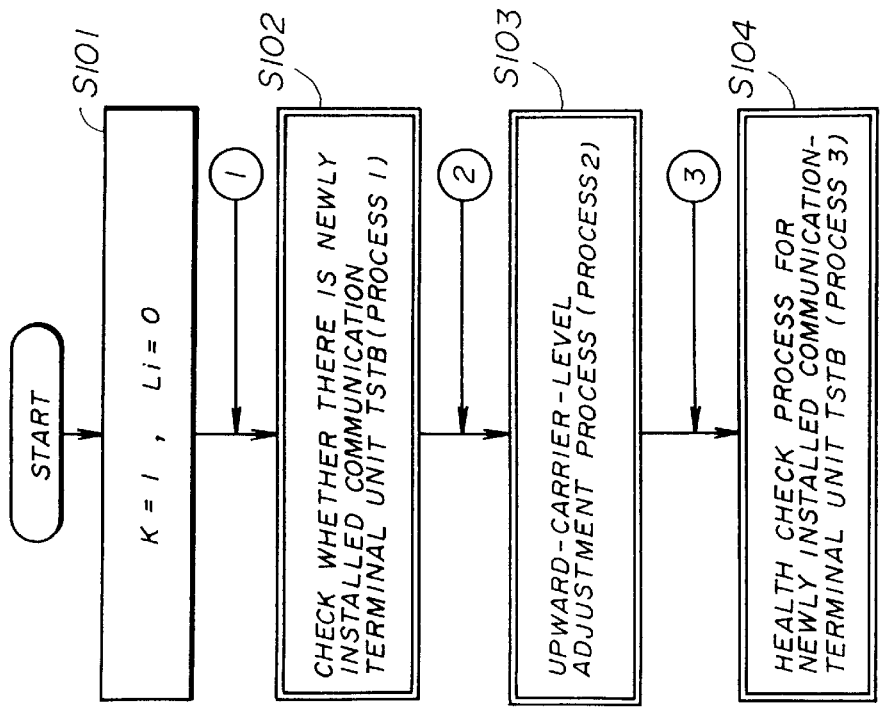
FIG. 8A is a flowchart of a control process carried out by a CPU of a system-control unit of the TDMA unit.

FIG. 8A is a flowchart of a control process carried out by the CPU 81 of the system-control unit 80 of the TDMA unit 22, and FIG. 8B is a flowchart of a control process carried out by the CPU 133 of the communication-terminal unit TSTB. In the flowcharts of FIGS. 8A and 8B as well as the following figures, steps indicated by double frames are accompanied with flowcharts describing these steps in detail.

In FIG. 8A, at a step S101, counters K and Li are set to 1 and 0, respectively. The counter K indicates how many times carrier-level adjustment processes are carried out for a given communication-terminal unit TSTB, and is used in a process 1.2 which will be described later. The counter Li is provided for the communication-terminal unit TSTB #i with respect to the averaging process, and stores how may times signals having the difference between the received carrier level and the optimal carrier level larger than the threshold value P are consecutively received from the communication-terminal unit TSTB #i.

At a step S102 following the step S101, a process is carried out to check whether there is a newly installed communication-terminal unit TSTB as when the communication-terminal unit TSTB is installed in a house of a new subscriber. This process is called a process 1.

At a step S103, an upward-carrier-level-adjustment process (process 2) is carried out.

At a step S104, a health-check process (process 3) for the newly installed communication-terminal unit TSTB is carried out.

In FIG. 8B, at a step S201, an initial-setting flag INI and a level-adjustment-completion flag LVL are set to 0 after the communication-terminal unit TSTB starts an operation thereof.

At a step S202, a process of receiving a global message for checking an existence of the newly installed communication-terminal unit TSTB is carried out. This process is a process 1 of the communication-terminal unit TSTB.

At a step S203, a process of receiving a carrier-level-adjustment instructing message is carried out. This process is a process 2 of the communication-terminal unit TSTB.

At a step S204, a process of receiving a health-check message (process 3) is carried out.

In the following, the steps S102 through S104 and the steps S201 through S204 will be described in detail.

Figure 9:
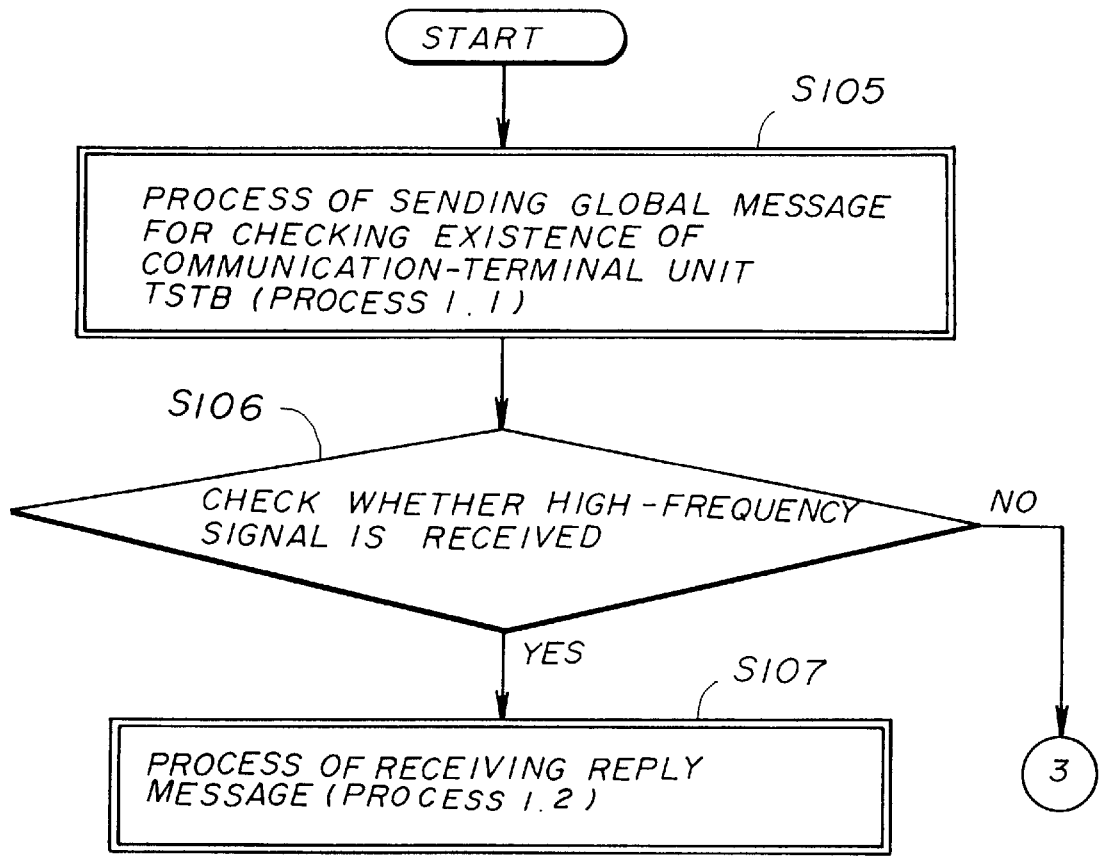
FIG. 9 is a flowchart of a process of a step S102 shown in FIG. 8A.

FIG. 9 is a flowchart of a process of the step S102 shown in FIG. 8A.

At a step S105, a process of sending the global message for checking an existence of the communication-terminal unit TSTB (process 1.2) is carried out.

At a step S106, a check is made whether a high-frequency signal has been received. If the answer is affirmative, the procedure goes to a step S107. Otherwise, the procedure goes to the step S104 of FIG. 8A.

At a step S107, a process of receiving a reply message (process 1.2) is carried out.

Figure 10:
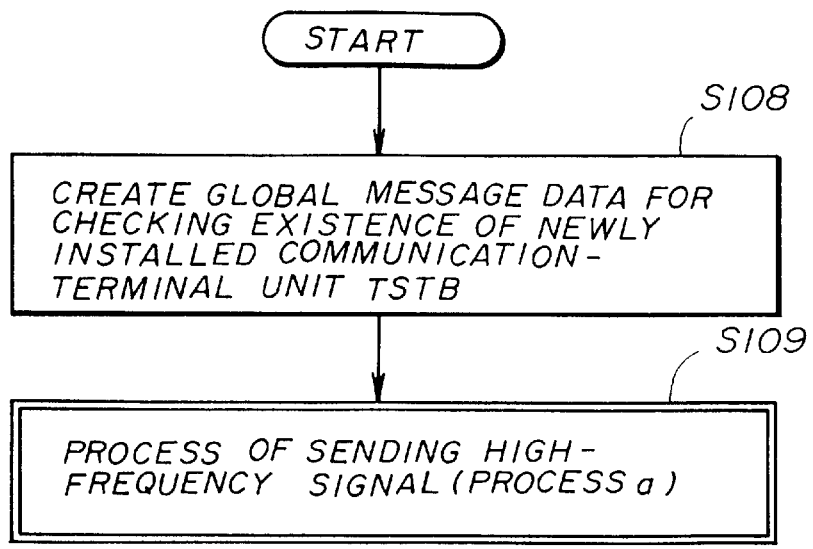
FIG. 10 is a flowchart of a process of a step S105 shown in FIG. 9.

FIG. 10 is a flowchart of a process of the step S105 shown in FIG. 9.

At a step S108, global-message data for checking the existence of the newly installed communication-terminal unit TSTB is created under the control of the CPU 81 of the system-control unit 80 shown in FIG. 5.

At a step S109, a process of sending a high-frequency signal (process a) is carried out.

Figure 11:
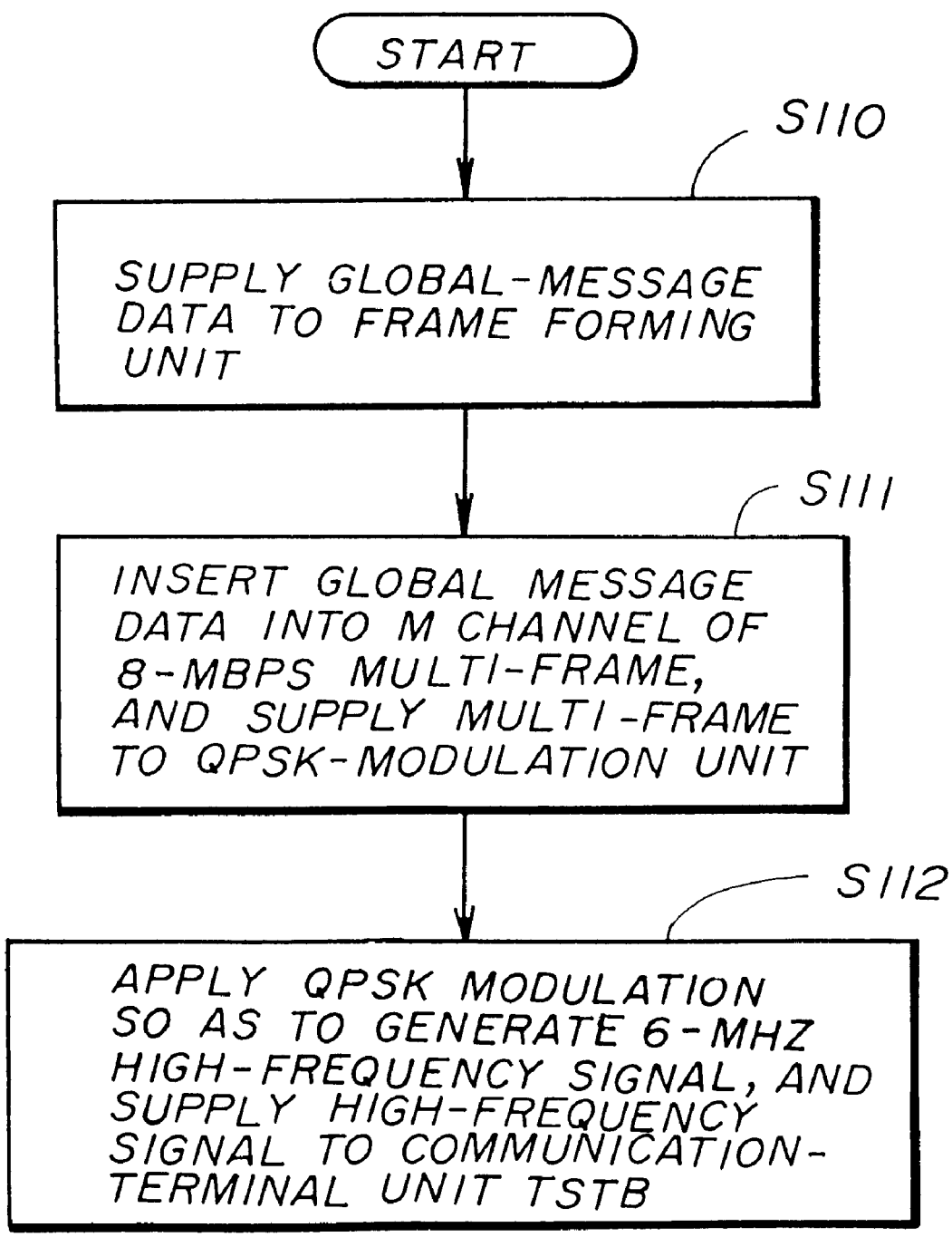
FIG. 11 is a flowchart of a process of a step S109 shown in FIG. 10.

FIG. 11 is a flowchart of a process of the step S109 shown in FIG. 10.

At a step S110, the global-message data is supplied to the frame forming unit 62 (FIG. 5) under the control of the CPU 81.

At a step S111, the frame forming unit 62 inserts the global-message data into the M channel of an 8-Mbps multi-frame, and supplies the multi-frame to the QPSK-modulation unit 63.

At a step S112, the QPSK-modulation unit 63 applies the QPSK modulation so as to generate a 6-MHz high-frequency signal, and supplies the high-frequency signal to the communication-terminal unit TSTB via the high-frequency-transmission unit 64.

Figure 12:
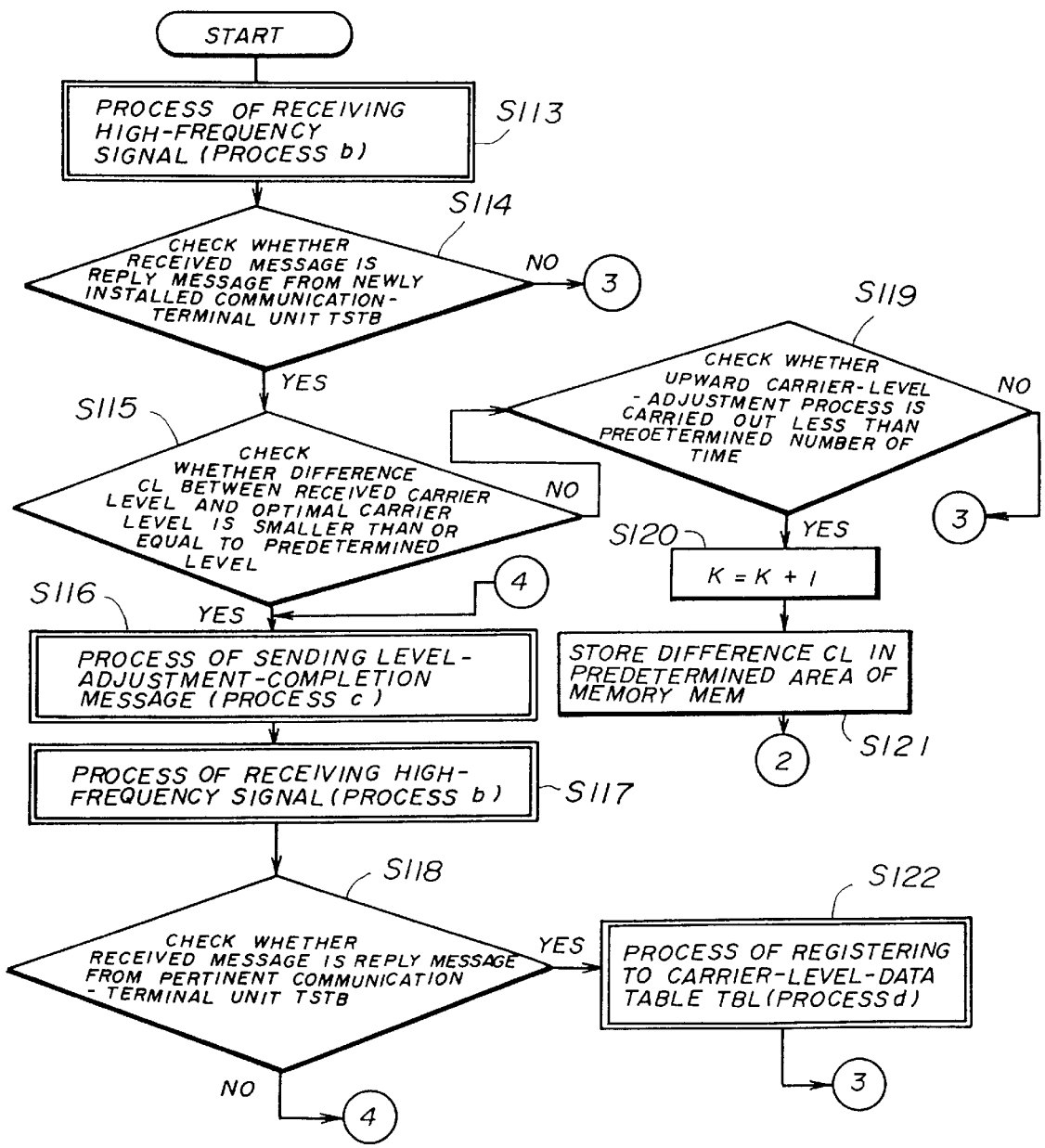
FIG. 12 is a flowchart of a process of a step S107 shown in FIG. 9.

FIG. 12 is a flowchart of a process of the step S107 shown in FIG. 9.

At a step S113, a process of receiving a high-frequency signal (process b) is carried out.

At a step S114, the CPU 81 checks whether the received message is a reply message from the newly installed communication-terminal unit TSTB. If the answer is negative, the procedure goes to the step S104 of FIG. 8A. If the answer is affirmative, the procedure goes to a step S115.

At the step S115, the CPU 81 checks whether a difference CL between the received carrier level and the optimal carrier level is below a predetermined level. If the answer is "yes", the procedure goes to a step S116. Otherwise, the procedure goes to a step S119.

At the step S116, a process of sending a level-adjustment-completion message (process c) is carried out.

At a step S117, a process of receiving a high-frequency signal (the same process as the process b of the step S113) is carried out.

At a step S118, the CPU 81 checks whether the received message is a reply message from the pertinent communication-terminal unit TSTB. If the answer is "no", the procedure goes back to the step S116. If the answer is "yes", the procedure goes to a step S122.

At the step S122, a process of registering to a carrier-level-data table TBL (process d) is carried out. After the step S122, the procedure goes to the step S104 of FIG. 8A. The carrier-level-data table TBL will be described later.

At the step S119 when the check at the step S115 gives a negative answer, a check is made whether the upward-carrier-level-adjustment process is carried out less than a predetermined number of times K. If the answer is "no", the procedure goes to the step S104 of FIG. 8A. If the answer is "yes", the procedure goes to a step S120.

At the step S120, the counter K is incremented by 1.

At a step S121, the difference CL is stored in a predetermined area of a memory MEM (RAM 83 of FIG. 5). This predetermined area stores the differences CL which are obtained by consecutive measurements of the carrier levels for the communication-terminal unit TSTB of the current message exchange. After the step S121, the procedure goes to the step S103 of FIG. 8A.

FIG. 13 is a table chart showing the carrier-level-data table TBL. In the carrier-level-data table TBL, an area for the difference CL and an area for the average are provided for each of the communication-terminal units TSTB. The area for the difference CL stores the differences CL between the carrier level of the received high-frequency signal and the optimal carrier level for N+1 measurements as differences $D_O$ through $D_N$, where the difference $D_N$ is the latest value. The area for the average stores an average of the differences $D_O$ through $D_N$.

Figure 14:
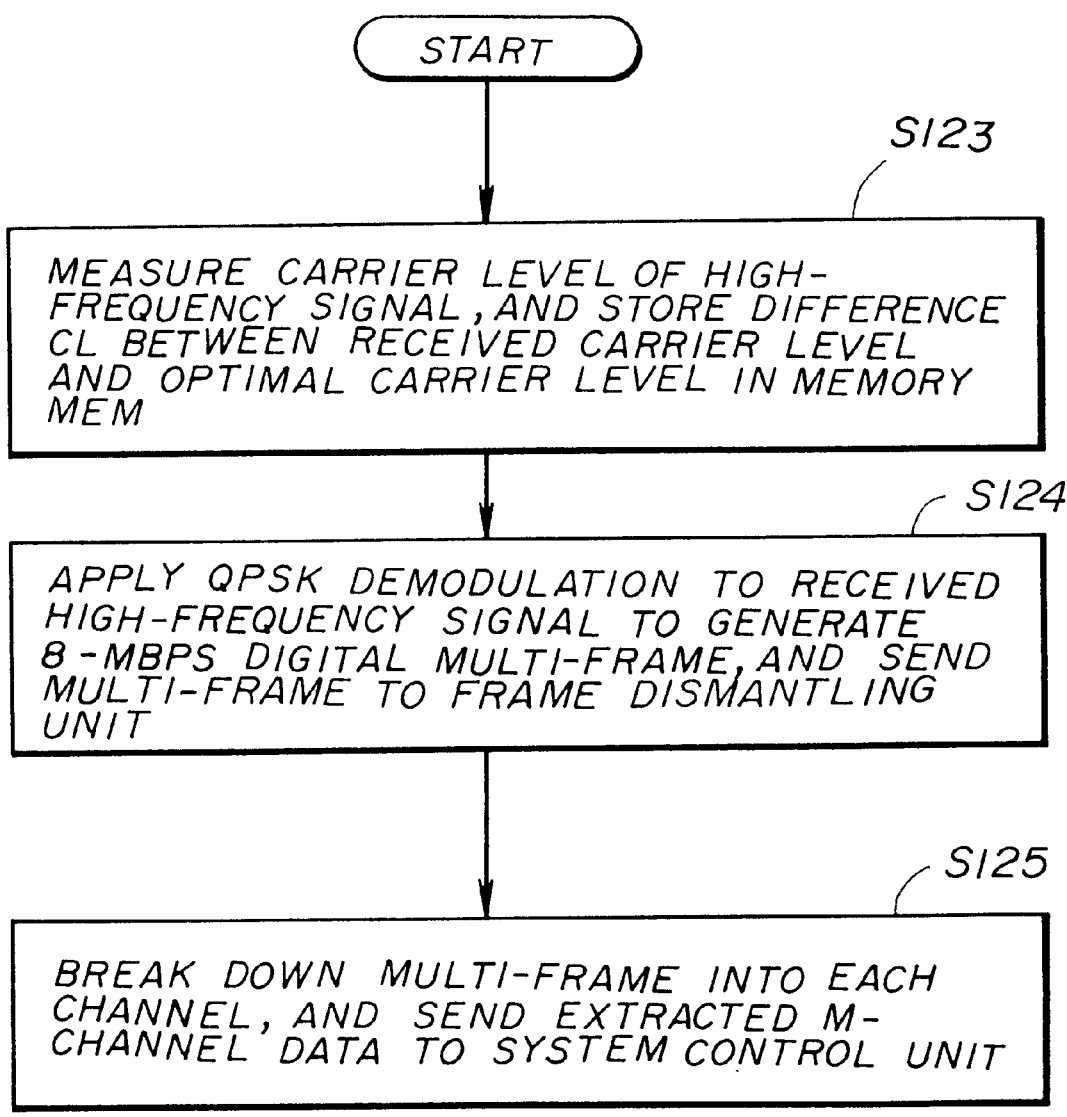
FIG. 14 is a flowchart of a process of a step S113 and a step S117 shown in FIG. 12.

FIG. 14 is a flowchart of a process of the step S113 and the step S117 shown in FIG. 12.

At a step S123, the CPU 81 measures a carrier level of a high-frequency signal received by the high-frequency-receiving unit 71, and stores the difference (or the absolute value thereof) CL between the received carrier level and the optimal carrier level in the memory MEM.

At a step S124, the QPSK-demodulation unit 72 applies the QPSK demodulation to the received high-frequency signal to generate an 8-Mbps digital multi-frame, and send the multi-frame to the frame dismantling unit 73.

At a step S125, the frame dismantling unit 73 breaks down the multi-frame into each channel, and sends extracted M-channel data to the system-control unit 80.

Figure 15:
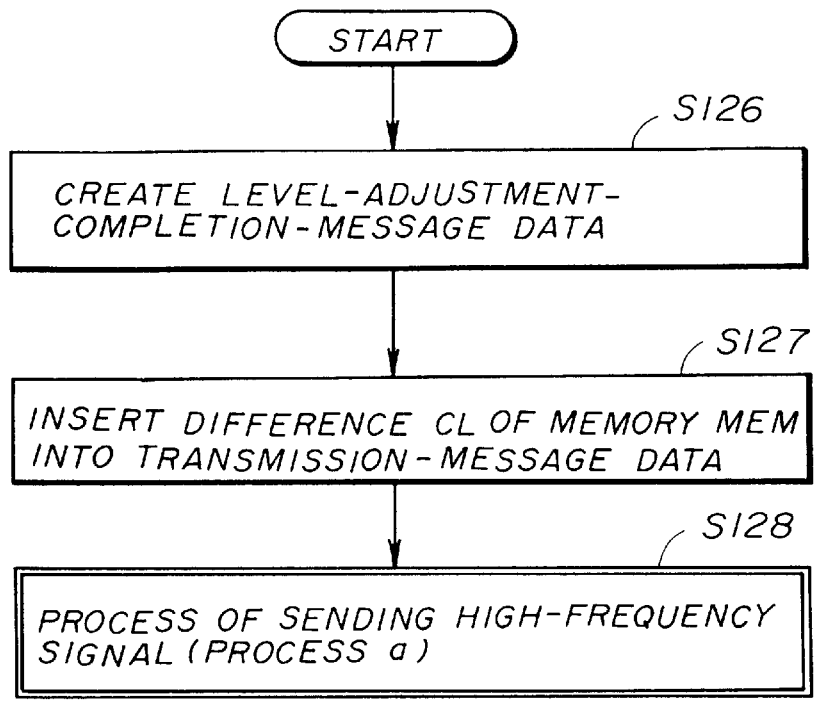
FIG. 15 is a flowchart of a process of a step S116 shown in FIG. 12.

FIG. 15 is a flowchart of a process of the step S116 shown in FIG. 12.

At a step S126, level-adjustment-completion-message data is created under the control of the CPU 81.

At a step S127, the difference CL stored in the memory MEM is inserted into transmission-message data.

At a step S128, the process of sending a high-frequency signal described with reference to FIG. 11 is carried out.

Figure 16:
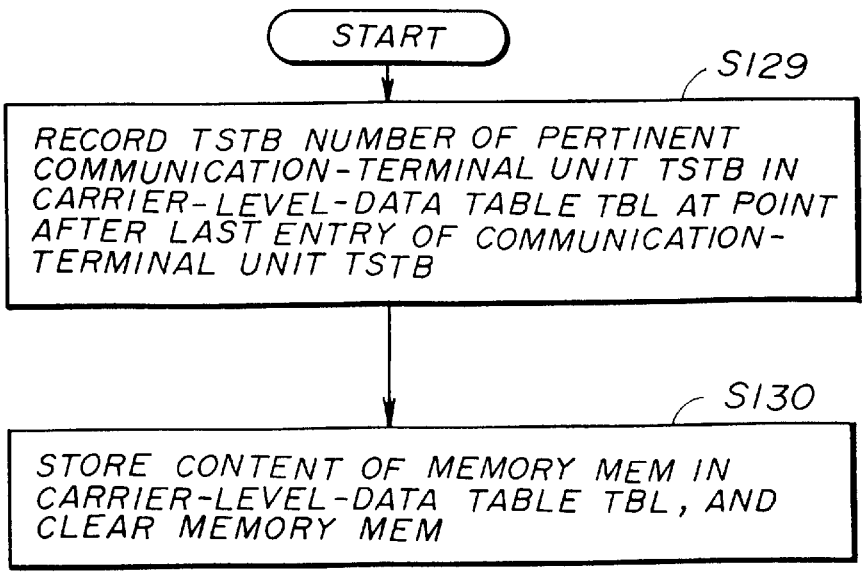
FIG. 16 is a flowchart of a process of a step S122 of FIG. 12.

FIG. 16 is a flowchart of a process of the step S122 of FIG. 12.

At a step S129, the CPU 81 records a TSTB number of the pertinent communication-terminal unit TSTB in the carrier-level-data table TBL at a point after the last entry of the communication-terminal unit TSTB. After this recording, the pertinent communication-terminal unit TSTB is regarded as an existing unit rather than a newly-installed-and-not-yet-recognized unit.

At a step S130, the content of the memory MEM is stored in the carrier-level-data table TBL, and the memory MEM is cleared.

Figure 17:
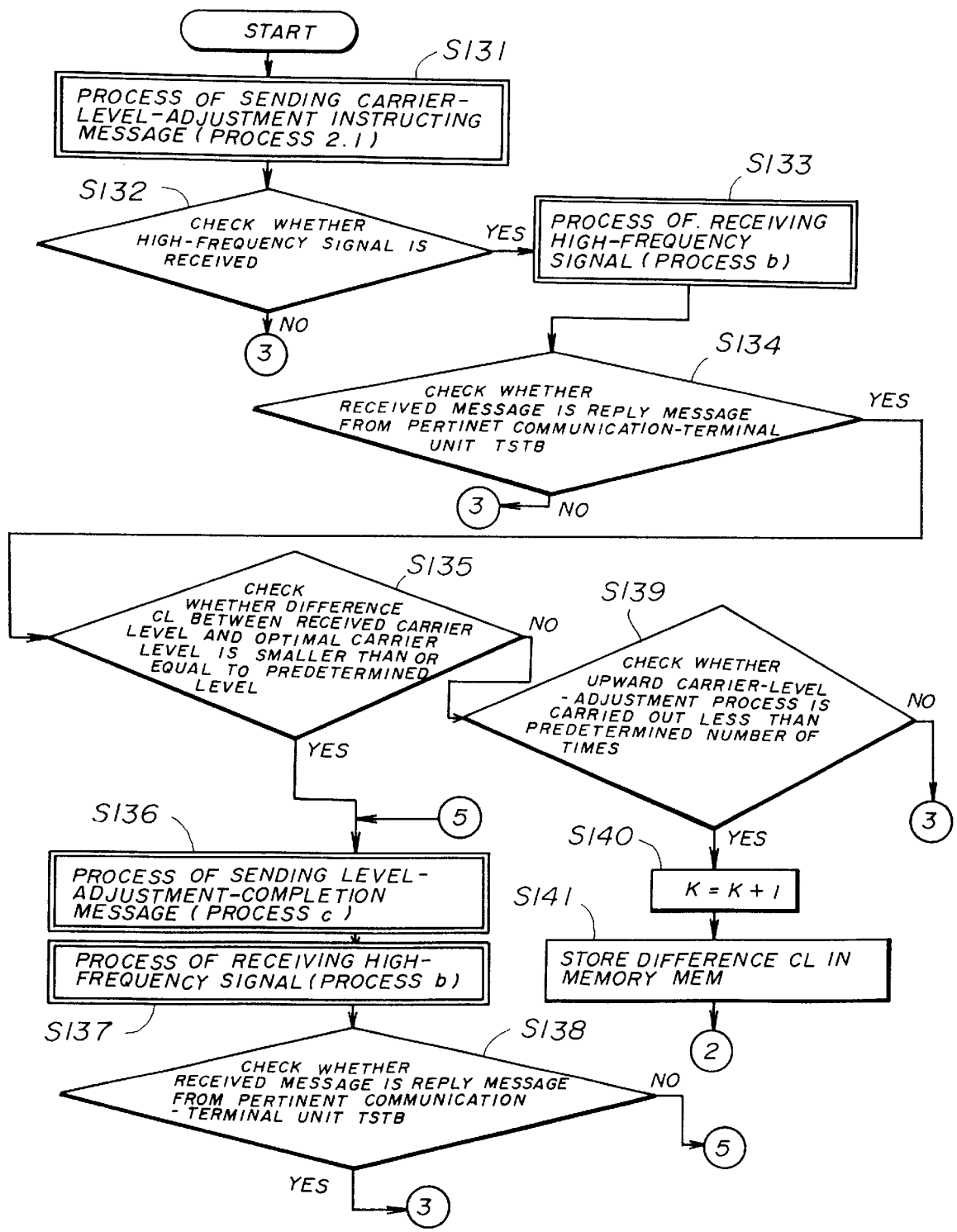
FIG. 17 is a flowchart of an upward-carrier-level-adjustment process of a step S103 shown in FIG. 8A.

FIG. 17 is a flowchart of the upward-carrier-level-adjustment process (process 2) of the step S103 shown in FIG. 8A.

At a step S131, a process of sending a carrier-level-adjustment instructing message (process 2.1) is carried out.

At a step S132, the CPU 81 checks whether a high-frequency signal has been received. If it has, the procedure goes to a step S133. Otherwise, the procedure goes to the step S104 of FIG. 8A.

At the step S133, a process of receiving a high-frequency signal (the same process as that of FIG. 14) is carried out.

At a step S134, the CPU 81 checks whether the received message is a reply message from the pertinent communication-terminal unit TSTB. If it is, the procedure goes to a step S135. Otherwise, the procedure goes to the step S104 of FIG. 8A.

At a step S135, the CPU 81 checks whether the difference CL between a carrier level of the received high-frequency signal and the optimal carrier level stored in the TDMA unit 22 is smaller than or equal to a predetermined level. If the answer is "yes", steps S136 through S138 are carried out. These steps S136 through S138 are the same as the steps S116 through S118 of FIG. 12, respectively, except for the steps carried out after the step S118. That is, if the answer to a check at the step S138 is "yes", the procedure goes to the step S104. Otherwise, the procedure goes back to the step S136. If the answer to the check at the step S135 turns out to be "no", steps S139 through S141 are carried out. These steps S139 through S141 are the same as the steps S119 through S121 of FIG. 12, respectively.

Figure 18:
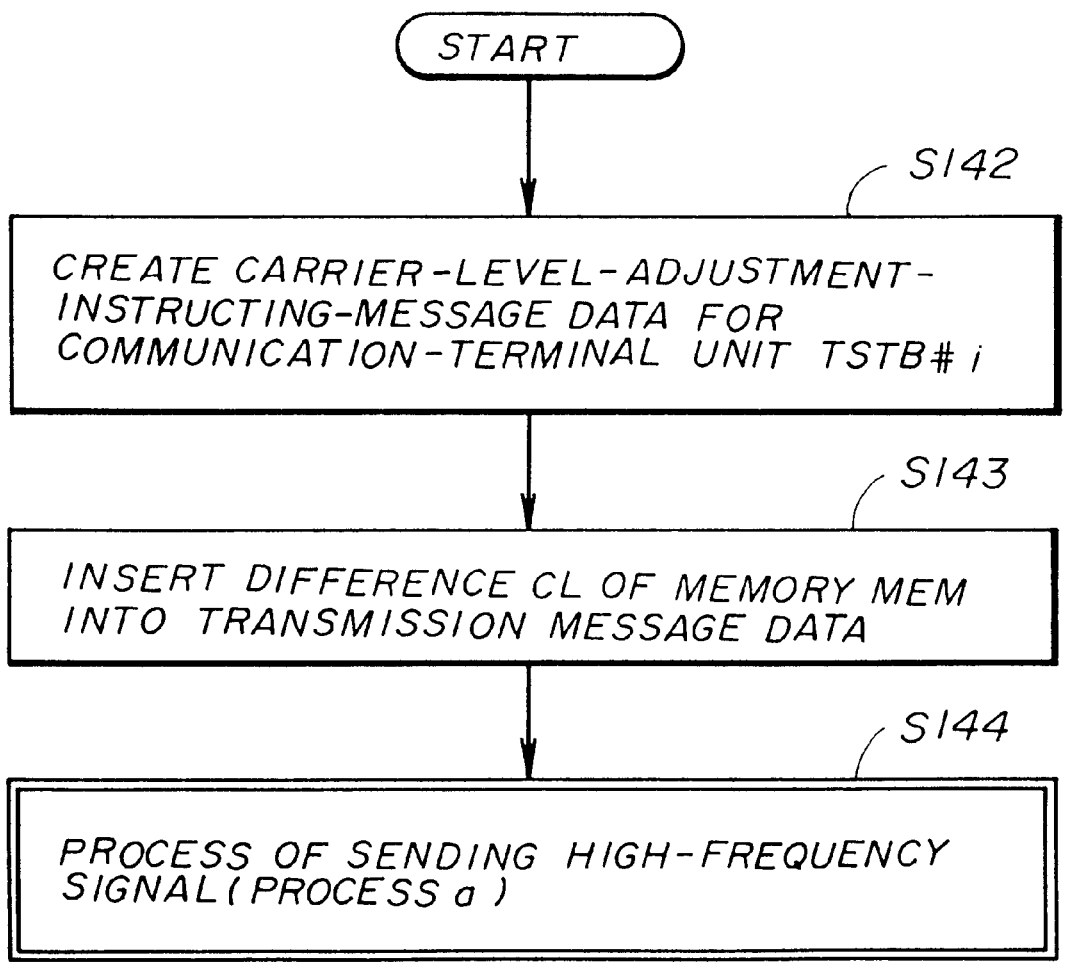
FIG. 18 is a flowchart of a process of a step S131 of FIG. 17.

FIG. 18 is a flowchart of a process of the step S131 of FIG. 17.

At a step S142, carrier-level-adjustment instructing-message data for the communication-terminal unit TSTB #i is formed under the control of the CPU 81.

At a step S143, the CPU 81 inserts the difference CL stored in the memory MEM into transmission message data.

At a step S144, a process of sending the high-frequency signal shown in FIG. 11 is carried out.

Figure 19:
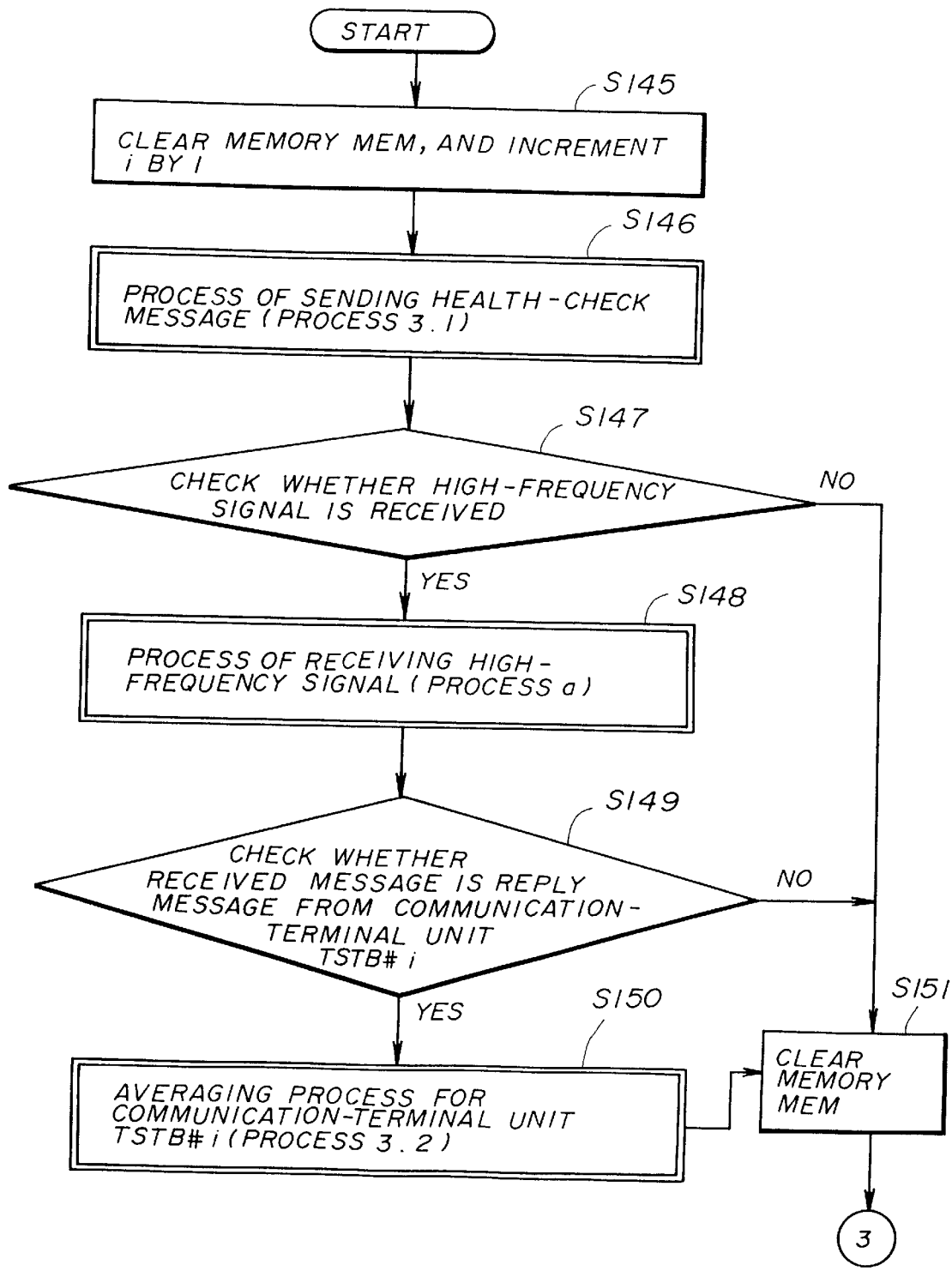
FIG. 19 is a flowchart of a health-check process for the communication-terminal unit TSTB of a step S104 shown in FIG. 8A.

FIG. 19 is a flowchart of the health-check process for the communication-terminal unit TSTB of the step S104 shown in FIG. 8A.

At a step S145, the memory MEM is cleared, and the variable i is incremented by 1.

At a step S146, a process of sending a health-check message (process 3.1) is carried out.

At a step S147, the CPU 81 checks whether a high-frequency signal is received. If it is, the procedure goes to a step S148. Otherwise, the procedure goes to a step S151.

At the step S148, a process of receiving the high-frequency signal shown in FIG. 14 is carried out.

At a step S149, the CPU 81 checks whether the received message is a reply message from the communication-terminal unit TSTB #i. If it is, the procedure goes to a step S150. Otherwise, the procedure goes to the step S151.

At a step S150, an averaging process (process 3.2) for the communication-terminal unit TSTB #i is carried out. After the step S150, the procedure goes to the step S151.

At the step S151, the CPU 81 clears the memory MEM. Then, the procedure goes to the step S104 of FIG. 8A.

Figure 20:
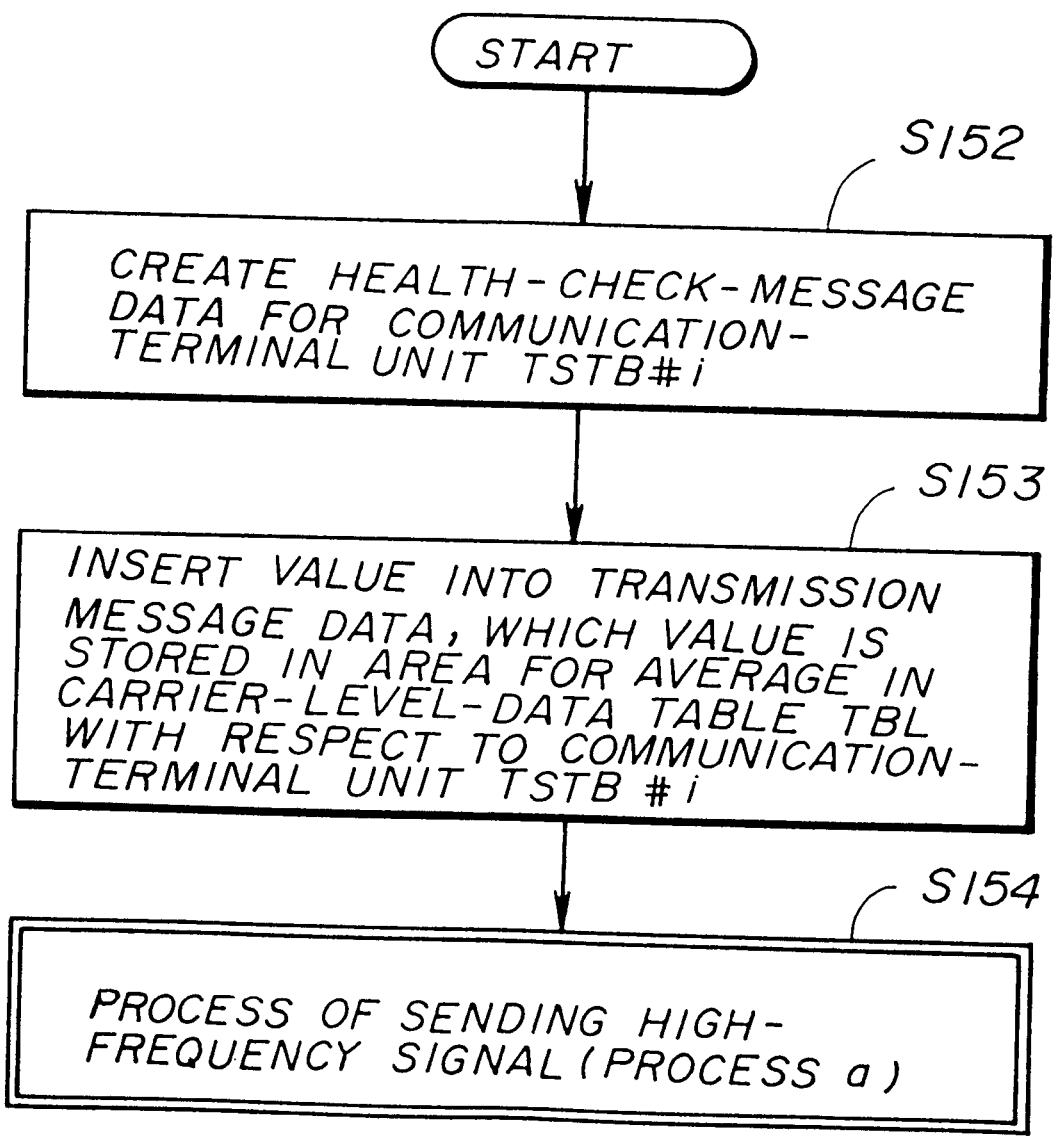
FIG. 20 is a flowchart of a process of a step S146 shown in FIG. 19.

FIG. 20 is a flowchart of a process of the step S146 shown in FIG. 19.

At a step S152, health-check-message data for the communication-terminal unit TSTB #i is formed under the control of the CPU 81.

At a step S153, the CPU 81 inserts into transmission message data a value which is stored in the area for the average in the carrier-level-data table TBL with respect to the communication-terminal unit TSTB #i. The area for the average is shown in FIG. 13, and the value stored therein is calculated through the averaging process of the step S150 of FIG. 19.

At a step S154, a process of sending a high-frequency signal the same as that of FIG. 11 is carried out.

Figure 21:
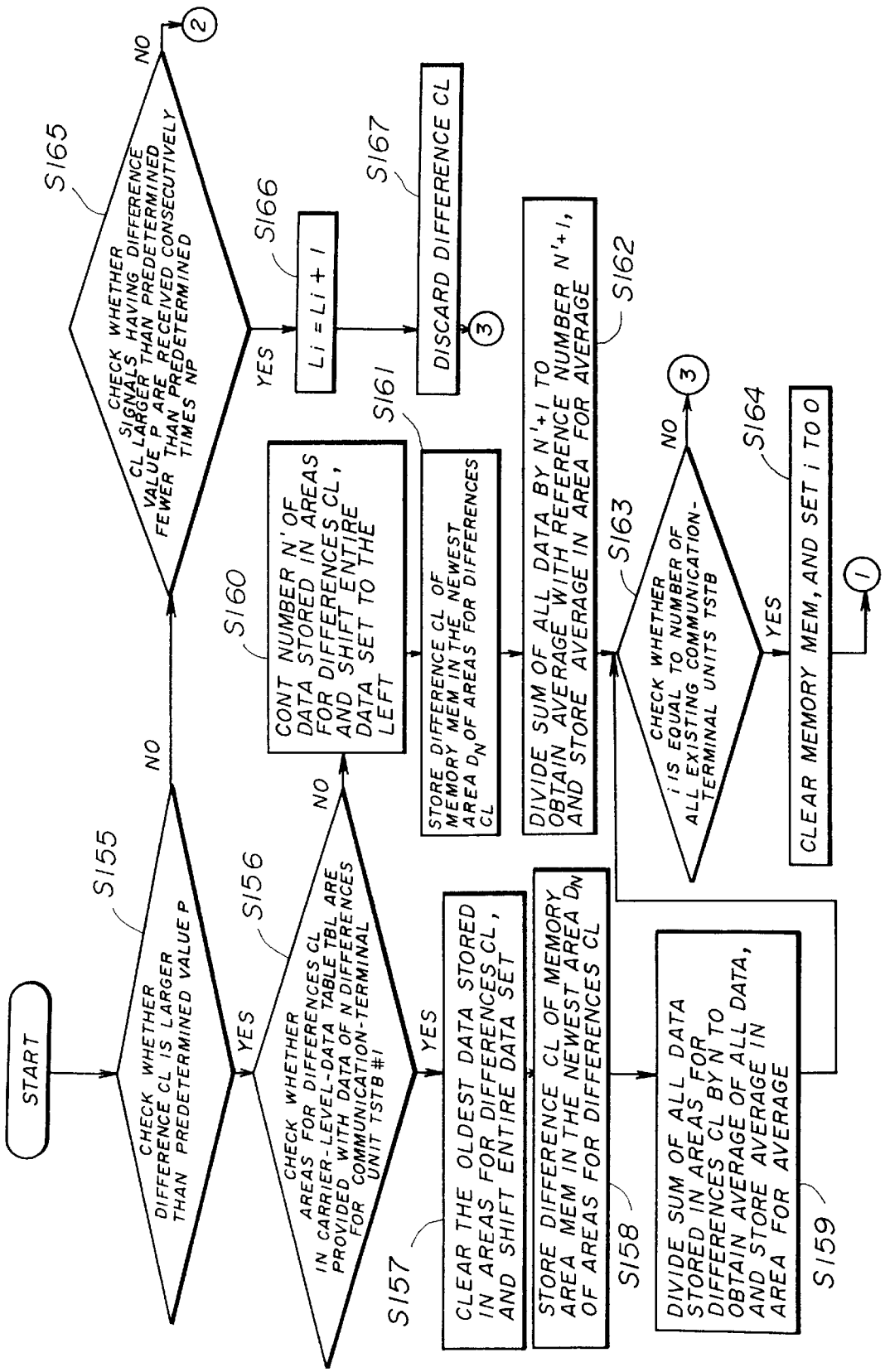
FIG. 21 is a flowchart of an averaging process for the communication-terminal unit TSTB #i carried out at a step S150 of FIG. 19.

FIG. 21 is a flowchart of the averaging process for the communication-terminal unit TSTB #i carried out at the step S150 of FIG. 19.

At a step S155, the CPU 81 checks whether the difference CL is larger than the predetermined value P. If it is, the procedure goes to a step S156. Otherwise, the procedure goes to a step S165.

At the step S156, the CPU 81 checks whether the areas for the differences CL in the carrier-level-data table TBL are provided with data of N differences for the communication-terminal unit TSTB #1. If the answer is "yes", the procedure goes to a step S157. Otherwise, the procedure goes to a step S160.

At the step S157, the CPU 81 clears the oldest data of the areas for the differences CL in the carrier-level-data table TBL, and shifts the data stored in the areas for the differences CL.

FIGS. 22A through 22C are table charts showing the process of the step S157. As shown in FIGS. 22A through 22C, the oldest data stored in $D_1$ is eliminated, and the entire data set is shifted to the left.

At a step S158, the CPU 81 stores the difference CL of the memory area MEM in the newest area $D_N$ of the areas for the differences CL.

At a step S159, the CPU 81 divides the sum of all the data stored in the areas for the differences CL by N to obtain an average of all the data, and stores the average in the area for the average. After the step S159, the procedure goes to a step S163.

At the step S160 when the check at the step S156 gave a negative answer, the number N' of the data stored in the areas for the differences CL is counted, and the entire data set is shifted to the left.

Figures 23A, 23B:
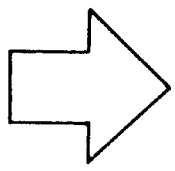
FIGS. 23A and 23B are table charts showing a process of a step S160.

FIGS. 23A and 23B are table charts showing the process of the step S160. As shown in FIGS. 23A and 23B, the entire set is shifted to the left, i.e., is shifted in a direction toward where the oldest data is stored.

At a step S161, the CPU 81 stores the difference CL of the memory area MEM in the newest area $D_N$ of the areas for the differences CL.

At a step S162, the CPU 81 divides the sum of all the data by N'+1 to obtain an average with a reference number N'+1, and stores the average in the area for the average. After the step S162, the procedure goes to the step S163.

At the step S163, a check is made whether the variable i is equal to the number of all the existing communication-terminal units TSTB. If the answer is "yes", the procedure goes to a step S164. Otherwise, the procedure goes to the step S104 of FIG. 8A.

At the step S164, the memory MEM is cleared, and the variable i is set to zero. After the step S164, the procedure goes to the step S102 of FIG. 8A.

At the step S165 when the check at the step S155 gave a negative answer, the CPU 81 checks whether signals having the difference CL larger than the predetermined value P are received consecutively fewer times than the predetermined times Np. If the answer is "no", the procedure goes to the step S103 of FIG. 8A. Otherwise, the procedure goes to a step S166.

At the step S166, the CPU 81 increments the counter Li by 1.

At a step S167, the difference CL is discarded. After the step S167, the procedure goes to the step S104 of FIG. 8A.

In the following, the operations of the communication-terminal unit TSTB #i shown in the flowchart of FIG. 8B will be described in detail.

Figure 24:
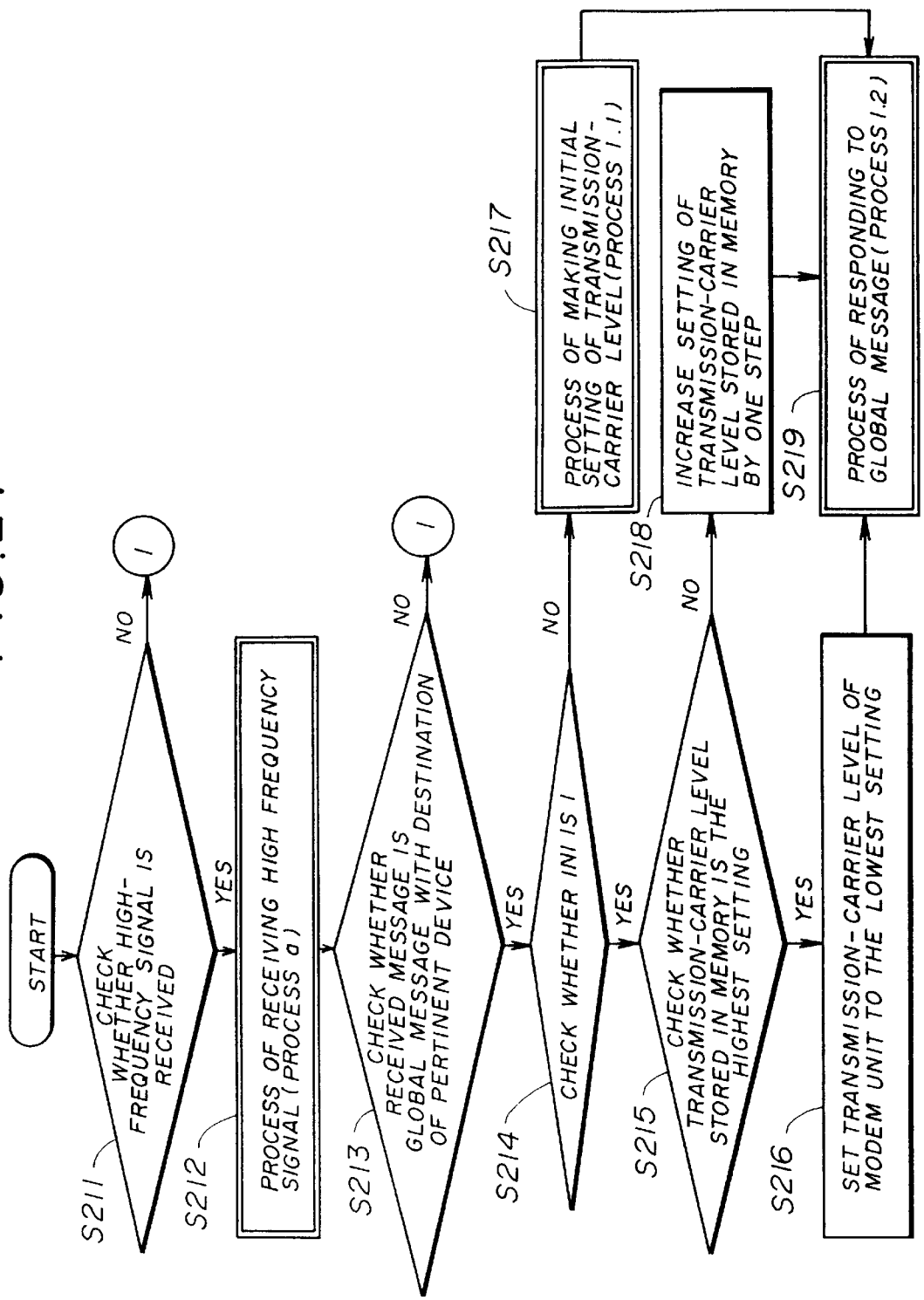
FIG. 24 is a flowchart of a process of receiving a global message for checking an existence of a newly installed communication-terminal unit TSTB carried out at a step S202 of FIG. 8B.

FIG. 24 is a flowchart of a process of receiving a global message for checking an existence of the newly installed communication-terminal unit TSTB carried out at the step S202 of FIG. 8B.

At a step S211, the CPU 133 checks whether a high-frequency signal is received. If it is, the procedure goes to a step S212. Otherwise, the procedure goes to the step S202 of FIG. 8B, i.e., the procedure goes back to the start of the flowchart of FIG. 24.

At the step S212, a process of receiving a high-frequency signal (process a, which will be described later) is carried out.

At a step S213, the CPU 133 checks whether the received message is a global message for checking the existence of the newly installed communication-terminal unit TSTB with a destination of the pertinent device. If the answer is "no", the procedure goes back to the start. Otherwise, the procedure goes to a step S214.

At the step S214, the CPU 133 checks whether the initial-setting flag INI is 1. If the answer is "no", the procedure goes to a step S217. Otherwise, the procedure goes to a step S215.

At the step S215, the CPU 133 checks whether the transmission carrier level stored in the memory 134 is the largest setting. If the answer is "no", the procedure goes to a step S218. Otherwise, the procedure goes to a step S216.

At a step S216, the CPU 133 sets the transmission carrier level of the modem unit 131 to the smallest setting. After the step S216, the procedure goes to a step S219.

At the step S217 when the check at the step S214 gave a negative answer, a process of making an initial setting of the transmission carrier level (process 1.2) is carried out. After the step S217, the procedure goes to the step S219.

At the step S218 when the check at the step S215 gave a negative answer, the CPU 133 increases the setting of the transmission carrier level stored in the memory 134 by one step. After the step S218, the procedure goes to the step S219.

At the step S219, a process of responding to the global message (process 1.2) is carried out.

Figure 25:
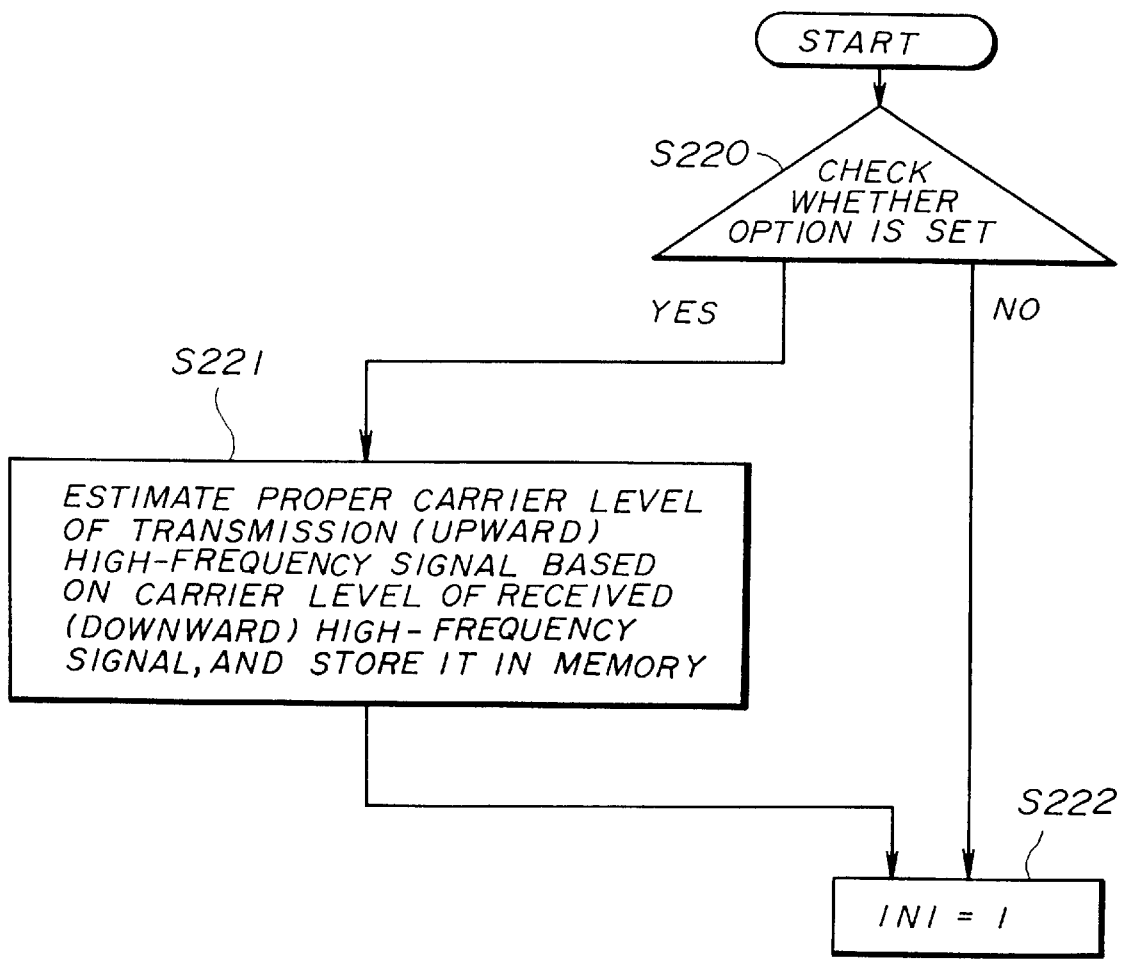
FIG. 25 is a flowchart of a process carried out at a step S217 of FIG. 24.

FIG. 25 is a flowchart of a process carried out at the step S217 of FIG. 24.

At a step S220, the CPU 133 checks whether an option defined in a program is selected to carry out an optional operation. This optional operation is a process of a step S221. If the answer to the check is "yes", the procedure goes to the step S221. Otherwise, the procedure goes to a step S222.

At the step S221, a proper carrier level of the transmission (upward) high-frequency signal is estimated based on the carrier level of the received (downward) high-frequency signal, and is stored in the memory 134.

At the step S222, the initial setting flag INI is set to 1.

Figure 26:
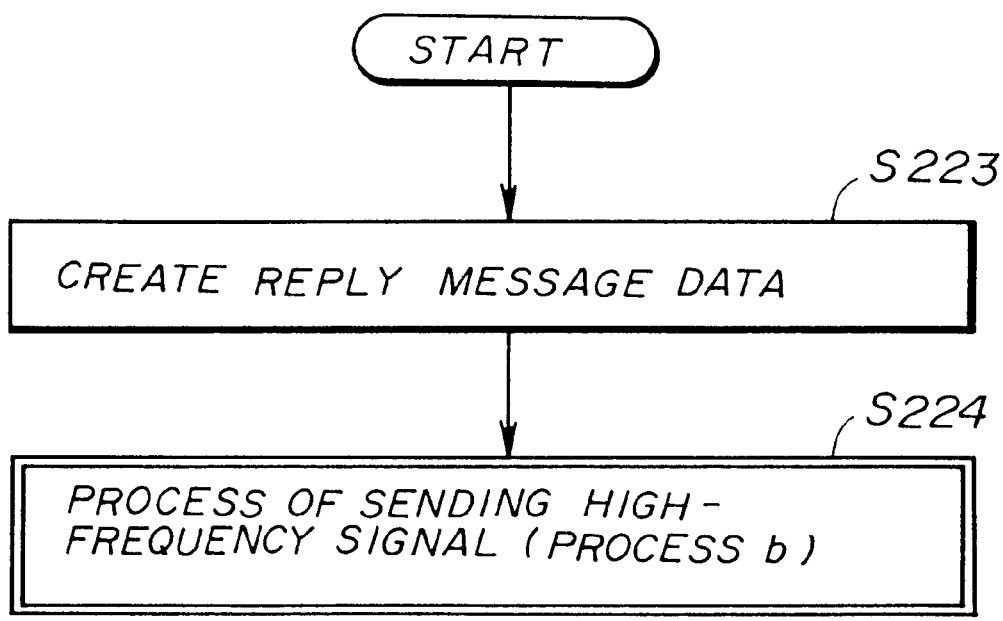
FIG. 26 is a flowchart of a process carried out at a step S219 of FIG. 24.

FIG. 26 is a flowchart of a process carried out at the step S219 of FIG. 24.

At a step S223, the CPU 133 creates a reply message data.

At a step S224, a process of sending a high-frequency signal (which will be described later) is carried out.

Figure 27:
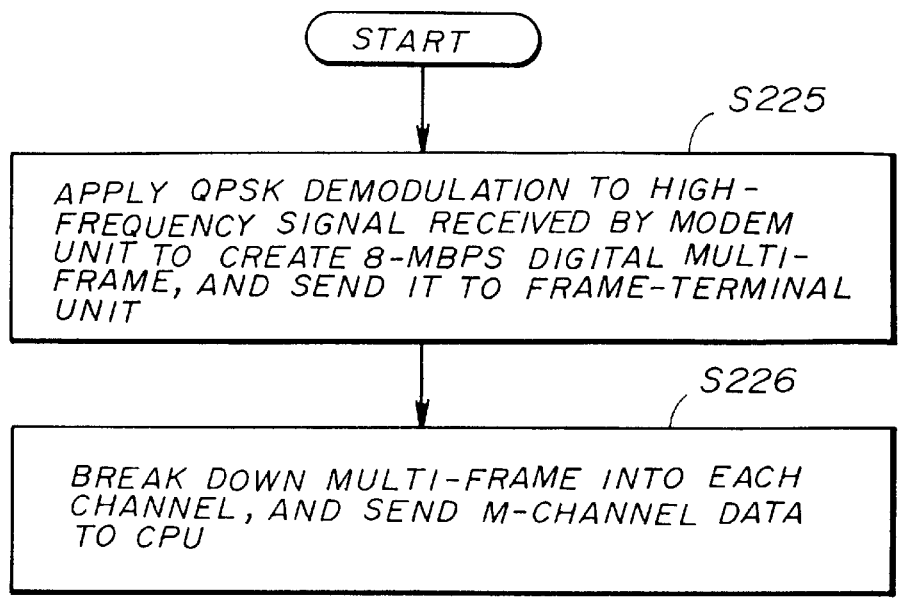
FIG. 27 is a flowchart of a process carried out at a step S212 of FIG. 24.

FIG. 27 is a flowchart of a process carried out at the step S212 of FIG. 24.

At a step S225, the high-frequency signal received by the modem unit 131 of FIG. 6 is subjected to the QPSK demodulation to create an 8-Mbps digital multi-frame, which is then sent to the frame-terminal unit 132.

At a step S226, the multi-frame is broken down into each channel in the frame-terminal unit 132, and the M-channel data thus extracted is sent to the CPU 133.

Figure 28:
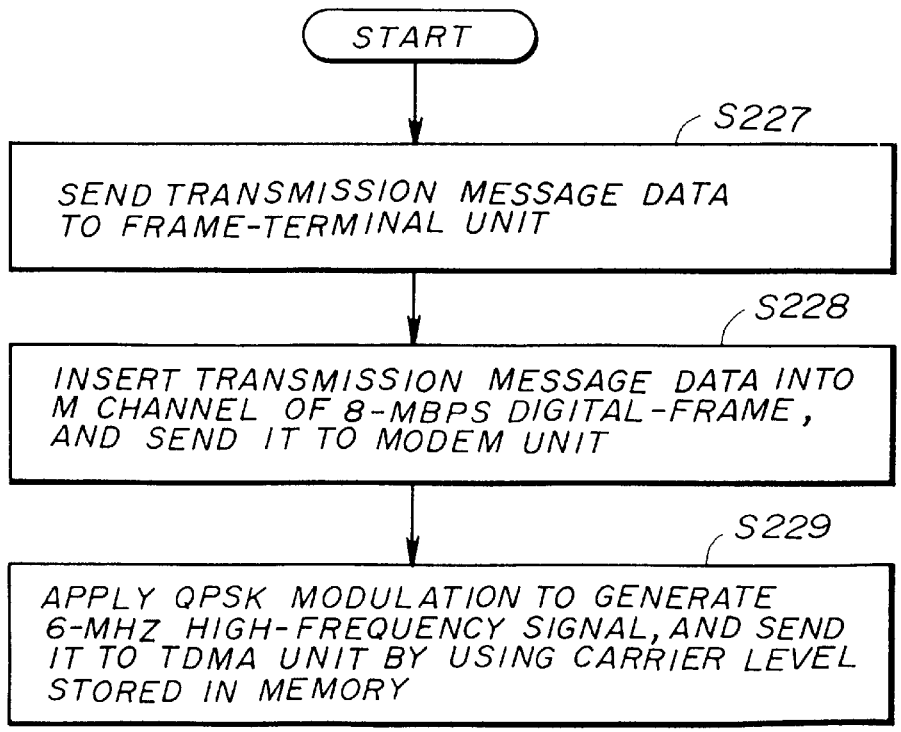
FIG. 28 is a flowchart of a process of sending a high-frequency signal carried out at a step S224 of FIG. 26.

FIG. 28 is a flowchart of a process of sending a high-frequency signal carried out at the step S224 of FIG. 26.

At a step S227, the CPU 133 sends transmission message data to the frame-terminal unit 132.

At a step S228, the frame-terminal unit 132 inserts the transmission message data into the M channel of an 8-Mbps digital-frame, which is then sent to the modem unit 131.

At a step S229, the modem unit 131 applies the QPSK modulation to generate a 6-MHz high-frequency signal, and sends the high-frequency signal to the TDMA unit 22 by using the carrier level stored in the memory 134.

Figure 29:
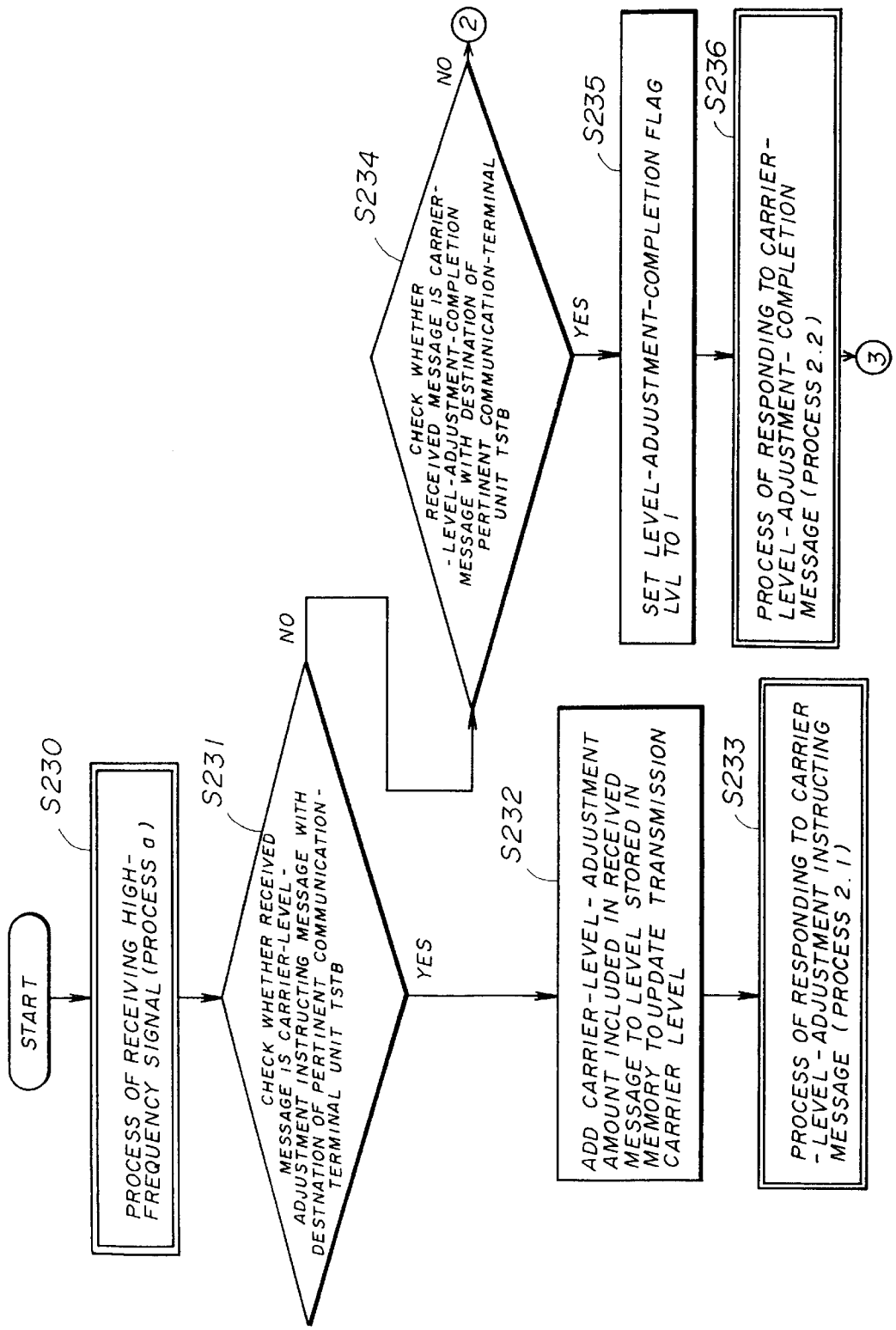
FIG. 29 is a flowchart of a process of receiving a carrier-level-adjustment instructing message carried out at a step S203 of FIG. 8B.

FIG. 29 is a flowchart of a process of receiving a carrier-level-adjustment instructing message carried out at the step S203 of FIG. 8B.

At a step S230, a process of receiving a high-frequency signal the same as that of FIG. 27 is carried out.

At a step S231, the CPU 133 checks whether the received message is the carrier-level-adjustment instructing message with a destination of the pertinent communication-terminal unit TSTB. If the answer is "yes", the procedure goes to a step S232. Otherwise, the procedure goes to a step S234.

At the step S232, the CPU 133 adds the carrier-level-adjustment amount included in the received message to the level stored in the memory 134 to update the transmission carrier level. Here, if the received message includes the carrier level itself, the carrier level is stored in the memory 134, instead of adding the adjustment amount.

At a step S233, a process of responding to the carrier-level-adjustment instructing message is carried out.

At the step S234 when the check at the step S231 gave a negative answer, the CPU 133 checks whether the received message is a carrier-level-adjustment-completion message with a destination of the pertinent communication-terminal unit TSTB. If the answer is "no", the procedure goes to the step S203 of FIG. 8B. Otherwise, the procedure goes to a step S235.

At the step S235, the CPU 133 sets the level-adjustment-completion flag LVL to 1.

At a step S236, a process of responding to the carrier-level-adjustment-completion message (process 2.2) is carried out. After the step S236, the procedure goes to the step S204 of FIG. 8B.

Figure 30:
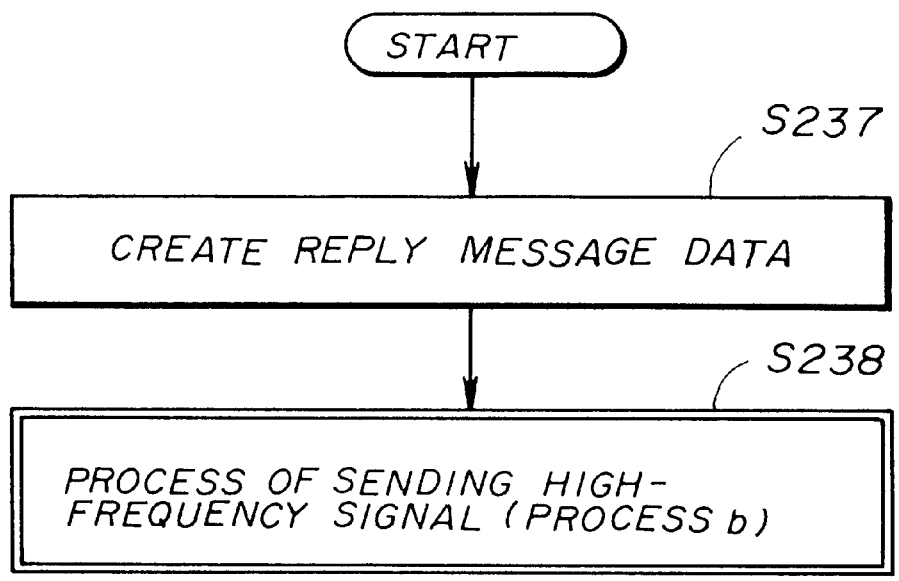
FIG. 30 is a flowchart of a process carried out at a step S233 of FIG. 29.

FIG. 30 is a flowchart of a process carried out at the step S233 of FIG. 29.

At a step S237, the CPU 133 creates reply message data.

At a step S238, a process of sending the high-frequency signal the same as that of FIG. 28 is carried out.

Figure 31:
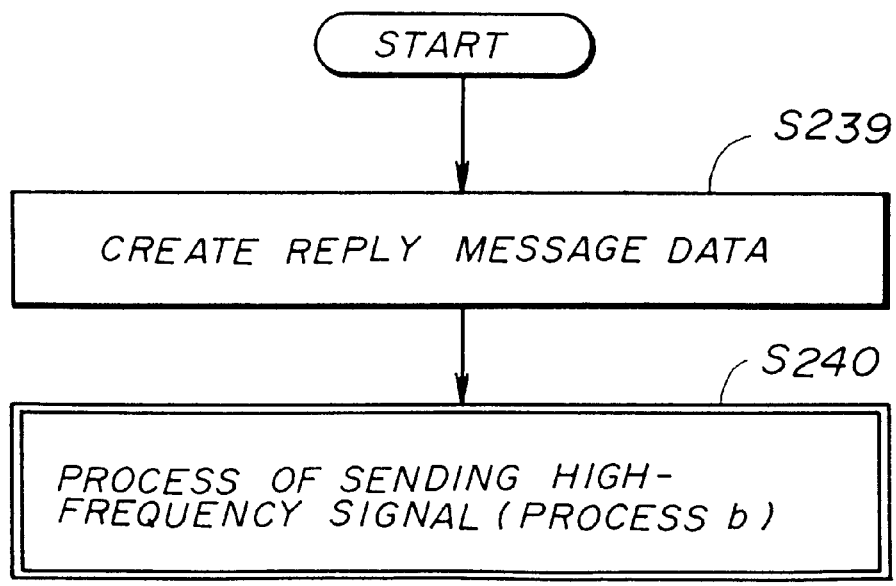
FIG. 31 is a flowchart of a process carried out at a step S236 of FIG. 29.

FIG. 31 is a flowchart of a process carried out at the step S236 of FIG. 29.

At a step S239, the CPU 133 creates reply message data.

At a step S240, a process of sending the high-frequency signal the same as that of FIG. 28 is carried out.

Figure 32:
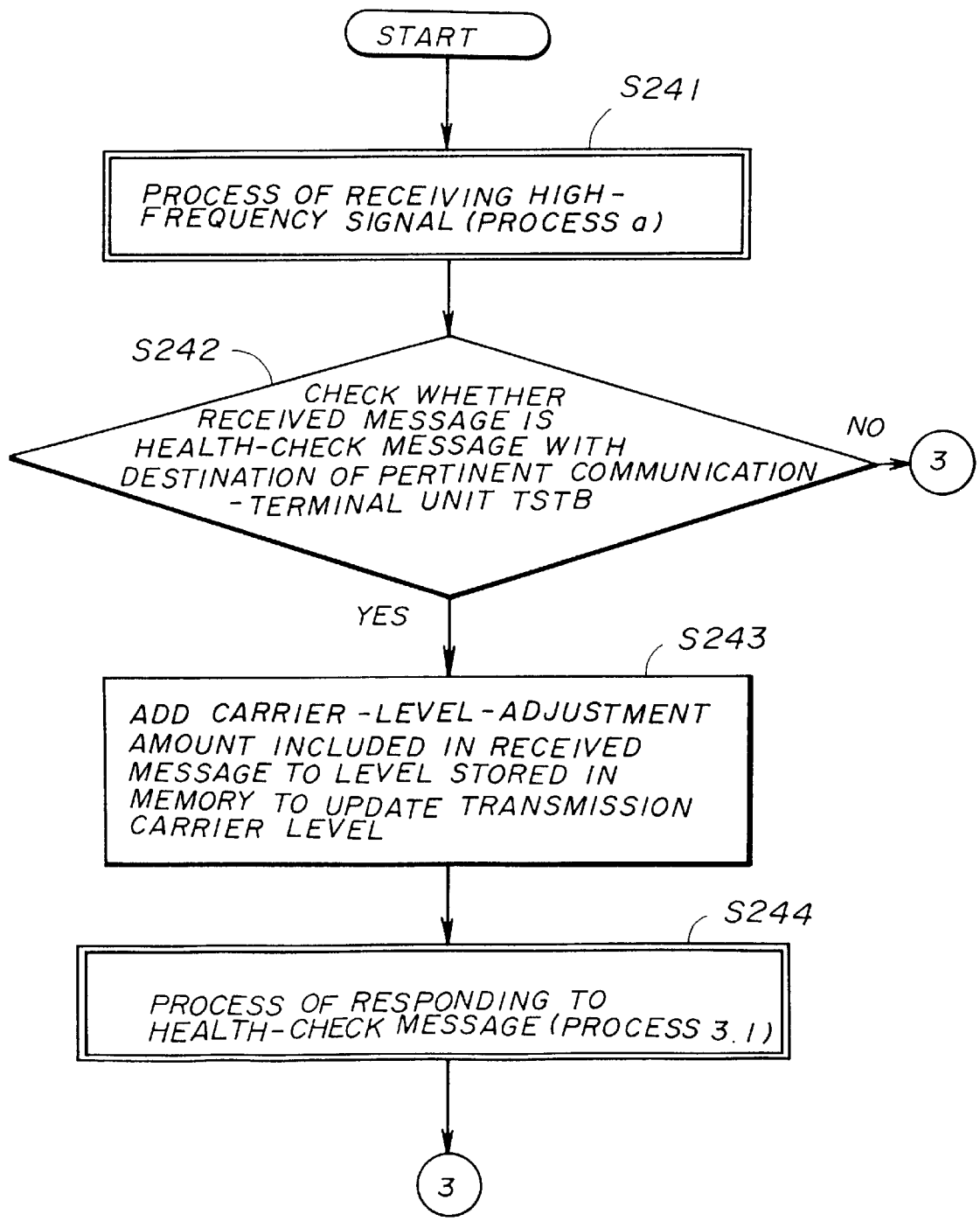
FIG. 32 is a flowchart of a process carried out at a step S204 of FIG. 8B.

FIG. 32 is a flowchart of a process carried out at the step S204 of FIG. 8B.

At a step S241, a process of receiving a high-frequency signal as previously described is carried out.

At a step S242, the CPU 133 checks whether the received message is a health-check message with a destination of the pertinent communication-terminal unit TSTB. If the answer is "yes", the procedure goes to a step S243. Otherwise, the procedure goes to the step S204 of FIG. 8B, i.e., goes back to the start of the flowchart of FIG. 32.

At the step S243, the CPU 133 adds the carrier-level-adjustment amount included in the received message to the level stored in the memory 134 to update the transmission carrier level. Here, if the received message includes the carrier level itself, the carrier level is merely stored in the memory 134, instead of adding the adjustment amount.

At a step S244, a process of responding to the health-check message (process 3.1) is carried out. After the step S244, the procedure goes back to the start of this flowchart.

Figure 33:
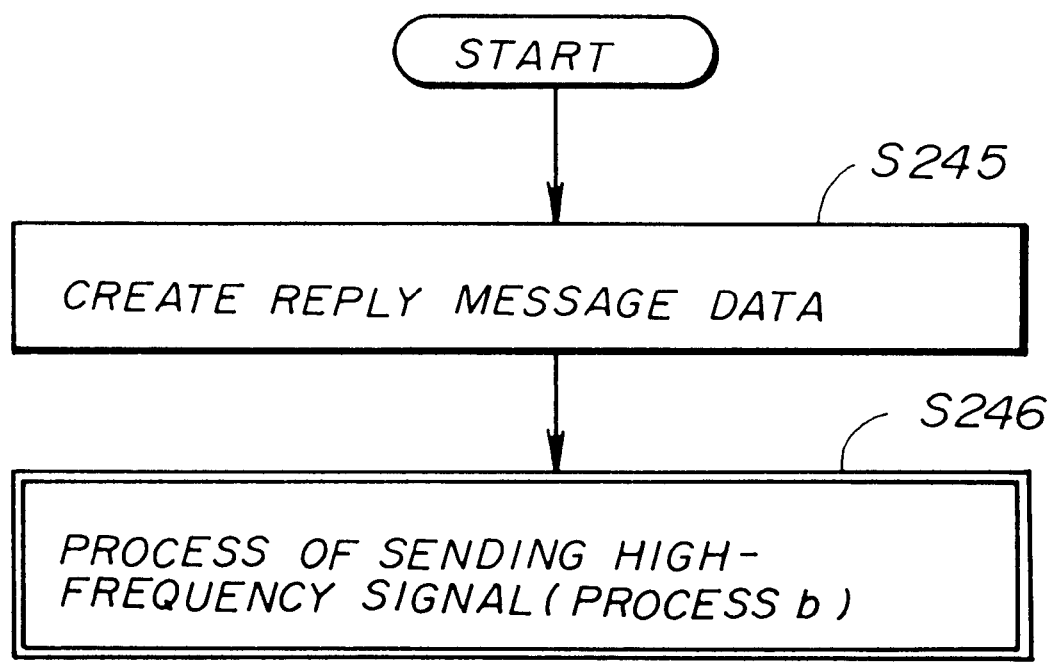
FIG. 33 is a flowchart of the process of responding to a health-check message.

FIG. 33 is a flowchart of the process of responding to the health-check message.

At a step S245, the CPU 133 creates reply message data.

At a step S246, a process of sending the high-frequency signal the same as that of FIG. 28 is carried out.

In the following, operation sequences between the TDMA unit 22 and the communication-terminal unit TSTB will be described with reference to the accompanying drawings.

Figure 34:
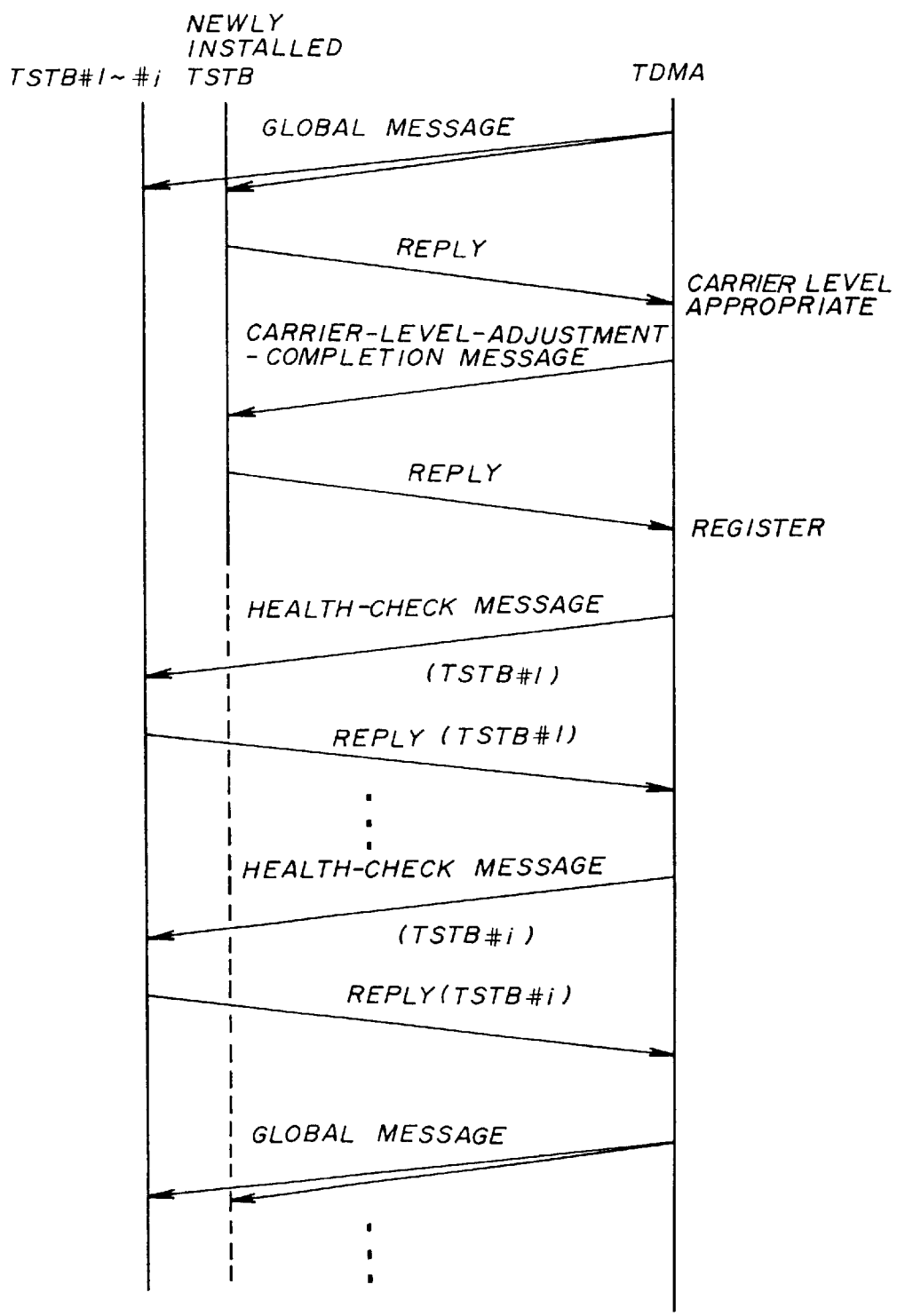
FIG. 34 is a sequence diagram showing an operation sequence when there is a newly installed communication-terminal unit TSTB.

FIG. 34 is a sequence diagram showing an operation sequence when there is a newly installed communication-terminal unit TSTB.

Upon receiving the global message for checking the existence of a newly installed communication-terminal unit TSTB, the newly installed communication-terminal unit TSTB sends back a response. When the TDMA unit 22 decides that the carrier level is appropriate, the TDMA unit 22 sends a carrier-level-adjustment-completion message. When the TDMA unit 22 receives a response to this completion message, the newly installed communication-terminal unit TSTB is registered as an existing communication-terminal unit TSTB. Then, a health-check message is sent to each of the existing communication-terminal units TSTB. The operation described above is repeated at equal intervals.

Figure 35:
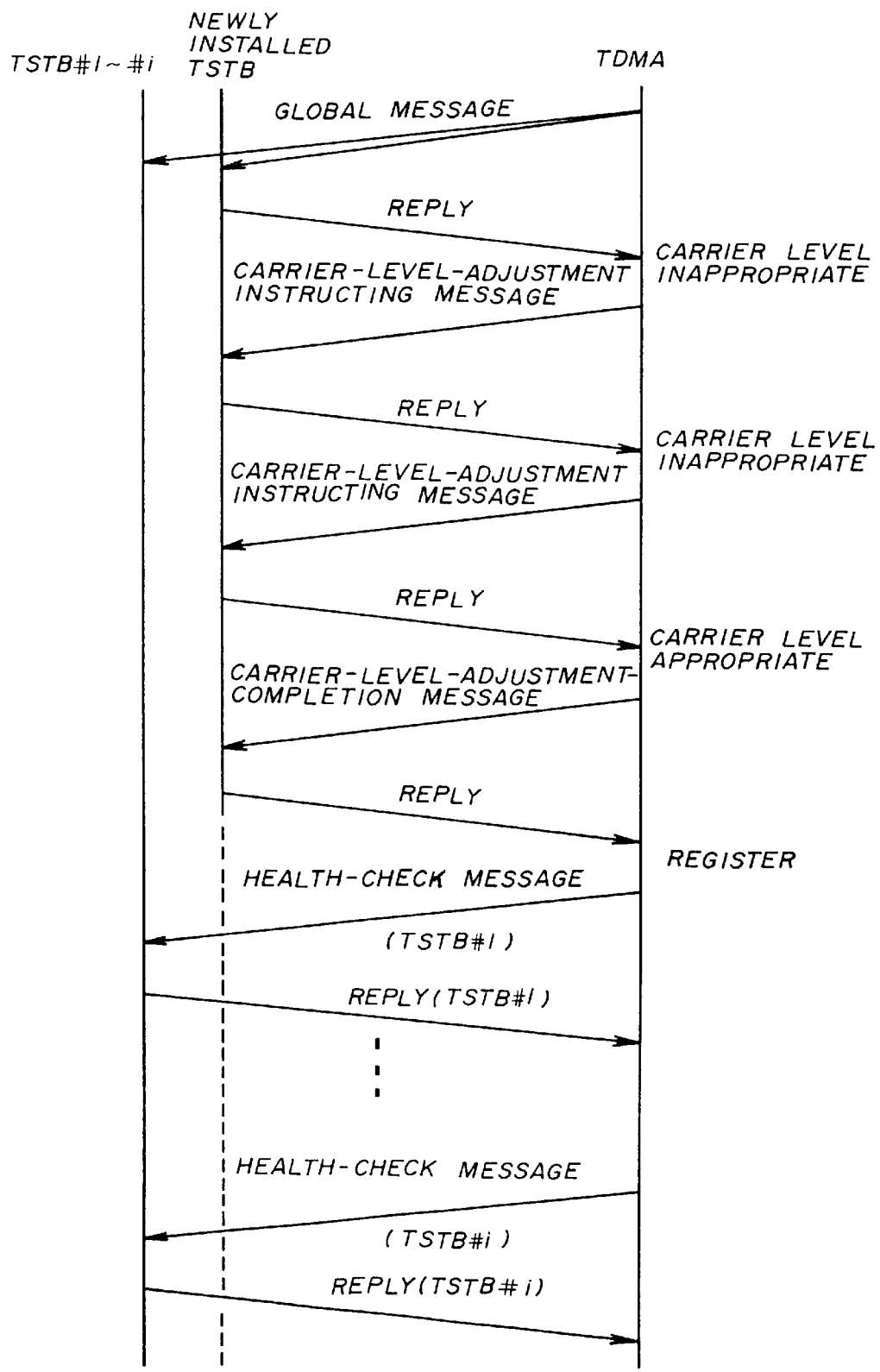
FIG. 35 is a sequence diagram showing an operation sequence when a carrier level of a newly installed communication-terminal unit TSTB is to be adjusted.

FIG. 35 is a sequence diagram showing an operation sequence when a carrier level of a newly installed communication-terminal unit TSTB is to be adjusted.

Upon receiving the global message for checking the existence of a newly installed communication-terminal unit TSTB, the newly installed communication-terminal unit TSTB sends back a response. When the TDMA unit 22 receiving this response decides that the received carrier level is inappropriate, the TDMA unit 22 sends a carrier-level-adjustment instructing message. Upon receiving a response to this instructing message, then, the TDMA unit 22 checks whether the adjusted carrier level is appropriate. The TDMA unit 22 sends the carrier-level-adjustment instructing message several times, if necessary, until the adjusted carrier level becomes appropriate. When the carrier level becomes appropriate, the newly installed communication-terminal unit TSTB is registered as an existing communication-terminal unit TSTB.

Figure 36:
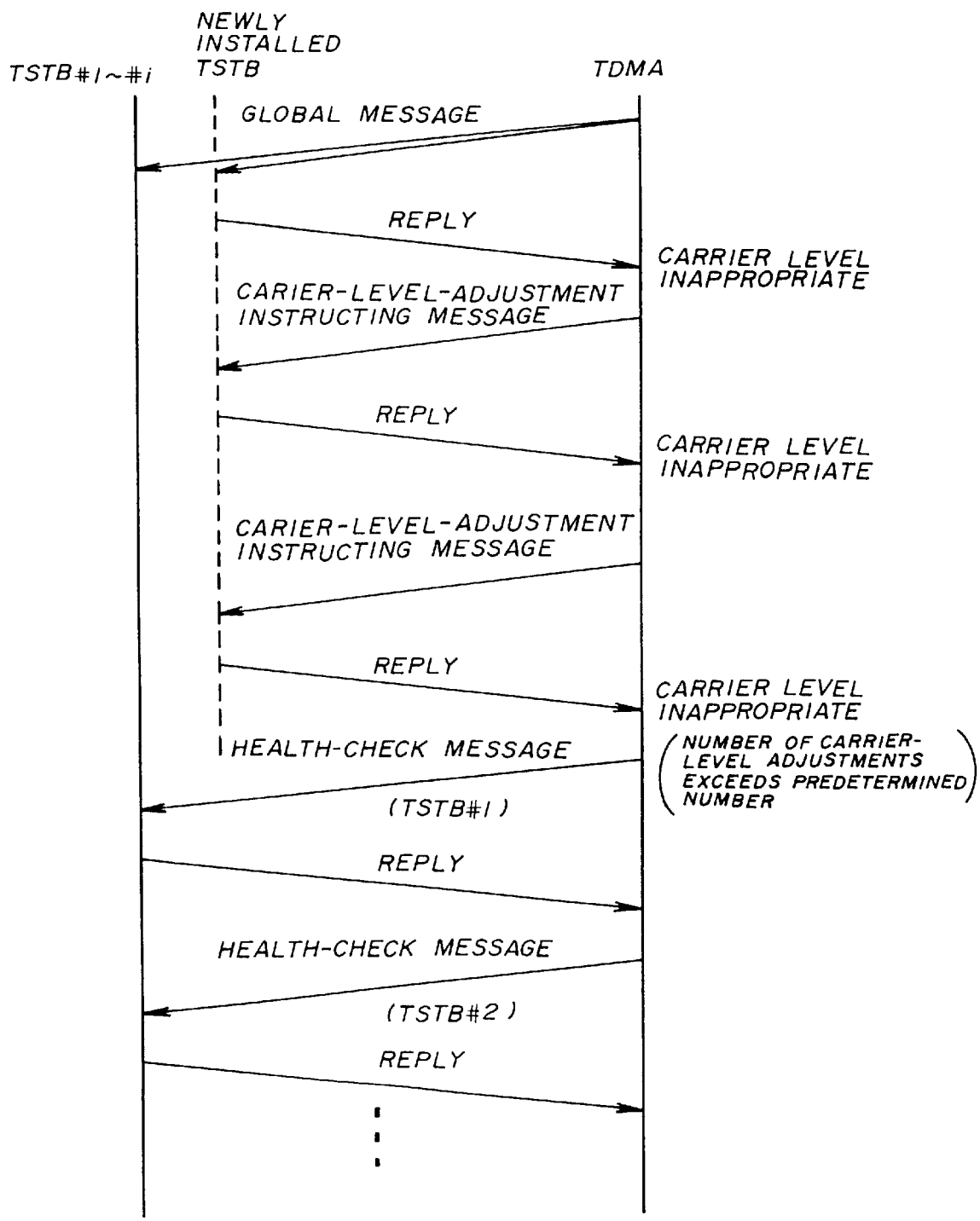
FIG. 36 is a sequence diagram of an operation sequence when the number of carrier-level-adjustment instructing messages transmitted to request an adjustment exceeds a predetermined number K.

FIG. 36 is a sequence diagram of an operation sequence when the number of the carrier-level-adjustment instructing messages transmitted to request an adjustment exceeds a predetermined number K.

As shown in FIG. 36, when this number exceeds the predetermined number K, it is determined that a newly installed communication-terminal unit TSTB is non-existent, and the registration thereof is not carried out.

Figure 37:
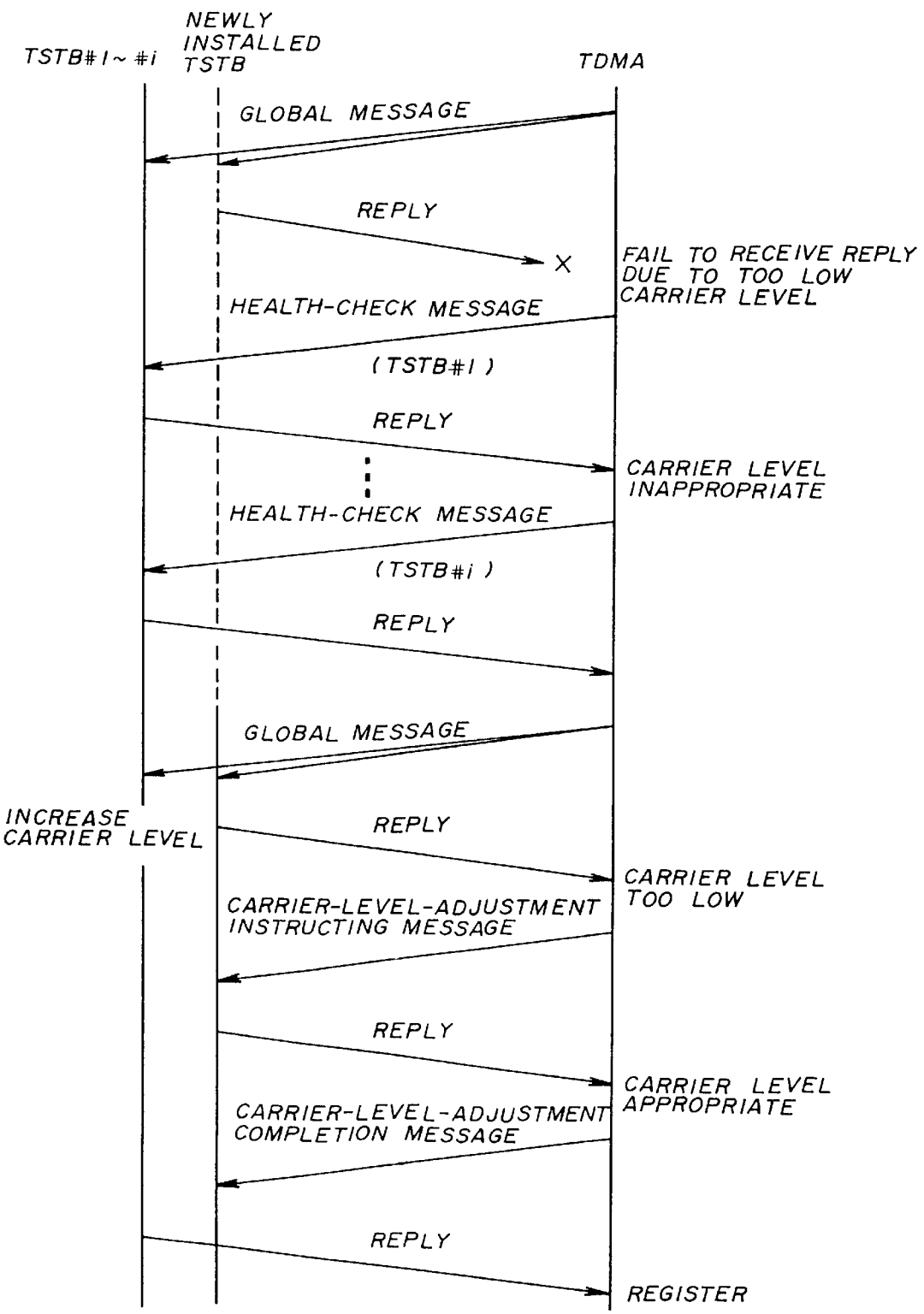
FIG. 37 is a sequence diagram of an operation sequence when the TDMA unit cannot receive a response transmitted from the newly installed communication-terminal unit TSTB responding to a global message.

FIG. 37 is a sequence diagram of an operation sequence when the TDMA unit 22 cannot receive a response transmitted from the newly installed communication-terminal unit TSTB responding to the global message, because the carrier level of the response is inappropriate.

When the TDMA unit 22 does not receive a response to the global message it transmitted, the TDMA unit 22 sends the global message for checking the existence of a newly installed communication-terminal unit TSTB again after one round of transmissions of the health-check messages. When the communication-terminal unit TSTB receives this global message, the communication-terminal unit TSTB decides that the TDMA unit 22 did not receive the response to the last global message. Based on this decision, the communication-terminal unit TSTB sends a response to the global message with a carrier level raised by one step. In an example of FIG. 37, the TDMA unit 22 manages to receive the response this time, but the carrier level is still too low. Thus, the TDMA unit 22 sends a carrier-level-adjustment instructing message to the communication-terminal unit TSTB, and the communication-terminal unit TSTB sends back a response at a proper carrier level.

Figure 38:
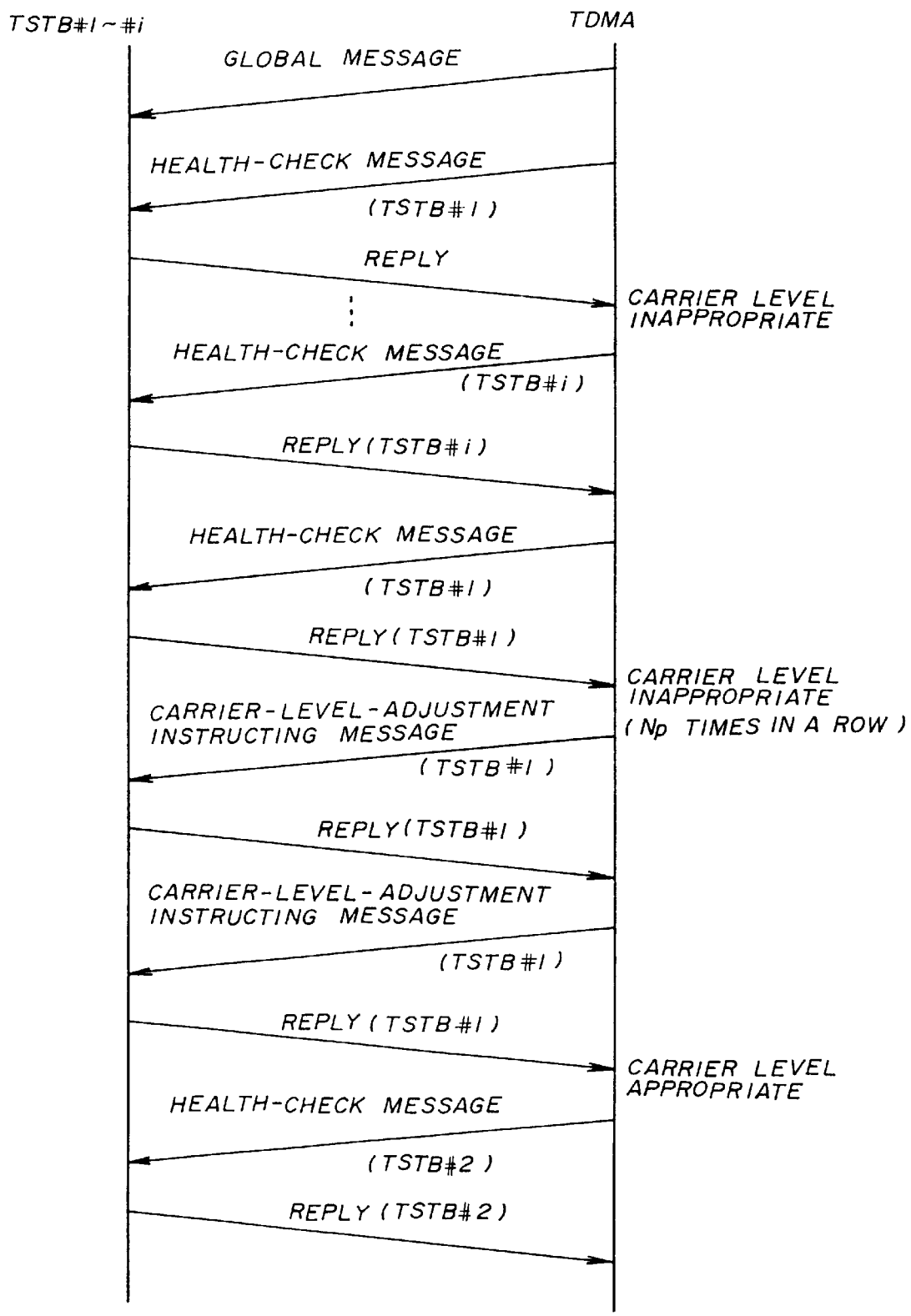
FIG. 38 is a sequence diagram of an operation sequence when an existing communication-terminal unit TSTB #1 has an inappropriate carrier level.

FIG. 38 is a sequence diagram of an operation sequence when an existing communication-terminal unit TSTB #1 has an inappropriate carrier level.

As shown in FIG. 38, there is no response to a global message for checking an existence of a newly installed communication-terminal unit TSTB since there is no newly installed one. Then, the TDMA unit 22 sends a health-check message to the communication-terminal unit TSTB #1. Upon receiving a response to this health-check message, the TDMA unit 22 decides that the carrier level is inappropriate because a difference between the received carrier level and the optimal carrier level is larger than the threshold value P. Health-check messages are periodically sent to the communication-terminal unit TSTB #1. When responses having the carrier-level difference larger than the threshold value P are consecutively received Np times, the TDMA unit 22 sends a carrier-level-adjustment instructing message to the communication-terminal unit TSTB #1. In an example of FIG. 38, after sending this message two times, the carrier level becomes appropriate.

In the above embodiment, the memory 134 of FIG. 6 may be provided with a backup battery. In this case, a carrier level stored in the memory 134 may be used as an initial setting after a recovery when the communication-terminal unit TSTB suffers from a power failure, thereby reducing time required for the recovery.

When the carrier-level-adjustment amount sent from the TDMA unit 22 does not reach the communication-terminal unit TSTB, the transmission of the carrier-level-adjustment amount is attempted again. In this case, the carrier-level-adjustment amount of this second attempt may be set to zero to avoid an excessive adjustment of the carrier level.

As described above, according to the first principle of the present invention, the automatic carrier-level adjustment of a communication-terminal device is periodically carried out via a channel which is different from those used for ordinary communications and the control thereof. Therefore, the automatic adjustment of the carrier level of each channel reflecting an actual level fluctuation is achieved without disturbing the ordinary communications.

Also, according to the first principle of the present invention, the carrier-level adjustment is carried out until the carrier level measured by the center device falls within a predetermined range. Therefore, a reliable carrier-level adjustment is achieved.

Also, according to the first principle of the present invention, when the carrier level measured by the center device falls within the predetermined range, the carrier-level-adjustment-completion message is transmitted. Therefore, an inconsistency between the center device and the communication-terminal device is less likely to happen.

Also, according to the first principle of the present invention, when the carrier level measured by the center device is still out of the predetermined range even after repeating the carrier-level-adjustment process a predetermined number of times, the center device notifies the communication-terminal device of the failure of the carrier-level adjustment. Therefore, when the carrier-level adjustment is not successful, the carrier-level adjustment can be restarted, thereby reducing the likelihood of the failure.

Also, according to the first principle of the present invention, the center device periodically transmits the global message for checking an existence of a newly installed communication-terminal device, and receives a response from the newly installed communication-terminal device to check whether the carrier level of the newly installed communication-terminal device is appropriate. Thus, a reliable carrier-level setting is conducted for the newly installed device.

Also, according to the first principle of the present invention, when the center device fails to receive the response to the global message, the communication-terminal device raises the carrier level by a predetermined amount to send a response to a next global message. Therefore, even when the response from the communication-terminal device is not received by the center device, the carrier level is adjusted in the end without outputting an excessively large signal level to the communication line.

Also, according to the first principle of the present invention, even when the response with the highest carrier level is not received by the center device, the carrier level is set to the lowest level for a further adjustment. Therefore, when the center device cannot detect the response because of collisions of the response with other communications, for example, and when the carrier level becomes excessively high because of this, the carrier level is lowered for a further adjustment to reduce the likelihood of the adjustment failure.

Also, according to the first principle of the present invention, the communication-terminal device measures the carrier level of a message sent from the center device to estimate an appropriate carrier level for transmission. Therefore, the communication-terminal device achieves an appropriate initial setting of the carrier level so as to reduce the time required for the carrier-level adjustment.

Also, according to the first principle of the present invention, the center device obtains the average of carrier levels for a predetermined number of responses to generate information on the carrier-level adjustment. Therefore, when the carrier level is displaced during an operation, the automatic adjustment is achieved to recover an appropriate carrier level.

Also, according to the first principle of the present invention, when the carrier level of the latest response (message) is different from the average by more than a predetermined amount, the carrier level of the latest response is discarded, and the current average is used for the carrier-level adjustment. Therefore, even when the carrier level is excessively displaced because of noise or the like, this carrier level is not included in the calculation of the average, thereby avoiding an undesirable influence of the noise or the like.

Also, according to the first principle of the present invention, when the carrier level of the latest response is different from the average by more than a predetermined amount and when the occurrences of such a situation reach a predetermined number, the current average is discarded to restart the measurement of the carrier levels. Therefore, even when the carrier level exceeds an adjustable range because of an addition of a communication cable, etc., the adjustment of the carrier level is restarted.

Also, according to the first principle of the present invention, the information on the carrier-level adjustment is the adjustment amount (calibration amount) for the current carrier level. Therefore, the center device do not have to store and manage the carrier levels for each of the communication-terminal devices, so that the center device needs less memory volume.

Moreover, the present invention concerns other problems, and a description thereof will be provided below. These problems relate to a method and a device for returning an acknowledge signal in a communication system which conducts a two-way communication via a one-to-many network such as used in a CATV network.

In recent years, communication systems for providing two-way services have been developed to provide such services as telephone services, VOD services, etc., via an existing CATV network. Such a two-way communication requires a bilateral transmission of control signals. In one-to-many network like the CATV network (e.g., a tree-type network), control signals transmitted in an upward direction (from terminal devices to a center device) may suffer from collisions with each other when a plurality of terminal devices send such control signals to the center device. To avoid this, collision control (slotted aloha method or the like) is generally employed for an upward communication.

In a system exchanging control signals between a center device and terminal devices, there is always a chance to lose the control signals because of transmission errors, etc. Usually, an ACK signal (acknowledge signal) is sent back when a message is received to acknowledge the receipt of the message. An example of this method is a transmission of the ACK signal in the layer 2 of the ISDN.

Figure 39:
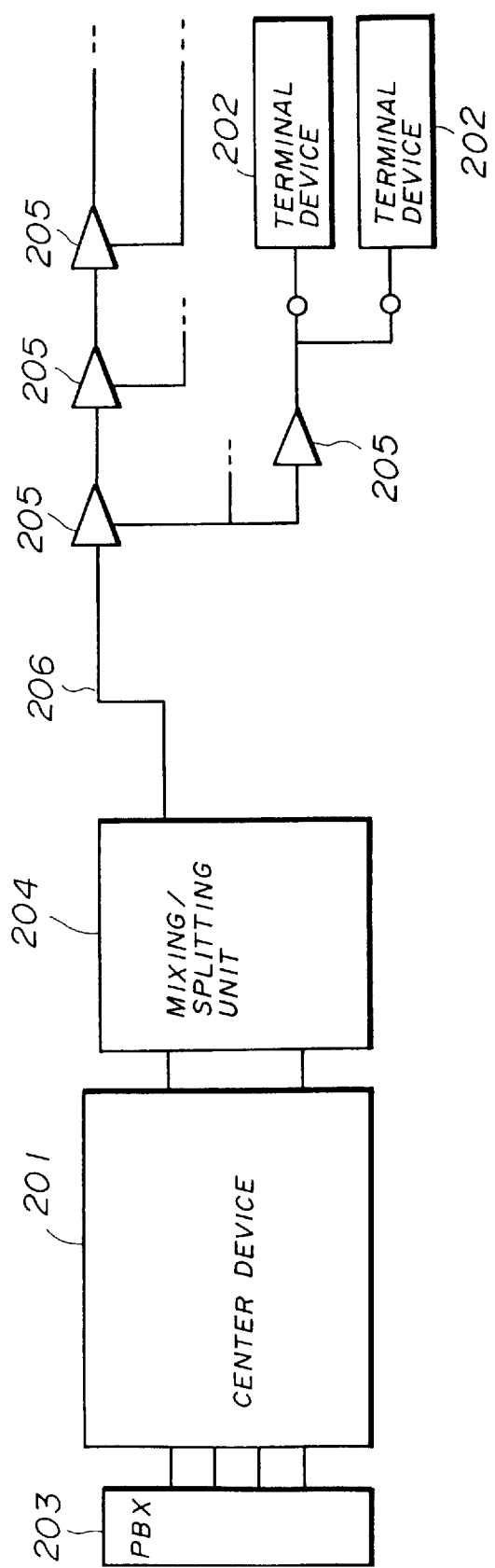
FIG. 39 is a block diagram showing a configuration of a one-to-many network of the prior art.

FIG. 39 is a block diagram showing a configuration of a one-to-many network of the prior art.

The network of FIG. 39 shows a configuration of a communication system for two-way telephone services via a one-to-many digital network (CATV network in this example). The communication system includes a center device 201, terminal devices 202, a switching device 203, a mixing/splitting unit 204, a repeating amplifier 205, and a communication line 206. The center device 201 is connected to the switching device 203 having telephone switching functions, and, also, is connected to a plurality of the terminal devices 202 via the mixing/splitting unit 204, the communication line 206, and the repeating amplifier 205.

Figure 40:
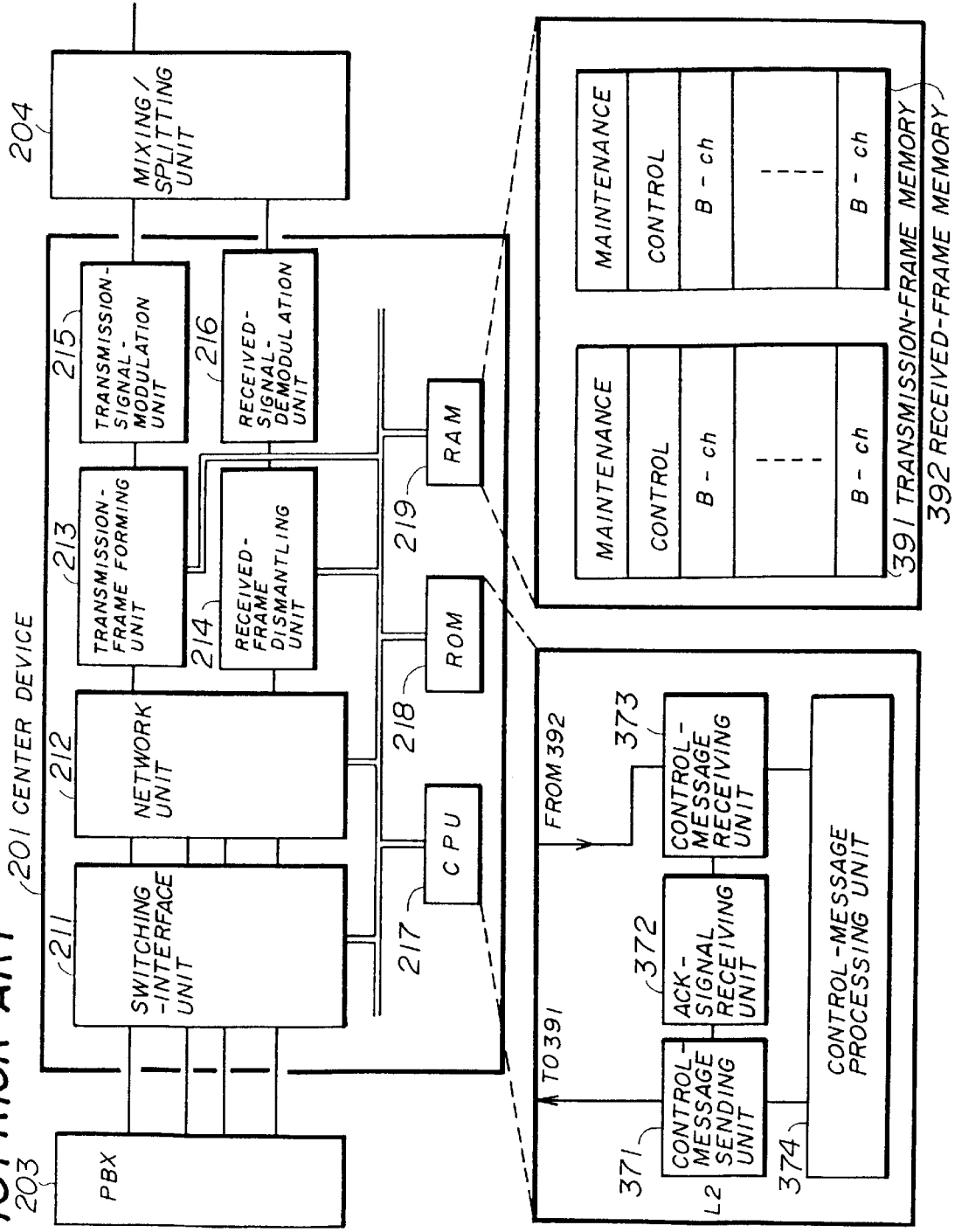
FIG. 40 is a block diagram of an example of a center device of FIG. 39.

FIG. 40 is a block diagram of an example of a center device of FIG. 39.

In FIG. 40, the center device 201 includes a switching-interface unit 211, a network unit 212, a transmission-frame forming unit 213, a received-frame dismantling unit 214, a transmission-signal-modulation unit 215, a received-signal-demodulation unit 216, a CPU 217, a ROM 218, and a RAM 219.

The switching-interface unit 211 is an interface with the switching device 203 having the telephone switching functions. The network unit 212 carries out a conversion of the communication channel B between the side of the switching device 203 and the communication line 206.

Communication signals are supplied from the network unit 212 to the transmission-frame forming unit 213. The transmission-frame forming unit 213 receives control signals and the like from the CPU 217, and puts the control signals, communication channels, etc., together to form a transmission frame. The transmission-signal-modulation unit 215 modulates the transmission frame into a transmission format (modem signal) of the network, and the modulated signal is transmitted to the communication line 206 via the mixing/splitting unit 204.

A frame received from the communication line 206 via the mixing/splitting unit 204 is demodulated by the received-signal-demodulation unit 216 from the transmission format of the network, and, then, is supplied to the received-frame dismantling unit 214. The received-frame dismantling unit 214 breaks down the received frame into the communication channels, the control signals, etc. The communication channels thus obtained are input to the network unit 212, and data extracted from the received frame is stored in the RAM 219.

The CPU 217, the ROM 218, and the CPU 217 are provided for the purpose of an entire control of the center device. The CPU 217 is responsible for the entire control of the center device 201, and the ROM 218 stores programs, etc., for the control of the center device 201. Also, the RAM 219 stores data of the received frame, etc.

The RAM 219 includes a transmission-frame memory 391 and a received-frame memory 392. The transmission-frame memory 391 stores maintenance data, control data, and data of a plurality of communication channels (B-ch). The received-frame memory 392 stores maintenance data, control data, and data of a plurality of communication channels.

In FIG. 40, functions provided by the CPU 217 and the ROM 218 are shown as function blocks. Namely, these functions include a control-message sending unit 371, an ACK-signal receiving unit 372, a control-message receiving unit 373, and a control-message processing unit 374. The control-message receiving unit 373 receives the control message by searching for pertinent data broken down by the received-frame dismantling unit 214 and stored in the received-frame memory 392. The control-message sending unit 371 sends the control message to be included in the transmission frame to the transmission-frame forming unit 213 via the transmission-frame memory 391. Also, the control-message sending unit 371 activates an ACK-signal-receipt timer when the receipt of the control message is notified. The control-message processing unit 374 carries out a terminal process of the control message received by the control-message receiving unit 373, and carries out a generation process of generating the control message to be sent to the control-message sending unit 371. The ACK-signal receiving unit 372 checks whether the control message received by the control-message receiving unit 373 indicates the receipt of the ACK signal, and sends to the control-message sending unit 371 an instruction to stop the ACK-signal-receipt timer if the receipt of the ACK signal is indicated.

Figure 41:
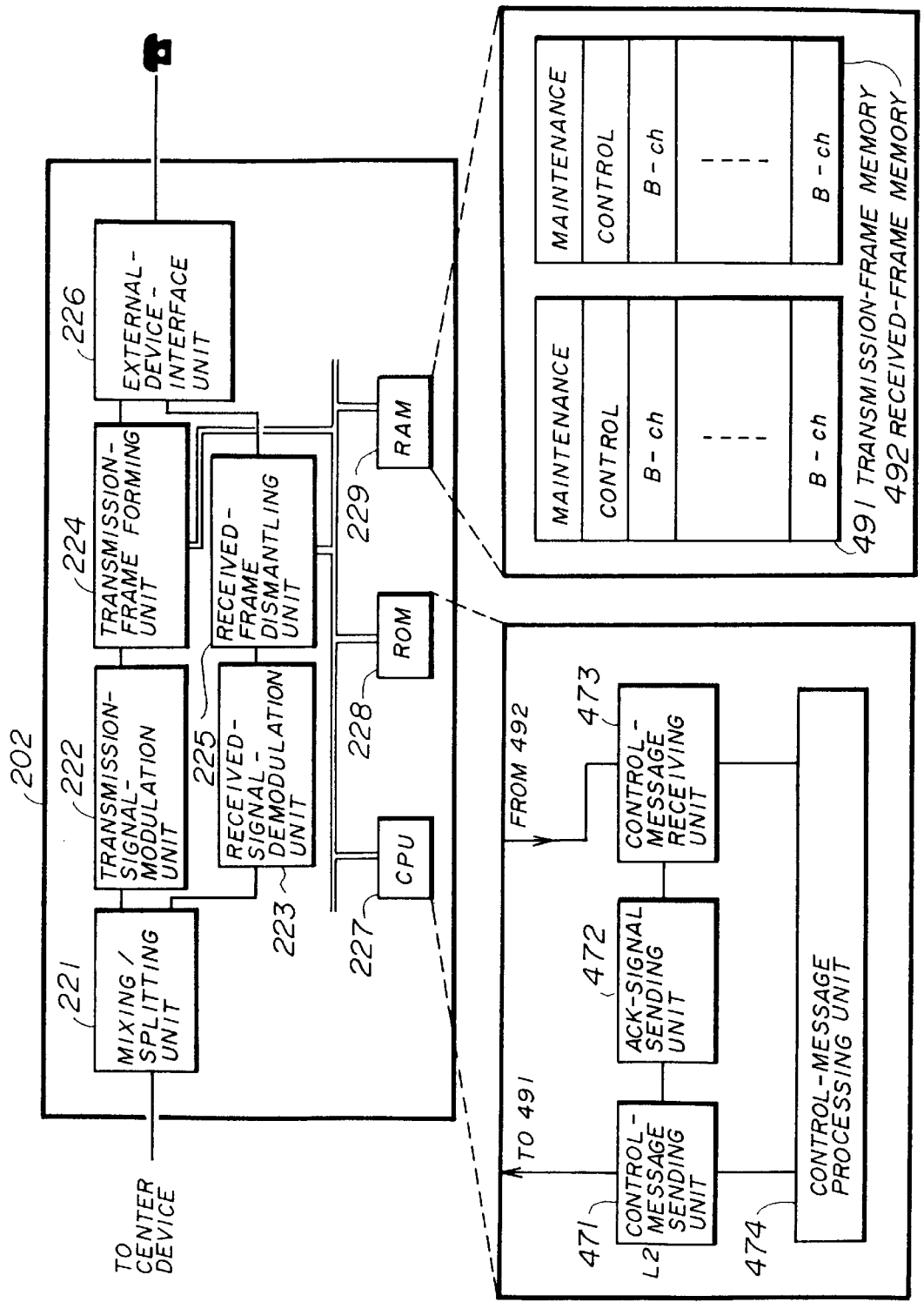
FIG. 41 is a block diagram of an example of a terminal device of FIG. 39.

FIG. 41 is a block diagram of an example of a terminal device of FIG. 39.

In FIG. 41, the terminal device 202 includes a mixing/splitting unit 221, a transmission-signal-modulation unit 222, a received-signal-demodulation unit 223, a transmission-frame forming unit 224, a received-frame dismantling unit 225, an external-device-interface unit 226, a CPU 227, a ROM 228, and a RAM 229.

A modem signal received from the communication line 206 is provided for the received-signal-demodulation unit 223 via the mixing/splitting unit 221 splitting the modem signal. The received-signal-demodulation unit 223 demodulates the received frame from the transmission format of the network, and, then, supplies the received frame to the received-frame dismantling unit 225. The received-frame dismantling unit 225 breaks down the received frame into the communication channels, the control signals, etc. The communication channels are supplied to external devices such as a telephone machine via the external-device interface unit 226, and data extracted from the received frame is stored in the RAM 229. The external-device-interface unit 226 provides an interface with the external devices.

Signals provided from the external-device-interface unit 226 are supplied to the transmission-frame forming unit 224. The transmission-frame forming unit 224 puts the control signal, the communication channels, etc., together to form a transmission frame, which is then supplied to the transmission-signal-modulation unit 222. The transmission-signal-modulation unit 222 modulates the transmission frame into the transmission format (modem signal) of the network, and sends the modem signal to the communication line 206 via the mixing/splitting unit 221.

The CPU 227, the ROM 228, and the CPU 227 are provided for the purpose of an entire control of the terminal device.

The RAN 229 includes a transmission-frame memory 491 and a received-frame memory 492. The transmission-frame memory 491 stores maintenance data, control data, and data of a plurality of communication channels. The received-frame memory 492 stores maintenance data, control data, and data of a plurality of communication channels.

In FIG. 41, functions provided by the CPU 227 and the ROM 228 are shown as function blocks. Namely, these functions include a control-message sending unit 471, an ACK-signal sending unit 472, a control-message receiving unit 473, and a control-message processing unit 474. The control-message receiving unit 473 receives the control message by searching for pertinent data broken down by the received-frame dismantling unit 225 and stored in the received-frame memory 492. The control-message sending unit 471 sends the control message to be included in the transmission frame to the transmission-frame forming unit 224 via the transmission-frame memory 491. The control-message processing unit 474 carries out a terminal process of the control message received by the control-message receiving unit 473, and carries out a generation process of generating the control message to be sent to the control-message sending unit 471. The ACK-signal sending unit 472 sends an instruction to the control-message sending unit 471 to send the ACK signal when receiving the control signal.

FIGS. 42A and 42B are illustrative drawings showing formats of frames used for a downward transmission and an upward transmission, respectively, between the center device and the terminal device.

Data transmitted in upward and downward directions in this communication system is comprised of a frame with a plurality of communication channels being time-division-multiplexed. Formats of this frame are shown in FIGS. 42A and 42B. FIG. 42A shows a frame format of the downward transmission, and FIG. 42B shows a frame format of the upward transmission.

A frame format 207 of the downward transmission from the center-device side to the terminal-device side includes a control channel 271, a distance-control channel 272, and a plurality of communication channels B0 through Bn. A control message 273 of the control channel 271 includes a terminal ID, control data, and FCS (frame check sequence).

A frame format 208 of the upward transmission from the terminal-device side to the center-device side includes a control channel 281, a distance-control channel 284, and a plurality of communication channels B0 through Bn. A control message 283 of the control channel 281 includes a terminal ID, control data, and FCS (frame check sequence).

The distance-control channel 284 is used for adjusting the transmission timing according to a distance of each terminal device, so that differences in signal-propagation time caused by differences in distance from the center device to the terminal devices are compensated for. An unused area following the distance-control channel 284 in the upward-direction frame format 208 is an area set aside for receipt of a signal sent from a terminal device to which the distance control is not applied. This unused area is not used in an normal operation, but is used for distance measurement only when the terminal device is initially installed.

In the following, operations of the communication system of FIG. 39 will be described with reference to the accompanying drawings.

Figure 43:
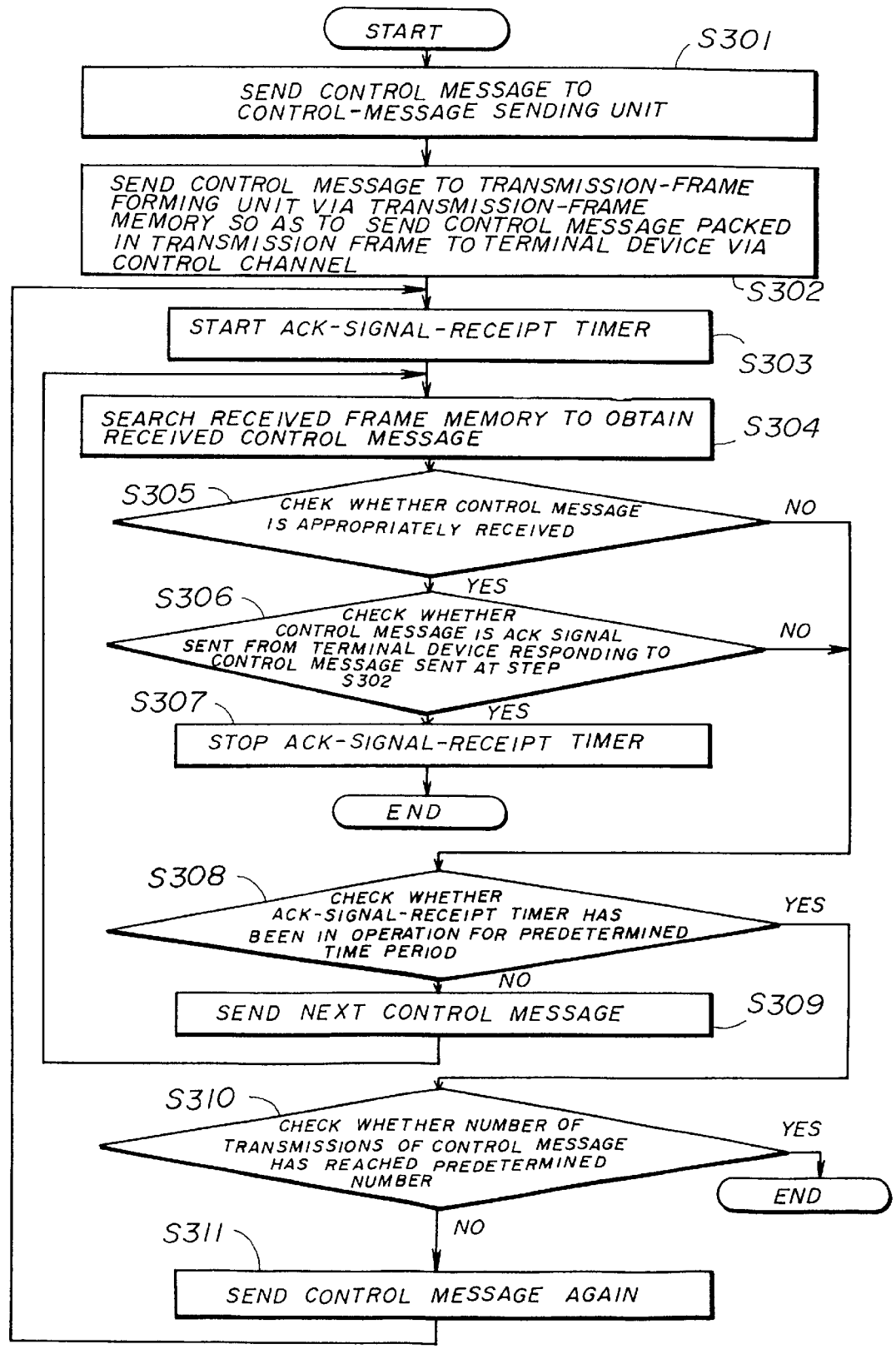
FIG. 43 is a flowchart of an operation of the center device.
Figure 44:
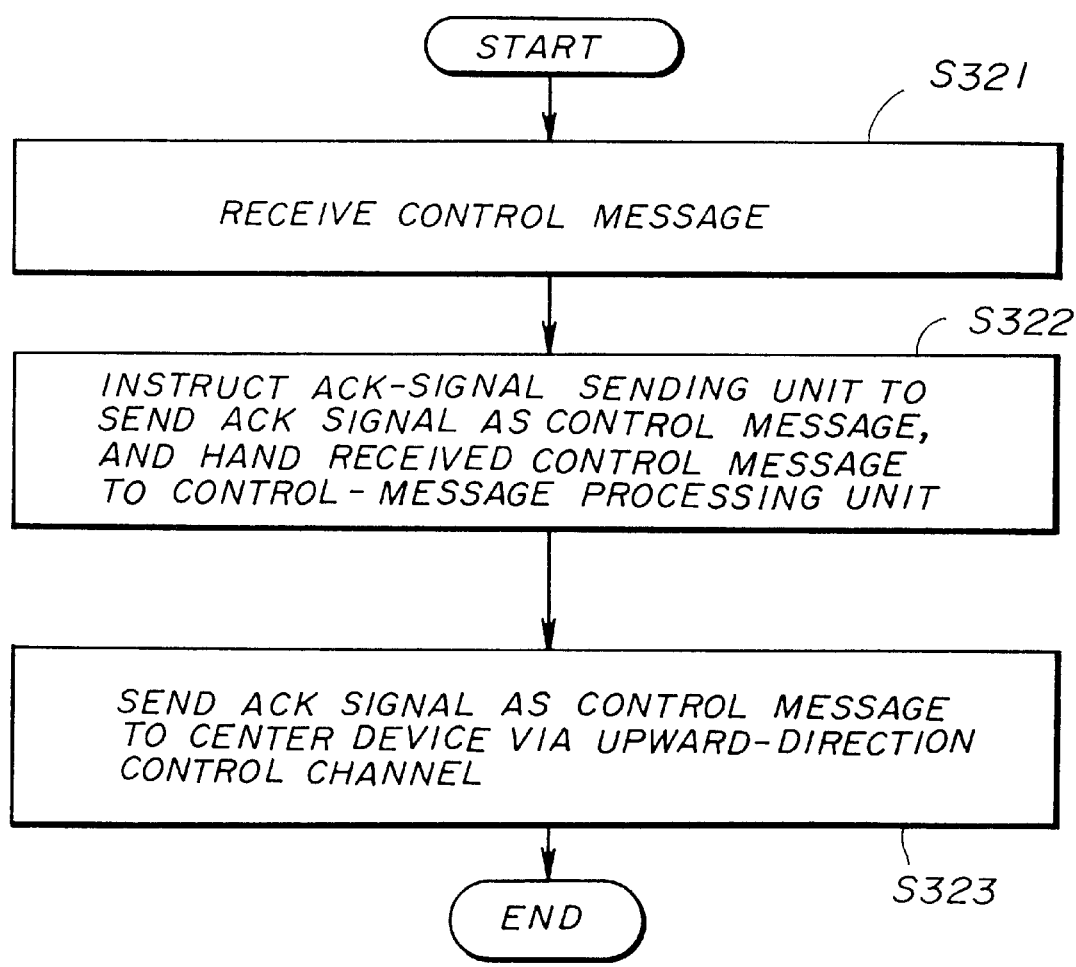
FIG. 44 is a flowchart of an operation of the terminal device.

FIG. 43 is a flowchart of an operation of the center device, and FIG. 44 is a flowchart of an operation of the terminal device.

In FIG. 43, at a step S301, the control-message processing unit 374 receiving a request for a control message transmission (e.g., a receipt signal of the telephone service) to the terminal device 202 sends a control message to the control-message sending unit 371.

At a step S302, the control-message sending unit 371 sends the control message to the transmission-frame forming unit 213 via the transmission-frame memory 391 so as to send the control message 273 packed in the transmission frame to the terminal device 202 via the control channel 271.

At a step S303, the control-message sending unit 371 starts the ACK-signal-receipt timer.

At a step S304, the control-message receiving unit 373 searches the received-frame memory 392 to obtain a received control message 283.

At a step S305, the control-message receiving unit 373 checks whether the control message 283 is appropriately received. If it is, the procedure goes to a step S306. Otherwise, the procedure goes to a step S308.

At the step S306, the ACK-signal receiving unit 372 checks whether this control message 283 is an ACK signal sent from the terminal device responding to the control message 273 sent at the step S302. If it is, the procedure goes to a step S307. Otherwise, the procedure goes to the step S308.

At the step S307, the ACK-signal receiving unit 372 informs the control-message sending unit 371 of the receipt of the ACK signal, so that the control-message sending unit 371 stops the ACK-signal-receipt timer activated when the control message 273 is sent to the pertinent terminal device.

At the step S308 when the control message 283 is not appropriately received or when the control message is not an ACK signal, the control-message sending unit 371 checks whether the ACK-signal-receipt timer has been in operation for a predetermined time period. If it has not, the procedure goes to a step S309.

At the step S309, the control-message sending unit 371 sends a next control message supplied from the control-message processing unit 374. Then, the procedure goes back to the step S304.

If it turns out at the step S308 that the ACK-signal-receipt timer has been in operation for the predetermined time period, a check is made at a step S310 whether the number of transmissions of the control message 273 for the pertinent ACK-signal-receipt timer has reached a predetermined number. If it has, the transmission of the pertinent control message 273 is terminated with a result of failure of the message transmission.

If it turns out at the step S310 that the number of the transmission has not reached the predetermined number, the procedure goes to a step S311. At the step S311, the control-message sending unit 371 again sends a control message corresponding to the pertinent ACK-signal-receipt timer to the terminal device 202 via the control channel 271. Then, the procedure goes back to the step S303.

An operation procedure of the terminal device 202 will be described below with reference to FIG. 44.

At a step S321, the control-message receiving unit 473 of the terminal device 202 searches the received-frame memory 492 to determine whether the control message 273 sent thereto is received.

At a step S322, the control-message receiving unit 473 instructs the ACK-signal sending unit 472 to send an ACK signal as the control message 283, and hands the received control message 273 to the control-message processing unit 474.

At a step S323, the ACK-signal sending unit 472 sends the ACK signal as the control message 283 to the center device 201 via the control-message sending unit 471 and the upward-direction control channel 281. This ends the procedure.

In the two-way communication system of the prior art, only one control channel for the transmission of the control message is provided in either one of the upward-direction frame or the downward-direction frame. In such a communication system, transmissions of the control messages in the downward direction from the center device to a plurality of the terminal devices are staggered in time by using only the one control channel, and each terminal device extracts the control message directed thereto from a number of control messages being sequentially transmitted. Only one control message is being transmitted at a time on the communication line, so that the control messages of the downward transmission do not collide with each other. On the other hand, transmissions of control messages in the upward direction from the terminal devices to the center device may result in collisions of the control messages when each terminal device tries to send the control message simultaneously.

Namely, ACK signals in the downward direction in response to the upward-direction control messages do not suffer from the collision, but ACK signals in the upward direction in response to the downward-direction control messages may collide with upward-direction control signals. When the collision happens, both the ACK signal and the upward-direction control message colliding with each other are discarded. Then, the downward-direction control message invoking the discarded ACK signal must be retransmitted, and, also, the discarded upward-direction control message must be retransmitted. This gives rise to a problem of a reduction in the transmission efficiency.

To overcome this problem, omission of the ACK signal for the downward-direction control message may be employed. Without acknowledgement of the transmission, however, the protocol becomes insecure so that such malfunctions as locking up caused by an inconsistency between the center device and the terminal devices may be created.

Typically, ACK signals are sent via the downward-direction control channel in response to the upward-direction control messages, so that these ACK signals add to the congestion of the downward-direction control messages.

As a result, the congestion of the control channel is exacerbated to lead to a further reduction in the transmission efficiency.

Accordingly, there is a need for an enhancement in the transmission efficiency by eliminating the collision of the ACK signals with each other or with the control messages.

In the following, embodiments of a second principle of the present invention will be described with reference to the accompanying drawings.

Embodiments of the second principle will be provided below with an application thereof to two-way telephone services using the one-to-many digital CATV network as shown in FIG. 39.

FIGS. 45A and 45B are illustrative drawings showing frame formats used for transmission between the center device and the terminal devices. FIG. 45A shows a frame format of the downward-direction transmission, and FIG. 45B shows a frame format of the upward-direction transmission. In FIGS. 45A and 45B, the same elements as those of FIGS. 42A and 42B are referred to by the same numerals, and a description thereof will be omitted.

The frame formats of FIGS. 45A and 45B differ from those of FIGS. 42A and 42B only in an ACK channel 282 following the control channel 281 in the upward-direction frame format. The ACK channel 282 is a specific channel for an ACK-signal transmission, and an ACK signal (ACK message) 285 of the ACK channel 282 includes a terminal ID, data which indicates ACK, and FCS.

Figure 46:
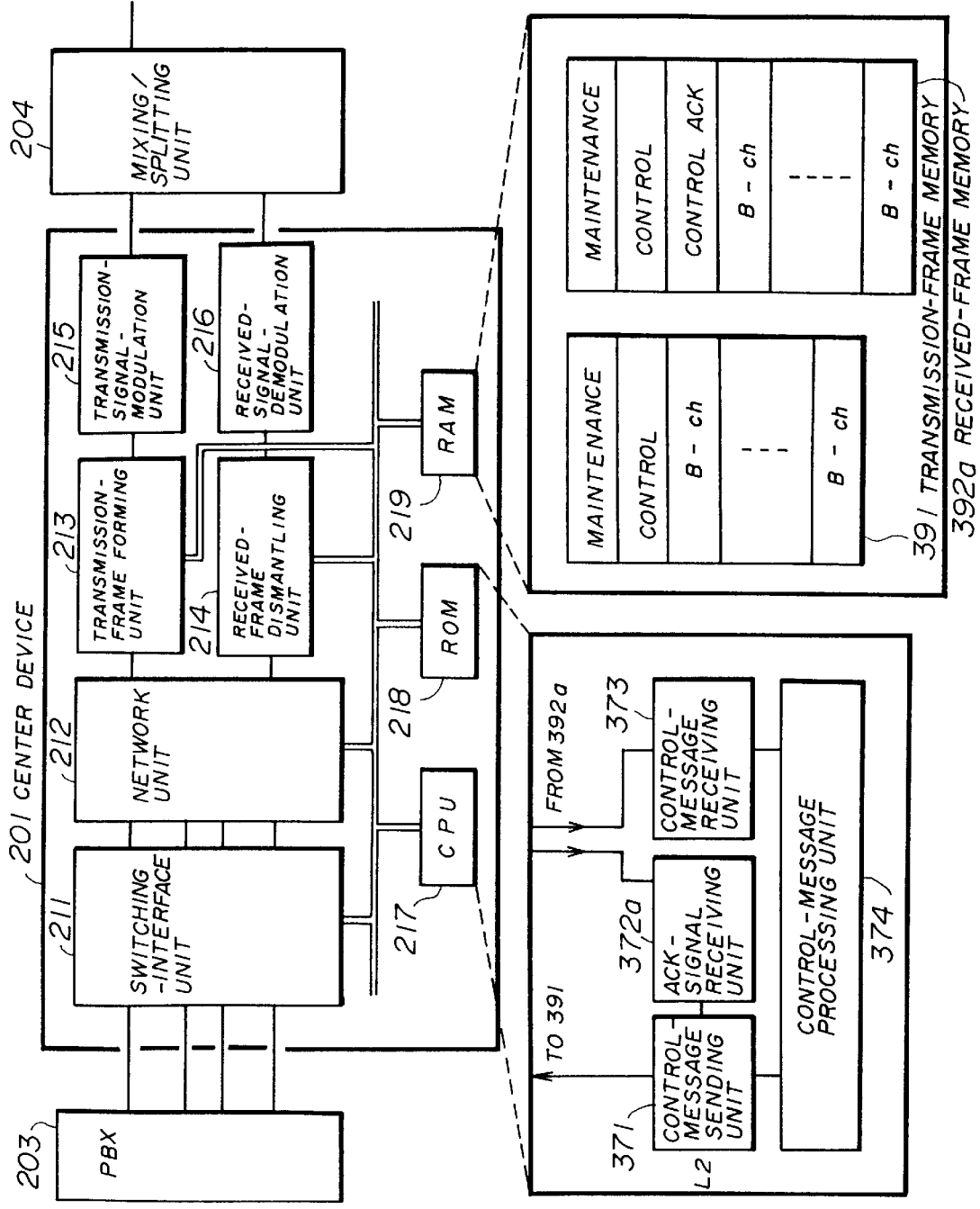
FIG. 46 is a block diagram of an example of a center device according to the first embodiment of the second principle.

FIG. 46 is a block diagram of an example of a center device according to a first embodiment of the second principle. In FIG. 46, the same elements as those of FIG. 40 are referred to by the same numerals, and a description thereof will be omitted.

In response to the provision of the ACK channel 282, the center device 201 of FIG. 46 has control ACK data for specifically storing the ACK signal in a received-frame memory 392a of the RAM 219. Also, an ACK-signal receiving unit 372a is capable of directly searching the contents of the received-frame memory 392a to check the receipt of the ACK signal, and notifies the control-message sending unit 371 when the ACK signal is received.

Figure 47:
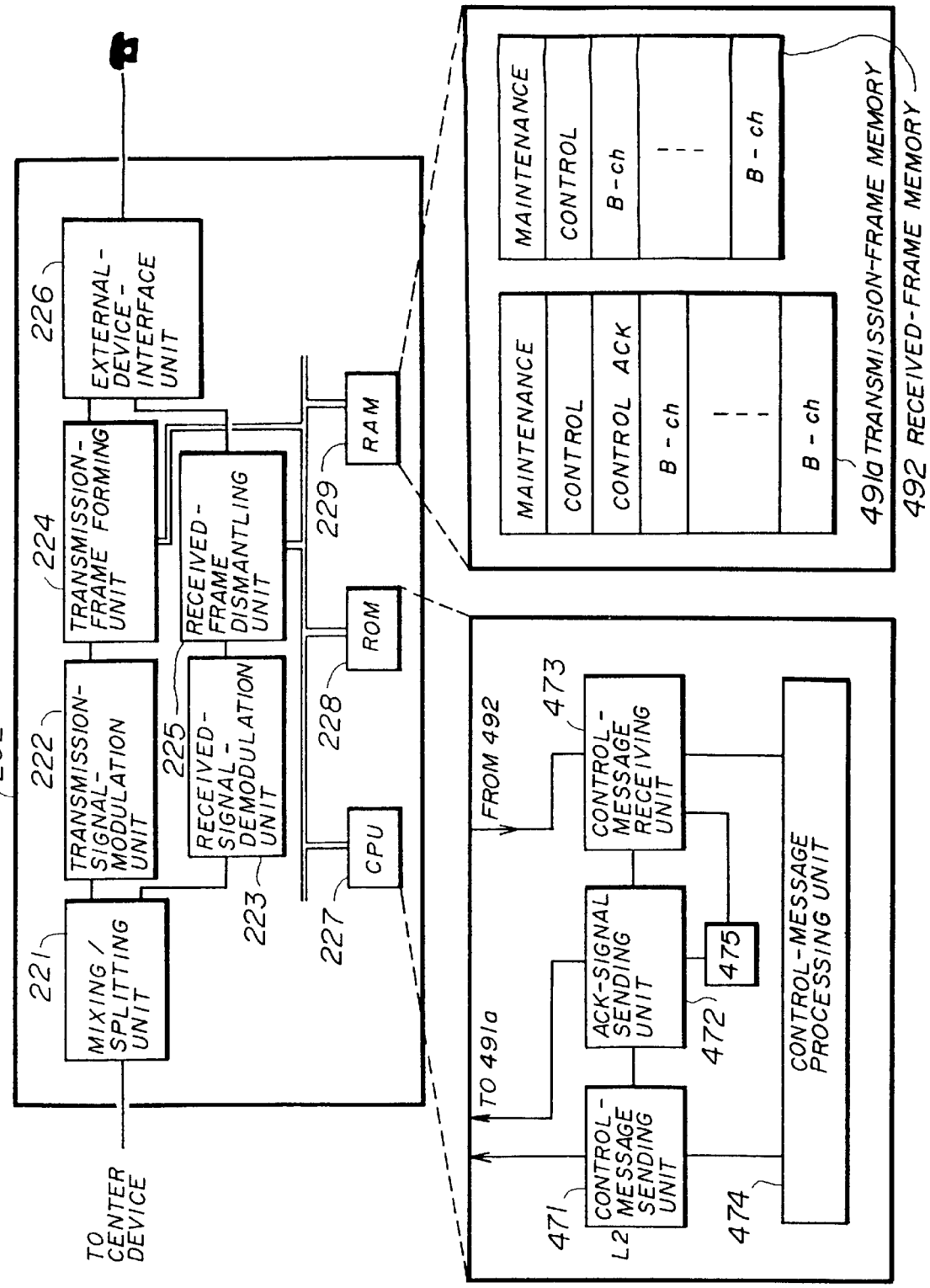
FIG. 47 is a block diagram of an example of a terminal device according to the first embodiment of the second principle.

FIG. 47 is a block diagram of an example of a terminal device according to the first embodiment of the second principle. In FIG. 47, the same elements as those of FIG. 41 are referred to by the same numerals, and a description thereof will be omitted.

In the terminal device 202 of FIG. 47, control ACK data for specifically storing the ACK signal is provided in a transmission-frame memory 491a of the RAM 229. Also, the ACK-signal sending unit 472 as a function implemented by the CPU 227 and the ROM 228 directly sends the ACK signal to the transmission-frame memory 491a, instead of using the control-message sending unit 471 as in the prior art, to transmit the ACK signal to the center device 201.

Alternately, an ACK-signal-transmission-timing controlling unit 475 may be provided. The ACK-signal-transmission-timing controlling unit 475 is informed by the control-message receiving unit 473 of the receipt of the control message. Then, the ACK-signal-transmission-timing controlling unit 475 instructs the timing of transmission of the ACK signal using an upward-direction frame after a predetermined time period from the receipt of the control message.

In the following, operations of the system of the first embodiment of the second principle will be described with reference to the accompanying drawings.

Figure 48:
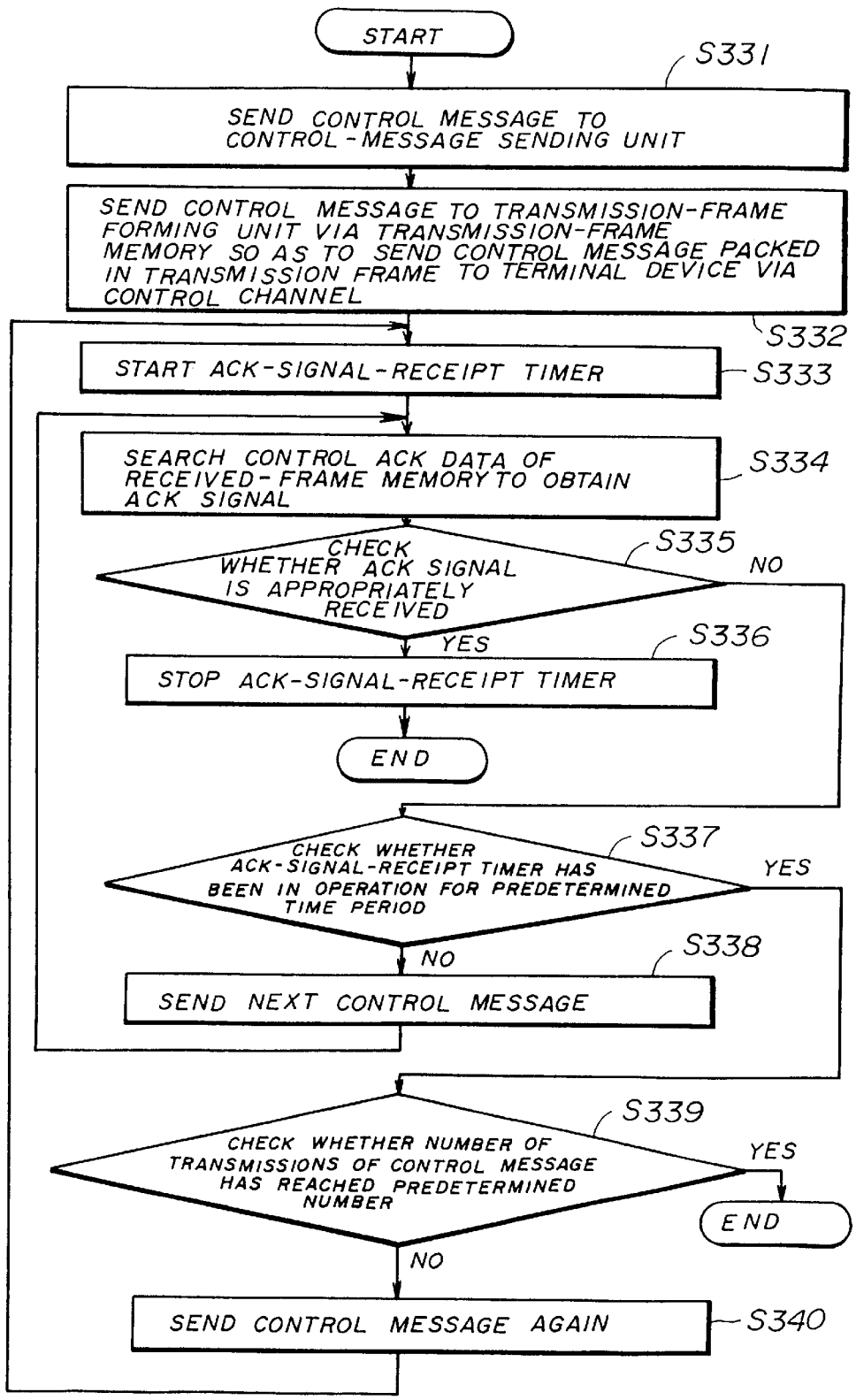
FIG. 48 is a flowchart of an operation of the center device of FIG. 46.

FIG. 48 is a flowchart of an operation of the center device 201 of FIG. 46.

At a step S331, the control-message processing unit 374 receiving a request for a control message transmission (e.g., a receipt signal of the telephone service) to the terminal device 202 sends a control message to the control-message sending unit 371.

At a step S332, the control-message sending unit 371 sends the control message to the transmission-frame forming unit 213 via the transmission-frame memory 391 so as to send the control message 273 packed in the transmission frame to the terminal device 202 via the control channel 271.

At a step S333, the control-message sending unit 371 starts the ACK-signal-receipt timer.

At a step S334, the ACK-signal receiving unit 372a searches the control ACK data of the received-frame memory 392a to obtain an ACK signal.

At a step S335, the ACK-signal receiving unit 372a checks whether the ACK signal is appropriately received. If it is, the procedure goes to a step S336. Otherwise, the procedure goes to a step S337.

At the step S336, the ACK-signal receiving unit 372a informs the control-message sending unit 371 of the receipt of the ACK signal, so that the control-message sending unit 371 stops the ACK-signal-receipt timer activated when the control message 273 is sent to the pertinent terminal device.

At the step S337 when the ACK signal is not appropriately received, the control-message sending unit 371 checks whether the ACK-signal-receipt timer has been in operation for a predetermined time period. If it has not, the procedure goes to a step S338.

At the step S338, the control-message sending unit 371 sends a next control message supplied from the control-message processing unit 374. Then, the procedure goes back to the step S334.

If it turns out at the step S337 that the ACK-signal-receipt timer has been in operation for the predetermined time period, a check is made at a step S339 whether the number of transmissions of the control message 273 for the pertinent ACK-signal-receipt timer has reached a predetermined number. If it has, the transmission of the pertinent control message 273 is terminated with a result of failure of the message transmission.

If it turns out at the step S339 that the number of the transmissions has not reached the predetermined number, the procedure goes to a step S340. At the step S340, the control-message sending unit 371 again sends a control message 273 corresponding to the pertinent ACK-signal-receipt timer to the terminal device 202 via the control channel 271. Then, the procedure goes back to the step S333.

Figure 49:
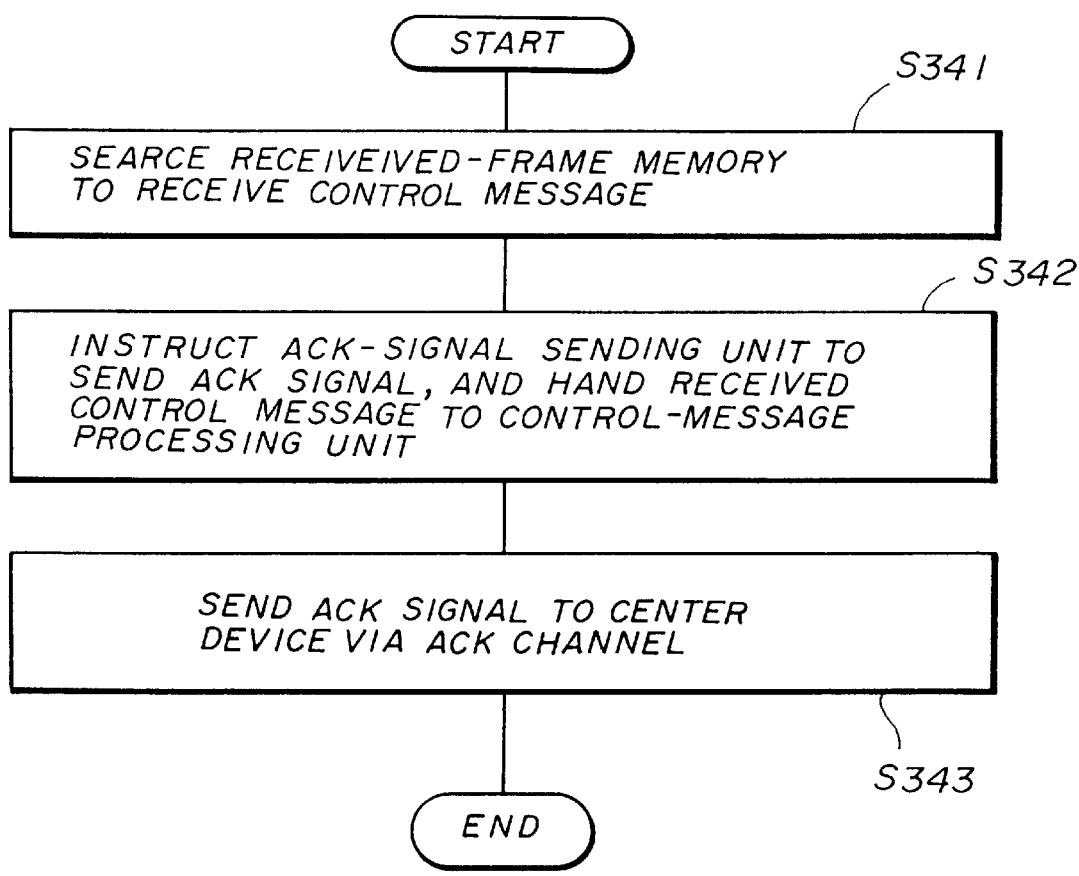
FIG. 49 is a flowchart of an operation of a terminal device of FIG. 47.

FIG. 49 is a flowchart of an operation of the terminal device 202 of FIG. 47. The operation of the terminal device 202 when the ACK-signal-transmission-timing controlling unit 475 is not provided will be described below with reference to FIG. 49.

At a step S341, the control-message receiving unit 473 of the terminal device 202 searches the received-frame memory 492 to determine whether the control message 273 sent thereto is received.

At a step S342, the control-message receiving unit 473 instructs the ACK-signal sending unit 472 to send the ACK signal 285, and hands the received control message 273 to the control-message processing unit 474.

At a step S343, the ACK-signal sending unit 472 sends the ACK signal 285 to the center device 201 via the ACK channel 282. This ends the procedure.

Figure 50:
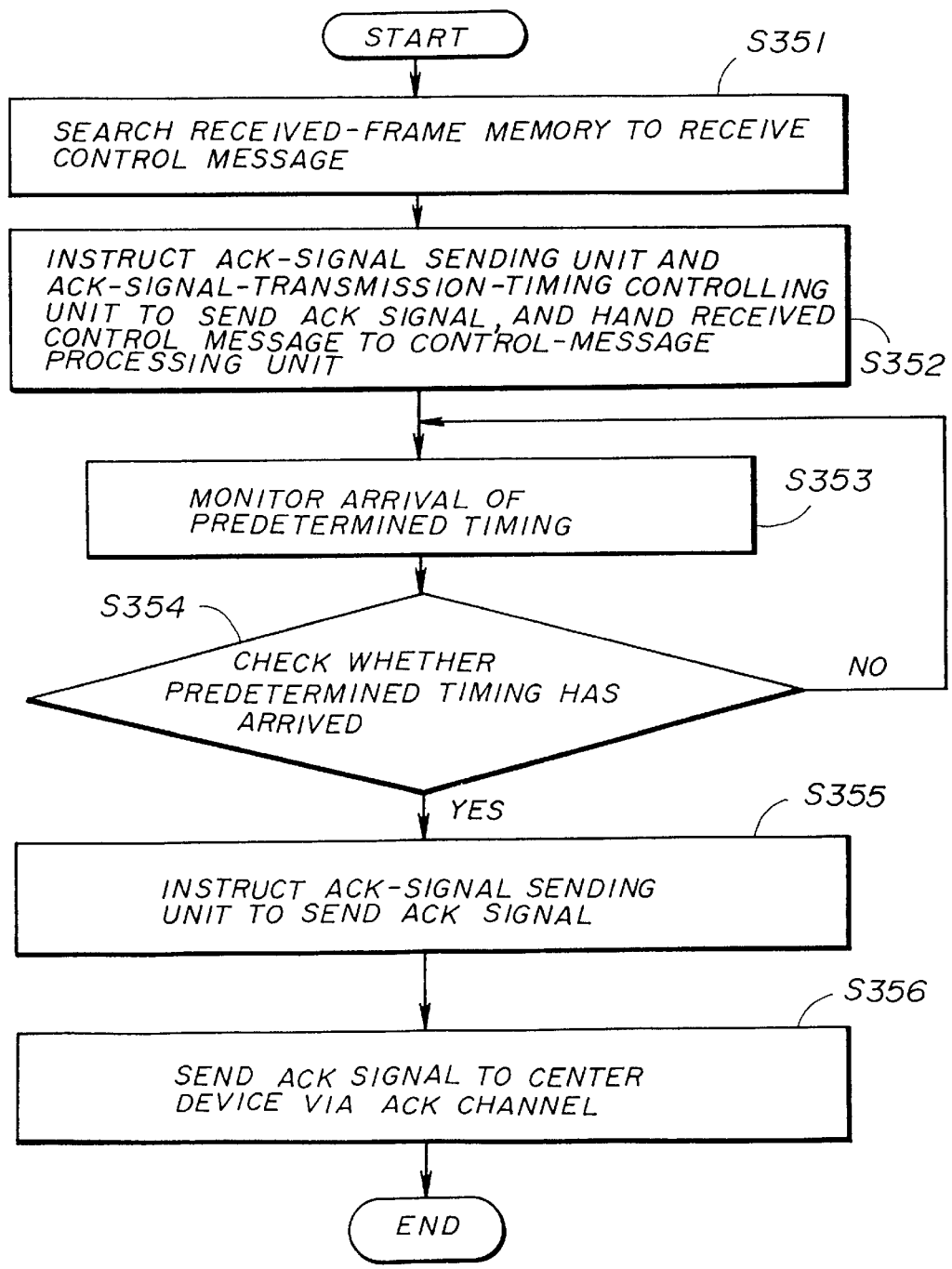
FIG. 50 is a flowchart of an operation of the terminal device of FIG. 47 when an ACK-signal-transmission-timing controlling unit is provided.

FIG. 50 is a flowchart of an operation of the terminal device 202 of FIG. 47 when the ACK-signal-transmission-timing controlling unit 475 is provided. The operation of the terminal device 202 when the ACK-signal-transmission-timing controlling unit 475 is provided will be described below with reference to FIG. 50.

At a step S351, the control-message receiving unit 473 of the terminal device 202 searches the received-frame memory 492 to determine whether the control message 273 sent thereto is received.

At a step S352, the control-message receiving unit 473 instructs the ACK-signal sending unit 472 and the ACK-signal-transmission-timing controlling unit 475 to send the ACK signal 285, and hands the received control message 273 to the control-message processing unit 474.

At a step S353, the ACK-signal-transmission-timing controlling unit 475 monitors the arrival of the predetermined timing (i.e., the passage of the predetermined time period after the receipt of the control message).

At a step S354, the ACK-signal-transmission-timing controlling unit 475 checks whether the predetermined timing has arrived. If it has not, the procedure goes back to the step S353. If the predetermined timing has arrived, the procedure goes to a step S355.

At the step S355, the ACK-signal-transmission-timing controlling unit 475 instructs the ACK-signal sending unit 472 to send the ACK signal 285.

At a step S356, the ACK-signal sending unit 472 sends the ACK signal 285 to the center device 201 via the ACK channel 282. This ends the procedure.

As described here, the ACK-signal-transmission timing is determined by the ACK-signal-transmission-timing controlling unit 475 such that the ACK signal is sent by the upward-direction frame after the predetermined time period from the receipt of the control signal. Since the downward-direction control messages are sequentially transmitted one after another, the upward-direction ACK signals are also transmitted sequentially one after another without collisions with each other.

Figure 51:
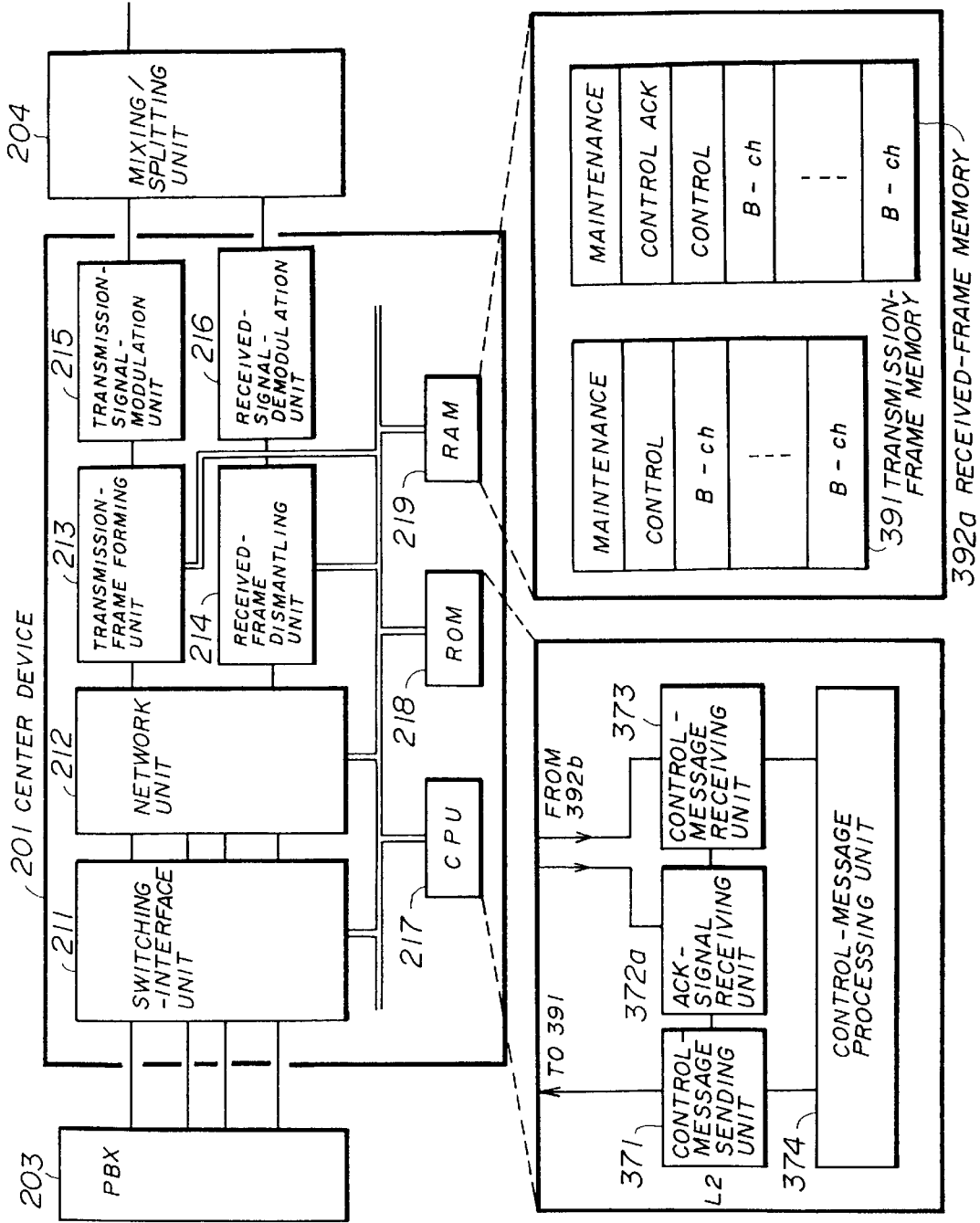
FIG. 51 is a block diagram of an example of a center device according to a second embodiment of the second principle.

FIG. 51 is a block diagram of an example of a center device according to a second embodiment of the second principle. FIGS. 52A and 52B are illustrative drawings showing frame formats used for transmission between the center device and the terminal devices according to the second embodiment of the second principle. FIG. 52A shows a frame format of the downward-direction transmission, and FIG. 52B shows a frame format of the upward-direction transmission. In these figures, the same elements as those of corresponding figures are referred to by the same numerals, and a description thereof will be omitted.

The second embodiment differs from the first embodiment only in the position of the ACK channel 282 inserted into the upward-direction frame format. In the second embodiment, the ACK channel 282 is provided in part of the unused space following the distance-control channel 284. In response, the center device 201 of FIG. 51 has the control ACK data stored prior to the control data in a received-frame memory 392b of the RAM 219.

As previously described, the unused area following the distance-control channel 284 is an area set aside for the receipt of a signal sent from terminal devices to which the distance control is not employed, and is not used except when the distance measurement is conducted at the time of an initial installment of a terminal device. Therefore, use of this unused area for the ACK signal has little effect on the operations of the terminal devices after the initial installment thereof. By placing the ACK channel 282 in the unused area following the ACK channel 282, an effective use of the upward-direction communication line is achieved.

Figure 53:
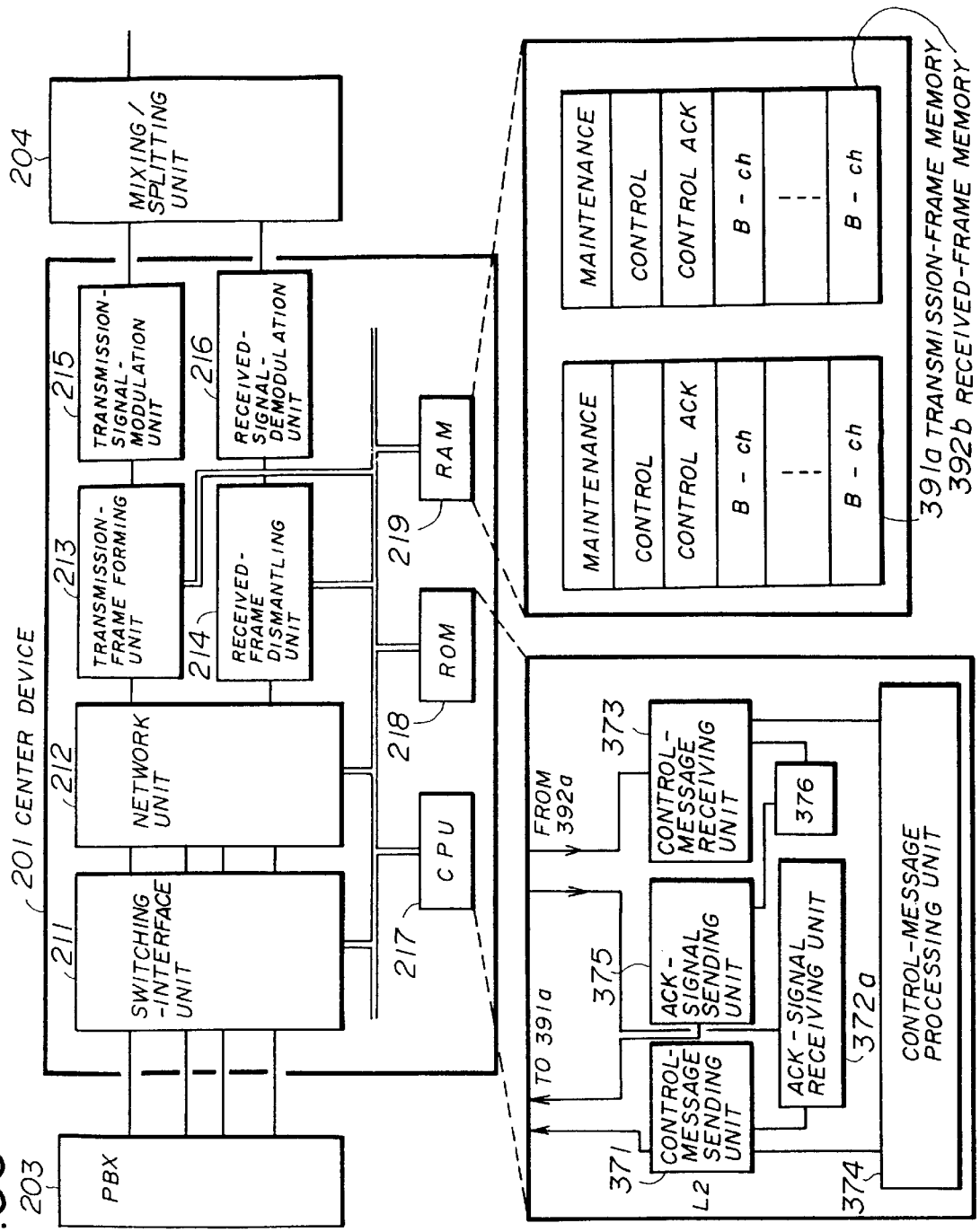
FIG. 53 is a block diagram of an example of a center device according to a third embodiment of the second principle.
Figure 54:
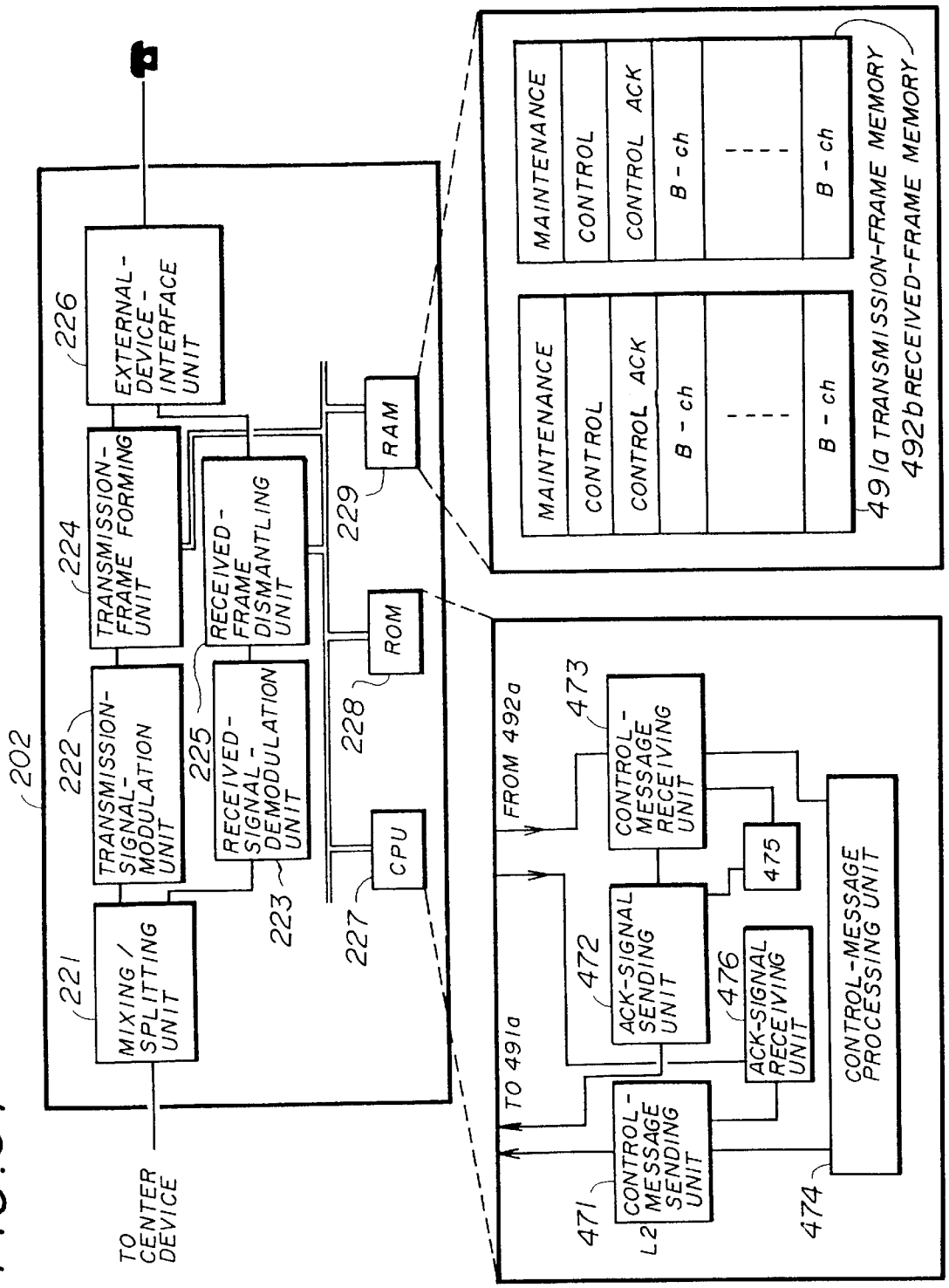
FIG. 54 is a block diagram of an example of a terminal device according to the third embodiment of the second principle.

FIG. 53 is a block diagram of an example of a center device according to a third embodiment of the second principle. FIG. 54 is a block diagram of an example of a terminal device according to the third embodiment of the second principle. FIGS. 55A and 55B are illustrative drawing showing frame formats used for transmission between the center device and the terminal devices according to the third embodiment of the second principle. FIG. 55A shows a frame format of the downward-direction transmission, and FIG. 55B shows a frame format of the upward-direction transmission. In these figures, the same elements as those of corresponding figures of the first embodiment are referred to by the same numerals, and a description thereof will be omitted.

In the third embodiment of the second principle, an ACK channel for specifically storing an ACK signal is provided in the downward-direction frame as well as in the upward-direction frame.

In the third embodiment of the second principle, as shown in FIG. 55B, the ACK channel 282 for specifically storing the ACK signal 285 is provided after the control channel 281 in the upward-direction frame as in the first embodiment. In the downward-direction frame, also, an ACK channel 274 for specifically storing an ACK signal 275 sent from the center device to a terminal device is provided after the control channel 271. The ACK signal 275 contained in the ACK channel 274 includes a terminal ID, data which indicates ACK, and FCS.

In response to the provision of the ACK signal 275 in the downward-direction frame, the center device 201 of FIG. 53 is provided with a storage area for storing control ACK data in a transmission-frame memory 391a, and, also, is provided with an ACK-signal sending unit 375 and an ACK-signal-transmission queuing unit 376. The ACK-signal-transmission queuing unit 376 makes ACK signals queue when there are a plurality of the ACK signals sent to the terminal-device side, and instructs the ACK-signal sending unit 375 to send the ACK signals one by one from the queue. Having received an instruction to send an ACK signal, the ACK-signal sending unit 375 directly sends the ACK signal to the transmission-frame memory 391a so that the ACK signal is sent to the terminal device. The ACK-signal receiving unit 372 is capable of directly searching the data of the received-frame memory 392a to receive the ACK signal.

In response to the provision of the ACK signal 275 in the downward-direction frame, also, the terminal device 202 of FIG. 54 is provided with a storage area for storing the control ACK data in a received-frame memory 492a, and, also, is provided with an ACK-signal receiving unit 476. The ACK-signal receiving unit 476 directly searches data of the received-frame memory 492a to receive an ACK signal. Having received the ACK signal, the ACK-signal receiving unit 476 instructs the control-message sending unit 471 to stop the ACK-signal-receipt timer.

In the following, operations of the communication system according to the third embodiment of the second principle will be described with reference to the accompanying drawings. A procedure for returning an upward-direction ACK signal is the same as that of the first embodiment shown in FIGS. 48 through 50, and, thus, a description thereof will be omitted. In the following, only a procedure for returning a downward-direction ACK signal will be described.

FIG. 56 is a flowchart of an operation of the terminal device according to the third embodiment of the second principle.

At a step S371, the control-message processing unit 474 receiving a request for a control message transmission (e.g., a transmission signal of the telephone service) to the center device 201 sends a control message to the control-message sending unit 471.

At a step S372, the control-message sending unit 471 sends the control message to the transmission-frame forming unit 224 via the transmission-frame memory 491a so as to send the control message 283 packed in the transmission frame to the center device 201 via the control channel 281.

At a step S373, the control-message sending unit 471 starts the ACK-signal-receipt timer.

At a step S374, the ACK-signal receiving unit 476 searches the control ACK data of the received-frame memory 492a to obtain an ACK signal.

At a step S375, the ACK-signal receiving unit 476 checks whether the ACK signal is appropriately received. If it is, the procedure goes to a step S376. Otherwise, the procedure goes to a step S377.

At the step S376, the ACK-signal receiving unit 476 informs the control-message sending unit 471 of the receipt of the ACK signal, so that the control-message sending unit 471 stops the ACK-signal-receipt timer activated when the control message 283 is sent to the pertinent terminal device.

At the step S377 when the ACK signal is not appropriately received, the control-message sending unit 471 checks whether the ACK-signal-receipt timer has been in operation for a predetermined time period. If it has not, the procedure goes to a step S378.

At the step S378, the control-message sending unit 471 sends a next control message supplied from the control-message processing unit 474. Then, the procedure goes back to the step S374.

If it turns out at the step S377 that the ACK-signal-receipt timer has been in operation for the predetermined time period, a check is made at a step S379 whether the number of transmissions of the control message 283 for the pertinent ACK-signal-receipt timer has reached a predetermined number. If it has, the transmission of the pertinent control message 283 is terminated with a result of failure of the message transmission.

If it turns out at the step S379 that the number of the transmissions has not reached the predetermined number, the procedure goes to a step S380. At the step S380, the control-message sending unit 471 again sends a control message 283 corresponding to the pertinent ACK-signal-receipt timer to the center device 201 via the control channel 281. Then, the procedure goes back to the step S373.

Figure 57:
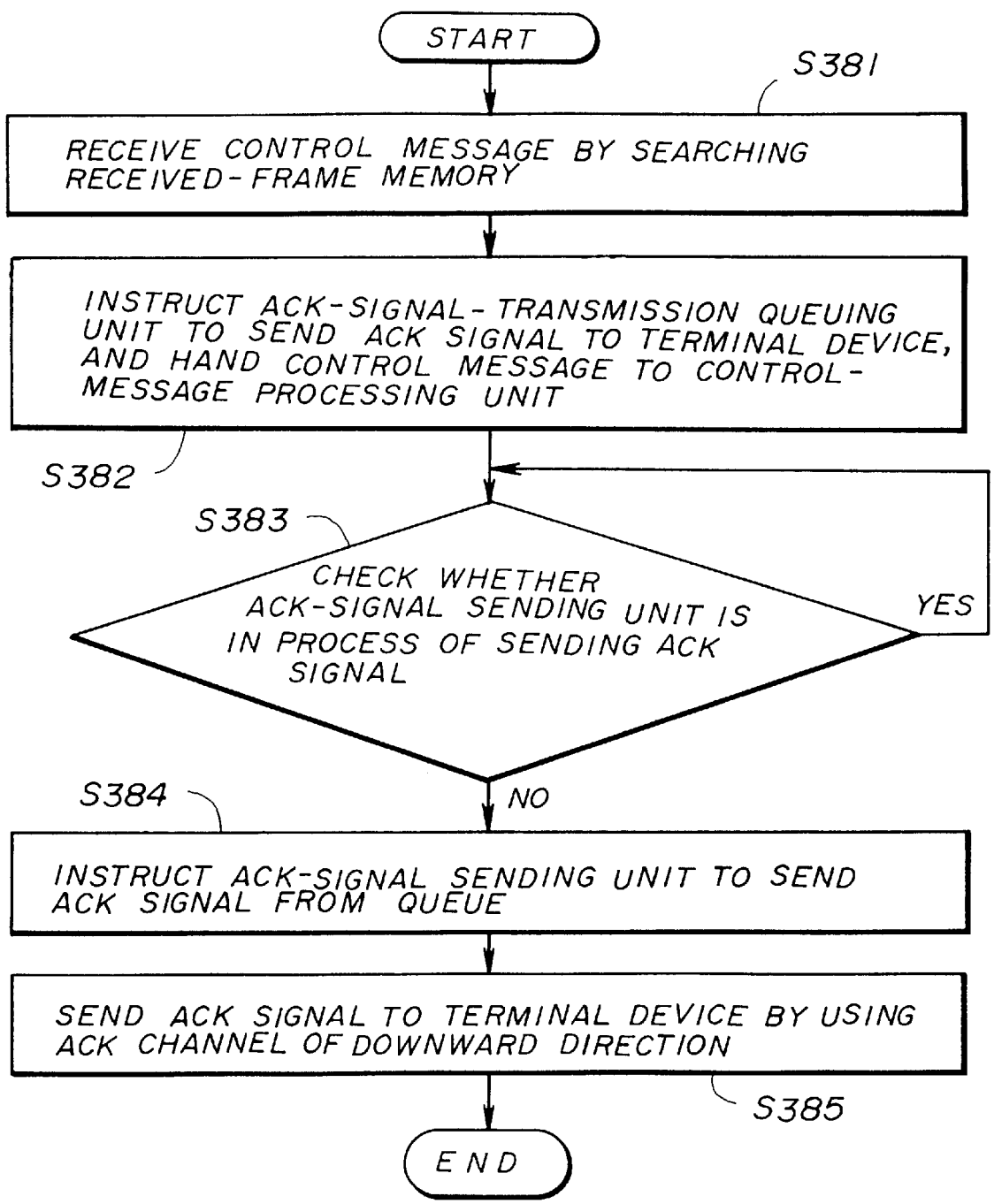
FIG. 57 is a flowchart of an operation of the center device according to the third embodiment of the second principle.

FIG. 57 is a flowchart of an operation of the center device according to the third embodiment of the second principle.

At a step S381, the control-message receiving unit 373 receives the control message 283 sent from the terminal device 202 by searching the received-frame memory 392a.

At a step S382, the control-message receiving unit 373 instructs the ACK-signal-transmission queuing unit 376 to send the ACK signal 275 to the pertinent terminal device, and, also, hands the control message 283 to the control-message processing unit 374.

At a step S383, the ACK-signal-transmission queuing unit 376 checks whether the ACK-signal sending unit 375 is in a process of sending the ACK signal. If it is, the procedure goes back to the step S383. Otherwise, the procedure goes to a step S384.

At a step S384, the ACK-signal-transmission queuing unit 376 instructs the ACK-signal sending unit 375 to send the ACK signal from the queue.

At a step S385, the ACK-signal sending unit 375 sends the ACK signal 275 to the terminal device 202 by using the ACK channel 274 of the downward direction. This ends the procedure.

In embodying the second principle of the present invention, various modifications may be made. For example, the first through third embodiments described above are provided only as examples, and two or more of the first through third embodiments may be combined to provide a further improved result.

As described above, according to the second principle of the present invention, the ACK signals responding to the downward-direction control messages are transmitted without colliding with upward-direction control messages sent from other terminal devices, thereby avoiding a reduction in the transmission efficiency caused by retransmission of the messages. Also, separation of the channel for the upward-direction control messages from the channel for the ACK signals leads to an enhancement in a transmission efficiency of the upward-direction control signals.

Also, according to the second principle of the present invention, the ACK channel for transmitting the ACK signals may be provided in part of the unused area which is prepared for the distance control and is not in use during the normal operation. Therefore, an efficient use of the transmission frequency band is achieved.

Also, according to the second principle of the present invention, the upward-direction ACK signals are transmitted after the predetermined time period from the receipt of the control message, so that the upward-direction ACK signals do not collide with those from other terminal devices by taking advantage of the fact that the downward-direction control messages are sent one message by one message. Therefore, an enhancement in the transmission efficiency of the ACK signals is achieved.

Also, according to the second principle of the present invention, separation of the channels used for the control messages and the ACK signals leads to an enhancement of the transmission efficiency of the downward-direction control signals.

Moreover, the present invention concerns another problem, and a description thereof will be described below.

In a network such as the CATV transmission system, the length of the communication line is long, and the same communication line is shared by a plurality of communication-terminal devices, so that an access method such as the slot-aloha method transmitting burst-like signals is employed for the upward-direction (from communication-terminal devices to the center device) communication. Thus, based on signal-propagation delays along the transmission line, a signal-transmission timing at which each of the communication-terminal device transmits a signal to the communication line should be set to an appropriate value. A third principle of the present invention is concerned with a technique by which a delay time of a transmission signal from each of the communication a terminal device is automatically corrected to achieve an appropriate signal-transmission timing.

Conventionally, the signal-transmission timing for each of the communication-terminal devices is fixedly set to a predetermined timing. This a predetermined timing is determined based on a distance between the center device and each of the to communication-terminal devices and other factors to compensate for the propagation delay along the communication line.

However, the propagation delay may deviate from the predetermined value and may fluctuate over time in the long run as well as in the short run, depending on the conditions of an environment in which the communication-terminal devices and the transmission line are installed. In this case, such fluctuation may cause an error on the center-device side.

Also, a delay in the signal-transmission timing may result in a collision of transmission signals between different communication-terminal devices, affecting communications of these communication-terminal devices.

Accordingly, there is a need for a method and a device for an automatic signal-transmission-timing adjustment which can adjust the signal-transmission timing for each channel by following actual propagation-delay fluctuation without affecting ordinary communication.

The third principle of the present invention is applied to a digital communication network having the same system configuration as that shown in FIG. 1. Thus, a description of the network-system configuration for the third principle will be omitted.

Also, basic configurations of the center device and the terminal device used in the third embodiment are the same as those shown in FIG. 2, and a description thereof will be omitted, except for points of difference.

With reference to FIG. 1, according to the third embodiment of the present invention, the center device 10 and the terminals A, B, and C conduct a periodic communication at regular intervals to monitor a transmission-delay time of each terminal and to adjust the transmission-delay time (signal-transmission timing) if necessary. This periodic communication for the delay-time adjustment is carried out by using a channel which is specific for the delay-time adjustment and different from data-communication channels or control channels.

In detail, the mixing/splitting unit 7c of the center device 10 receives a high-frequency signal from a terminal A, for example, and supplies the high-frequency signal for each high-frequency channel to the upward-communication-line interface 5c. For each high-frequency channel, the upward-communication-line interface 5c measures a transmission-delay time of the received frame after demodulating the received high-frequency signal, and informs the central-control unit 1c of a difference between the detected transmission-delay time and an optimal timing of the received frame.

Based on the difference, the central-control unit 1c determines a signal-transmission-timing-adjustment (transmission-delay-time-adjustment) amount which the terminal A should use for a next transmission, and, then, sends the signal-transmission-timing-adjustment amount for each high-frequency channel to the downward-communication-line interface 4c. The downward-communication-line interface 4c places the transmission-delay-time-adjustment amount for each high-frequency channel on a transmission signal for the terminal A, and sends the transmission signal to the terminal A through the mixing/splitting unit 7c. For the transmission of the transmission signal, it is preferable to use a transmission-delay-time-adjustment specific channel different from data channels and control channels.

In the terminal A, the high-frequency-modem unit 4t demodulates the high-frequency signal received from the center device 10 via the communication line 11 to create a digital signal, and divides it for each high-frequency channel before handing it to the communication-control unit 3t. The communication-control unit 3t extracts the transmission-delay-time-adjustment amount for each high-frequency channel from the received digital signal, and provides the transmission-delay-time-adjustment amount to the central-control unit 1t. The central-control unit 1t controls the high-frequency-modem unit 4t according to the transmission-delay-time-adjustment amount for each high-frequency channel, so that the transmission timing is modified for next and following transmissions to the center device 10.

As described above, the transmission-delay-time-adjustment for each terminal is based on periodic delay-time detections, and, preferably, the transmission-delay-time-adjustment amount is transmitted to each terminal via a specific channel. Thus, an automatic transmission-delay-time adjustment is appropriately carried out for each channel by following an actual delay-time fluctuation without affecting other communications.

In the following, an embodiment of the third principle of the present invention will be described with reference to the accompanying drawings.

FIG. 58 is a block diagram of a configuration of a CATV system according to an embodiment of the third principle of the present invention. In FIG. 58, the same elements as those of FIG. 3 are referred to by the same numerals. The CATV system of FIG. 58 includes a center device 100A, a subscriber house 200A, the optical-fiber cable 140, and the coaxial cable 150. One end of the optical-fiber cable 140 is connected to the center device 10A, and the other end is connected to an optical-to-electrical conversion unit O/E. The coaxial cable 150 extending from the electrical-to-optical conversion unit O/E is provided with an amplifier Amp. From the amplifier Amp, a coaxial cable 160 is branched and extends to the subscriber house 200A. The coaxial cable 160 enters the subscriber house 200A via the splitter 110. Other subscriber houses (not shown) are connected to the coaxial cable 150. A plurality of amplifiers AMP are connected to the coaxial cable 150, so that a plurality of coaxial cables 160 can be branched from the amplifiers AMP.

The center device 100A includes the mixing/splitting unit 21, a TDMA (time division multiple access) unit 22A, the switching node 23, the digital video server 24, the image switching server 25, the management system 26, the maintenance console 27, the router 28, the bus 29, and the optical-to-electrical conversion unit E/O. The mixing/splitting unit 21 mixes signals from the image switching server 25 and the TDMA unit 22A, and outputs a resulting signal to the optical-to-electrical conversion unit E/O. Also, the mixing/splitting unit 21 splits a signal from the optical-to-electrical conversion unit E/O, and provides resulting signals to the image switching server 25 and the TDMA unit 22A.

The TDMA unit 22A is responsible for the entire control of the center device 100A, and a description thereof will be provided later in detail. The switching node 23 controls the communication between the center device 100A and another communication network. The digital video server 24 provides subscribers with images for interactive services such as VOD (video on demand). The image switching server 25 applies predetermined image processing on the image signals provided from the digital video server 24 for the purpose of transmission of the images, and supplies an output to the mixing/splitting unit 21 after an application of digital modulation. The management system 26 conducts maintenance management of the center device 10A. Service personnel for the maintenance enters or obtains necessary information via the maintenance console 27. The TDMA unit 22A, the digital video server 24, and the image switching server 25 exchange signals with each other via the bus 29 and the router 28.

Interfaces between the TDMA unit 22A and units connected thereto are as follows. The switching-node interface between the TDMA unit 22A and the switching node 23 is an ISDN primary set for interface (ISDN PRI) which has electrical and physical conditions complying to ITU-I.430 and has a frame structure complying to ITU-G.704, for example. The interface between the TDMA unit 22A and the mixing/splitting unit 21 uses a coaxial cable on which a plurality of high-frequency channels are formed. The bus 29 connected to the TDMA unit 22A is an ethernet LAN, for example. The interface between the TDMA unit 22A and the maintenance console 27 is a serial interface such as RS-232C, for example.

The subscriber house 200A includes a first communication-control unit (TSTB: telephone set top box) 31A and the second communication-control unit (DSTB: digital set top box) 32. The first communication-terminal unit 31A is connected to an interface unit TEL/MODEM for connecting a telephone and a modem. The second communication-terminal unit 32 is connected to an interface unit HT for connecting a home terminal used for an interactive service, and is connected to an interface unit TV for connecting a television set. In FIG. 58, a dotted arrow indicates a signal flow for a telephone service, and a dotted-and-dashed arrow indicates a signal flow for an interactive service.

Relations between the configuration of FIG. 58 and the configuration of FIG. 2 are as follows. The TDMA unit 22A of FIG. 58 corresponds to the elements 1c through 6c of FIG. 2, and the mixing/splitting unit 21 of FIG. 58 corresponds to the element 7c of FIG. 2. The first communication-terminal unit 31A and the second communication-terminal unit 32 of FIG. 58 correspond to the elements 1t through 5t of FIG. 2, where control functions of the elements it through 5t are divided into that for the telephone service and that for the interactive service.

Main elements used for the transmission-delay-time adjustment of the third principle of the present invention are the TDMA unit 22A and the first communication-terminal unit 31A of FIG. 58, and a description thereof will be provided in detail. First, an interface structure of the coaxial cable 150 will be briefly described for the sake of explanation.

The interface structure of the coaxial cable 150 is the same as that shown in the table chart of FIG. 4, and, thus, a lengthy description thereof will not be repeated here. As shown in FIG. 4, the M channel is provided for the maintenance and distance-measurement purposes. In the third principle of the present invention, the M channel is used for the transmission-delay-time adjustment. In this manner, the transmission-delay-time adjustment is performed by using a channel (M channel) other than the B, C, and D channels so as not to affect an ordinary communication and the control thereof.

FIG. 59 is an illustrative drawing showing a frame structure of an upward-direction frame based on the interface structure of FIG. 4. FIGS. 60A through 60F are illustrative drawings showing channel structures of the upward-direction frame. As shown in FIG. 59, one frame has a length corresponding to 4 ms, and a guard timing G and a synchronization signal SY are attached in front of each channel. One frame contains 95 B channels and one each of other channels. As shown in FIGS. 60A through 60F, a guard timing G, a start bit S, a synchronization bit PR, a terminal ID (except for the B channel), and a unique word UW are attached in front of data in each channel. Also, CRC bits are attached for each channel except for the B channel.

Figure 61:
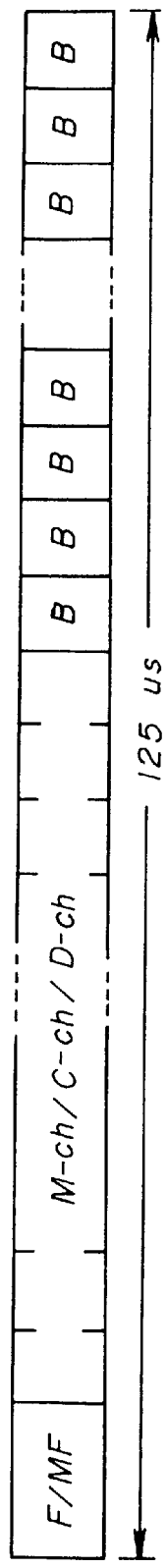
FIG. 61 is an illustrative drawing showing a frame structure of a downward-direction frame.
Figure 62A:
FIGS. 62A through 62E are illustrative drawings showing channel structures of the downward-direction frame.
Figure 62B:
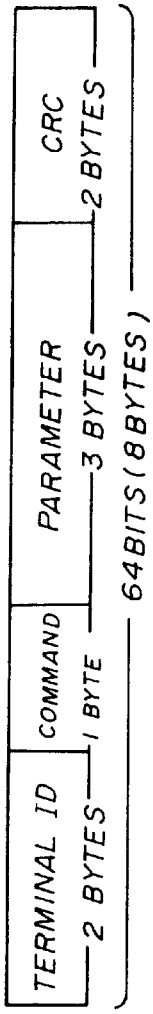
Figure 62C:
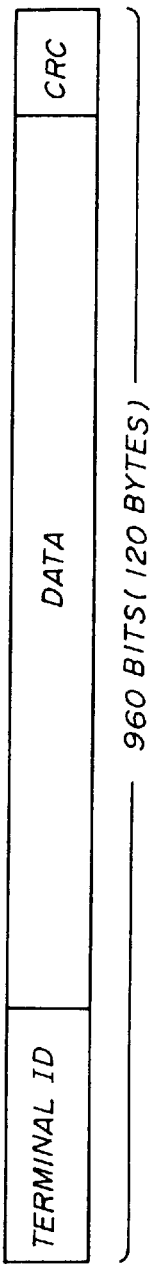
Figure 62D:
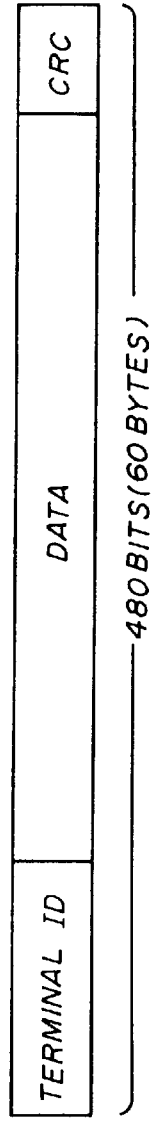
Figure 62E:
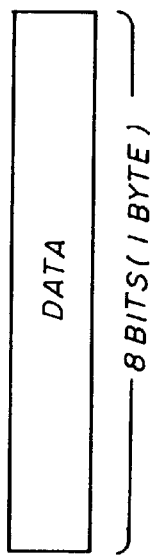

FIG. 61 is an illustrative drawing showing a frame structure of the downward-direction frame. FIGS. 62A through 62E are illustrative drawings showing channel structures of the downward-direction frame. FIG. 63A and 63B are illustrative drawings showing details of a multi-frame structure. As shown in FIG. 61, one frame has a length corresponding to 125 µs. As shown in FIGS. 63A and 63B, one multi-frame is comprised of 32 frames. One multi-frame contains 95 B channels as shown in FIG. 62E, and, also, contains one each of other channels shown in FIGS. 62A through 62D.

Figure 64:
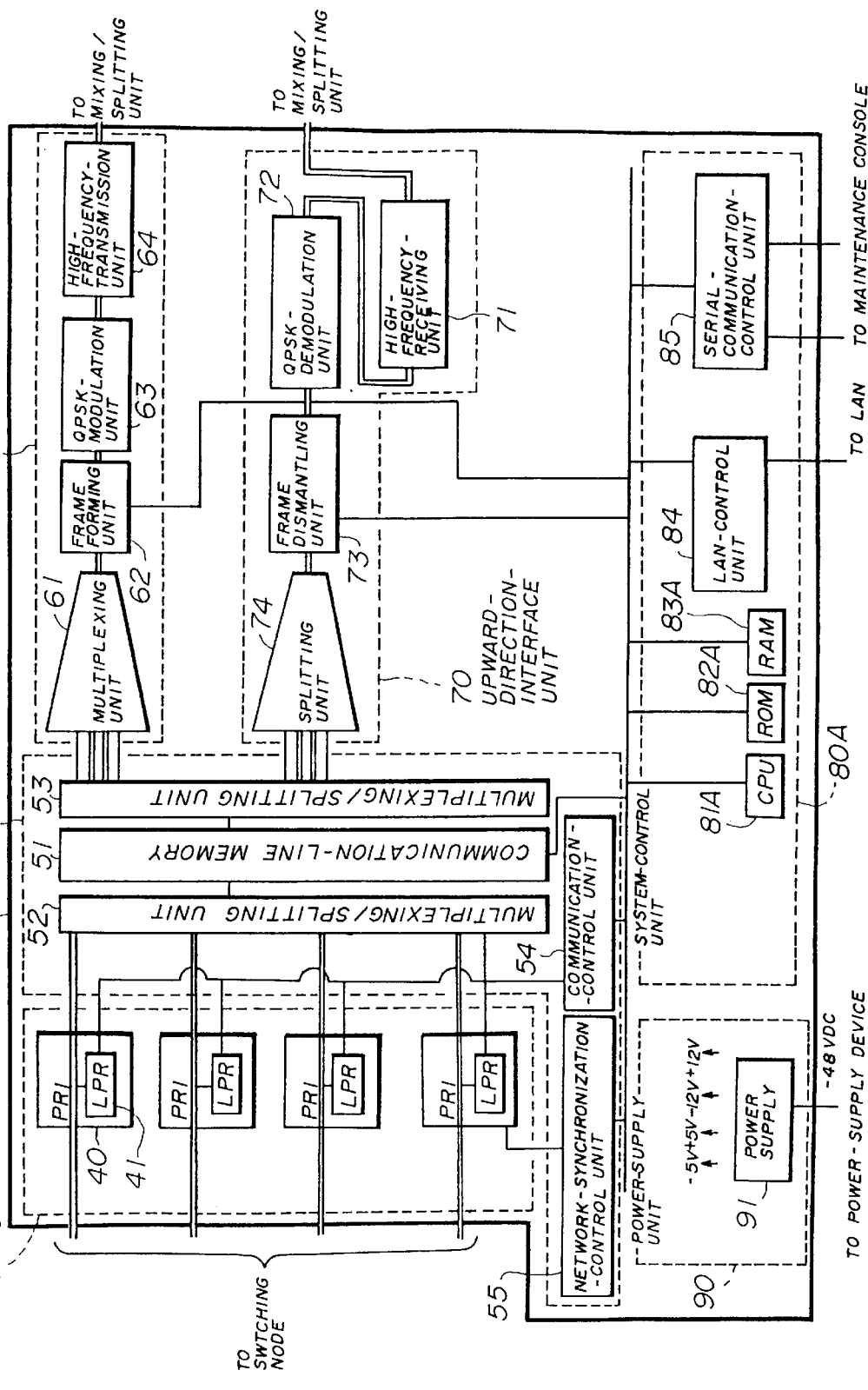
FIG. 64 is a block diagram showing a detailed configuration of the TDMA unit of FIG. 58.

FIG. 64 is a block diagram showing a detailed configuration of the TDMA unit 22A.

The TDMA unit 22A includes the switching-node-interface unit 40, the communication-line-control unit 50, the downward-direction-interface unit 60, the upward-direction-interface unit 70, a system-control unit 80A, and the power-supply unit 90. The system-control unit 80A includes a CPU 81A, a ROM 82A, a RAM 83A, the LAN-control unit 84, and the serial-communication-control unit 85, and is responsible for the entire control of the TDMA unit 22A including the interface control thereof. The communication-line-control unit 50 includes the communication-line memory 51, the multiplexing/splitting unit 52, the multiplexing/splitting unit 53, the communication-control unit 54, and the network-synchronization-control unit 55, and carries out the multiplexing and splitting of the 2-Mbps highway for the communication with the switching-node-interface unit 40.

Also, the communication-line-control unit 50 carries out communication control between the line processor LPR and the CPU 81A, network-synchronization-and-distribution control, and control of the communication-line memory 51. The switching-node-interface unit 40 has four lines of the ISDN primary set for interface of 1.5 Mbps. Each line is provided with a PRI trunk, and each trunk is provided with the line processor LPR. The downward-direction-interface unit 60 includes the multiplexing unit 61, the frame forming unit 62, the QPSK-modulation unit 63, and the high-frequency-transmission unit 64, and forms a digital frame (8 Mbps) transmitted in the downward direction via the optical-fiber cable 140.

Also, the downward-direction-interface unit 60 carries out QPSK modulation and high-frequency-transmission control, and performs selection of high-frequency-transmission channels and the setting of the transmission-delay time. The upward-direction-interface unit 70 includes the high-frequency-receiving unit 71, the QPSK-demodulation unit 72, the frame dismantling unit 73, and the splitting unit 74, and controls the receiving of high-frequency signals via the optical-fiber cable 140. Also, the upward-direction-interface unit 70 carries out QPSK demodulation and the dismantling of the digital frame. The power-supply unit 90 supplies power for the internal circuit by using an externally provided power.

Figure 65:
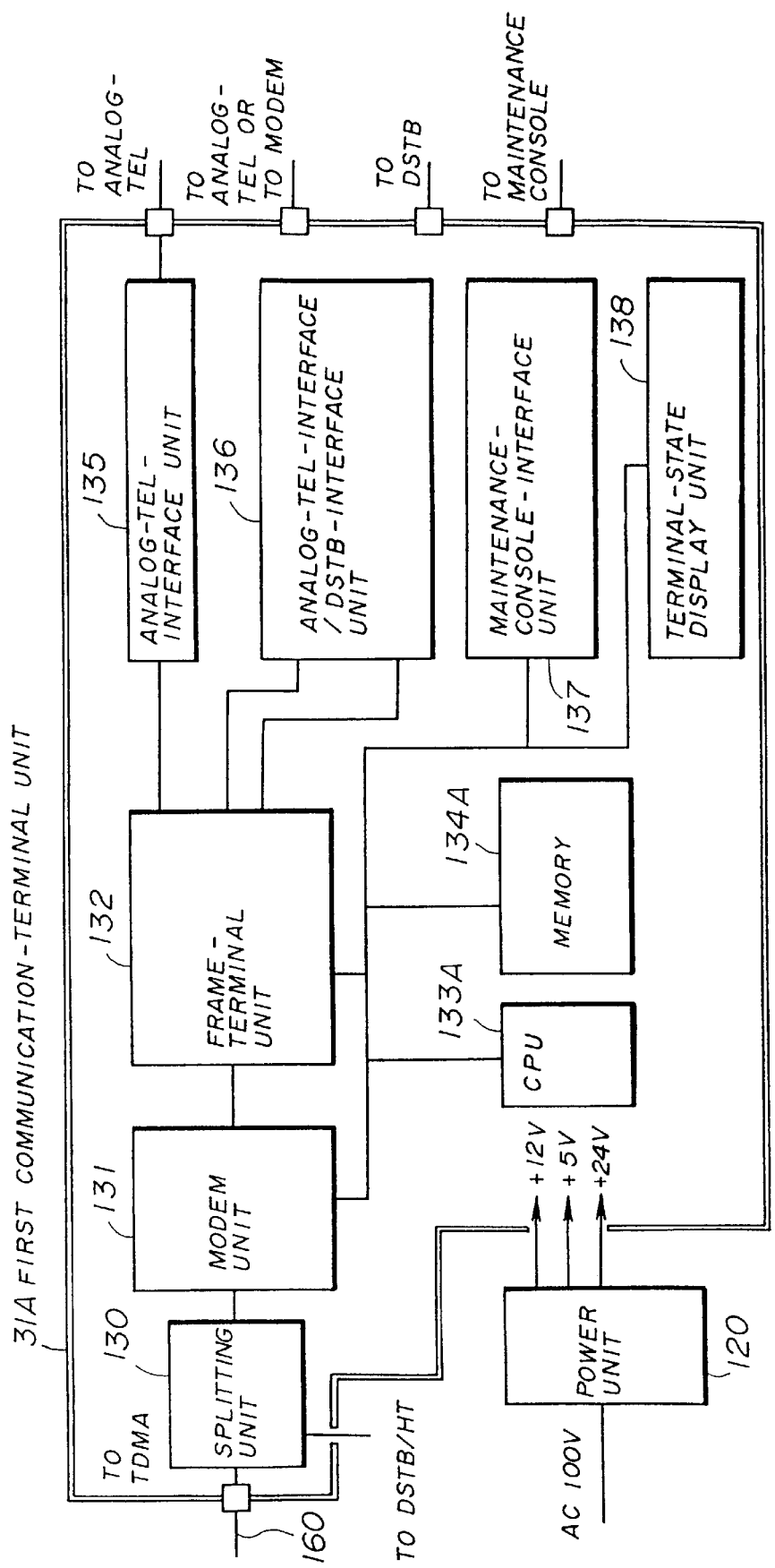
FIG. 65 is a block diagram showing a detailed configuration of the first communication-terminal unit of FIG. 58.

FIG. 65 is a block diagram showing a detailed configuration of the first communication-terminal unit 31A.

The first communication-terminal unit 31A includes the splitting unit 130, the modem unit 131, the frame-terminal unit 132, a CPU 133A, a memory 134A, the analog-TEL-interface unit 135, the analog-TEL-interface/DSTB-interface unit 136, the maintenance-console-interface unit 137, and the terminal-state-display unit 138.

The modem unit 131 carries out a conversion between an 8-Mbps digital signal and the QPSK signal transmitted and received via the coaxial cable 160, the selection of the transmission high-frequency channels, and the setting of the transmission-delay time. The frame-terminal unit 132 forms and splits the B, C, D, and M channels for signals to and from the modem unit 131. The frame-terminal unit 132 carries out terminal control (including delay control) of the D and M channels. The analog-TEL-interface unit 135 provides an analog-standard-telephone/modem interface. The analog-TEL-interface/DSTB-interface unit 136 carries out a signal exchange with the second communication-terminal unit 32 for the C channel serving as the control-signal channel for an interactive service such as VOD.

Also, the analog-TEL-interface/DSTB-interface unit 136 provides a LAN interface of IEEE 802.3. The maintenance-console-interface unit 137 provides an interface with a maintenance console used for maintenance of the subscriber-house terminal. The terminal-state-display unit 138 displays status information which should be checked on the terminal side, such as a power status, a status indicating either the transmission-delay-time-adjustment completion or the transmission-delay-time-adjustment in progress, etc. The splitting unit 130 splits the coaxial cable 160 into two paths, one for the modem unit 131 and the other for the second communication-terminal unit 32, etc. The power unit 120 is provided outside the first communication-terminal unit 31A to supply electric power to the first communication-terminal unit 31A. The power unit 120 is also used as a power supply for the second communication-terminal unit 32.

In the following, operations of the embodiment of the third principle will be described.

The TDMA unit 22A periodically transmits a global message prompting a reply from the first communication-terminal unit 31A by using the M channel on the interface between the TDMA unit 22A and the first communication-terminal unit 31A, in order to check whether the first communication-terminal unit 31A is operating properly. The process of transmitting this global message is as follows.

In FIG. 64, the system-control unit 80A of the TDMA unit 22A sends a global message to the frame forming unit 62 of the downward-direction-interface unit 60. The frame forming unit 62 inserts the received global message into a multi-frame on the downward interface between the TDMA unit 22A and the first communication-terminal unit 31A, and sends it to the QPSK-modulation unit 63. The QPSK-modulation unit 63 modulates a digital signal of the 8-Mbps multi-frame received from the frame forming unit 62 to generate a high-frequency signal, and supplies the high-frequency signal to the high-frequency-transmission unit 64. The high-frequency-transmission unit 64 transmits a signal at a speed of 4 Mbaud through a 6-MHz high-frequency channel to the mixing/splitting unit 21 of the center device 100A shown in FIG. 58. The mixing/splitting unit 21 receives a plurality of high-frequency channels distanced by a 6-MHz interval from each other from the TDMA unit 22A and the image switching server 25, and mixes them into the frequency band of the optical-fiber cable 140. In this manner, the mixing/splitting unit 21 transmits a signal to the first communication-terminal unit 31A.

When the first communication-terminal unit 31A is a newly installed one, the first communication-terminal unit 31A receives the high-frequency signal from the TDMA unit 22A by using the modem unit 131. Then, the first communication-terminal unit 31A extracts high-frequency channels to be processed, and applies the QPSK demodulation to the high-frequency signals of the extracted high-frequency channels to generate digital signals. Further, the first communication-terminal unit 31A supplies the digital signals as 8-Mbps multi-frames to the frame-terminal unit 132. The frame-terminal unit 132 breaks down the multi-frames into the B, C, D, M, C-ACK, and D-ACK channels, and sends these channels other than the B channel to the memory 134A under the control of the CPU 133A.

The CPU 133A checks the M channel, and forms a reply message to send it to the frame-terminal unit 132 if the M channel contains the global message for the confirmation of the newly installed one of the first communication-terminal unit 31A. The frame-terminal unit 132 inserts the reply message into the M channel of the frame directed upward to the TDMA unit 22A, and sends the frame to the modem unit 131. The modem unit 131 applies the QPSK modulation to the frame to generate a high-frequency signal, and sends the high-frequency signal to the TDMA unit 22A via the 64-MHz high-frequency channel.

The TDMA unit 22A demodulates the reply message received by the high-frequency-receiving unit 71 to create a digital frame, and compares the timing of the received digital frame with an optimal timing at which the digital frame should have been transmitted from the terminal device, based on the internal clock (to which the TDMA unit 22A is synchronized) of the TDMA unit 22A. Then, the TDMA unit 22A notifies the CPU 81A of the system-control unit 80A of a difference between these two timings. The CPU 81A generates a code indicating a transmission-delay-time-adjustment amount as an M-channel message by using the notified difference. Here, the transmission-delay-time-adjustment amount is an adjustment amount which should be used by the first communication-terminal unit 31A the next time it sends an upwardly directed high-frequency signal.

The CPU 81A sends the code to the frame forming unit 62 of the downward-direction-interface unit 60. The frame forming unit 62 inserts the code into an 8-MHz multi-frame in the same manner as when sending the global message, and sends the code to the first communication-terminal unit 31A via the QPSK-modulation unit 63, the high-frequency-transmission unit 64, and the mixing/splitting unit 21.

Upon receiving the M channel message containing the adjustment amount described above, the first communication-terminal unit 31A makes the CPU 133A give the modem unit 131 an instruction that transmission-delay times for high-frequency signals transmitted from now on be set in accordance with the adjustment amount received from the TDMA unit 22A.

As in the operations described above, the frame timing (transmission-delay time) of the upwardly directed signals from the first communication-terminal unit 31A to the TDMA unit 22A is set by an automatic and periodic adjustment.

In this operation, the TDMA unit 22A periodically sends an M-channel message (health-check message) to each first communication-terminal unit 31A, requesting a reply. The M-channel message transmitted from the TDMA unit 22A may include a signal-transmission-timing-adjustment amount which should be used by the first communication-terminal unit 31A for sending a digital-signal frame the next time. Message exchanges between the TDMA unit 22A and the first communication-terminal unit 31A are the same as the message exchanges previously described. In this operation, however, the TDMA unit 22A applies an averaging process, as will be described below, to a difference between the transmission-delay time of the signal transmission from the first communication-terminal unit 31A and the optimal received-frame timing extracted from the internal clock of the TDMA unit 22A. Here, this internal clock is a network-synchronization clock to which the TDMA unit 22A is synchronized.

First, a reference number N indicating a number of differences used for the averaging calculation, a threshold value P for the difference between the received-digital-frame timing and the optimal timing extracted from the internal clock, and a threshold number Np indicating how many notifications of the difference exceeding the threshold value P should be tolerated are stored in the memory (e.g., RAM 83A) of the TDMA unit 22A. These settings may be entered through the management system 26 or the maintenance console 27 of the center device 100A shown in FIG. 58, or may be stored in the memory (e.g., ROM 82A) as fixed settings.

The downward-direction-interface unit 60 of the TDMA unit 22A receives a reply message from the first communication-terminal unit 31A responding to the periodic message transmitted from the TDMA unit 22A. Then, the TDMA unit 22A measures the transmission-delay time of the received digital signal, and notifies the CPU 81A of the system-control unit 80A of a difference between the measured transmission-delay time and the optimal transmission-delay time extracted from the internal clock of the TDMA unit 22A. The CPU 81A compares the difference with the threshold value P stored in the memory (e.g., ROM 82A), and stores the difference in the memory (e.g., RAM 83A) if the difference is smaller than or equal to the threshold value P.

Also, the CPU 81A obtains a sum of the difference notified this time and the differences notified at the last N−1 occasions, and calculates an average of these differences by using the reference number N. The average thus obtained is then sent by a next periodic message from the TDMA unit 22A to the first communication-terminal unit 31A as the transmission-delay-time-adjustment amount for the high-frequency signal which will be transmitted the next time from the first communication-terminal unit 31A.

If the difference notified this time is larger than the threshold value P, a count is read from a counter (which will be described below) to be compared with the threshold number Np stored in the memory. This counter increments the count by 1 when the notified difference is larger than the threshold value P. If the count is smaller than the threshold number Np, the count is updated with an increment by 1, and the notified difference is discarded. Then, an average obtained at an immediately previous occasion is sent by the next periodic message to the first communication-terminal unit 31A as the transmission-delay-time-adjustment amount. If the count is larger than the threshold number Np, the differences stored in the memory are disposed of, and a transmission-delay-time-adjustment process for the first communication-terminal unit 31A is carried out again. This is not carried out by the next periodic message, but a message is immediately sent to the first communication-terminal unit 31A.

Figure 66:
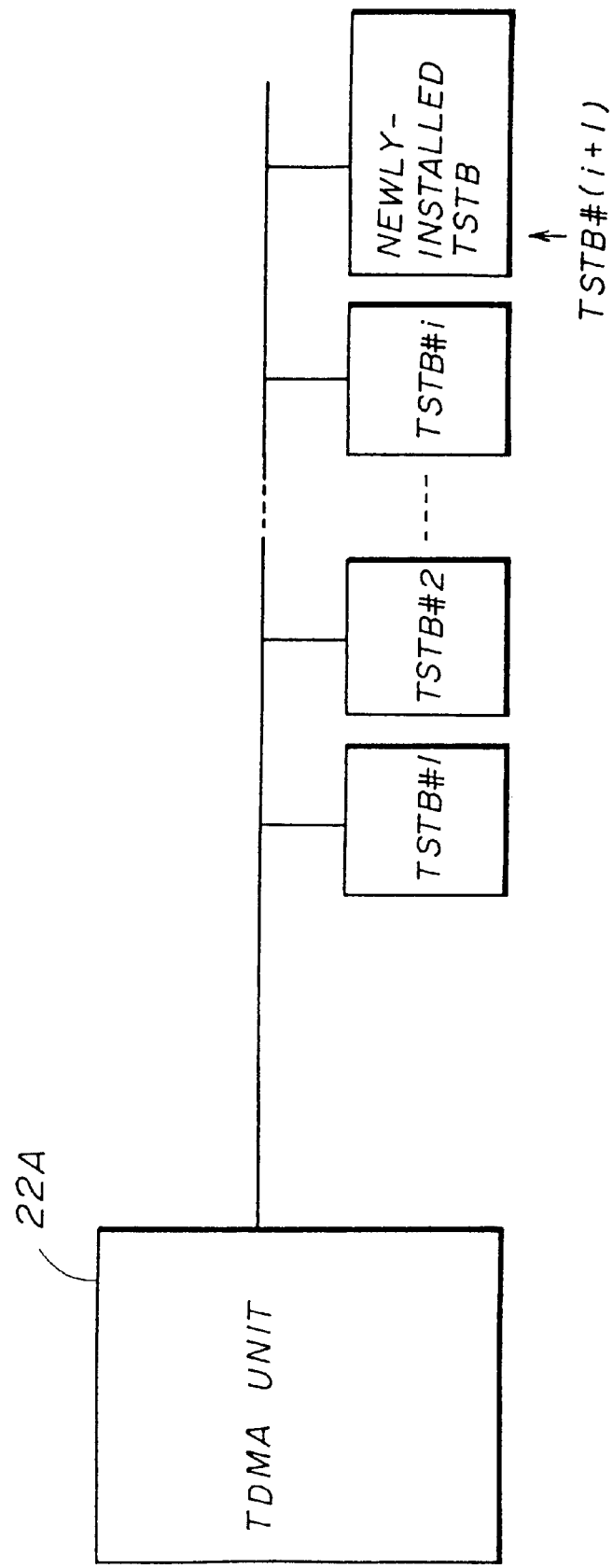
FIG. 66 is an illustrative drawing showing assignments of identification numbers to communication-terminal units.

In the following, the operations of the embodiment of the third principle will be described in detail with reference to the accompanying flowcharts. In the description provided below, each of the first communication-terminal units 31A is provided with an identification number to distinguish one from the others, and the first communication-terminal unit 31A is called a communication-terminal unit TSTB. FIG. 66 is an illustrative drawing showing assignments of the identification numbers to the communication-terminal units TSTB.

Figure 67B:
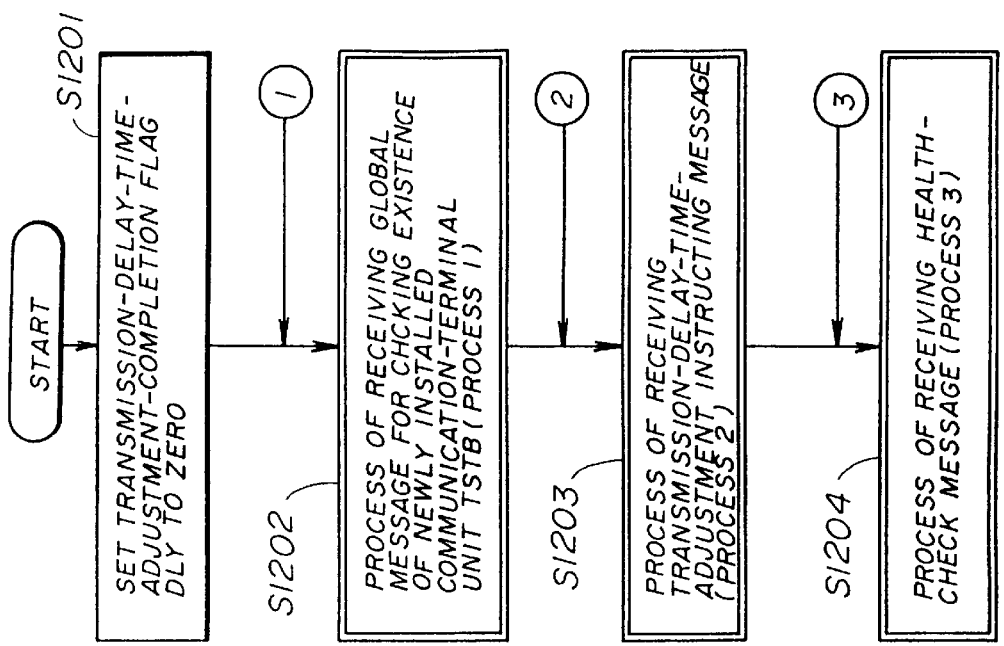
FIG. 67B is a flowchart of a control process carried out by a CPU of the communication-terminal unit.
Figure 67A:
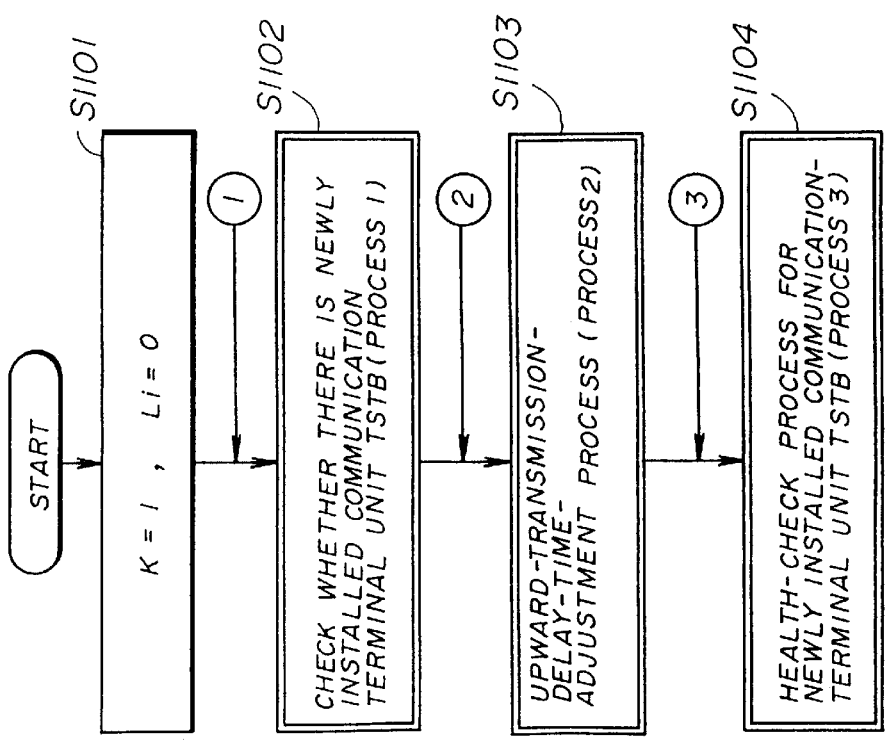
FIG. 67A is a flowchart of a control process carried out by a CPU of a system-control unit of the TDMA unit.

FIG. 67A is a flowchart of a control process carried out by the CPU 81A of the system-control unit 80A of the TDMA unit 22A, and FIG. 67B is a flowchart of a control process carried out by the CPU 133A of the communication-terminal unit TSTB. In the flowcharts of FIGS. 67A and 67B as well as the following figures, steps indicated by double frames are accompanied with flowcharts describing these steps further in detail.

In FIG. 67A, at a step S1101, counters K and Li are set to 1 and 0, respectively. The counter K indicates how many times transmission-delay-time adjustment processes are carried out for a given communication-terminal unit TSTB, and is used in a process 1.2 which will be described later. The counter Li is provided for the communication-terminal unit TSTB #i with respect to the averaging process, and stores how may times signals having the difference between the received transmission-delay time and the optimal transmission-delay time larger than the threshold value P are consecutively received from the communication-terminal unit TSTB #i.

At a step S1102 following the step S1101, a process is carried out to check whether there is a newly installed communication-terminal unit TSTB as when the communication-terminal unit TSTB is installed in a house of a new subscriber. This process is called a process 1.

At a step S1103, an upward-transmission-delay-time-adjustment process (process 2) is carried out.

At a step S1104, a health-check process (process 3) for the newly installed communication-terminal unit TSTB is carried out.

In FIG. 67B, at a step S1201, an transmission-delay-time-adjustment-completion flag DLY is set to 0 after the communication-terminal unit TSTB starts an operation thereof.

At a step S1202, a process of receiving a global message for checking an existence of the newly installed communication-terminal unit TSTB is carried out. This process is a process 1 of the communication-terminal unit TSTB.

At a step S1203, a process of receiving a transmission-delay-time-adjustment instructing message is carried out. This process is a process 2 of the communication-terminal unit TSTB.

At a step S1204, a process of receiving a health-check message (process 3) is carried out.

In the following, the steps S1102 through S1104 and the steps S1201 through S1204 will be described in detail.

Figure 68:
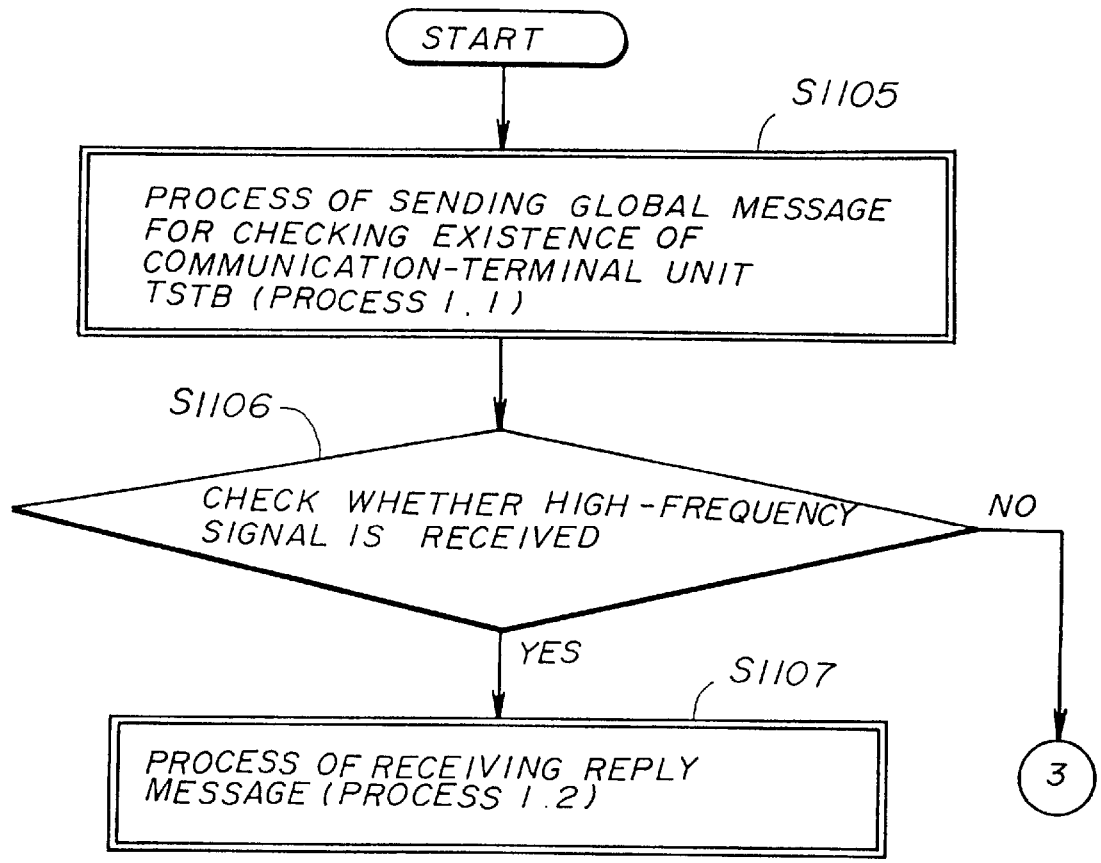
FIG. 68 is a flowchart of a process of a step S1102 shown in FIG. 67A.

FIG. 68 is a flowchart of a process of the step S1102 shown in FIG. 67A.

At a step S1105, a process of sending the global message for checking an existence of the communication-terminal unit TSTB (process 1.2) is carried out.

At a step S1106, a check is made whether a high-frequency signal has been received. If the answer is affirmative, the procedure goes to a step S1107. Otherwise, the procedure goes to the step S1104 of FIG. 67A.

At a step S1107, a process of receiving a reply message (process 1.2) is carried out.

Figure 69:
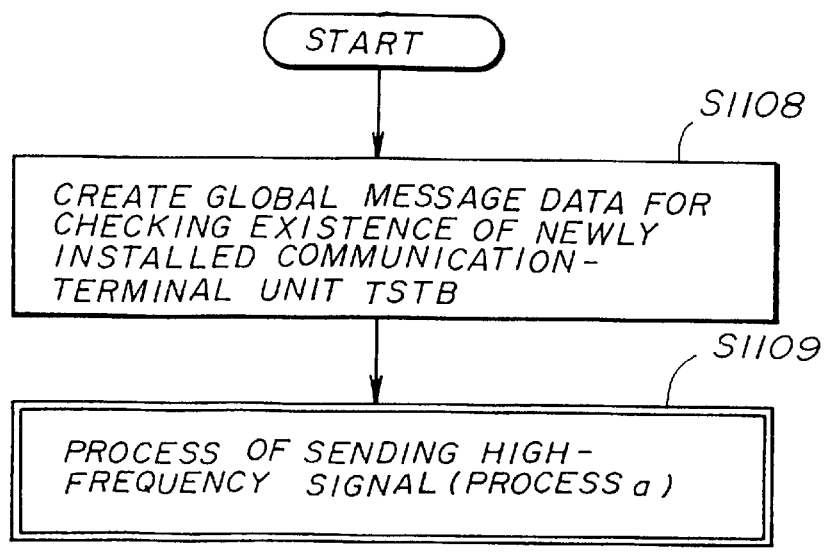
FIG. 69 is a flowchart of a process of a step S1105 shown in FIG. 68.

FIG. 69 is a flowchart of a process of the step S1105 shown in FIG. 68.

At a step S1108, global-message data for checking the existence of the newly installed communication-terminal unit TSTB is created under the control of the CPU 81A of the system-control unit 80A shown in FIG. 64.

At a step S1109, a process of sending a high-frequency signal (process a) is carried out.

Figure 70:
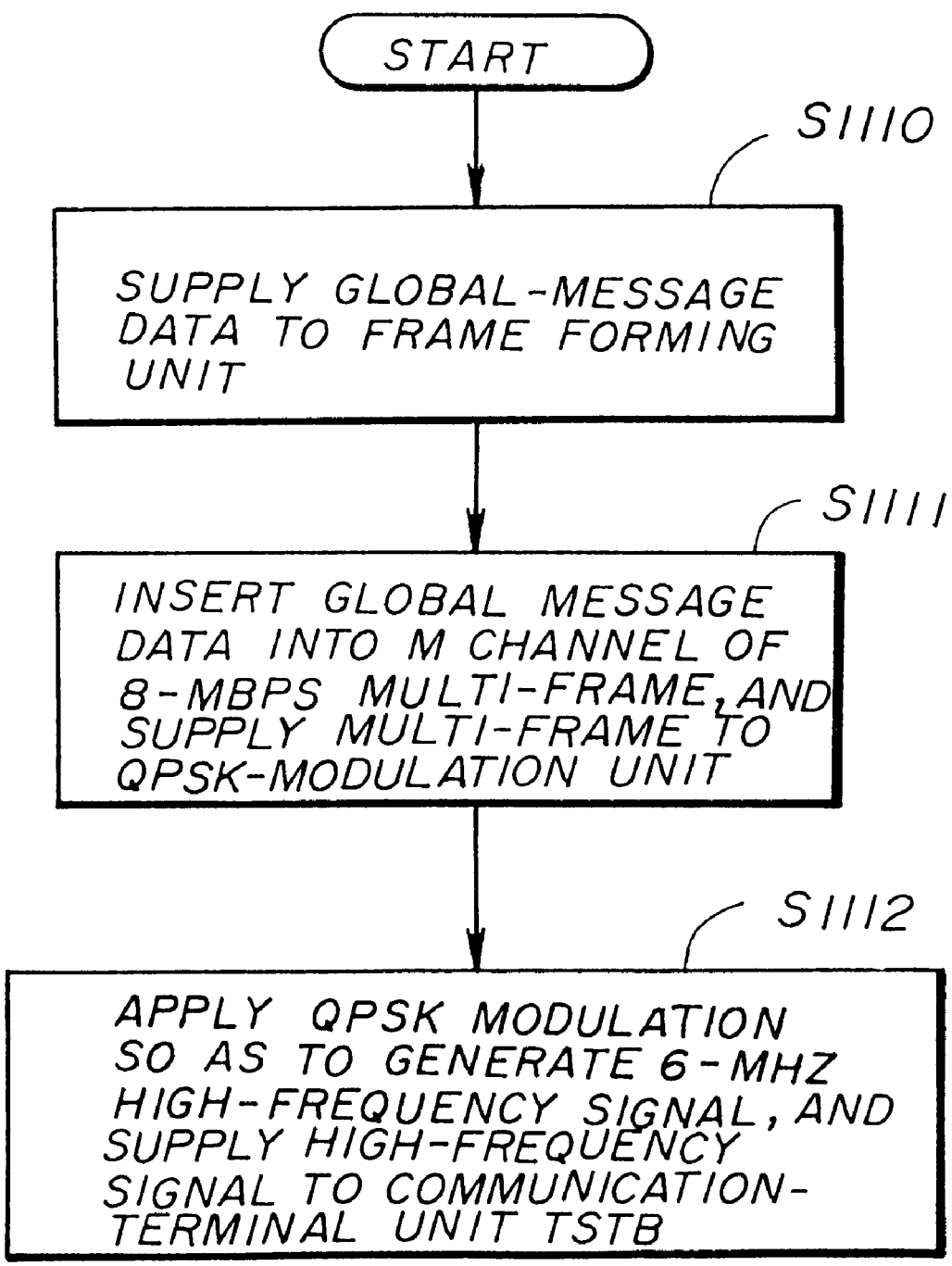
FIG. 70 is a flowchart of a process of a step S1109 shown in FIG. 69.

FIG. 70 is a flowchart of a process of the step S1109 shown in FIG. 69.

At a step S1110, the global-message data is supplied to the frame forming unit 62 (FIG. 64) under the control of the CPU 81A.

At a step S1111, the frame forming unit 62 inserts the global-message data into the M channel of an 8-Mbps multi-frame, and supplies the multi-frame to the QPSK-modulation unit 63.

At a step S1112, the QPSK-modulation unit 63 applies the QPSK modulation so as to generate a 6-MHz high-frequency signal, and supplies the high-frequency signal to the communication-terminal unit TSTB via the high-frequency-transmission unit 64.

Figure 71:
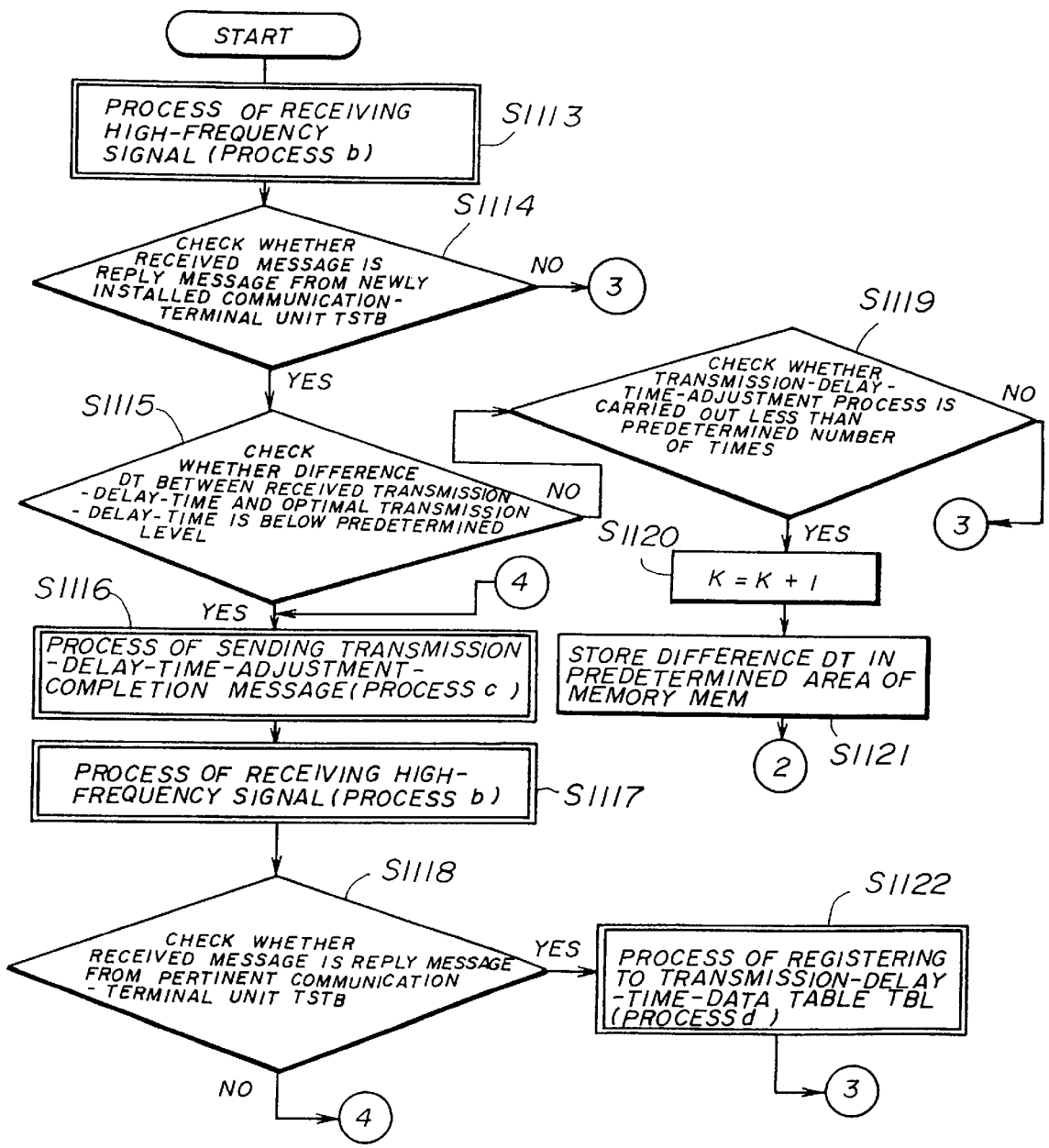
FIG. 71 is a flowchart of a process of a step S1107 shown in FIG. 68.

FIG. 71 is a flowchart of a process of the step S1107 shown in FIG. 68.

At a step S1113, a process of receiving a high-frequency signal (process b) is carried out.

At a step S1114, the CPU 81A checks whether the received message is a reply message from the newly installed communication-terminal unit TSTB. If the answer is negative, the procedure goes to the step S1104 of FIG. 67A. If the answer is affirmative, the procedure goes to a step S1115.

At the step S1115, the CPU 81A checks whether a difference DT between the timing of the received-M-channel message and the optimal timing of an upwardly directed frame extracted from the internal clock of the TDMA unit 22A is below a predetermined level. If the answer is "yes", the procedure goes to a step S1116. Otherwise, the procedure goes to a step S1119.

At the step S1116, a process of sending a transmission-delay-time-adjustment-completion message (process c) is carried out.

At a step S1117, a process of receiving a high-frequency signal (the same process as the process b of the step S1113) is carried out.

At a step S1118, the CPU 81A checks whether the received message is a reply message from the pertinent communication-terminal unit TSTB. If the answer is "no", the procedure goes back to the step S1116. If the answer is "yes", the procedure goes to a step S1122.

At the step S1122, a process of registering to a transmission-delay-time-data table TBL (process d) is carried out. After the step S1122, the procedure goes to the step S1104 of FIG. 67A. The transmission-delay-time-data table TBL will be described later.

At the step S1119 when the check at the step S1115 gives a negative answer, a check is made whether the transmission-delay-time-adjustment process is carried out less than a predetermined number of times K. If the answer is "no", the procedure goes to the step S1104 of FIG. 67A. If the answer is "yes", the procedure goes to a step S1120.

At the step S1120, the counter K is incremented by 1.

At a step S1121, the difference DT is stored in a predetermined area of a memory MEM (RAM 83A of FIG. 64).

This predetermined area stores the differences DT which are obtained by consecutive measurements of the transmission-delay times for the communication-terminal unit TSTB of the current message exchange. After the step S1121, the procedure goes to the step S1103 of FIG. 67A.

FIG. 72 is a table chart showing the transmission-delay-time-data table TBL. In the transmission-delay-time-data table TBL, an area for the difference DT and an area for the average are provided for each of the communication-terminal units TSTB. The area for the difference DT stores the differences DT between the frame timings of the received messages and the optimal frame timings with regard to N+1 measurements as differences $D_O$ through $D_N$, where the difference $D_N$ is of the latest measurement. The area for the average stores an average of the differences $D_O$ through $D_N$.

Figure 73:
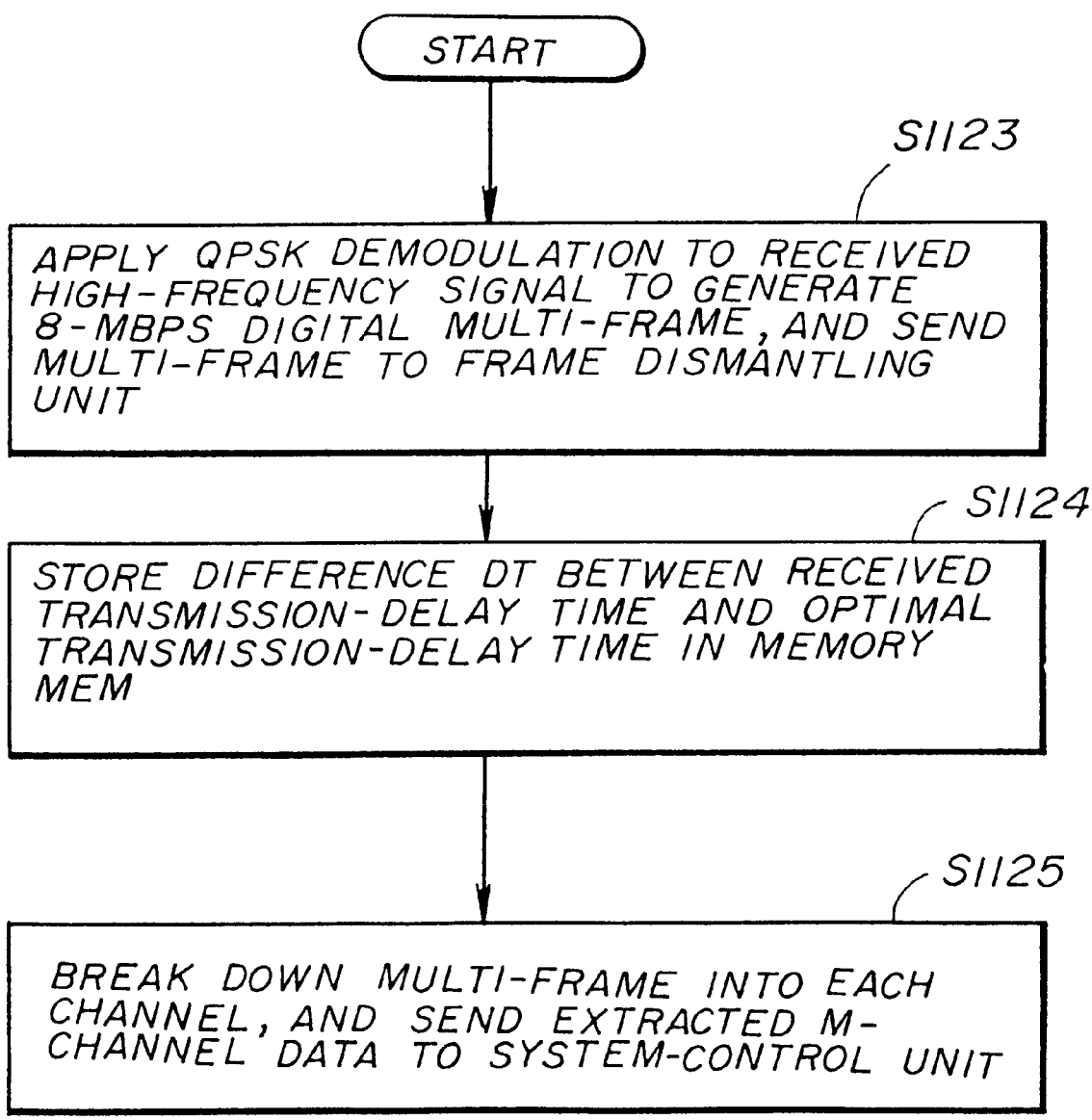
FIG. 73 is a flowchart of a process of a step S1113 and a step S1117 shown in FIG. 71.

FIG. 73 is a flowchart of a process of the step S1113 and the step S1117 shown in FIG. 71.

At a step S1123, the QPSK-demodulation unit 72 applies the QPSK demodulation to the received high-frequency signal to generate an 8-Mbps digital multi-frame, and sends the multi-frame to the frame dismantling unit 73.

At a step S1124, the CPU 81A obtains the difference (or the absolute value thereof) DT between the receipt timing of the M channel supplied from the frame dismantling unit 73 and the optimal timing extracted from the internal clock of the TDMA unit 22A, and stores the difference DT in the memory MEM.

At a step S1125, the frame dismantling unit 73 breaks down the multi-frame into each channel, and sends extracted M-channel data to the system-control unit 80A.

Figure 74:
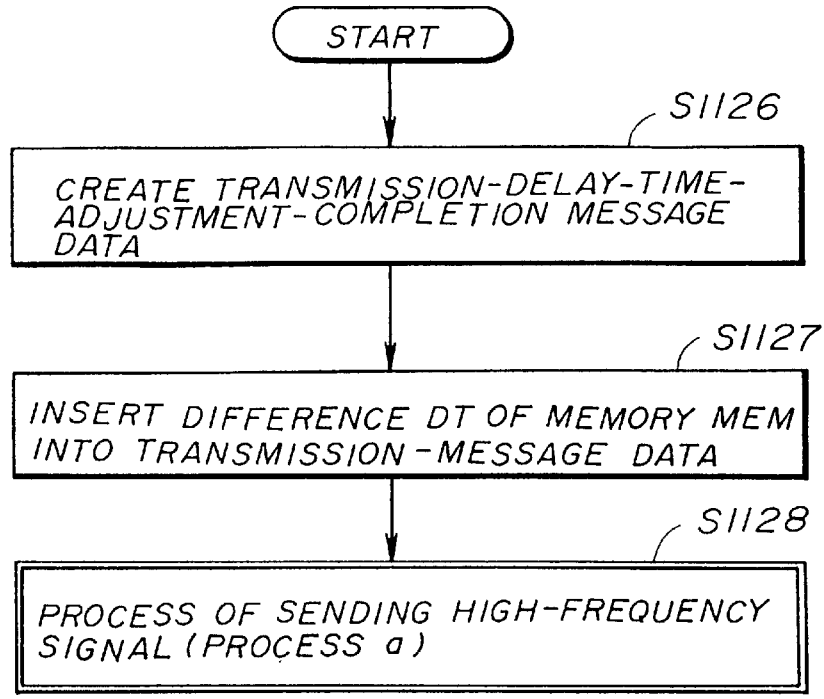
FIG. 74 is a flowchart of a process of a step S1116 shown in FIG. 71.

FIG. 74 is a flowchart of a process of the step S1116 shown in FIG. 71.

At a step S1126, transmission-delay-time-adjustment-completion-message data is created under the control of the CPU 81A.

At a step S1127, the difference DT stored in the memory MEM is inserted into transmission-message data.

At a step S1128, the process of sending a high-frequency signal described with reference to FIG. 70 is carried out.

Figure 75:
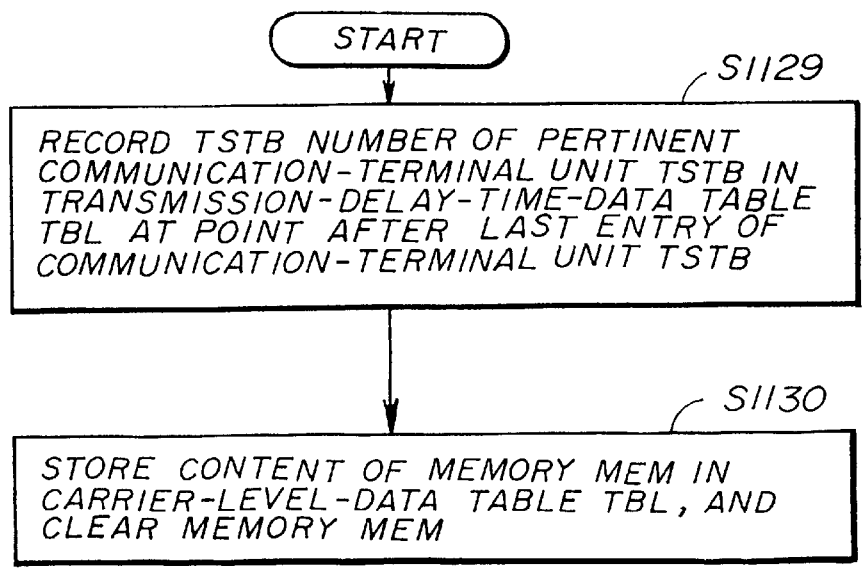
FIG. 75 is a flowchart of a process of a step S1122 of FIG. 71.

FIG. 75 is a flowchart of a process of the step S1122 of FIG. 71.

At a step S1129, the CPU 81A records a TSTB number of the pertinent communication-terminal unit TSTB in the transmission-delay-time-data table TBL at a point after the last entry of the communication-terminal unit TSTB. After this recording, the pertinent communication-terminal unit TSTB is regarded as an existing unit rather than a newly-installed-and-not-yet-recognized unit.

At a step S1130, the content of the memory MEM is stored in the transmission-delay-time-data table TBL, and the memory MEM is cleared.

Figure 76:
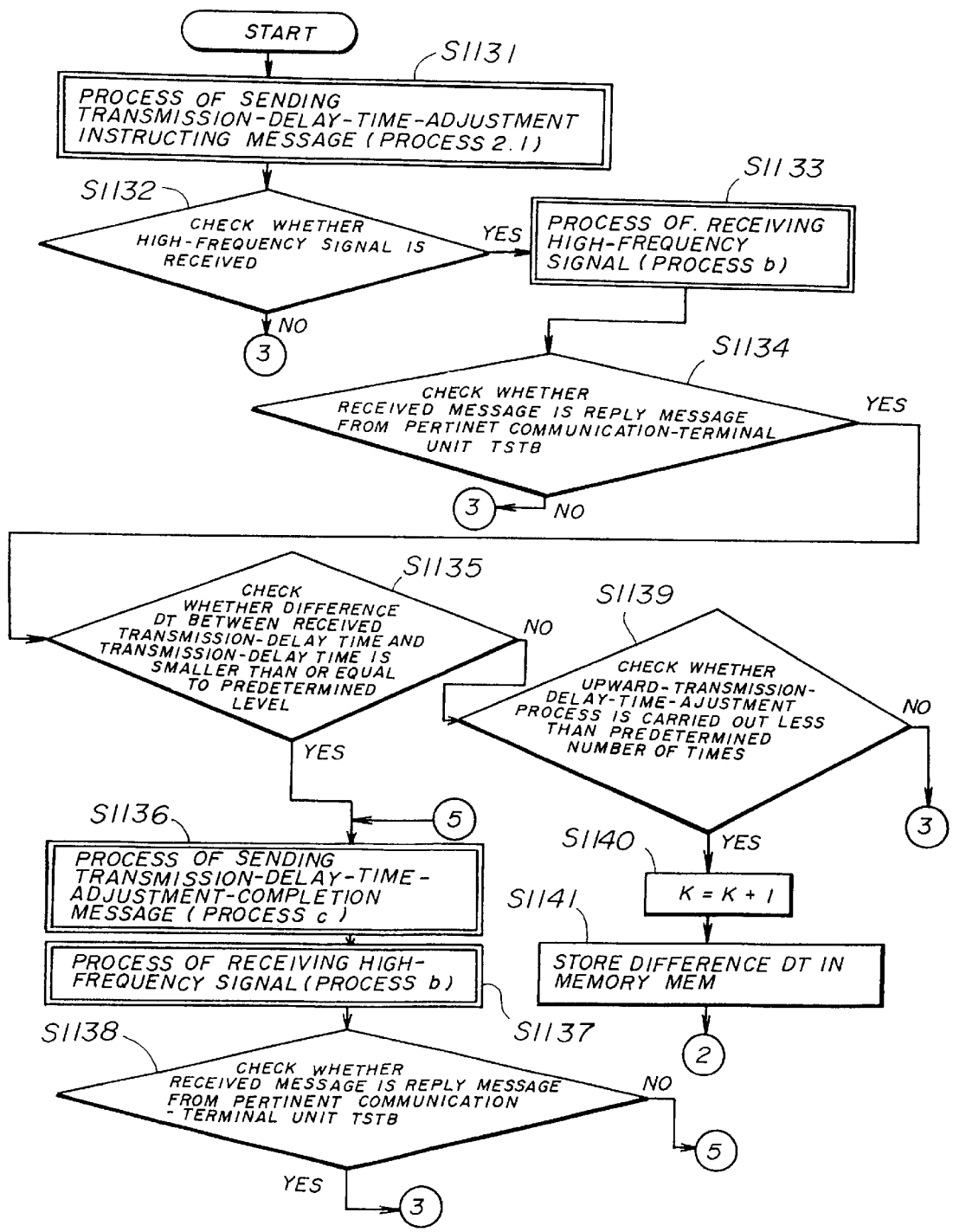
FIG. 76 is a flowchart of an upward-transmission-delay-time-adjustment process (process 2) of a step S1103 shown in FIG. 67A.

FIG. 76 is a flowchart of the upward-transmission-delay-time-adjustment process (process 2) of the step S1103 shown in FIG. 67A.

At a step S1131, a process of sending a transmission-delay-time-adjustment instructing message (process 2.1) is carried out.

At a step S1132, the CPU 81A checks whether a high-frequency signal has been received. If it has, the procedure goes to a step S1133. Otherwise, the procedure goes to the step S1104 of FIG. 67A.

At the step S1133, a process of receiving a high-frequency signal (the same process as that of FIG. 73) is carried out.

At a step S1134, the CPU 81A checks whether the received message is a reply message from the pertinent communication-terminal unit TSTB. If it is, the procedure goes to a step S1135. Otherwise, the procedure goes to the step S1104 of FIG. 67A.

At a step S1135, the CPU 81A checks whether the difference DT between the frame timing of the received message and the optimal timing is smaller than or equal to a predetermined level. If the answer is "yes", steps S1136 through S1138 are carried out. These steps S1136 through S1138 are the same as the steps S1116 through S1118 of FIG. 71, respectively, except for the steps carried out after the step S1118. That is, if the answer to a check at the step S1138 is "yes", the procedure goes to the step S1104. Otherwise, the procedure goes back to the step S1136. If the answer to the check at the step S1135 turns out to be "no", steps S1139 through S1141 are carried out. These steps S1139 through S1141 are the same as the steps S1119 through S1121 of FIG. 71, respectively.

Figure 77:
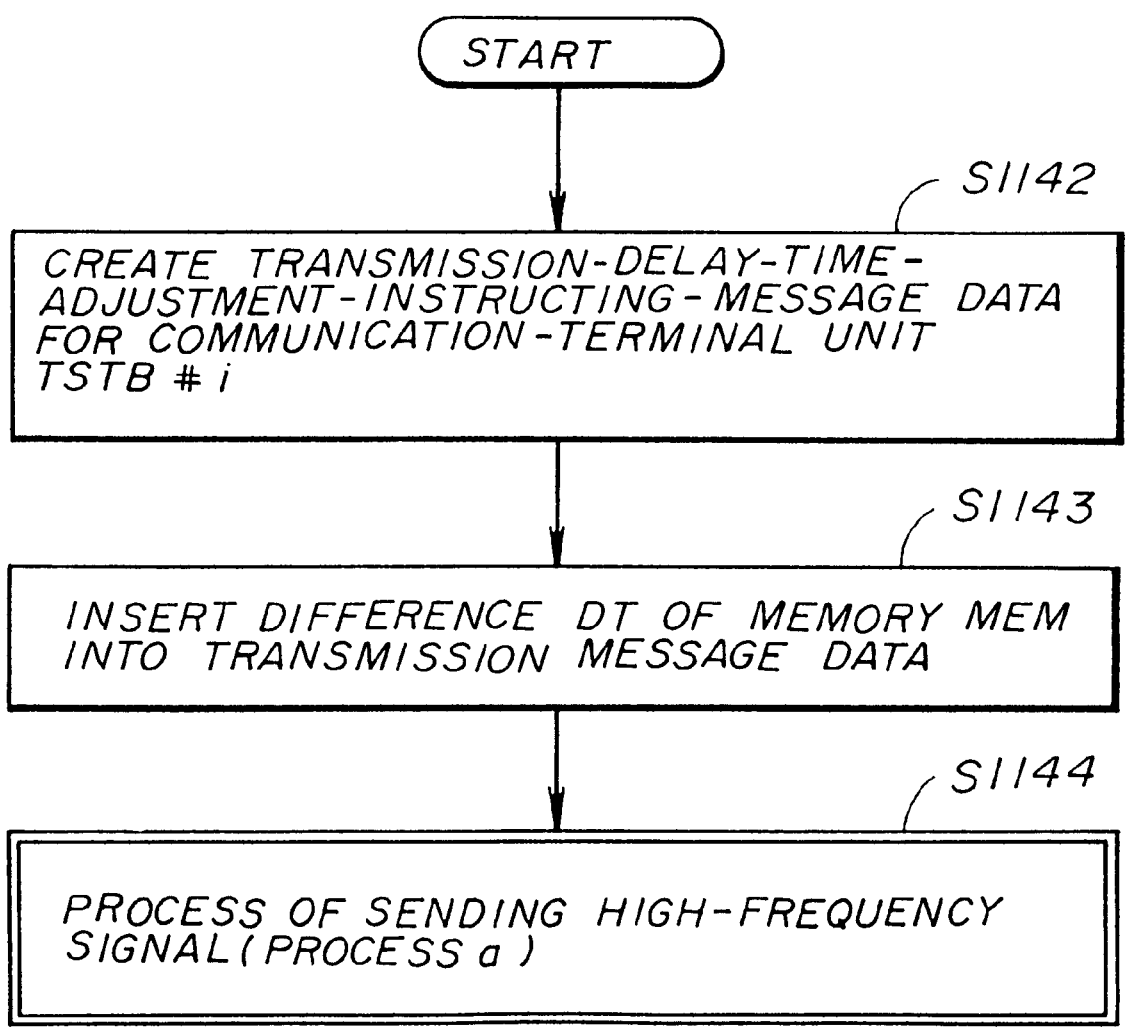
FIG. 77 is a flowchart of a process of a step S1131 of FIG. 76.

FIG. 77 is a flowchart of a process of the step S1131 of FIG. 76.

At a step S1142, transmission-delay-time-adjustment-instructing-message data for the communication-terminal unit TSTB #i is formed under the control of the CPU 81A.

At a step S1143, the CPU 81A inserts the difference DT stored in the memory MEM into transmission message data.

At a step S1144, a process of sending the high-frequency signal shown in FIG. 70 is carried out.

Figure 78:
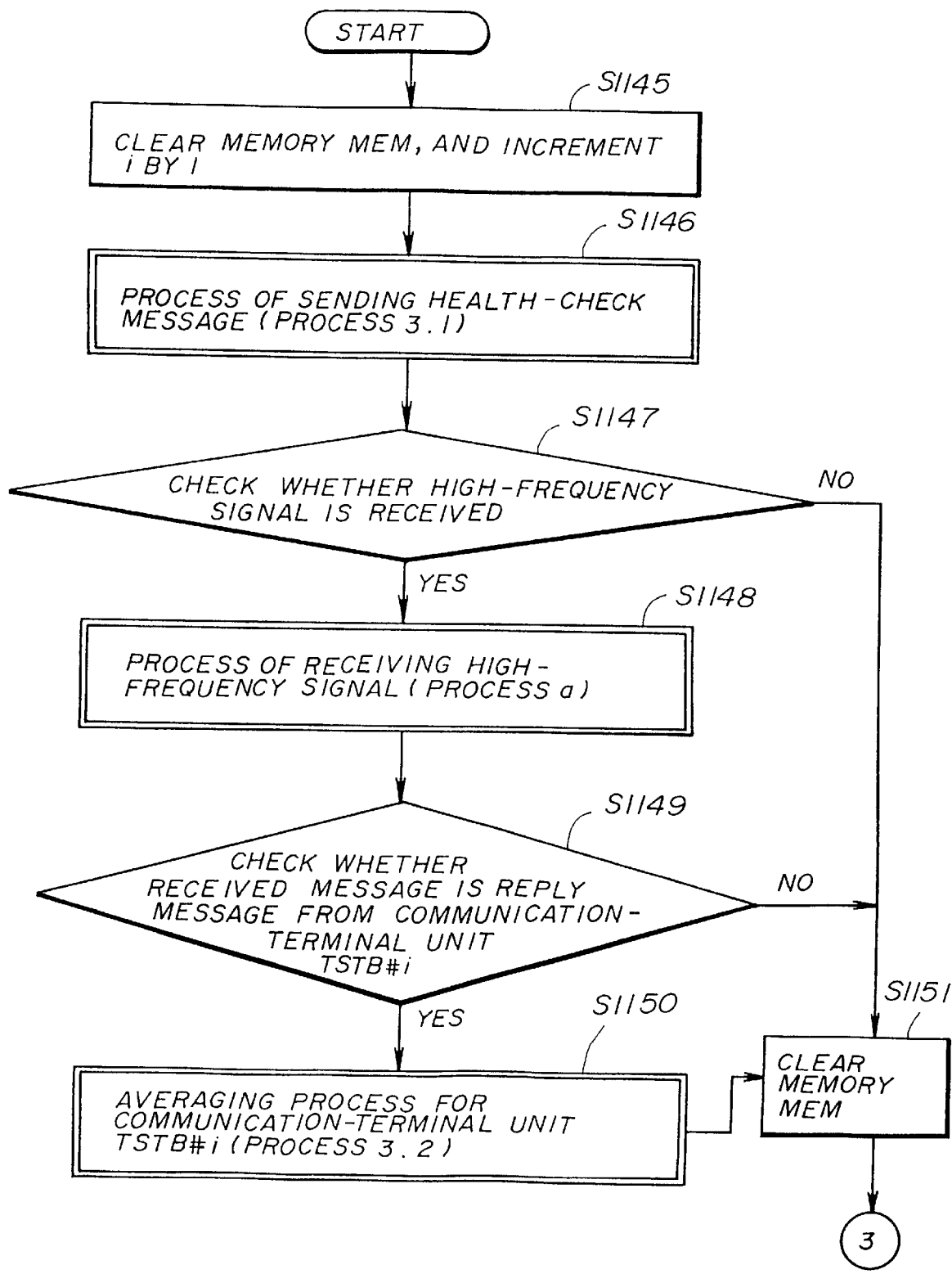
FIG. 78 is a flowchart of a health-check process for the communication-terminal unit of a step S1104 shown in FIG. 67A.

FIG. 78 is a flowchart of the health-check process for the communication-terminal unit TSTB of the step S1104 shown in FIG. 67A.

At a step S1145, the memory MEM is cleared, and the variable i is incremented by 1.

At a step S1146, a process of sending a health-check message (process 3.1) is carried out.

At a step S1147, the CPU 81A checks whether a high-frequency signal is received. If it is, the procedure goes to a step S1148. Otherwise, the procedure goes to a step S1151.

At the step S1148, a process of receiving the high-frequency signal shown in FIG. 73 is carried out.

At a step S1149, the CPU 81A checks whether the received message is a reply message from the communication-terminal unit TSTB #i. If it is, the procedure goes to a step S1150. Otherwise, the procedure goes to the step S1151.

At a step S1150, an averaging process (process 3.2) for the communication-terminal unit TSTB #i is carried out. After the step S1150, the procedure goes to the step S1151.

At the step S1151, the CPU 81A clears the memory MEM. Then, the procedure goes to the step S1104 of FIG. 67A.

Figure 79:
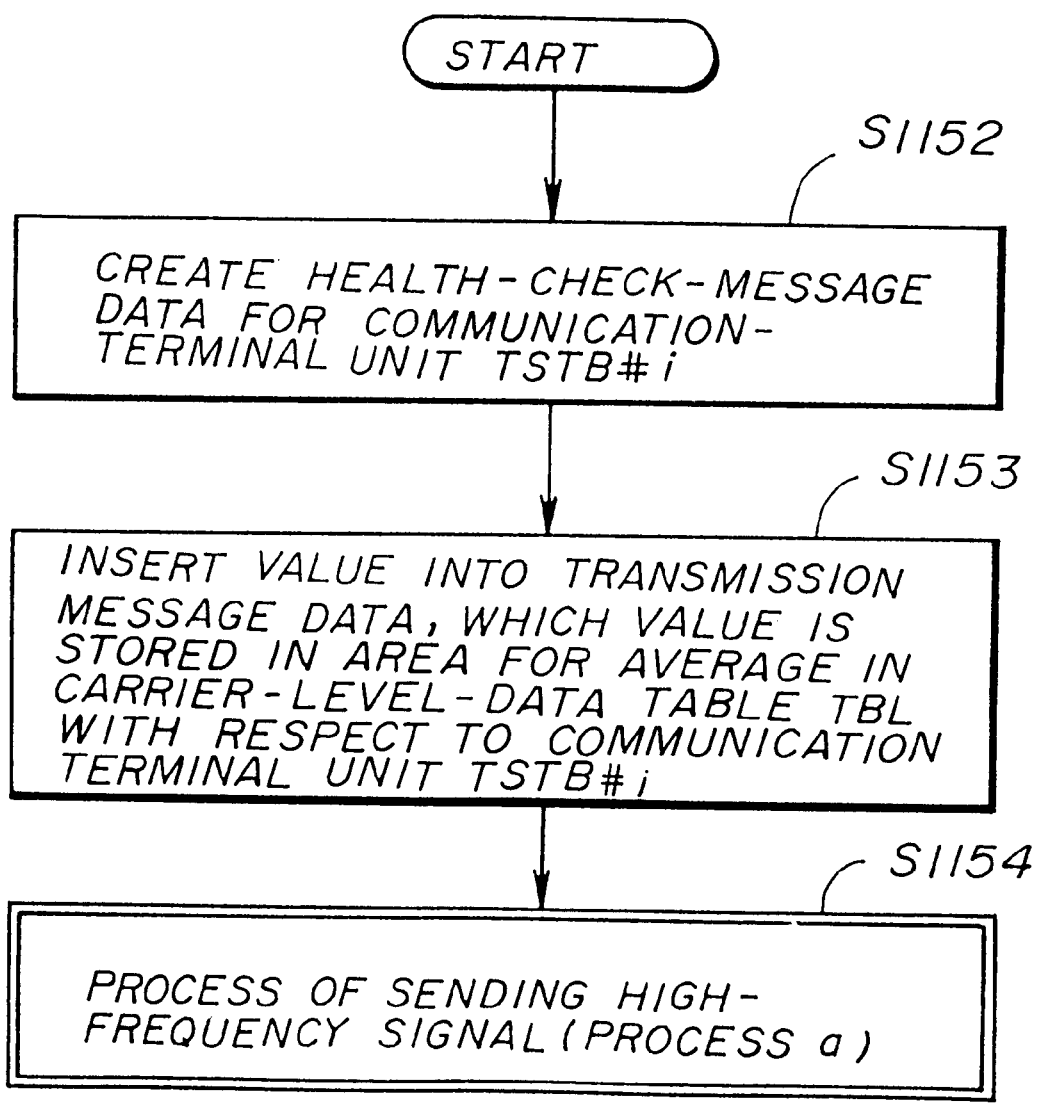
FIG. 79 is a flowchart of a process of a step S1146 shown in FIG. 78.

FIG. 79 is a flowchart of a process of the step S1146 shown in FIG. 78.

At a step S1152, health-check-message data for the communication-terminal unit TSTB #i is formed under the control of the CPU 81A.

At a step S1153, the CPU 81A inserts into transmission message data a value which is stored in the area for the average in the transmission-delay-time-data table TBL with respect to the communication-terminal unit TSTB #i. The area for the average is shown in FIG. 72, and the value stored therein is calculated through the averaging process of the step S1150 of FIG. 78.

At a step S1154, a process of sending a high-frequency signal the same as that of FIG. 70 is carried out.

Figure 80:
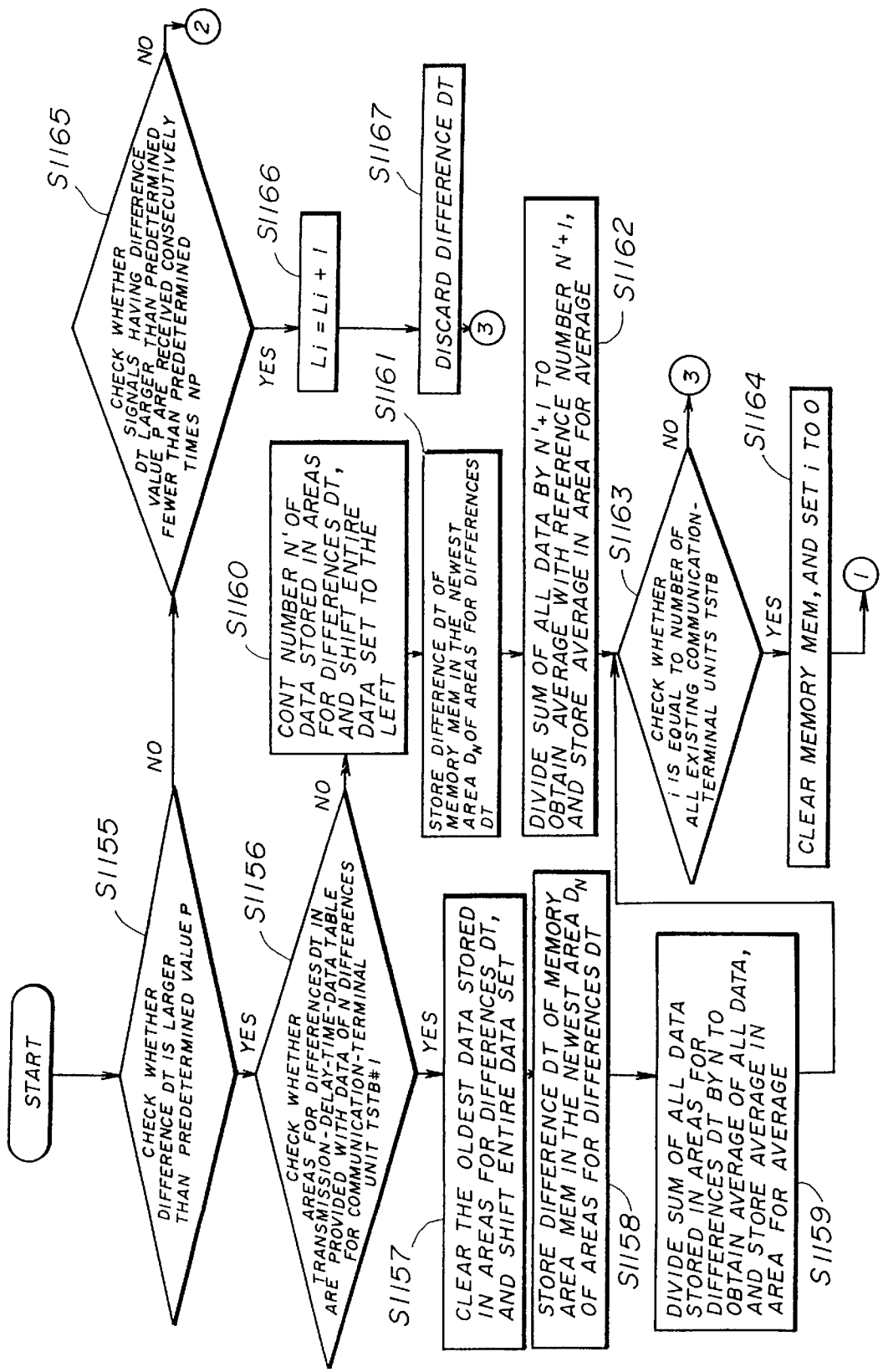
FIG. 80 is a flowchart of an averaging process for the communication-terminal unit carried out at a step S1150 of FIG. 78.

FIG. 80 is a flowchart of the averaging process for the communication-terminal unit TSTB #i carried out at the step S1150 of FIG. 78.

At a step S1155, the CPU 81A checks whether the difference DT is larger than the predetermined value P. If it is, the procedure goes to a step S1156. Otherwise, the procedure goes to a step S1165.

At the step S1156, the CPU 81A checks whether the areas for the differences DT in the transmission-delay-time-data table TBL are provided with data of N differences for the communication-terminal unit TSTB #1. If the answer is "yes", the procedure goes to a step S1157. Otherwise, the procedure goes to a step S1160.

At the step S1157, the CPU 81A clears the oldest data of the areas for the differences DT in the transmission-delay-time-data table TBL, and shifts the data stored in the areas for the differences DT.

FIGS. 81A through 81C are table charts showing the process of the step S1157. As shown in FIGS. 81A through 81C, the oldest data stored in $D_1$ is eliminated, and the entire data set is shifted to the left.

At a step S1158, the CPU 81A stores the difference DT of the memory area MEM in the newest area $D_N$ of the areas for the differences DT.

At a step S1159, the CPU 81A divides the sum of all the data stored in the areas for the differences DT by N to obtain an average of all the data, and stores the average in the area for the average. After the step S1159, the procedure goes to a step S1163.

At the step S1160 when the check at the step S1156 gave a negative answer, the number N' of the data stored in the areas for the differences DT is counted, and the entire data set is shifted to the left.

Figures 82A, 82B:
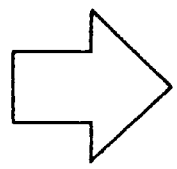
FIGS. 82A and 82B are table charts showing a process of a step S1160.

FIGS. 82A and 82B are table charts showing the process of the step S1160. As shown in FIGS. 82A and 82B, the entire set is shifted to the left, i.e., is shifted in a direction toward where the oldest data is stored.

At a step S1161, the CPU 81A stores the difference DT of the memory area MEM in the newest area $D_N$ of the areas for the differences DT.

At a step S1162, the CPU 81A divides the sum of all the data by N'+1 to obtain an average with a reference number N'+1, and stores the average in the area for the average. After the step S1162, the procedure goes to the step S1163.

At the step S1163, a check is made whether the variable i is equal to the number of all the existing communication-terminal units TSTB. If the answer is "yes", the procedure goes to a step S1164. Otherwise, the procedure goes to the step S1104 of FIG. 67A.

At the step S1164, the memory MEM is cleared, and the variable i is set to zero. After the step S1164, the procedure goes to the step S1102 of FIG. 67A.

At the step S1165 when the check at the step S1155 gave a negative answer, the CPU 81A checks whether signals having the difference DT larger than the predetermined value P are received consecutively fewer times than the predetermined times Np. If the answer is "no", the procedure goes to the step S1103 of FIG. 67A. Otherwise, the procedure goes to a step S1166.

At the step S1166, the CPU 81A increments the counter Li by 1.

At a step S1167, the difference DT is discarded. After the step S1167, the procedure goes to the step S1104 of FIG. 67A.

In the following, the operations of the communication-terminal unit TSTB #i shown in the flowchart of FIG. 67B will be described in detail.

Figure 83:
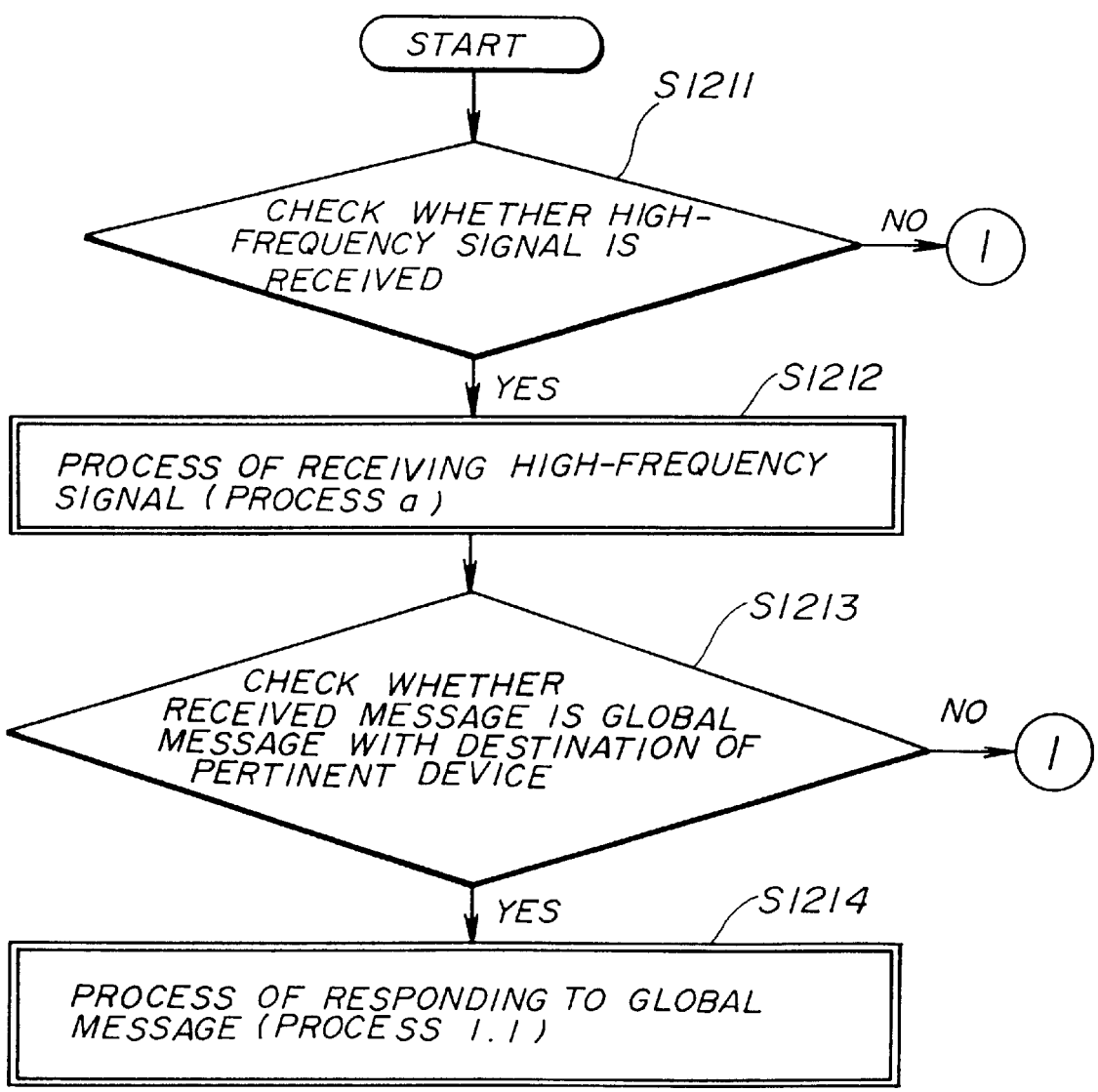
FIG. 83 is a flowchart of a process of receiving a global message for checking an existence of a newly installed communication-terminal unit carried out at a step S1202 of FIG. 67B.

FIG. 83 is a flowchart of a process of receiving a global message for checking an existence of the newly installed communication-terminal unit TSTB carried out at the step S1202 of FIG. 67B.

At a step S1211, the CPU 133A checks whether a high-frequency signal is received. If it is, the procedure goes to a step S1212. Otherwise, the procedure goes to the step S1202 of FIG. 67B, i.e., the procedure goes back to the start of the flowchart of FIG. 83.

At the step S1212, a process of receiving a high-frequency signal (process a, which will be described later) is carried out.

At a step S1213, the CPU 133A checks whether the received message is a global message for checking the existence of the newly installed communication-terminal unit TSTB with a destination of the pertinent device. If the answer is "no", the procedure goes back to the start. Otherwise, the procedure goes to a step S1214.

At the step S1214, a process of responding to the global message is carried out.

Figure 84:
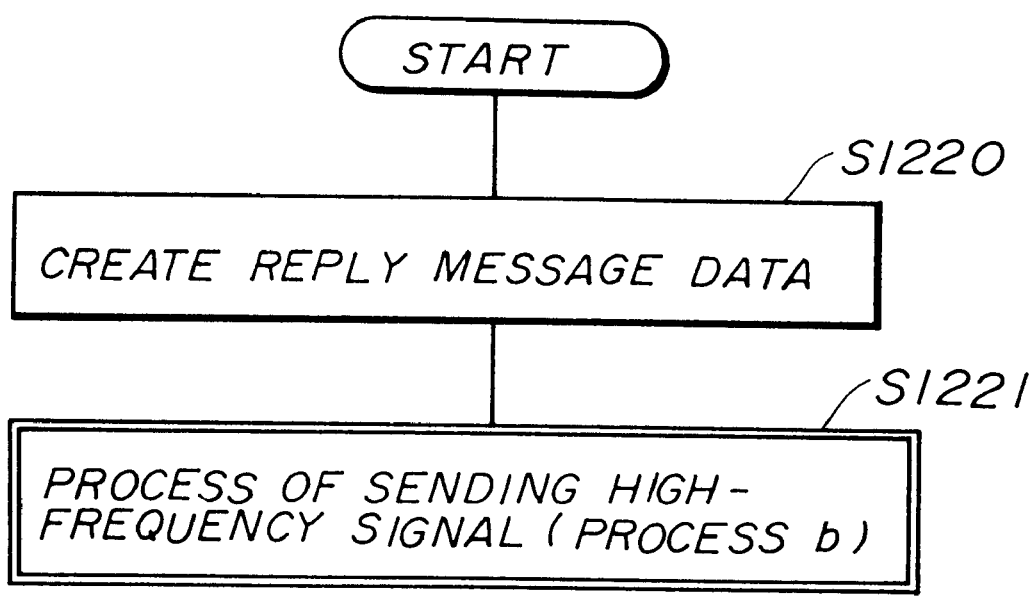
FIG. 84 is a flowchart of a process carried out at a step S1214 of FIG. 83.

FIG. 84 is a flowchart of a process carried out at the step S1214 of FIG. 83.

At a step S1220, the CPU 133A creates reply message data.

At a step S1221, a process of sending a high-frequency signal (which will be described later) is carried out.

Figure 85:
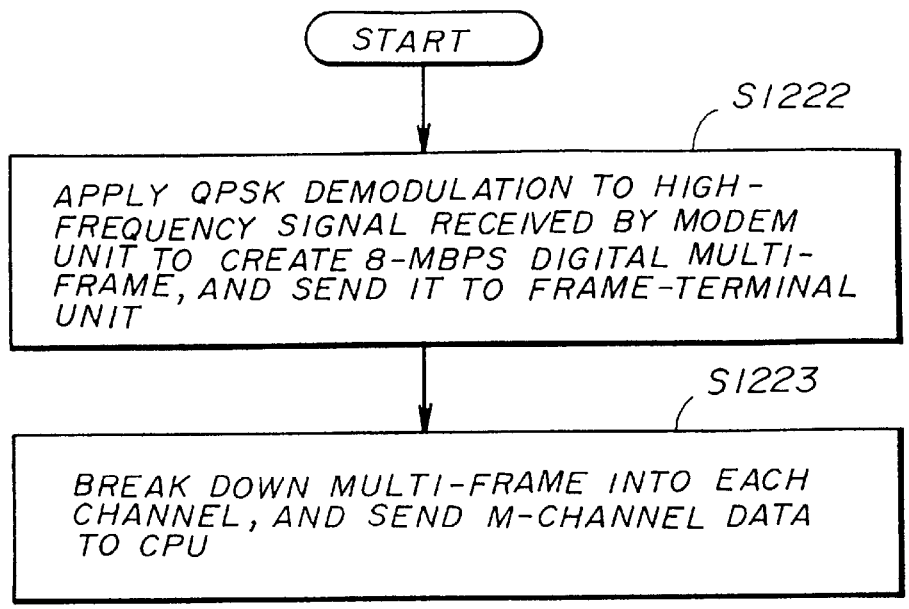
FIG. 85 is a flowchart of a process carried out at a step S1212 of FIG. 83.

FIG. 85 is a flowchart of a process carried out at the step S1212 of FIG. 83.

At a step S1222, the high-frequency signal received by the modem unit 131 of FIG. 65 is subjected to the QPSK demodulation to create an 8-Mbps digital multi-frame, which is then sent to the frame-terminal unit 132.

At a step S1223, the multi-frame is broken down into each channel in the frame-terminal unit 132, and the M-channel data thus extracted is sent to the CPU 133A.

Figure 86:
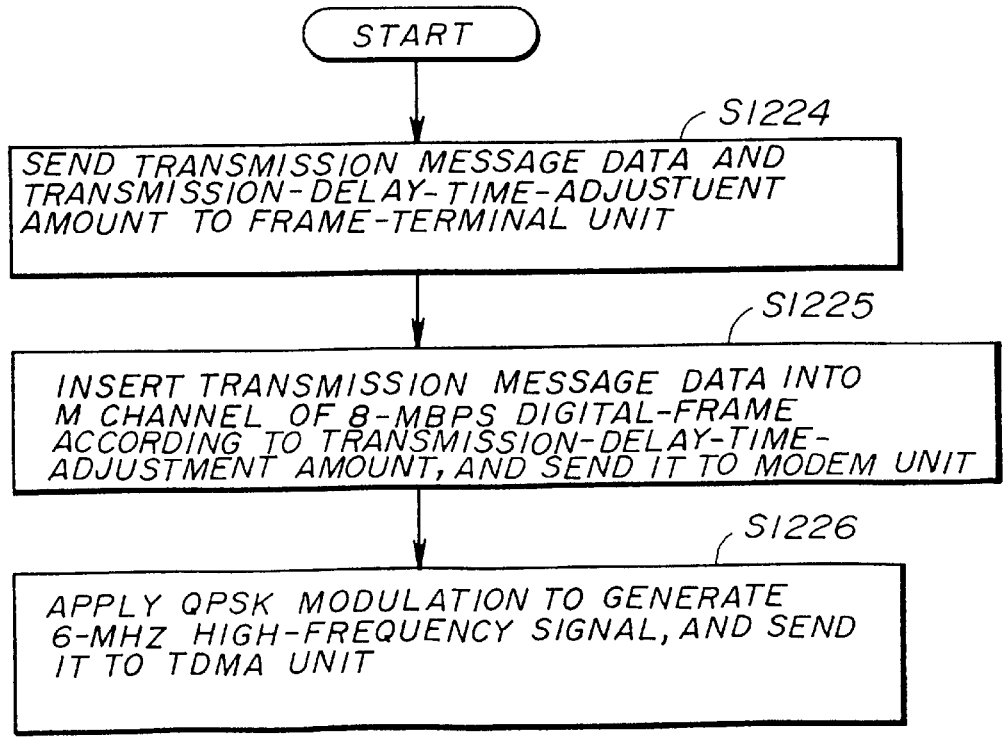
FIG. 86 is a flowchart of a process of sending a high-frequency signal carried out at a step S1224 of FIG. 85.

FIG. 86 is a flowchart of a process of sending a high-frequency signal carried out at the step S1224 of FIG. 85.

At a step S1224, the CPU 133A sends transmission message data and the transmission-delay-time-adjustment amount stored in the memory 134A to the frame-terminal unit 132.

At a step S1225, the frame-terminal unit 132 inserts the transmission message data into the M channel of an 8-Mbps digital frame according to the transmission-delay-time-adjustment amount, and sends the 8-Mbps digital frame to the modem unit 131.

At a step S1226, the modem unit 131 applies the QPSK modulation to generate a 6-MHz high-frequency signal, and sends the high-frequency signal to the TDMA unit 22A.

Figure 87:
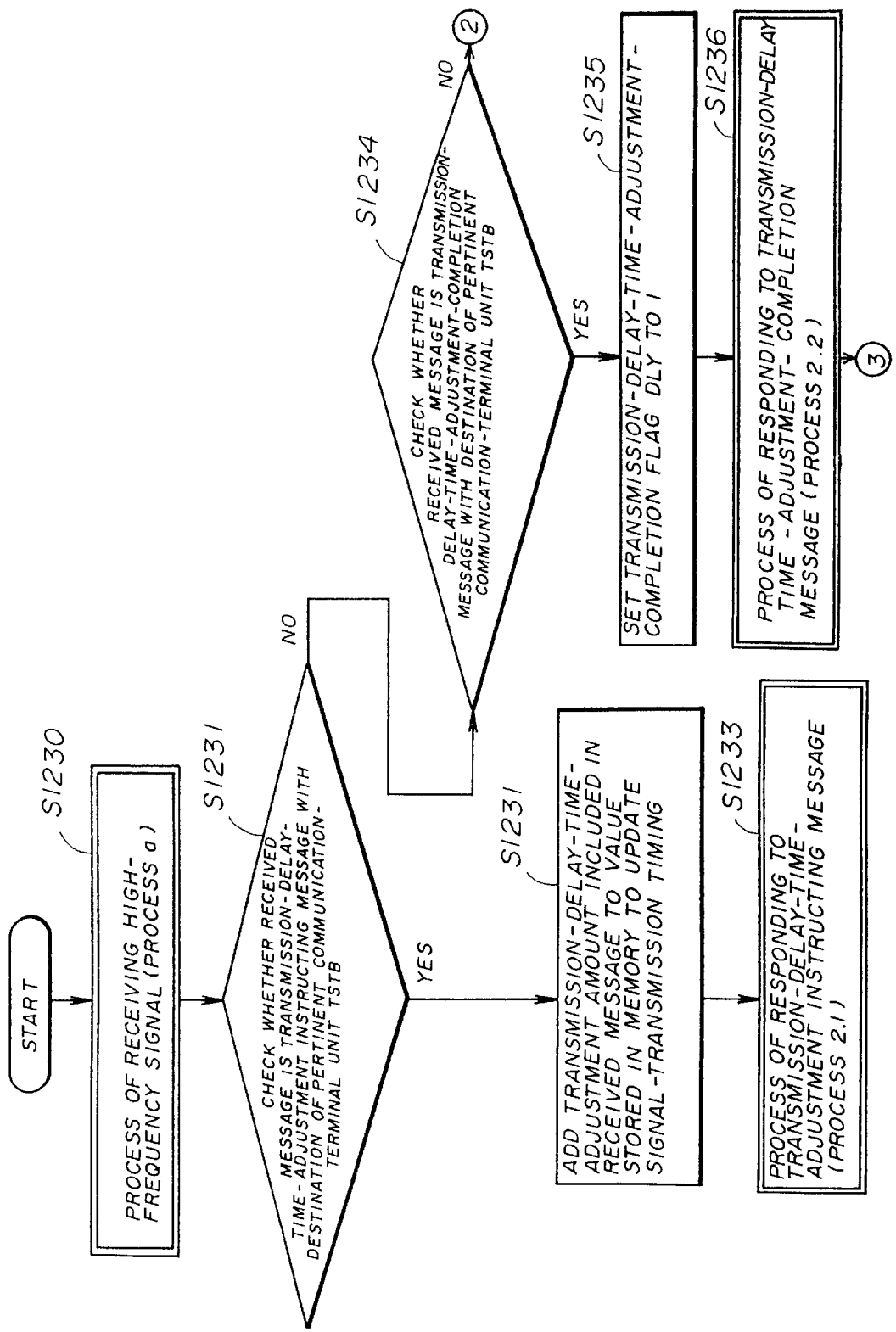
FIG. 87 is a flowchart of a process of receiving a transmission-delay-time-adjustment instructing message carried out at a step S1203 of FIG. 67B.

FIG. 87 is a flowchart of a process of receiving a transmission-delay-time-adjustment instructing message carried out at the step S1203 of FIG. 67B.

At a step S1230, a process of receiving a high-frequency signal the same as that of FIG. 85 is carried out.

At a step S1231, the CPU 133A checks whether the received message is the transmission-delay-time-adjustment instructing message with a destination of the pertinent communication-terminal unit TSTB. If the answer is "yes", the procedure goes to a step S1232. Otherwise, the procedure goes to a step S1234.

At the step S1232, the CPU 133A adds the transmission-delay-time-adjustment amount included in the received message to the value stored in the memory 134A to update the signal-transmission timing.

At a step S1233, a process of responding to the transmission-delay-time-adjustment instructing message is carried out.

At the step S1234 when the check at the step S1231 gave a negative answer, the CPU 133A checks whether the received message is a transmission-delay-time-adjustment-completion message with a destination of the pertinent communication-terminal unit TSTB. If the answer is "no", the procedure goes to the step S1203 of FIG. 67B. Otherwise, the procedure goes to a step S1235.

At the step S1235, the CPU 133A sets the transmission-delay-time-adjustment-completion flag DLY to 1.

At a step S1236, a process of responding to the transmission-delay-time-adjustment-completion message (process 2.2) is carried out. After the step S1236, the procedure goes to the step S1204 of FIG. 67B.

Figure 88:
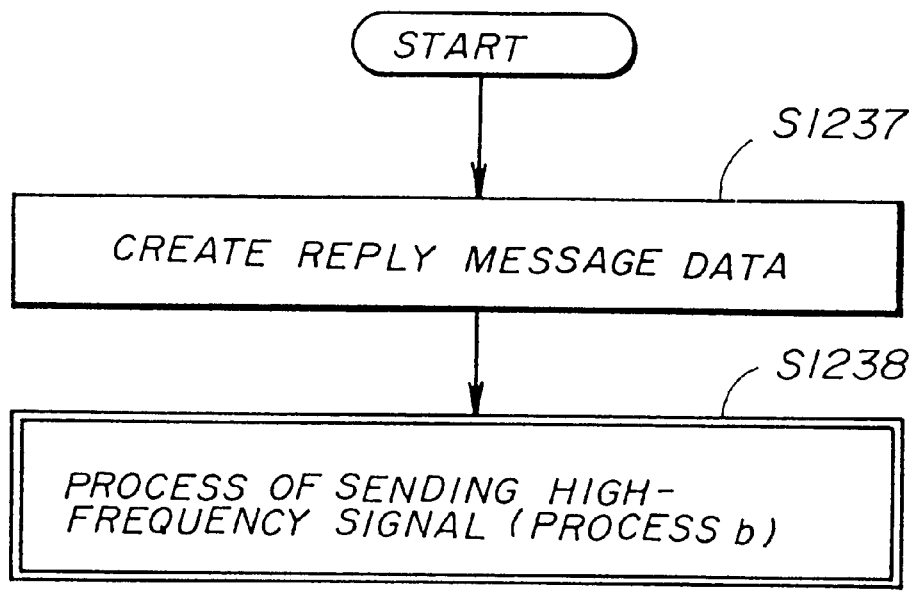
FIG. 88 is a flowchart of a process carried out at a step S1233 of FIG. 87.

FIG. 88 is a flowchart of a process carried out at the step S1233 of FIG. 87.

At a step S1237, the CPU 133A creates reply message data.

At a step S1238, a process of sending the high-frequency signal the same as that of FIG. 86 is carried out.

Figure 89:
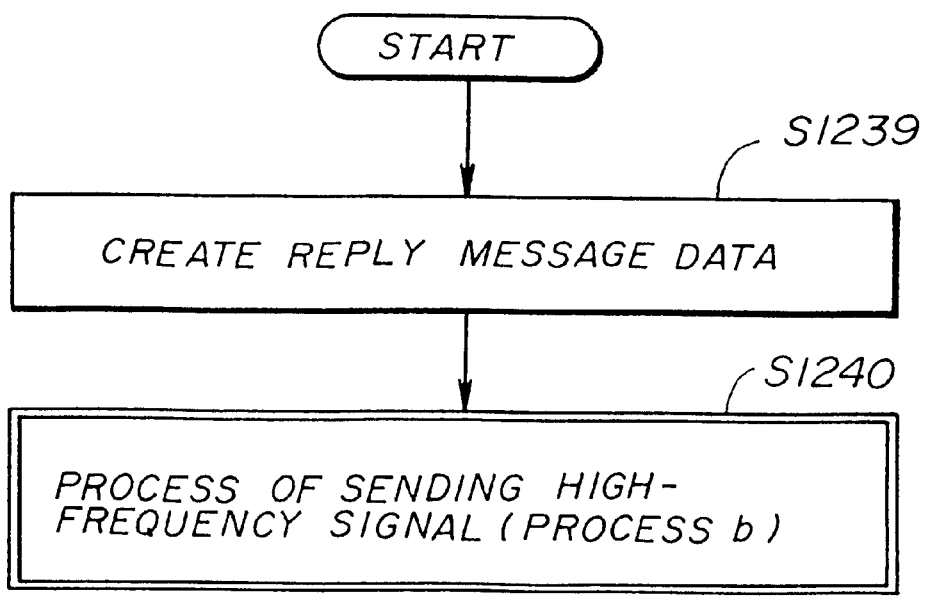
FIG. 89 is a flowchart of a process carried out at a step S1236 of FIG. 87.

FIG. 89 is a flowchart of a process carried out at the step S1236 of FIG. 87.

At a step S1239, the CPU 133A creates reply message data.

At a step S1240, a process of sending the high-frequency signal the same as that of FIG. 86 is carried out.

Figure 90:
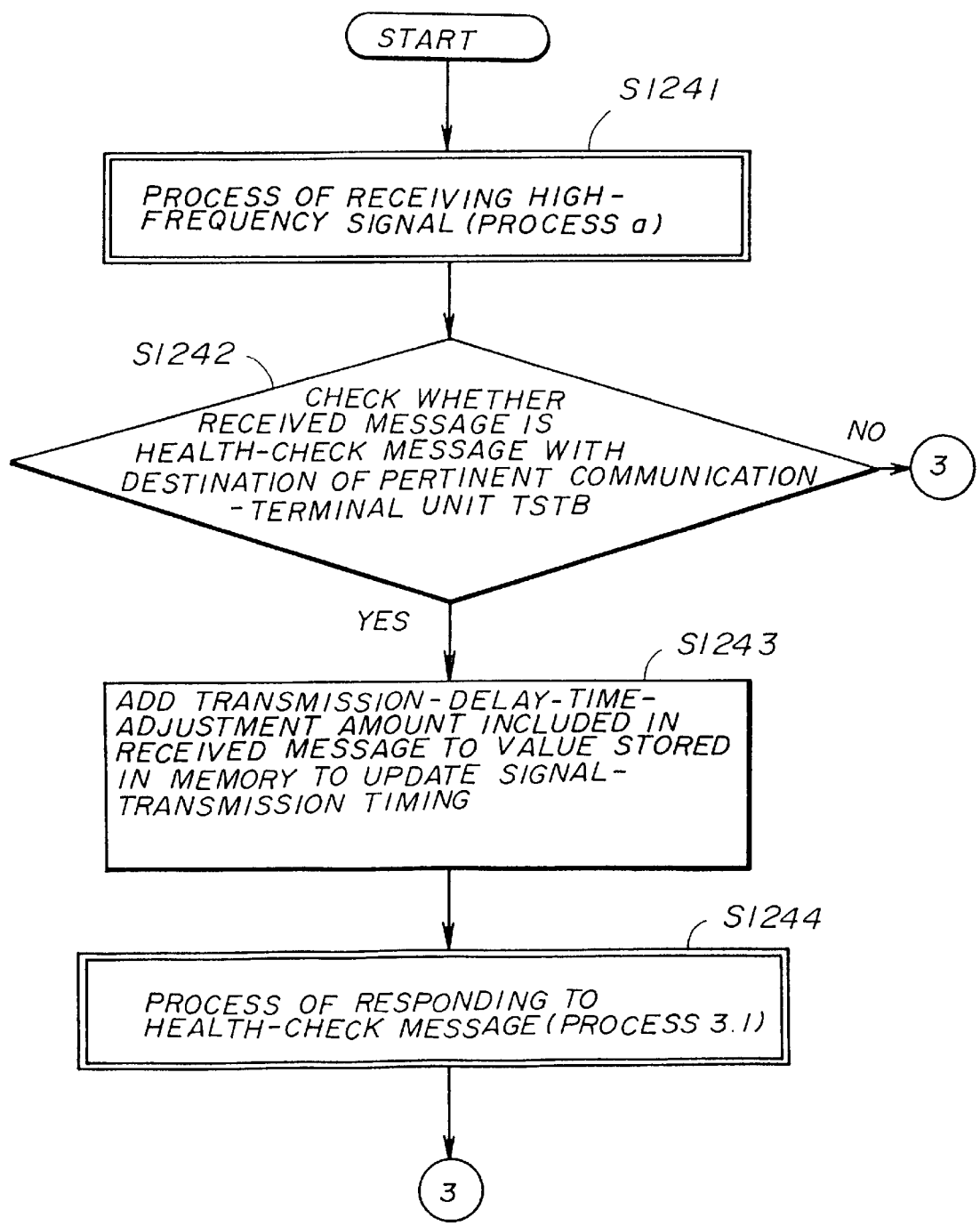
FIG. 90 is a flowchart of a process carried out at a step S1204 of FIG. 67B.

FIG. 90 is a flowchart of a process carried out at the step S1204 of FIG. 67B.

At a step S1241, a process of receiving a high-frequency signal as previously described is carried out.

At a step S1242, the CPU 133A checks whether the received message is a health-check message with a destination of the pertinent communication-terminal unit TSTB. If the answer is "yes", the procedure goes to a step S1243. Otherwise, the procedure goes to the step S1204 of FIG. 67B, i.e., goes back to the start of the flowchart of FIG. 90.

At the step S1243, the CPU 133A adds the transmission-delay-time-adjustment amount included in the received message to the value stored in the memory 134A to update the signal-transmission timing.

At a step S1244, a process of responding to the health-check message (process 3.1) is carried out. After the step S1244, the procedure goes back to the start of this flowchart.

Figure 91:
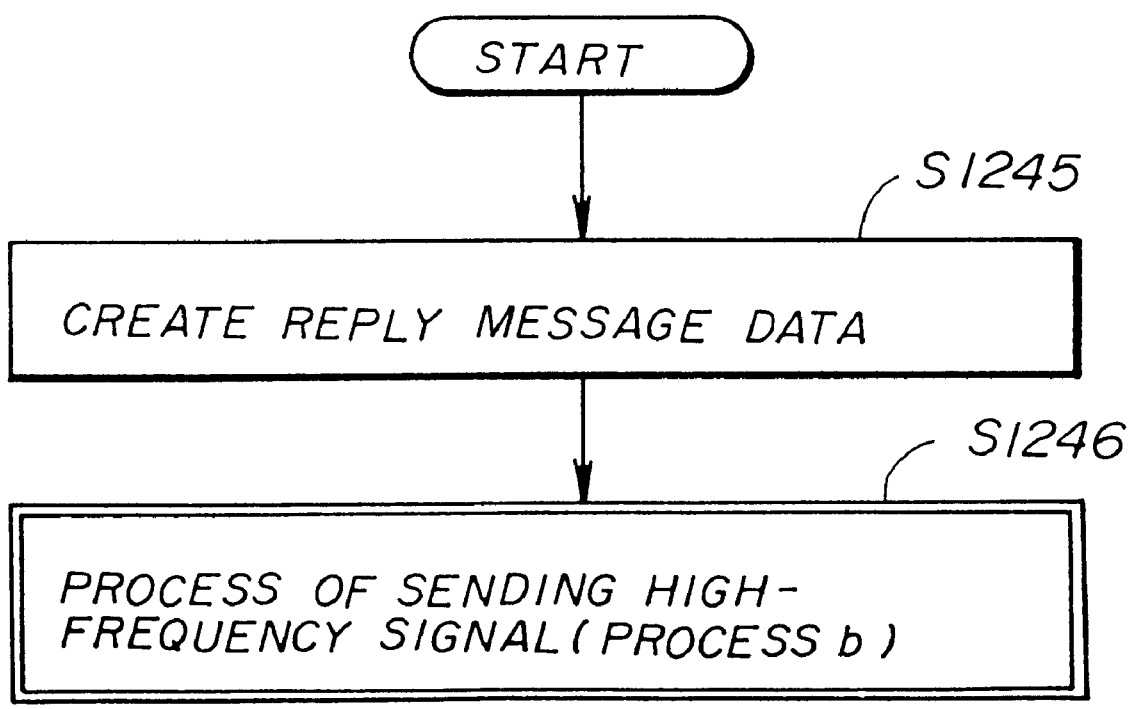
FIG. 91 is a flowchart of the process of responding to the health-check message.

FIG. 91 is a flowchart of the process of responding to the health-check message.

At a step S1245, the CPU 133A creates reply message data.

At a step S1246, a process of sending the high-frequency signal the same as that of FIG. 86 is carried out.

In the following, operation sequences between the TDMA unit 22A and the communication-terminal unit TSTB will be described with reference to the accompanying drawings.

Figure 92:
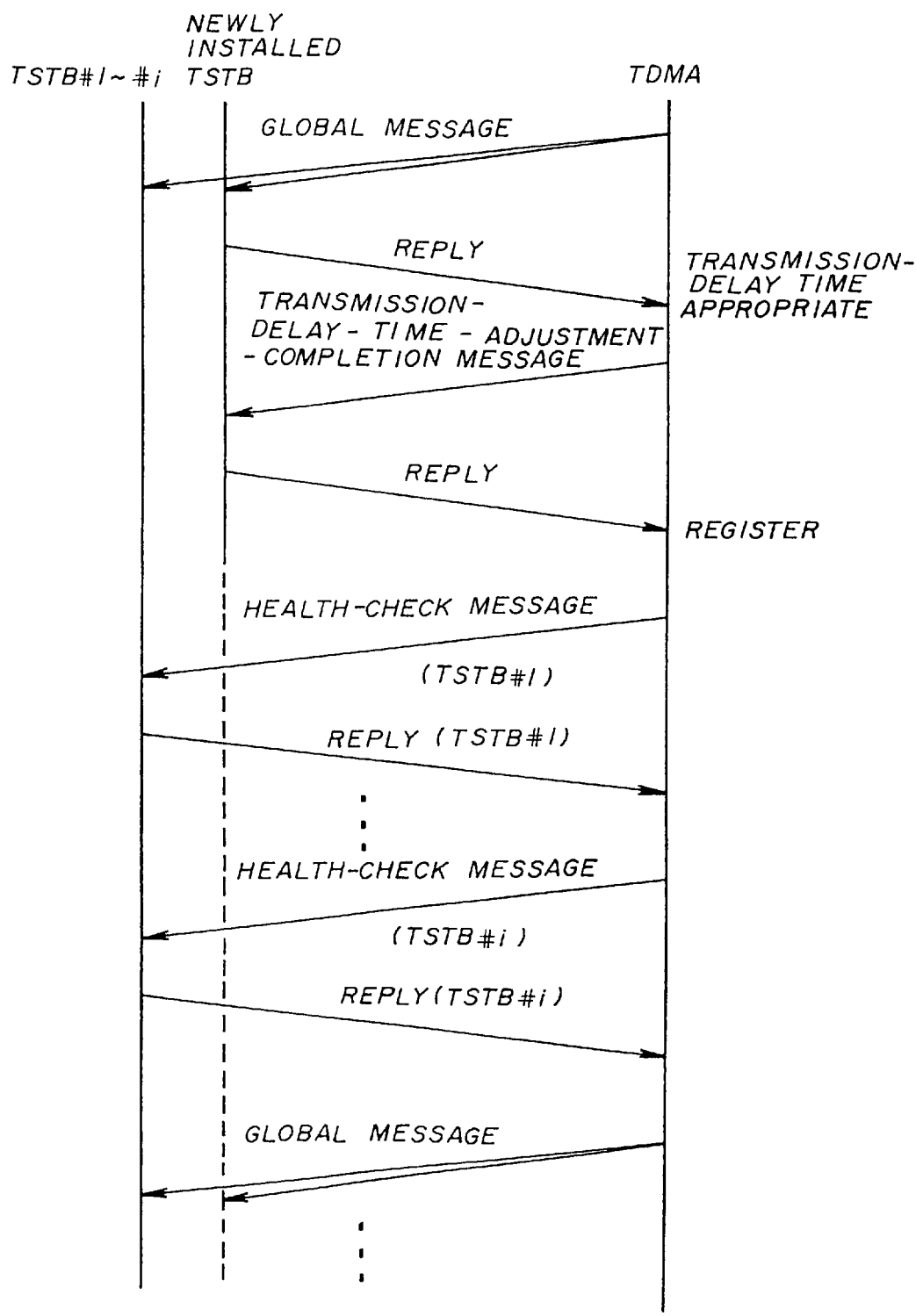
FIG. 92 is a sequence diagram showing an operation sequence when there is a newly installed communication-terminal unit.

FIG. 92 is a sequence diagram showing an operation sequence when there is a newly installed communication-terminal unit TSTB.

Upon receiving the global message for checking the existence of a newly installed communication-terminal unit TSTB, the newly installed communication-terminal unit TSTB sends back a response. When the TDMA unit 22A decides that the transmission-delay time is appropriate, the TDMA unit 22A sends a transmission-delay-time-adjustment-completion message. When the TDMA unit 22A receives a response to this completion message, the newly installed communication-terminal unit TSTB is registered as an existing communication-terminal unit TSTB. Then, a health-check message is sent to each of the existing communication-terminal units TSTB. The operation described above is repeated at equal intervals.

Figure 93:
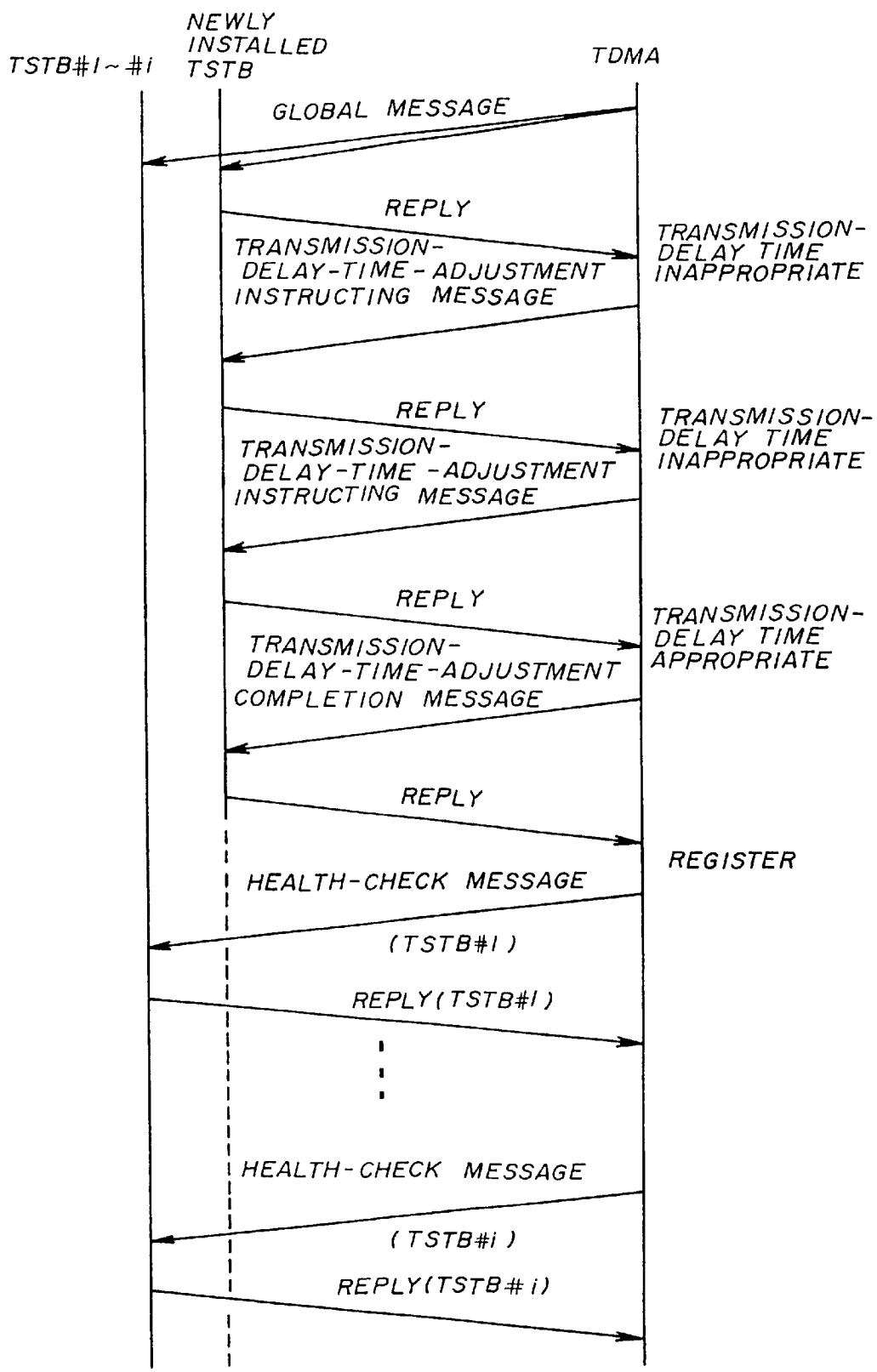
FIG. 93 is a sequence diagram showing an operation sequence when a transmission-delay time of a newly installed communication-terminal unit is to be adjusted.

FIG. 93 is a sequence diagram showing an operation sequence when a transmission-delay time of a newly installed communication-terminal unit TSTB is to be adjusted.

Upon receiving the global message for checking the existence of a newly installed communication-terminal unit TSTB, the newly installed communication-terminal unit TSTB sends back a response. When the TDMA unit 22A receiving this response decides that the receipt timing of the message (transmission-delay time) is inappropriate, the TDMA unit 22A sends a transmission-delay-time-adjustment instructing message. Upon receiving a response to this instructing message, then, the TDMA unit 22A checks whether the adjusted transmission-delay time is appropriate. The TDMA unit 22A sends the transmission-delay-time-adjustment instructing message several times, if necessary, until the adjusted transmission-delay time becomes appropriate. When the transmission-delay time becomes appropriate, the newly installed communication-terminal unit TSTB is registered as an existing communication-terminal unit TSTB.

Figure 94:
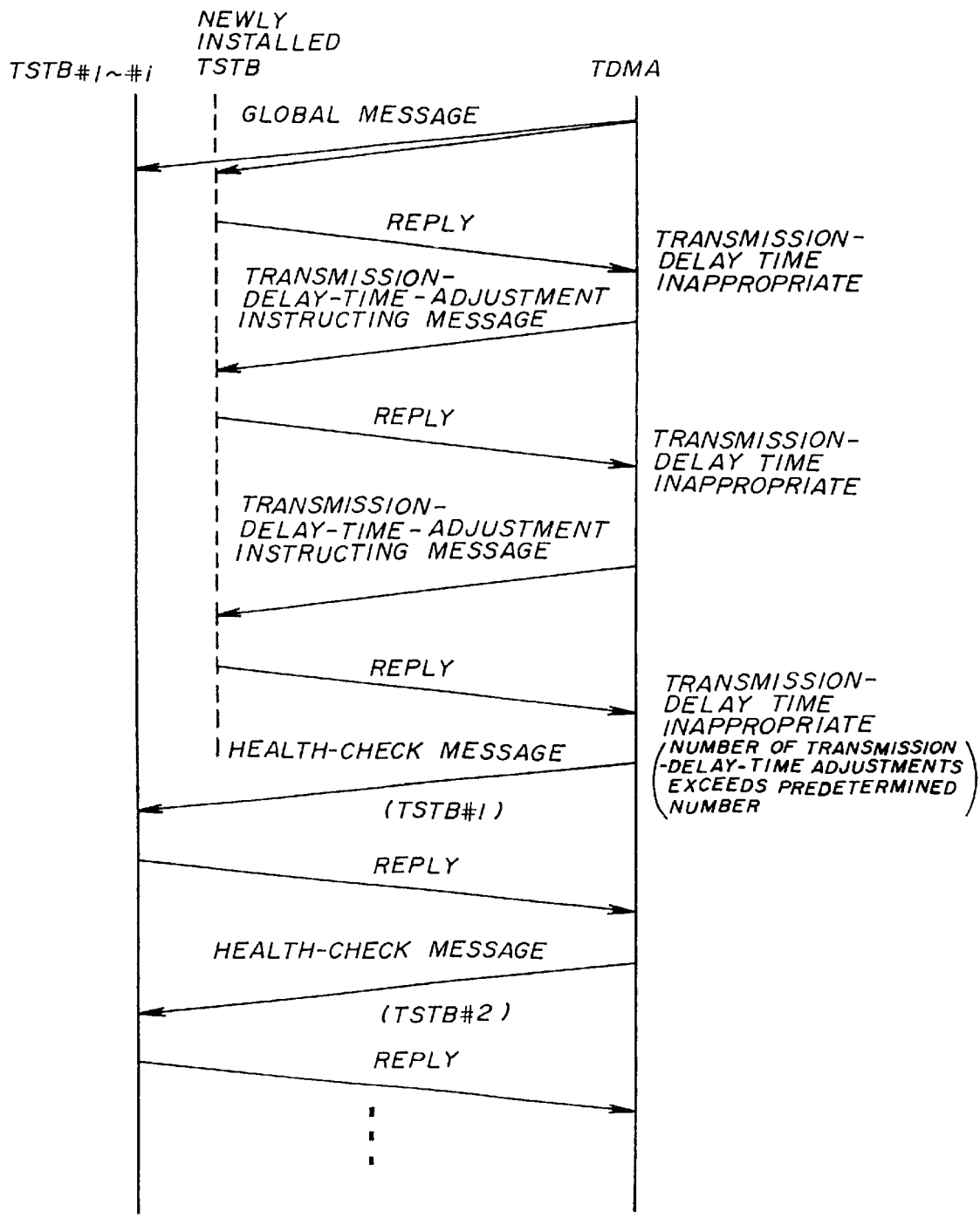
FIG. 94 is a sequence diagram of an operation sequence when the number of transmission-delay-time-adjustment instructing messages transmitted to request an adjustment exceeds a predetermined number.

FIG. 94 is a sequence diagram of an operation sequence when the number of the transmission-delay-time-adjustment instructing messages transmitted to request an adjustment exceeds a predetermined number K.

As shown in FIG. 94, when this number exceeds the predetermined number K, it is determined that a newly installed communication-terminal unit TSTB is non-existent, and the registration thereof is not carried out.

Figure 95:
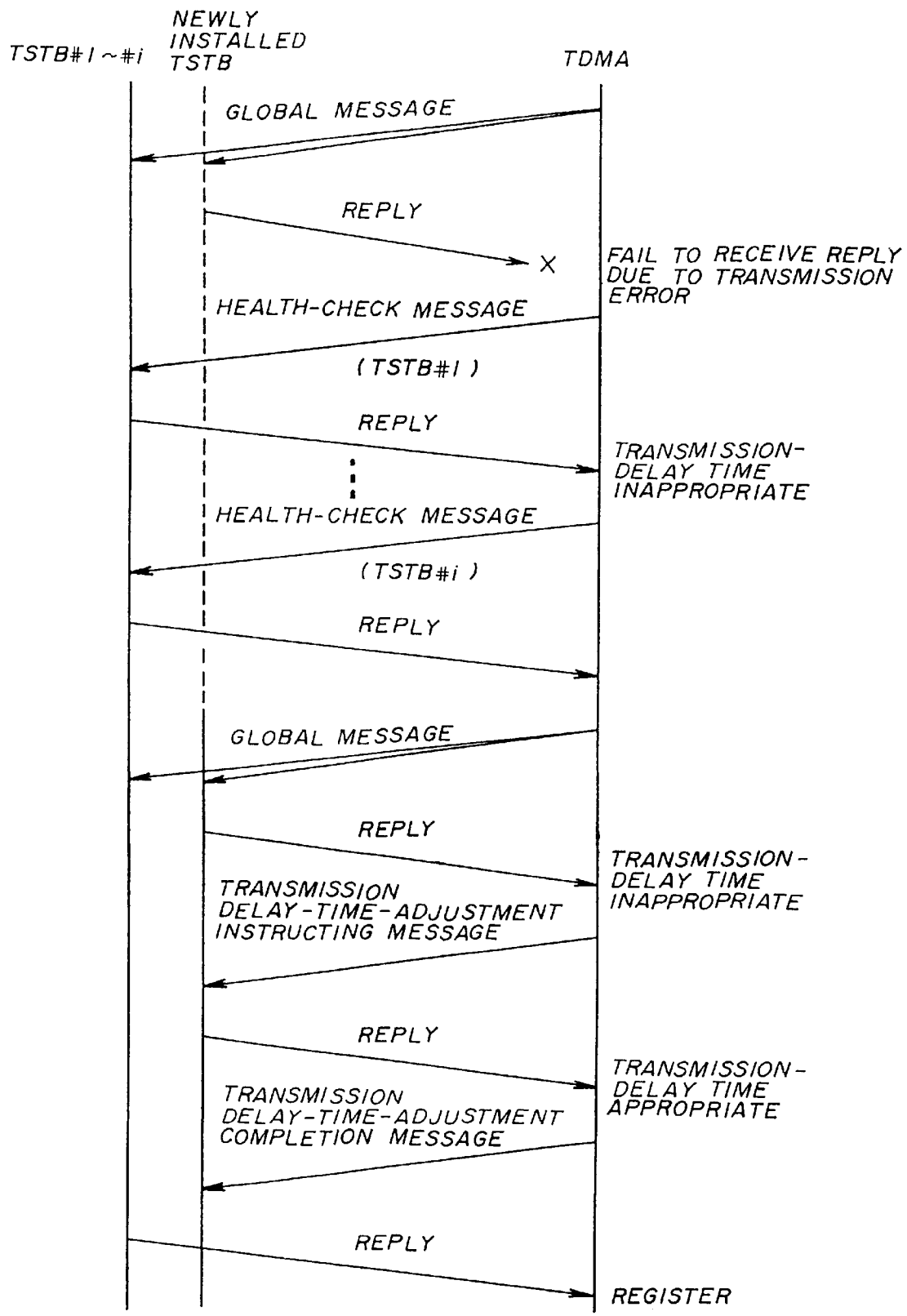

FIG. 95 is a sequence diagram of an operation sequence when the TDMA unit 22A cannot receive a response transmitted from the newly installed communication-terminal unit TSTB responding to the global message because of a transmission error or the like.

When the TDMA unit 22A does not receive a response to the global message it transmitted, the TDMA unit 22A sends the global message for checking the existence of a newly installed communication-terminal unit TSTB again after one round of transmissions of the health-check messages. When the communication-terminal unit TSTB receives this global message, the communication-terminal unit TSTB decides that the TDMA unit 22A did not receive the response to the last global message, and sends a response to the global message again. In an example of FIG. 95, the TDMA unit 22A manages to receive the response this time, but the transmission-delay time is still inappropriate. Thus, the TDMA unit 22A sends a transmission-delay-time-adjustment instructing message to the communication-terminal unit TSTB, and the communication-terminal unit TSTB sends back a response at a proper transmission-delay time.

Figure 96:
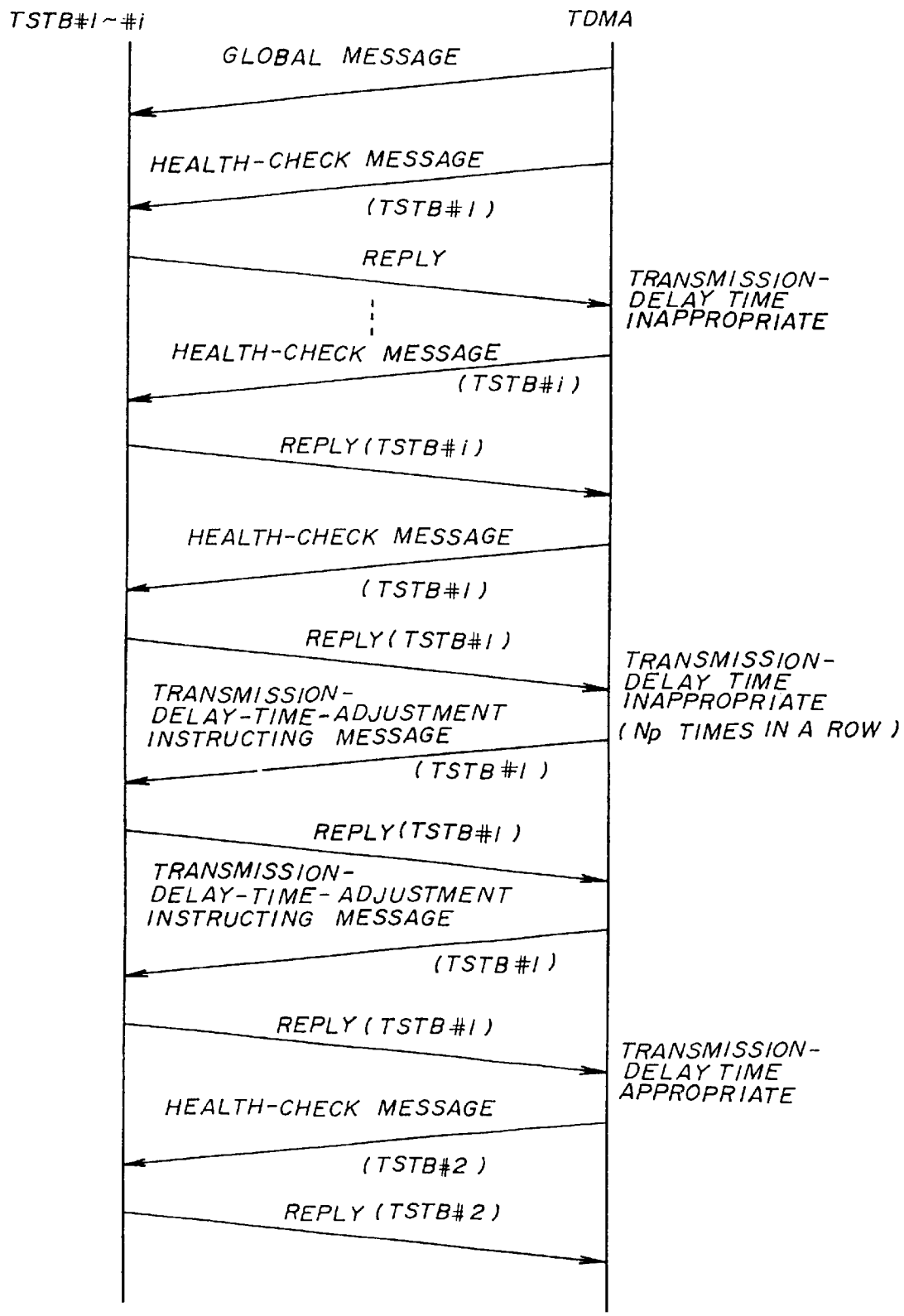
FIG. 96 is a sequence diagram of an operation sequence when an existing communication-terminal unit has an inappropriate transmission-delay time.

FIG. 96 is a sequence diagram of an operation sequence when an existing communication-terminal unit TSTB #1 has an inappropriate transmission-delay time.

As shown in FIG. 96, there is no response to a global message for checking an existence of a newly installed communication-terminal unit TSTB since there is no newly installed one. Then, the TDMA unit 22A sends a health-check message to the communication-terminal unit TSTB #1. Upon receiving a response to this health-check message, the TDMA unit 22A decides that the transmission-delay time is inappropriate because a difference between the received transmission-delay time and the optimal transmission-delay time is larger than the threshold value P. Health-check messages are periodically sent to the communication-terminal unit TSTB #1. When responses having the transmission-delay-time difference larger than the threshold value P are consecutively received Np times, the TDMA unit 22A sends a transmission-delay-time-adjustment instructing message to the communication-terminal unit TSTB #1. In an example of FIG. 96, after sending this message two times, the transmission-delay time becomes appropriate.

As described above, according to the third principle of the present invention, the automatic transmission-delay-time adjustment of a communication-terminal device is periodically carried out via a channel which is different from those used for ordinary communications and the control thereof. Therefore, the automatic adjustment of the signal-transmission timing reflecting an actual transmission-delay time is achieved for each channel without disturbing the ordinary communications.

Also, according to the third principle of the present invention, the transmission-delay-time adjustment is carried out until the transmission-delay time measured by the center device falls within a predetermined range. Therefore, a dynamic and reliable transmission-delay-time adjustment is achieved.

Also, according to the third principle of the present invention, when the transmission-delay time measured by the center device falls within the predetermined range, the transmission-delay-time-adjustment-completion message is transmitted. Therefore, an inconsistency between the center device and the communication-terminal device is less likely to happen.

Also, according to the third principle of the present invention, when the transmission-delay time measured by the center device is still out of the predetermined range even after repeating the transmission-delay-time-adjustment process a predetermined number of times, the center device notifies the communication-terminal device of the failure of the transmission-delay-time adjustment. Therefore, when the transmission-delay-time adjustment is not successful, the transmission-delay-time adjustment can be restarted, thereby reducing the likelihood of the failure.

Also, according to the third principle of the present invention, the center device periodically transmits the global message for checking an existence of a newly installed communication-terminal device, and receives a response from the newly installed communication-terminal device to check whether the transmission-delay time of the newly installed communication-terminal device is appropriate. Thus, a reliable transmission-delay-time setting is conducted for the newly installed device.

Also, according to the third principle of the present invention, the center device obtains the average of transmission-delay times for a predetermined number of responses to generate information on the transmission-delay-time adjustment. Therefore, when the transmission-delay time is displaced during an operation, the automatic adjustment is achieved to recover an appropriate transmission-delay time.

Also, according to the third principle of the present invention, when the transmission-delay time of the latest response (message) is different from the average by more than a predetermined amount, the transmission-delay time of the latest response is discarded, and the current average is used for the transmission-delay-time adjustment. Therefore, even when the transmission-delay time is excessively displaced because of noise or the like, this transmission-delay time is not included in the calculation of the average, thereby avoiding an undesirable influence of the noise or the like.

Also, according to the third principle of the present invention, when the transmission-delay time of the latest response is different from the average by more than a predetermined amount and when the occurrences of such a situation reach a predetermined number, the current average is discarded to restart the measurement of the transmission-delay times. Therefore, even when the transmission-delay time exceeds an adjustable range because of an addition of a communication cable, etc., the adjustment of the transmission-delay time is restarted.

Further, the present invention is not limited to these embodiments, but various variations and modifications may be made without departing from the scope of the present invention.

What is claimed is:

1. A method of an automatic adjustment of a carrier level for a system having a center device, a communication line extending from said center device, and at least one communication-terminal device connected to said communication line, said system conducting two-way communication of data signals on said communication line based on a predetermined multiplexing scheme, said method comprising the steps of:

a) periodically transmitting a carrier-level-measurement message from said center device to said communication line for each high-frequency channel used for said two-way communication, said carrier-level-measurement message being sent via a firsts channel provided as a default channel different from channels used for communication and control;

b) transmitting a reply message in response to said carrier-level-measurement message from a communication-terminal device to said center device via a second channel provided as a default channel different from said channels used for communication and control;

c) transmitting a carrier-level-adjustment message from said center device to said communication line via said first channel, said carrier-level-adjustment message containing level-adjustment information based on a carrier level of said reply message received by said center device;

d) adjusting a carrier level of said communication-terminal device based on said level-adjustment information of said carrier-level-adjustment message received by said communication-terminal device;

e) obtaining an average of a predetermined number of carrier levels obtained by repeatedly receiving said reply message so as to create said level-adjustment information based on said average; and f) discarding said average and restarting measuring of said carrier levels when a predetermined number of occurrences of a carrier level of most recent one of said reply message is different from said average by more than a predetermined amount.

2. The method as claimed in claim 1, further comprising the steps of:

g) transmitting a reply message from said communication-terminal device to said center device by using said carrier level of said communication-terminal device adjusted at said step d); and h) measuring a carrier level of said reply message of said step g) by said center device, wherein said steps c) through f) are repeated until said carrier level measured at said step f) falls within a predetermined range.

3. The method as claimed in claim 2, further comprising a step of informing said communication-terminal device of a completion of a carrier-level adjustment when said carrier level measured at said step h) falls within said predetermined range.

4. The method as claimed in claim 2, further comprising a step of informing said communication-terminal device of a failure of a carrier-level adjustment when said carrier level measured at said step h) is out of said predetermined range after a predetermined number of repetitions of said steps c) through h).

5. The method as claimed in claim 1, further comprising the steps of:

g) periodically transmitting an existence-check message for checking an existence of a newly installed communication-terminal device to said communication line; and h) measuring a carrier level of a reply message sent from said newly installed communication-terminal device responding to said existence-check message so as to decide if this carrier level is appropriate.

6. The method as claimed in claim 5, further comprising a step i) of raising a carrier level of a reply message responding to a next existence-check message by a predetermined increment amount when said reply message of said step h) has not been received by said center device.

7. The method as claimed in claim 6, wherein said carrier level of said communication-terminal device is set to the lowest setting to repeat said steps g) through i) when said reply message of said step h) is not received by said center device even by using the highest setting of said carrier level of said communication-terminal device.

8. The method as claimed in claim 1, further comprising a step g) of obtaining an estimate of a carrier level for a transmission from said communication-terminal device based on a carrier level of a transmission from said center device so as to use said estimate as an initial setting of said carrier level of said communication-terminal device.

9. The method as claimed in claim 1, further comprising a step h) of discarding the most recent one of said reply message without updating said average to use said average for a carrier-level adjustment when a carrier level of said most recent one of said reply message is different from said average by more than a predetermined amount.

10. The method as claimed in claim 1, wherein said level-adjustment information is an adjustment amount by which said carrier level of said communication-terminal device should be changed.

11. A center device used in a system for a two-way communication of data signals based on a predetermined multiplexing scheme, said center device connected to a communication line, said communication line connected to at least one communication terminal device, said center device comprising:

first means for periodically transmitting a carrier-level-measurement message to said communication line for each high-frequency channel used for said two-way communication, said carrier-level-measurement message being sent via a first channel provided as a default channel different from channels used for communication and control;

second means for transmitting a carrier-level-adjustment message to said communication line via said first channel, said carrier-level-adjustment message containing level-adjustment information based on a received-carrier level of a reply message sent from a communication-terminal device responding to said carrier-level-measurement message, said reply message being sent via a second channel provided as a default channel different from said channels used for communication and control;

eighth means for obtaining an average of a predetermined number of received-carrier levels obtained by repeatedly receiving said reply message so as to create said level-adjustment information based on said average; and tenth means for discarding said average and restarting measuring of said received-carrier levels when there is a predetermined number of occurrences of a received-carrier level of most recent one of said reply message is different from said average by more than a predetermined amount.

12. The center device as claimed in claim 11, further comprising third means for measuring a received-carrier level of a reply message sent by said communication-terminal device using a carrier level adjusted based on said level-adjustment information.

13. The center device as claimed in claim 12, further comprising fourth means for notifying said communication-terminal device of a completion of a carrier-level adjustment when said received-carrier level measured by said third means falls within a predetermined range.

14. The center device as claimed in claim 13, further comprising fifth means for notifying said communication-terminal device of a failure of a carrier-level adjustment when said received-carrier level measured by said third means is out of a predetermined range after sending a predetermined number of said carrier-level-adjustment message.

15. The center device as claimed in claim 11, further comprising:

sixth means for periodically transmitting an existence-check message for checking an existence of a newly installed communication-terminal device to said communication line; and seventh means for measuring a carrier level of a reply message sent from said newly installed communication-terminal device responding to said existence-check message so as to decide if this carrier level is appropriate.

16. The center device as claimed in claim 11, further comprising ninth means for discarding the most recent one of said reply message without updating said average to use said average for a carrier-level adjustment when a received-carrier level of said most recent one of said reply message is different from said average by more than a predetermined amount.

17. A communication-terminal device used in a system for a two-way communication of data signals based on a predetermined multiplexing scheme, said communication terminal device connected to a communication line, said communication line connected to a center device, said communication-terminal device comprising:

first means for periodically receiving a carrier-level-measurement message for each high-frequency channel used for said two-way communication as said carrier-level-measurement message is sent from said center device via a first channel provided as a default channel different from channels used for communication and control, so as to transmit a reply message to said center device in response to said carrier-level-measurement message via a second channel provided as a default channel different from said channels used for communication and control;

second means for adjusting a carrier level for transmission based on level-adjustment information after receiving a carrier-level-adjustment message from said center device via said first channel, said carrier-level-adjustment message containing said level-adjustment information based on a carrier level of said reply message received by said center device;

sixth means for obtaining an average of a predetermined number of received-carrier levels obtained by repeatedly receiving said reply message so as to create said level-adjustment information based on said average; and seventh means for discarding said average and restarting measuring of said received-carrier levels when there is a predetermined number of occurrences of a received-carrier level of most recent one of said reply message is different from said average by more than a predetermined amount.

18. The communication-terminal device as claimed in claim 17, further comprising third means for raising a carrier level of a reply message responding to an existence-check message by a predetermined increment amount when said reply message previously transmitted to said center device in response to a previous existence-check message has not been received by said center device, said existence-check message being sent from said center device to check an existence of a newly installed communication-terminal device, said reply message responding to said existence-check message being used by said center device for measuring a received carrier level of said reply message to determine if this carrier level is appropriate.

19. The communication-terminal device as claimed in claim 17, further comprising fourth means for setting a carrier level of a reply message responding to an existence-check message to the lowest setting when said reply message responding to said existence-check message is not received by said center device even when using the highest setting of said carrier level, said existence-check message being sent from said center device to check an existence of a newly installed communication-terminal device, said reply message responding to said existence-check message being used by said center device for measuring a received carrier level of said reply message to determine if this carrier level is appropriate.

20. The communication-terminal device as claimed in claim 17, further comprising fifth means for obtaining an estimate of a carrier level for a transmission from said communication-terminal device based on a carrier level of a transmission from said center device so as to use said estimate as an initial setting of said carrier level of said communication-terminal device.

* * * * *